(12) United States Patent
Fang et al.

(10) Patent No.: US 12,177,081 B2
(45) Date of Patent: Dec. 24, 2024

(54) SYSTEM, METHOD, AND APPARATUS TO EXECUTE VEHICLE COMMUNICATIONS USING A ZONAL ARCHITECTURE

(71) Applicant: Sonatus, Inc., Sunnyvale, CA (US)

(72) Inventors: Yu Fang, Palo Alto, CA (US);
Xuanran Zong, Sunnyvale, CA (US);
James Murphy, Alameda, CA (US);
Rohit Sharma, San Jose, CA (US);
Jaime Alcantara Portillo, Los Altos, CA (US)

(73) Assignee: Sonatus, Inc., Sunnyvale, CA (US)

( * ) Notice: Subject to any disclaimer, the term of this patent is extended or adjusted under 35 U.S.C. 154(b) by 0 days.

(21) Appl. No.: 18/417,481

(22) Filed: Jan. 19, 2024

(65) Prior Publication Data

US 2024/0163172 A1   May 16, 2024

Related U.S. Application Data

(63) Continuation of application No. 18/244,147, filed on Sep. 8, 2023, which is a continuation-in-part of
(Continued)

(51) Int. Cl.
*G06F 15/16* (2006.01)
*G06F 9/54* (2006.01)
(Continued)

(52) U.S. Cl.
CPC .......... *H04L 41/0893* (2013.01); *G07C 5/008* (2013.01); *H04L 41/28* (2013.01);
(Continued)

(58) Field of Classification Search
CPC ....... H04L 41/0893; H04L 2012/40215; H04L 29/12849; H04L 45/72; H04L 43/0876;
(Continued)

(56) References Cited

U.S. PATENT DOCUMENTS

| | | |
|---|---|---|
| 6,292,731 B1 | 9/2001 | Kirchhoffer et al. |
| 7,702,739 B1 | 4/2010 | Cheng et al. |

(Continued)

FOREIGN PATENT DOCUMENTS

| | | |
|---|---|---|
| CN | 103019167 A | 4/2013 |
| CN | 103685000 A | 3/2014 |

(Continued)

OTHER PUBLICATIONS

"Automotive testing and Engineering services", 2022, 20 pages.
(Continued)

*Primary Examiner* — Hamza N Algibhah
(74) *Attorney, Agent, or Firm* — GTC Law Group

(57) ABSTRACT

An example system including a vehicle multi-zone monitoring platform, including a network layout circuit structured to interpret a virtual network layout for a vehicle having a multi-zone network; a network characterization circuit structured to interpret network activity for the vehicle; and a network analysis circuit structured to determine a virtual network map in response to the virtual network layout and the network activity, and to provide the virtual network map to a user interface.

12 Claims, 88 Drawing Sheets

Related U.S. Application Data application No. 17/570,738, filed on Jan. 7, 2022, now Pat. No. 11,929,878, which is a continuation of application No. 17/027,187, filed on Sep. 21, 2020, now Pat. No. 11,228,496.

(60) Provisional application No. 63/404,918, filed on Sep. 8, 2022, provisional application No. 63/024,383, filed on May 13, 2020, provisional application No. 62/986,444, filed on Mar. 6, 2020, provisional application No. 62/911,249, filed on Oct. 5, 2019, provisional application No. 62/911,248, filed on Oct. 5, 2019, provisional application No. 62/903,462, filed on Sep. 20, 2019.

(51) Int. Cl.
| | |
|---|---|
| *G07C 5/00* | (2006.01) |
| *H04L 9/40* | (2022.01) |
| *H04L 29/06* | (2006.01) |
| *H04L 41/0893* | (2022.01) |
| *H04L 41/28* | (2022.01) |
| *H04L 43/0876* | (2022.01) |
| *H04L 47/20* | (2022.01) |
| *H04L 61/3015* | (2022.01) |
| *H04L 61/4511* | (2022.01) |
| *H04W 4/40* | (2018.01) |

(52) U.S. Cl.
CPC .......... *H04L 43/0876* (2013.01); *H04L 47/20* (2013.01); *H04L 61/3025* (2013.01); *H04L 61/4511* (2022.05); *H04L 63/0236* (2013.01); *H04W 4/40* (2018.02)

(58) Field of Classification Search
CPC ............. H04L 61/3025; H04L 61/4511; H04L 63/0236; H04W 4/40; G07C 5/008
USPC ........................................................ 709/223
See application file for complete search history.

(56) References Cited

U.S. PATENT DOCUMENTS

| | | | |
|---|---|---|---|
| 8,024,486 B2 | 9/2011 | Beers et al. | |
| 8,705,527 B1 | 4/2014 | Addepalli et al. | |
| 9,355,507 B1 | 5/2016 | Lee et al. | |
| 9,380,428 B1 | 6/2016 | Dame et al. | |
| 9,470,579 B2 | 10/2016 | Ritter et al. | |
| 9,634,892 B2 | 4/2017 | Das | |
| 9,852,636 B2 | 12/2017 | Chow et al. | |
| 9,871,819 B2 | 1/2018 | Liyanage et al. | |
| 10,181,059 B1 | 1/2019 | Brewton et al. | |
| 10,573,168 B1 | 2/2020 | Razak et al. | |
| 10,616,176 B2 | 4/2020 | Lei et al. | |
| 10,650,621 B1 | 5/2020 | King et al. | |
| 10,759,424 B2 | 9/2020 | Misu et al. | |
| 10,945,199 B2 | 3/2021 | Omiya et al. | |
| 10,951,728 B2* | 3/2021 | Lepp | H04L 67/566 |
| 11,072,356 B2 | 7/2021 | Mong et al. | |
| 11,165,651 B2 | 11/2021 | Fang et al. | |
| 11,228,496 B2 | 1/2022 | Fang et al. | |
| 11,252,039 B2* | 2/2022 | Fang | H04L 47/20 |
| 11,287,150 B2 | 3/2022 | Guan et al. | |
| 11,312,374 B2 | 4/2022 | Zhao et al. | |
| 11,349,717 B2 | 5/2022 | Fang et al. | |
| 11,362,899 B2 | 6/2022 | Fang et al. | |
| 11,386,229 B2 | 7/2022 | Adams et al. | |
| 11,411,823 B2 | 8/2022 | Fang et al. | |
| 11,520,677 B1 | 12/2022 | Arazi | |
| 11,538,287 B2 | 12/2022 | Fang et al. | |
| 11,721,137 B2 | 8/2023 | Fang et al. | |
| 11,736,357 B2 | 8/2023 | Fang et al. | |
| 11,750,462 B2 | 9/2023 | Fang et al. | |
| 11,772,583 B2 | 10/2023 | Fang et al. | |
| 11,778,434 B2 | 10/2023 | Kim et al. | |
| 11,805,018 B2 | 10/2023 | Fang et al. | |
| 11,824,722 B2 | 11/2023 | Fang et al. | |
| 11,929,878 B2 | 3/2024 | Fang et al. | |
| 11,943,109 B2 | 3/2024 | Fang et al. | |
| 12,003,374 B2 | 6/2024 | Fang et al. | |
| 12,034,601 B2 | 7/2024 | Fang et al. | |
| 2001/0033225 A1* | 10/2001 | Razavi | H04L 67/34 340/988 |
| 2004/0093434 A1 | 5/2004 | Hovell et al. | |
| 2004/0267410 A1 | 12/2004 | Duri et al. | |
| 2005/0075760 A1 | 4/2005 | Moisel et al. | |
| 2005/0108444 A1 | 5/2005 | Flauaus et al. | |
| 2005/0182534 A1 | 8/2005 | Legate et al. | |
| 2006/0089938 A1 | 4/2006 | Leonard et al. | |
| 2006/0155438 A1 | 7/2006 | Tsunoda et al. | |
| 2007/0229350 A1* | 10/2007 | Scalisi | G06Q 10/08 342/350 |
| 2008/0119983 A1 | 5/2008 | Inbarajan et al. | |
| 2008/0147250 A1 | 6/2008 | Oesterling et al. | |
| 2008/0195257 A1 | 8/2008 | Rauch | |
| 2008/0258939 A1 | 10/2008 | Smith et al. | |
| 2009/0125153 A1 | 5/2009 | Yang et al. | |
| 2009/0187968 A1 | 7/2009 | Roese et al. | |
| 2009/0207818 A1 | 8/2009 | Tsai et al. | |
| 2009/0256690 A1 | 10/2009 | Golenski | |
| 2010/0169353 A1 | 7/2010 | Soetarman | |
| 2010/0269155 A1 | 10/2010 | Droms et al. | |
| 2010/0332584 A1 | 12/2010 | Ramakrishnan et al. | |
| 2011/0078299 A1 | 3/2011 | Nagapudi et al. | |
| 2011/0153149 A1* | 6/2011 | Jeon | H04L 69/169 701/1 |
| 2011/0169755 A1* | 7/2011 | Murphy | G06F 9/451 345/173 |
| 2011/0196571 A1 | 8/2011 | Foladare et al. | |
| 2011/0260884 A1 | 10/2011 | Yi et al. | |
| 2011/0269441 A1 | 11/2011 | Silver | |
| 2012/0139489 A1 | 6/2012 | Gaul et al. | |
| 2012/0271849 A1* | 10/2012 | Lesser | G06F 16/245 707/E17.014 |
| 2013/0159489 A1* | 6/2013 | Cha | H04L 61/5038 709/223 |
| 2013/0303192 A1 | 11/2013 | Louboutin et al. | |
| 2013/0311774 A1 | 11/2013 | Larson et al. | |
| 2014/0173076 A1 | 6/2014 | Ravindran et al. | |
| 2014/0215491 A1 | 7/2014 | Addepalli et al. | |
| 2014/0276090 A1 | 9/2014 | Breed | |
| 2014/0277935 A1 | 9/2014 | Daman et al. | |
| 2014/0325602 A1* | 10/2014 | Kwon | H04L 67/12 726/4 |
| 2014/0350768 A1* | 11/2014 | Filippov | B60W 60/0053 701/23 |
| 2014/0359185 A1 | 12/2014 | Sawal et al. | |
| 2015/0051787 A1 | 2/2015 | Doughty et al. | |
| 2015/0071115 A1 | 3/2015 | Neff et al. | |
| 2015/0149017 A1 | 5/2015 | Attard et al. | |
| 2015/0200969 A1 | 7/2015 | Leung et al. | |
| 2015/0210287 A1 | 7/2015 | Penilla et al. | |
| 2015/0228130 A1 | 8/2015 | Zinner et al. | |
| 2015/0244806 A1 | 8/2015 | Renac et al. | |
| 2015/0276415 A1 | 10/2015 | Shrinath et al. | |
| 2016/0031441 A1 | 2/2016 | Foley | |
| 2016/0133063 A1 | 5/2016 | Lim et al. | |
| 2016/0163136 A1 | 6/2016 | Lee et al. | |
| 2016/0182341 A1 | 6/2016 | Fischer et al. | |
| 2016/0197776 A1* | 7/2016 | Das | H04W 8/265 455/419 |
| 2016/0255154 A1* | 9/2016 | Kim | H04L 63/08 726/25 |
| 2016/0269225 A1 | 9/2016 | Kirchmeier et al. | |
| 2016/0275158 A1* | 9/2016 | Baset | G06F 16/248 |
| 2016/0294605 A1 | 10/2016 | Searle et al. | |
| 2016/0328197 A1 | 11/2016 | Bai et al. | |
| 2017/0054574 A1 | 2/2017 | Wu et al. | |
| 2017/0060559 A1 | 3/2017 | Ye et al. | |
| 2017/0126810 A1 | 5/2017 | Kentley et al. | |
| 2017/0134164 A1 | 5/2017 | Haga et al. | |

(56) References Cited

U.S. PATENT DOCUMENTS

| | | |
|---|---|---|
| 2017/0147989 A1 | 5/2017 | Onimaru |
| 2017/0161973 A1 | 6/2017 | Katta et al. |
| 2017/0210228 A1 | 7/2017 | Katayama et al. |
| 2017/0228410 A1 | 8/2017 | Slusar |
| 2017/0248965 A1 | 8/2017 | Wellman et al. |
| 2017/0251339 A1 | 8/2017 | Addepalli et al. |
| 2017/0262277 A1 | 9/2017 | Endo et al. |
| 2017/0339056 A1 | 11/2017 | Uno |
| 2017/0339095 A1* | 11/2017 | Lei ................. H04L 61/5076 |
| 2017/0359128 A1 | 12/2017 | Xi et al. |
| 2018/0007161 A1 | 1/2018 | Hwang et al. |
| 2018/0017404 A1 | 1/2018 | Mendels et al. |
| 2018/0062988 A1 | 3/2018 | Sikaria et al. |
| 2018/0072250 A1 | 3/2018 | Kim et al. |
| 2018/0076970 A1 | 3/2018 | Han et al. |
| 2018/0131524 A1* | 5/2018 | Shin ..................... H04L 9/14 |
| 2018/0189323 A1 | 7/2018 | Wheeler |
| 2018/0191636 A1* | 7/2018 | Wang ................. H04L 47/762 |
| 2018/0205703 A1 | 7/2018 | Grau |
| 2018/0232235 A1 | 8/2018 | Gaur et al. |
| 2018/0237039 A1 | 8/2018 | Mong et al. |
| 2018/0261020 A1 | 9/2018 | Petousis et al. |
| 2018/0267530 A1 | 9/2018 | Sugaiwa et al. |
| 2018/0270230 A1 | 9/2018 | Schmidt et al. |
| 2018/0286152 A1 | 10/2018 | Iwaasa |
| 2018/0287815 A1 | 10/2018 | Yamamoto et al. |
| 2018/0293809 A1 | 10/2018 | James et al. |
| 2018/0357561 A1 | 12/2018 | Selvarajan et al. |
| 2018/0367525 A1 | 12/2018 | Kassimis et al. |
| 2019/0007794 A1 | 1/2019 | Thakur et al. |
| 2019/0020985 A1 | 1/2019 | Dai et al. |
| 2019/0028864 A1 | 1/2019 | Liang et al. |
| 2019/0068407 A1 | 2/2019 | Haga et al. |
| 2019/0079842 A1 | 3/2019 | Chae et al. |
| 2019/0095650 A1 | 3/2019 | Midgley |
| 2019/0097932 A1* | 3/2019 | Buczek ................. H04L 12/413 |
| 2019/0098472 A1 | 3/2019 | Yoshihara |
| 2019/0108049 A1 | 4/2019 | Singh et al. |
| 2019/0123908 A1 | 4/2019 | Morita et al. |
| 2019/0129778 A1 | 5/2019 | Olson et al. |
| 2019/0141133 A1 | 5/2019 | Rajan et al. |
| 2019/0141142 A1 | 5/2019 | Filippou et al. |
| 2019/0188651 A1 | 6/2019 | Penilla et al. |
| 2019/0207862 A1 | 7/2019 | Kajio et al. |
| 2019/0215185 A1 | 7/2019 | Hellenthal |
| 2019/0217777 A1 | 7/2019 | John Naum Vangelov et al. |
| 2019/0256049 A1 | 8/2019 | Jawany et al. |
| 2019/0258252 A1 | 8/2019 | Muta et al. |
| 2019/0260800 A1 | 8/2019 | Shalev et al. |
| 2019/0287080 A1 | 9/2019 | Penilla et al. |
| 2019/0334763 A1* | 10/2019 | Cawse ................. H04L 43/0817 |
| 2019/0349071 A1* | 11/2019 | Saxena ............. H04B 7/18506 |
| 2019/0356574 A1 | 11/2019 | Schoch |
| 2019/0379683 A1 | 12/2019 | Overby et al. |
| 2019/0394089 A1* | 12/2019 | Barrett ................. H04W 12/088 |
| 2019/0394305 A1 | 12/2019 | Kim et al. |
| 2020/0036717 A1 | 1/2020 | Akella et al. |
| 2020/0053577 A1 | 2/2020 | Sundar |
| 2020/0057630 A1 | 2/2020 | Cho et al. |
| 2020/0090504 A1 | 3/2020 | Kadar et al. |
| 2020/0145252 A1 | 5/2020 | Torisaki et al. |
| 2020/0160633 A1* | 5/2020 | Zhang ................. B60R 25/102 |
| 2020/0164882 A1 | 5/2020 | Beiderbeck et al. |
| 2020/0186449 A1 | 6/2020 | Tofighbakhsh et al. |
| 2020/0208998 A1 | 7/2020 | Xiang et al. |
| 2020/0209002 A1* | 7/2020 | Hou ..................... G07C 5/008 |
| 2020/0210336 A1 | 7/2020 | Bräutigam et al. |
| 2020/0218531 A1 | 7/2020 | Kushwaha et al. |
| 2020/0252339 A1 | 8/2020 | McKeefery et al. |
| 2020/0257317 A1 | 8/2020 | Musk et al. |
| 2020/0259919 A1* | 8/2020 | Lepp ..................... H04W 4/44 |
| 2020/0264632 A1* | 8/2020 | Sugimoto ............. G05D 1/0287 |
| 2020/0267080 A1 | 8/2020 | Joshi et al. |
| 2020/0274927 A1 | 8/2020 | Richmond et al. |
| 2020/0296139 A1* | 9/2020 | Fainberg ............. H04L 63/205 |
| 2020/0341956 A1 | 10/2020 | Bayer et al. |
| 2020/0342691 A1 | 10/2020 | Saers et al. |
| 2020/0344090 A1 | 10/2020 | Park |
| 2020/0346628 A1* | 11/2020 | Whitfield, Jr. .......... B60T 8/171 |
| 2020/0361487 A1* | 11/2020 | Sakamoto ................. G05B 9/02 |
| 2020/0371774 A1* | 11/2020 | Kato ......................... G06F 8/65 |
| 2020/0374221 A1* | 11/2020 | Tandon .................. H04L 45/42 |
| 2020/0389469 A1 | 12/2020 | Litichever et al. |
| 2020/0406910 A1 | 12/2020 | Ruan et al. |
| 2020/0413408 A1 | 12/2020 | Bailey et al. |
| 2021/0021497 A1 | 1/2021 | Brinkman et al. |
| 2021/0024035 A1 | 1/2021 | Nakashima et al. |
| 2021/0026617 A1 | 1/2021 | Maru et al. |
| 2021/0070321 A1* | 3/2021 | Serizawa ............. G07C 5/0808 |
| 2021/0075800 A1* | 3/2021 | Paraskevas ......... H04L 63/1441 |
| 2021/0092018 A1 | 3/2021 | Fang et al. |
| 2021/0092019 A1 | 3/2021 | Fang et al. |
| 2021/0144068 A1 | 5/2021 | Mo et al. |
| 2021/0152639 A1 | 5/2021 | Madden |
| 2021/0155267 A1* | 5/2021 | Goto ................... B60W 30/165 |
| 2021/0155269 A1* | 5/2021 | Oba ....................... H04W 4/44 |
| 2021/0158688 A1 | 5/2021 | Lau et al. |
| 2021/0171042 A1* | 6/2021 | Hayakawa ............. G08G 1/167 |
| 2021/0173911 A1* | 6/2021 | Ohashi ..................... G06F 21/32 |
| 2021/0192867 A1 | 6/2021 | Fang et al. |
| 2021/0197831 A1 | 7/2021 | Choi et al. |
| 2021/0209519 A1 | 7/2021 | Baskin et al. |
| 2021/0232687 A1 | 7/2021 | Sasaki et al. |
| 2021/0234760 A1 | 7/2021 | Fang et al. |
| 2021/0234761 A1 | 7/2021 | Fang et al. |
| 2021/0234762 A1 | 7/2021 | Fang et al. |
| 2021/0234763 A1* | 7/2021 | Fang ..................... H04W 4/40 |
| 2021/0234767 A1 | 7/2021 | Ricci et al. |
| 2021/0258189 A1* | 8/2021 | Toyoda ............. H04L 12/40202 |
| 2021/0264693 A1 | 8/2021 | Rueck et al. |
| 2021/0310217 A1* | 10/2021 | Akiyama ............... E02F 9/2054 |
| 2021/0407220 A1* | 12/2021 | Fang ..................... G07C 5/0808 |
| 2021/0410134 A1 | 12/2021 | Cheraghi et al. |
| 2022/0046460 A1 | 2/2022 | Samuel et al. |
| 2022/0070063 A1 | 3/2022 | Fang et al. |
| 2022/0078084 A1 | 3/2022 | Fang et al. |
| 2022/0118924 A1* | 4/2022 | Wortberg ................ B60R 16/03 |
| 2022/0131751 A1 | 4/2022 | Fang et al. |
| 2022/0131752 A1 | 4/2022 | Fang et al. |
| 2022/0131753 A1 | 4/2022 | Fang et al. |
| 2022/0131754 A1* | 4/2022 | Fang ..................... H04L 43/0876 |
| 2022/0131755 A1 | 4/2022 | Fang et al. |
| 2022/0158974 A1* | 5/2022 | Wang ..................... H04L 63/104 |
| 2022/0173969 A1* | 6/2022 | Fang ..................... H04W 12/37 |
| 2022/0173970 A1 | 6/2022 | Fang et al. |
| 2022/0173971 A1 | 6/2022 | Fang et al. |
| 2022/0173972 A1 | 6/2022 | Fang et al. |
| 2022/0217074 A1* | 7/2022 | Akhavain Mohammadi ............... H04L 45/64 |
| 2022/0231917 A1 | 7/2022 | Fang et al. |
| 2022/0271971 A1 | 8/2022 | Newald et al. |
| 2022/0297635 A1 | 9/2022 | Fang et al. |
| 2022/0303194 A1 | 9/2022 | Palaios et al. |
| 2023/0043675 A1 | 2/2023 | Liu et al. |
| 2023/0109635 A1 | 4/2023 | Palermo et al. |
| 2023/0150523 A1 | 5/2023 | Fang et al. |
| 2023/0154244 A1 | 5/2023 | Fang et al. |
| 2023/0154245 A1 | 5/2023 | Fang et al. |
| 2023/0154246 A1 | 5/2023 | Fang et al. |
| 2023/0156748 A1* | 5/2023 | Li ......................... H04W 4/08 370/329 |
| 2023/0158974 A1 | 5/2023 | Fang et al. |
| 2023/0158975 A1 | 5/2023 | Fang et al. |
| 2023/0161583 A1 | 5/2023 | Fang et al. |
| 2023/0298398 A1 | 9/2023 | Fang et al. |
| 2023/0298399 A1 | 9/2023 | Fang et al. |
| 2023/0298400 A1 | 9/2023 | Fang et al. |
| 2023/0298401 A1 | 9/2023 | Fang et al. |
| 2023/0298402 A1 | 9/2023 | Fang et al. |
| 2023/0298403 A1 | 9/2023 | Fang et al. |
| 2023/0298404 A1 | 9/2023 | Fang et al. |
| 2023/0298405 A1 | 9/2023 | Fang et al. |
| 2023/0298406 A1 | 9/2023 | Fang et al. |
| 2023/0306796 A1 | 9/2023 | Tsuchiya et al. |

(56) References Cited

U.S. PATENT DOCUMENTS

| | | | |
|---|---|---|---|
| 2023/0316817 A1 | 10/2023 | Fang et al. | |
| 2023/0353446 A1* | 11/2023 | Ichimaru | H04L 43/08 |
| 2023/0360448 A1 | 11/2023 | Fang et al. | |
| 2023/0396634 A1 | 12/2023 | Fang et al. | |
| 2024/0022524 A1 | 1/2024 | Bibernell et al. | |
| 2024/0073093 A1* | 2/2024 | Fang | H04L 63/0236 |
| 2024/0098592 A1 | 3/2024 | Janneteau et al. | |
| 2024/0154867 A1 | 5/2024 | Fang et al. | |
| 2024/0154868 A1 | 5/2024 | Fang et al. | |
| 2024/0154869 A1 | 5/2024 | Fang et al. | |
| 2024/0163173 A1 | 5/2024 | Fang et al. | |
| 2024/0163174 A1 | 5/2024 | Fang et al. | |
| 2024/0179063 A1 | 5/2024 | Fang et al. | |
| 2024/0214271 A1 | 6/2024 | Fang et al. | |

FOREIGN PATENT DOCUMENTS

| | | | |
|---|---|---|---|
| CN | 106961437 A | 7/2017 | |
| CN | 107409079 A | 11/2017 | |
| CN | 107819736 A | 3/2018 | |
| CN | 107925594 A | 4/2018 | |
| CN | 208401892 U | 1/2019 | |
| CN | 111835627 A | 10/2020 | |
| DE | 102006023137 A1 | 11/2007 | |
| EP | 1571788 A1 | 9/2005 | |
| EP | 1627778 A1 | 2/2006 | |
| EP | 2959654 A1 | 12/2015 | |
| KR | 20010027471 A | 4/2001 | |
| KR | 100310412 B1 | 9/2001 | |
| WO | 2001026332 | 4/2001 | |
| WO | WO-2007050406 A1 * | 5/2007 | B60T 7/22 |
| WO | 2020039295 A1 | 2/2020 | |
| WO | 2020150872 A1 | 7/2020 | |
| WO | 2021055952 A1 | 3/2021 | |
| WO | WO-2021055955 A1 * | 3/2021 | G07C 5/008 |
| WO | 2021178979 A1 | 9/2021 | |
| WO | 2021178979 A8 | 10/2021 | |
| WO | 2022218554 A1 | 10/2022 | |
| WO | 2022256742 A1 | 12/2022 | |
| WO | 2023059938 A1 | 4/2023 | |
| WO | PCTUS2023/032346 | 9/2023 | |
| WO | 2024054664 A1 | 3/2024 | |
| WO | PCT/US2024/029686 | 5/2024 | |
| WO | PCT/US2024/031110 | 5/2024 | |

OTHER PUBLICATIONS 202080080424.7 , "Chinese Application No. 202080080424.7, First Office Action and Search Report mailed Oct. 12, 2023", Sonatus, Inc., 11 pages.
20864819.6 , "European Application Serial No. 20864819.6, Extended European Search Report mailed Jun. 28, 2023", Sonatus, Inc., 9 pages.
20865060.6 , "European Application Serial No. 20865060.6, Extended European Search Report mailed Jul. 10, 2023", Sonatus, Inc., 8 pages.
Chapin, Peter C., et al., "Authorization in Trust Management: Features and Foundations", Retrieved on Dec. 2, 2020 (Dec. 2, 2020) from <http://lemuria.cis.vtc.edu/-pchapin/papers/chapin-skalka-wang-ACMCS2008.pdf> entire document, 48 pages.
Chen, Wai , et al., "Ad hoc peer-to-peer network architecture for vehicle safety communications", IEEE Communications Magazine, vol. 43, No. 4, 2005, pp. 100-107.
Felser, Max , et al., "Coexistence Standardization of Operation Technology and Information Technology", Proceedings of the IEEE, IEEE. New York, US, vol. 107, No. 6,, Jun. 1, 2019, pp. 962-976.
Herber, Christian , et al., "Real-time capable CAN to AVB ethernet gateway using frame aggregation and scheduling", 2015 Design, Automation & Test in Europe Conference & Exhibition (DATE), EDAA,, Mar. 9, 2015, pp. 61-66.
Ishak, Mohamad Khairi, et al., "Vehicle Sensors Programming BAsed on Controller Area Network (CAN) Bus Using Canoe", 2019, 4 pages.

Nguyen-Duy, Jonathan , "Smart Cars: A Peek Into the Future of Converged Networks", Jan. 9, 2018, 4 pages.
PCT/US2020/051817 , "International Application Serial No. PCT/US2020/051817, International Preliminary Report on Patentability mailed Mar. 31, 2022", Sonatus, Inc., 22 pages.
PCT/US2020/051817 , "International Application Serial No. PCT/US2020/051817, International Search Report and Written Opinion mailed Feb. 24, 2021", Sonatus, Inc., 23 pages.
PCT/US2020/051817 , "International Application Serial No. PCT/US2020/051817, Invitation to Pay Additional Fees and, Where Applicable, Protest Fee mailed Dec. 1, 2020", Sonatus, Inc., 2 pages.
PCT/US2020/051825 , "International Application Serial No. PCT/US2020/051825, International Search Report and Written Opinion mailed Jan. 13, 2021", Sonatus, Inc., 15 pages.
PCT/US2021/021421 , "International Application Serial No. PCT/US2021/021421, International Preliminary Report on Patentability mailed Sep. 15, 2022", Sonatus, Inc., 17 pages.
PCT/US2021/021421 , "International Application Serial No. PCT/US2021/021421, International Search Report and Written Opinion mailed Jul. 21, 2021", Sonatus, Inc., 19 pages.
PCT/US2021/021421 , "International Application Serial No. PCT/US2021/021421, Invitation to Pay Additional Fees and, Where Applicable, Protest Fee mailed May 10, 2021", Sonatus, Inc., 2 pages.
PCT/US2022/032380 , "International Application Serial No. PCT/US2022/032380, International Preliminary Report on Patentability mailed Nov. 21, 2023", Sonatus, Inc., 13 pages.
PCT/US2022/032380 , "International Application Serial No. PCT/US2022/032380, International Search Report and Written Opinion mailed Sep. 8, 2022", Sonatus, Inc., 12 pages.
PCT/US2022/046292 , "International Application Serial No. PCT/US2022/046292, International Search Report and Written Opinion mailed Mar. 7, 2023", Sonatus, Inc., 18 pages.
PCT/US2022/046292 , "International Application Serial No. PCT/US2022/046292, Invitation to Pay Additional Fees and, Where Applicable, Protest Fee mailed Jan. 11, 2023", Sonatus, Inc., 2 pages.
PCT/US2023/032346 , "International Application Serial No. PCT/US2023/032346, International Search Report and Written Opinion mailed Nov. 27, 2023", Sonatus, Inc., 3 pages.
PCTUS2020051825 , "International Application Serial No., International Preliminary Report on Patentability mailed Mar. 31, 2022", Sonatus, Inc., 16 pages.
Wakikawa, Ryuji , et al., "Design of Vehicle Network: Mobile Gateway for MANET and NEMO Converged Communication", Sep. 2, 2005, 2 pages.
Wang, Yujing , et al., "Adapting a Container Infrastructure for Autonomous Vehicle Development", Cornell University Library/Computer Science/Software Engineering, Nov. 19, 2019, [online] [retrieved on Jun. 22, 2021 (Jun. 22, 2021)] Retrieved from the Internet < URL: https://arxiv.org/abs/1911.01075>, entire document,, 6 pages.
U.S. Appl. No. 18/244,147, filed Sep. 8, 2023, Pending, Yu Fang.
U.S. Appl. No. 18/532,224, filed Dec. 7, 2023, Pending, Yu Fang.
U.S. Appl. No. 18/532,696, filed Dec. 7, 2023, Pending, Yu Fang.
U.S. Appl. No. 18/743,848, filed Jun. 14, 2024, Pending, Yu Fang.
U.S. Appl. No. 18/743,878, filed Jun. 14, 2024, Pending, Yu Fang.
U.S. Appl. No. 18/743,953, filed Jun. 14, 2024, Pending, Yu Fang.
U.S. Appl. No. 18/743,967, filed Jun. 14, 2024, Pending, Yu Fang.
202217011087 , "Indian Application Serial No. 202217011087 First Examination Report, mailed Jan. 12, 2024", Sonatus, Inc., 6 pages.
202217011256 , "Indian Application Serial No. 202217011256 First Examination Report, mailed Mar. 27, 2024", Sonatus, Inc., 6 pages.
21764127.3 , "European Application Serial No. 21764127.3, Extended European Search Report mailed Mar. 11, 2024", Sonatus, Inc., 7 pages.
PCT/US2022/046292 , "International Application Serial No. PCT/US2022/046292, International Preliminary Report on Patentability mailed Apr. 18, 2024", Sonatus, Inc., 15 pages.

* cited by examiner

2 - Node Topology

3 - Node Topology

Installing the multi-zone network configured in accordance with the zonal architecture value
5306

Fig. 33

Installing the multi-zone network configured in accordance with a network topology description of the zonal architecture value
5306

Fig. 34

Installing the multi-zone network configured in accordance with a zone manager distribution description of the zonal architecture value
5306

Fig. 35

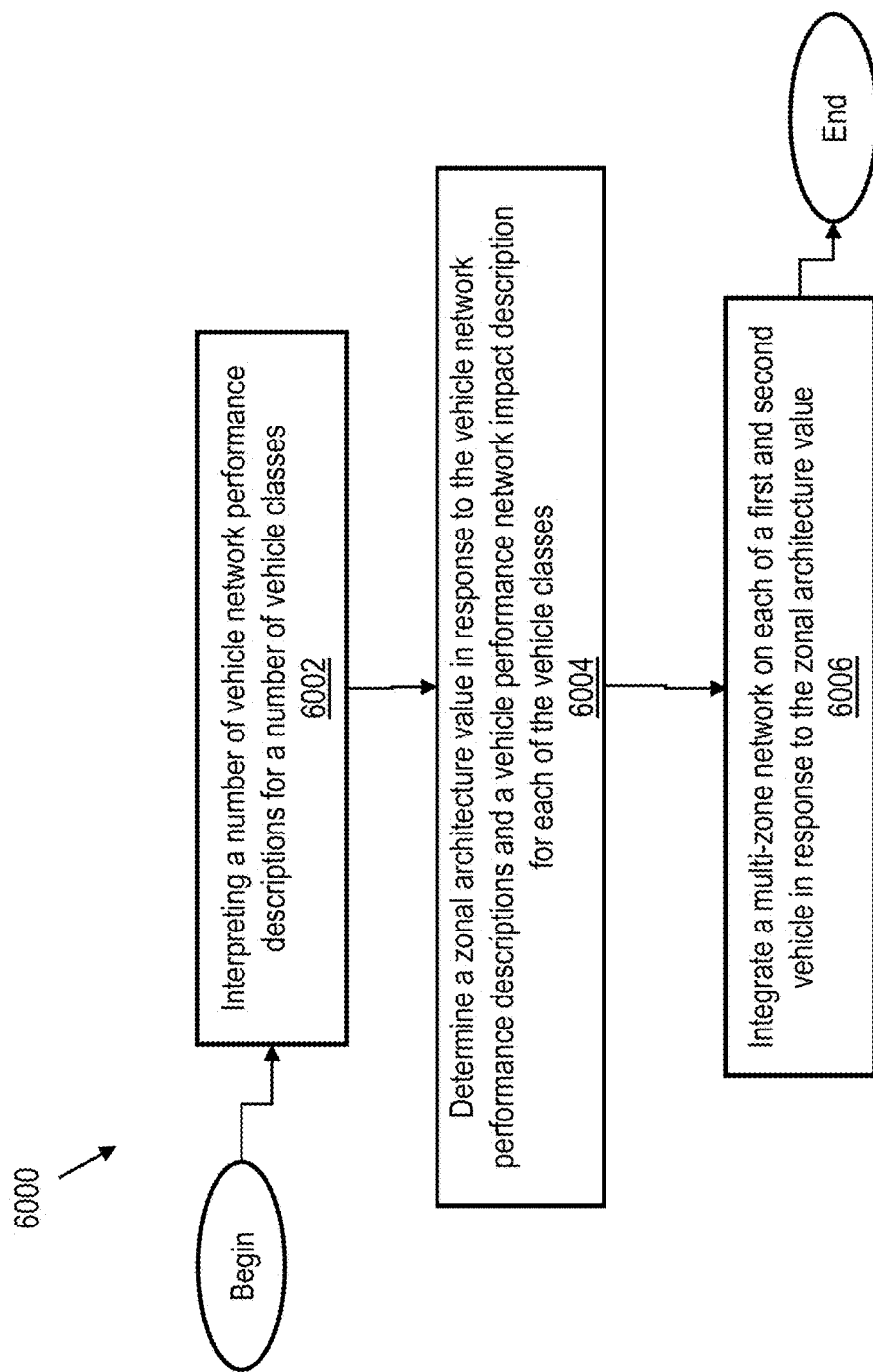

Installing the multi-zone network on each of the vehicles configured in accordance with the zonal architecture value
6006

Fig. 40

Installing the multi-zone network one each of the vehicles configured in accordance with a network topology description of the zonal architecture value
6006

Fig. 41

Installing the multi-zone network on each of the vehicles configured in accordance with a zone manager distribution description of the zonal architecture value
6006

Fig. 42

| Service ID | Service provider description | Service permissions description | Service capability description | Service input description | Service active or inactive flag | Service deprecation flag | Service enrollees description | Service participant description |
|---|---|---|---|---|---|---|---|---|
| | | | | | | | | |
| | | | | | | | | |
| | | | | | | | | |
| | | | | | | | | |

SYSTEM, METHOD, AND APPARATUS TO EXECUTE VEHICLE COMMUNICATIONS USING A ZONAL ARCHITECTURE

CROSS-REFERENCE TO RELATED APPLICATIONS

The present application claims priority to, and is a continuation of, U.S. patent application Ser. No. 18/244,147, filed on 8 Sep. 2023, and entitled SYSTEM, METHOD, AND APPARATUS TO EXECUTE VEHICLE COMMUNICATIONS USING A ZONAL ARCHITECTURE.

U.S. patent application Ser. No. 18/244,147 claims priority to, and is a continuation-in-part of, U.S. patent application Ser. No. 17/570,738, filed on 7 Jan. 2022, Publication No. US 2022-0131753 and entitled SYSTEM, METHOD, AND APPARATUS TO EXTRA VEHICLE COMMUNICATIONS CONTROL.

U.S. patent application Ser. No. 17/570,738 is a continuation of and claims priority to U.S. patent application Ser. No. 17/027,187, filed 21 Sep. 2020, entitled SYSTEM, METHOD, AND APPARATUS TO EXTRA VEHICLE COMMUNICATIONS CONTROL, now issued as U.S. Pat. No. 11,228,496.

U.S. patent application Ser. No. 17/027,187 claims benefit of priority to the following provisional applications: U.S. Application Ser. No. 62/903,462, filed 20 Sep. 2019, entitled SYSTEM, METHOD AND APPARATUS FOR A MIXED VEHICLE NETWORK; U.S. Application Ser. No. 62/911,249, filed 5 Oct. 2019, entitled SYSTEM, METHOD AND APPARATUS FOR A MIXED VEHICLE NETWORK; U.S. Application Ser. No. 62/911,248, filed 5 Oct. 2019, entitled SYSTEM, METHOD AND APPARATUS FOR CLOUD-BASED INTERACTIONS WITH A MIXED VEHICLE NETWORK; U.S. Application Ser. No. 62/986,444, filed 6 Mar. 2020, entitled SYSTEM, METHOD AND APPARATUS FOR IMPLEMENTING CONFIGURABLE DATA COLLECTION FOR A VEHICLE; and U.S. Application Ser. No. 63/024,383, filed 13 May 2020, entitled SYSTEM, METHOD AND APPARATUS TO TEST AND VERIFY A VEHICLE NETWORK.

U.S. patent application Ser. No. 18/244,147 claims benefit of priority to provisional U.S. Application Ser. No. 63/404,918, filed 8 Sep. 2022 entitled ZONAL ARCHITECTURE FOR A VEHICLE.

Each of the foregoing patents and applications are incorporated herein by reference in the entirety for all purposes.

BACKGROUND

Vehicles and mobile applications are increasingly reliant on computing devices distributed around the vehicle to perform electronic control functions. Modern passenger vehicles, as an example, routinely have over 100 separate electronic control devices distributed around the vehicle. These devices cooperate and communicate with each other to perform various vehicle functions. Previously known systems generally connect devices on networks that are organized around particular vehicle functions. The result is that various networks are distributed extensively around the vehicle, with multiple connection paths that result in considerably more hardware (e.g., cables and routing devices) than is necessary to just connect the devices. Vehicles increasingly face high design costs to integrate all of the connections, and security risks from the multiple networks of various types on the vehicle that provide potential access points. Due to the reliance on electronic devices, which is only expected to increase, and the growing capability of vehicles to act autonomously and provide increasing capabilities for the electronic devices, the consequences of a security breach or other security issues on vehicles are increasing. Further, there are a range of devices and capabilities, from modern electronics that can communicate on high speed networks using modern communications, to simple electronics that utilize older networks that can be based on very simple protocols or industry standards.

Thus, vehicles have a patchwork of networks having varying security capabilities, multiple overlapping communication paths based on vehicle function, and consequent difficulties in designing, monitoring, or updating the various networks or the devices thereon.

SUMMARY

Embodiments herein provide for systems and processes to implement a zonal architecture for vehicles to improve operational capability, reduce risk, reduce costs, and increase the security of the network for the vehicle. Embodiments here provide a convenient and capable interface to rapidly reconfigure the network, including during runtime, to respond to network events such as a capability loss or security risk. Embodiments herein further include creating and implementing functions for the vehicle in a service oriented architecture, allowing users to create and roll out content for features while focusing on the capability and performance of the features, and without requiring knowledge of complex network interactions and end point locations, duties, or capabilities.

Certain embodiments herein provide a powerful user interface to design, implement, and monitor network performance for a vehicle, leveraging the zonal architecture and tools to manage cross-network communications in a seamless manner for the user.

Embodiments herein solve a number of challenges in previously known systems, including simplifying network design, implementation, and integration, reducing security risks, and broadening the range of contributors with various expertise to contribute features and capabilities to the vehicle. Further, embodiments herein allow for the rapid implementation and confirmation of reconfiguring the network and implementing features, without requiring significant vehicle operating risks or downtime.

BRIEF DESCRIPTION OF THE FIGURES

The disclosure and the following detailed description of certain embodiments thereof may be understood by reference to the following figures:

FIG. 33 is another procedure to FIG. 32 where a multi-zone network is installed, according to certain embodiments of the present disclosure.

FIG. 34 is another procedure to FIG. 32 where a multi-zone network is installed, according to certain embodiments of the present disclosure.

FIG. 35 is another procedure to FIG. 32 where a multi-zone network is installed, according to certain embodiments of the present disclosure.

FIG. 39 is a process to integrate a multi-zone network on each of a first and second vehicle, according to certain embodiments of the present disclosure.

FIG. 40 is another process as in FIG. 39 to integrate a multi-zone network on each of a first and second vehicle, according to certain embodiments of the present disclosure.

FIG. 41 is another process as in FIG. 39 to integrate a multi-zone network on each of a first and second vehicle, according to certain embodiments of the present disclosure.

FIG. 42 is another process as in FIG. 39 to integrate a multi-zone network on each of a first and second vehicle, according to certain embodiments of the present disclosure.

FIG. 70 is a sample service register, according to certain embodiments of the present disclosure.

DETAILED DESCRIPTION

Figure 1:
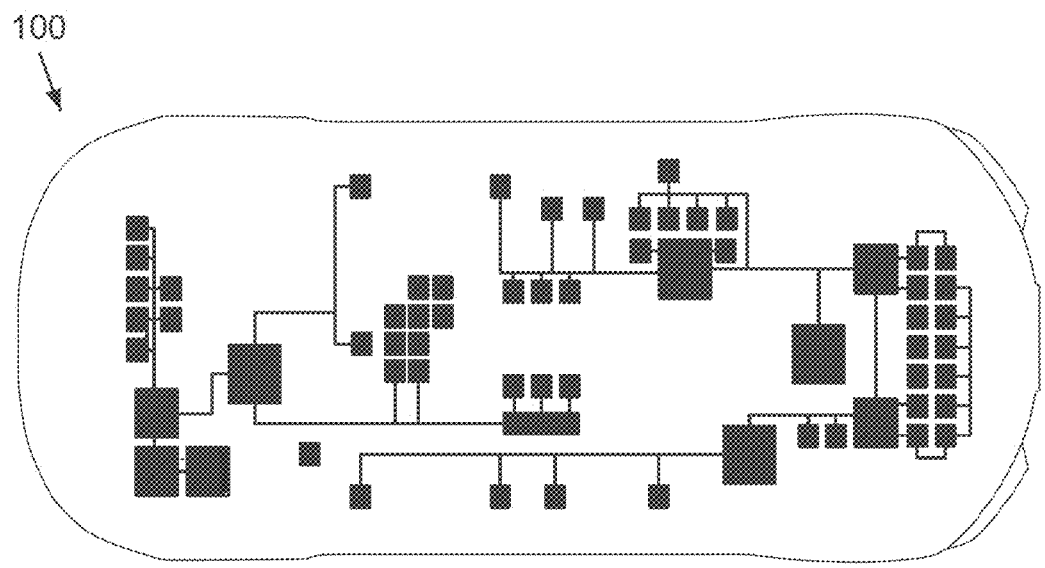
FIG. 1 is a schematic diagram illustrating a previously known network arrangement.

Without limitation to any other aspect of the present disclosure, aspects of the disclosure herein provide an implementation of a zoned network architecture on a vehicle, where each zone includes a portion of end points on the vehicle, and where each zone may include multiple network types, for example with some end points communicating on a CAN network architecture, and other end points communicating on an ethernet architecture, LIN architecture, or the like. The utilization of a zoned architecture provides for a number of benefits over previously known systems, for example allowing for end points to communicatively couple to a network and other devices based upon physical location, rather than a function of the end point, reducing the length of runs for electrical connections, allowing for redundancy of connectivity options (e.g., to accommodate loss of connectivity infrastructure due to wear, failures, vehicle damage, or the like) for end points, increasing network control and security, allowing for greater options in controller distribution (e.g., reducing the number of controllers required, allowing for inter-controller redundancy), and dynamic configuration of vehicle applications, connectivity between end points, data collection operations, and/or data provision options (e.g., making data available from an end point to any other end point).

Example embodiments utilize a policy to implement security, authorization, and/or configuration options. For example, a policy may include a data structure defining which end points are allowed to request data, which end points are allowed to provide data, the priority related to end points, the configuration of data (e.g., units, sampling rate, latency, priority, resolution, etc.) related to end points, or the like. In certain embodiments, a policy is a file or other data structure that can be updated dynamically, allowing changes to the configuration without requiring a change in firmware, change in software, or the like, allowing for a dynamic update without requiring a shutdown, increasing the risk of an incomplete update that may disable the controller, or the like.

Certain aspects of the present disclosure include various operations to control communications in a vehicle network environment, including providing communications between devices or end points on different network zones and/or different network types, providing for control without requiring specific knowledge of the communicator of the actual addresses or locations of other devices on the network, the utilization of a policy or configuration file to update network control parameters, and the like. Additionally, certain aspects of the present disclosure include controlling communications between a vehicle device and an external device, in either direction. Additionally, certain aspects of the present disclosure include adjusting the routing of communications on a network, whether between separate devices on the network, or between a device on the network and an external device. Without limitation to any aspect of the present disclosure, some tools that can be utilized to tactically implement certain operations herein, in combination with the present disclosure, and descriptions that can enhance understanding of some of the terminology used herein (e.g., policy, end point, external device, network protocol, network type, etc.) can be found in one or more of the following U.S. Patents or Patent Applications: U.S. application Ser. No. 17/027,167, filed 21 Sep. 2020, and entitled SYSTEM, METHOD, AND APPARATUS TO SUPPORT MIXED NETWORK COMMUNICATIONS ON A VEHICLE (SONA-0006-U01); U.S. application Ser. No. 17/027,187, filed 21 Sep. 2020, and entitled SYSTEM, METHOD, AND APPARATUS TO EXTRA VEHICLE COMMUNICATIONS CONTROL (SONA-0007-U01); U.S. application Ser. No. 17/195,589, filed 8 Mar. 2021, and entitled SYSTEM, METHOD, AND APPARATUS FOR MANAGING VEHICLE DATA COLLECTION (SONA-0010-U01); and U.S. application Ser. No. 17/833,614, filed 6 Jun. 2022, and entitled SYSTEM, METHOD, AND APPARATUS FOR MANAGING VEHICLE DATA COLLECTION (SONA-0012-U01), each of which is incorporated herein by reference in the entirety for all purposes. Embodiments throughout the present disclosure may be embodied, at least in part, utilizing controllers, circuits, components, processors, and/or operations such as those set forth in one or more of the foregoing patents or patent applications. For example, operations to manage intra-network and/or inter-network communications on a vehicle, including adjusting the management based on changes to a policy or the like, may utilize embodiments as set forth in application '167; operations to manage communications between any end point and external devices, including adjusting the managing based on changes to a policy or the like, may utilize embodiments as set forth in application '187; operations to manage data collection operations, including adjusting data collection, formatting, and/or configuration of data, data life cycle management, and communication of collected data, may utilize embodiments as set forth in application '589; and/or operations to implement, execute, and otherwise manage automated vehicle operations, including operations that can be implemented without software or firmware updates being required, may utilize embodiments as set forth in application '614.

Certain aspect of the present disclosure are set forth as a controller, a circuit, a computing device, a processor, an electronic computing unit (ECU), a manager (e.g., reference FIG. 22 and the related description), a management device (e.g., reference FIG. 8 and the related description), an adaptor (e.g., reference FIG. 19 and the related description), a platform, or any other components having similar language, and being configured to perform certain operations and/or having a structure to perform certain operations. Any such devices are referenced as a "circuit, or similar terms" in the remainder of this paragraph. Without limitation to any other aspect of the present disclosure, a circuit or similar terms, as utilized herein, may be embodied as any one or more of: a computing device having computational resources (e.g., processing, memory, communications interfaces, etc.) configured and capable to perform aspects of the described operations; any hardware interface element such as a mouse, keyboard, microphone, display device, or the like; a sensor configured to provide the described data elements and/or to provide information from which the described data elements can be determined, estimated, or inferred; an actuator configured to provide the described operations; instructions stored on a computer readable medium such that a processor responsive to the instructions thereby performs one or more of the described operations; a hardware component configured to perform one or more of the operations in response to operating conditions (e.g., a valve, spring, switch, gear arrangement, etc. configured to perform one or more described operations); and/or a logic circuit configured and/or programmed to perform one or more of the described operations. Circuits, or similar terms, are depicted as a single device in embodiments herein for clarity of the present description. Circuits, or similar terms, may be distributed, for example with portions of a circuit positioned on different computing devices and/or embodied at least in part on various hardware devices, where the distributed portions cooperate to perform the described functions. In certain embodiments, the distribution of a circuit, or similar term, may vary according to the current operating condition, for example a portion of a build environment circuit 9804 (reference FIG. 77 and the related description) may be positioned on a user interface and/or a user device during certain operations, for example to make the operations more responsive to a user and/or to enhance security of communications between the user and the vehicle multi-zone architecture configuration platform (in the example). Further, the devices embodying the circuit, or similar terms, may vary depending upon the operating conditions and/or the operations being performed. In a further example using the build environment circuit 9804, a user may connect to the platform with a first device (e.g., a laptop) at a first time, and with a second device (e.g., a mobile phone) at a second time, where the elements embodying the build environment circuit 9804 may differ, for example where a portion of the build environment circuit 9804 is positioned on the user device during certain operations. In another example, a central zone manager may be migrated during certain operations, for example when another zone controller is designated as the central zone manager in response to an off-nominal event, and accordingly the specific hardware devices embodying the central zone manager may differ at different times, at different operating conditions, and/or depending upon the specific operations being performed by the system. The utilization of circuits or other similar terms herein is provided for clarity of the present description, and contemplates any devices configured to operationally execute the operations set forth herein. Example and non-limiting specific arrangements are described herein to provide clarity of the description and a context to clarify the operations and benefits of the present disclosure, but any other arrangements that are capable of, and configured to, perform the described operations are specifically contemplated herein.

Various embodiments herein are presented as procedures, methods, or other operational descriptions to perform certain actions embodying aspects of the disclosure. Such operations will be referenced as a "procedure" in the remainder of this paragraph. Any such procedure may be varied in the order of operations, performed as a cyclical or repeated operation (where relevant, and in whole or part), operations described may be divided into parts, and/or operations may be combined (in whole or part). In certain embodiments, procedures may be performed, in whole or part, by any hardware devices as set forth throughout the present disclosure, including by any circuit, controller, computing device, etc., having the capability to perform operations of the example procedures.

Figure 2:
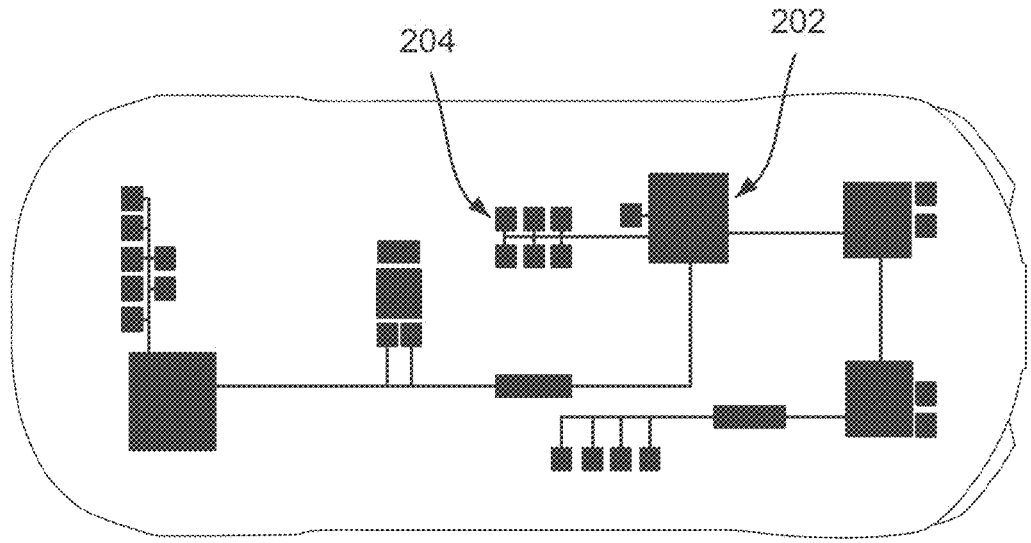
FIG. 2 is a schematic diagram illustrating an embodiment of the present disclosure.

FIG. 1 illustrates an example previously known system 100, including various networks and end points distributed around the vehicle. The example of FIG. 1 is simplified to illustrate the differences with systems of the present disclosure, but actual examples of previously known systems are even more complex and intertwined than the system depicted. The example of FIG. 2 depicts an example system 200 of the present disclosure schematically. Networks are divided into zones that are selected based on costs (e.g., reducing the wiring, interfacing, and configuration costs), and risk management (e.g., reduced exposure of network paths to various vehicle risks, improved security as a small number of network zone managers can monitor network zones, and enforce security protocols). Other embodiments of the present disclosure maintain the cost reductions and risk management, but can further support capabilities such as providing redundant control and/or hardware operations, for example, creating a system that is robust to failures, preserving selected capability based on the failure. Thus systems of the present disclosure have a reduced likelihood of failure, and a superior response capability in the event of a failure.

Figure 3:
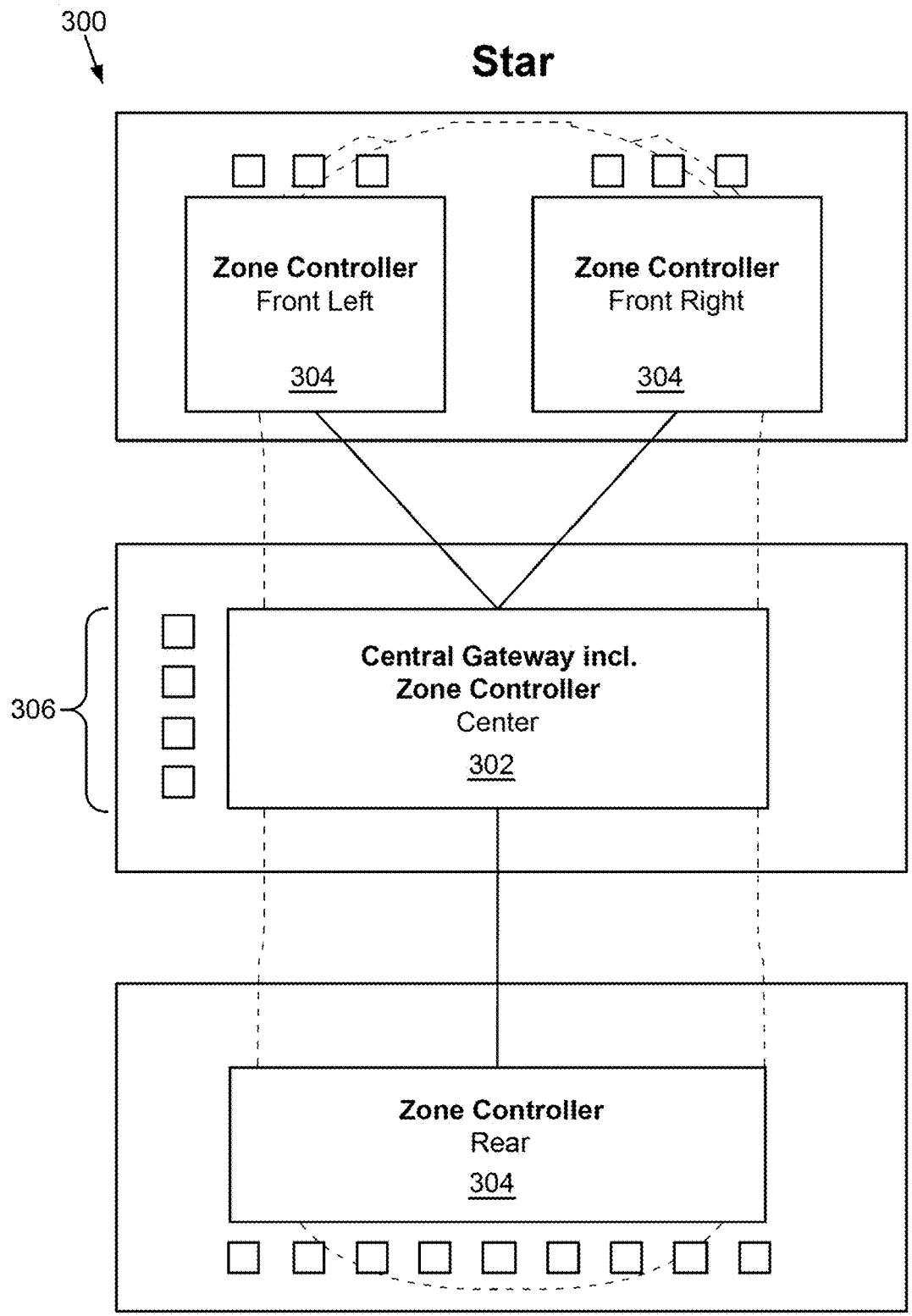
FIG. 3 is a block diagram depicting certain considerations for a star topology, according to certain embodiments of the present disclosure.
Figure 4:
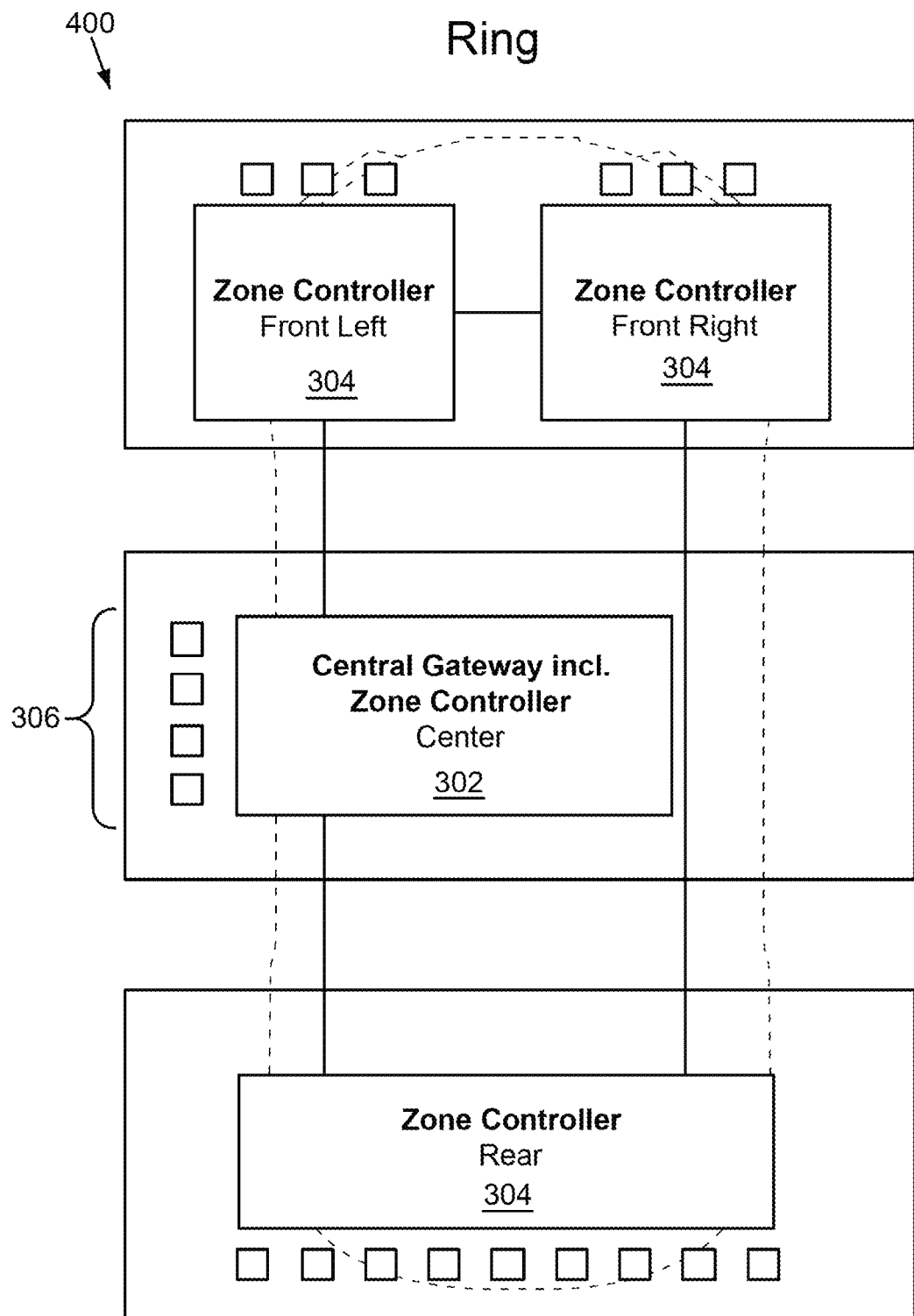
FIG. 4 is a block diagram depicting certain considerations for a ring topology, according to certain embodiments of the present disclosure.
Figure 5:
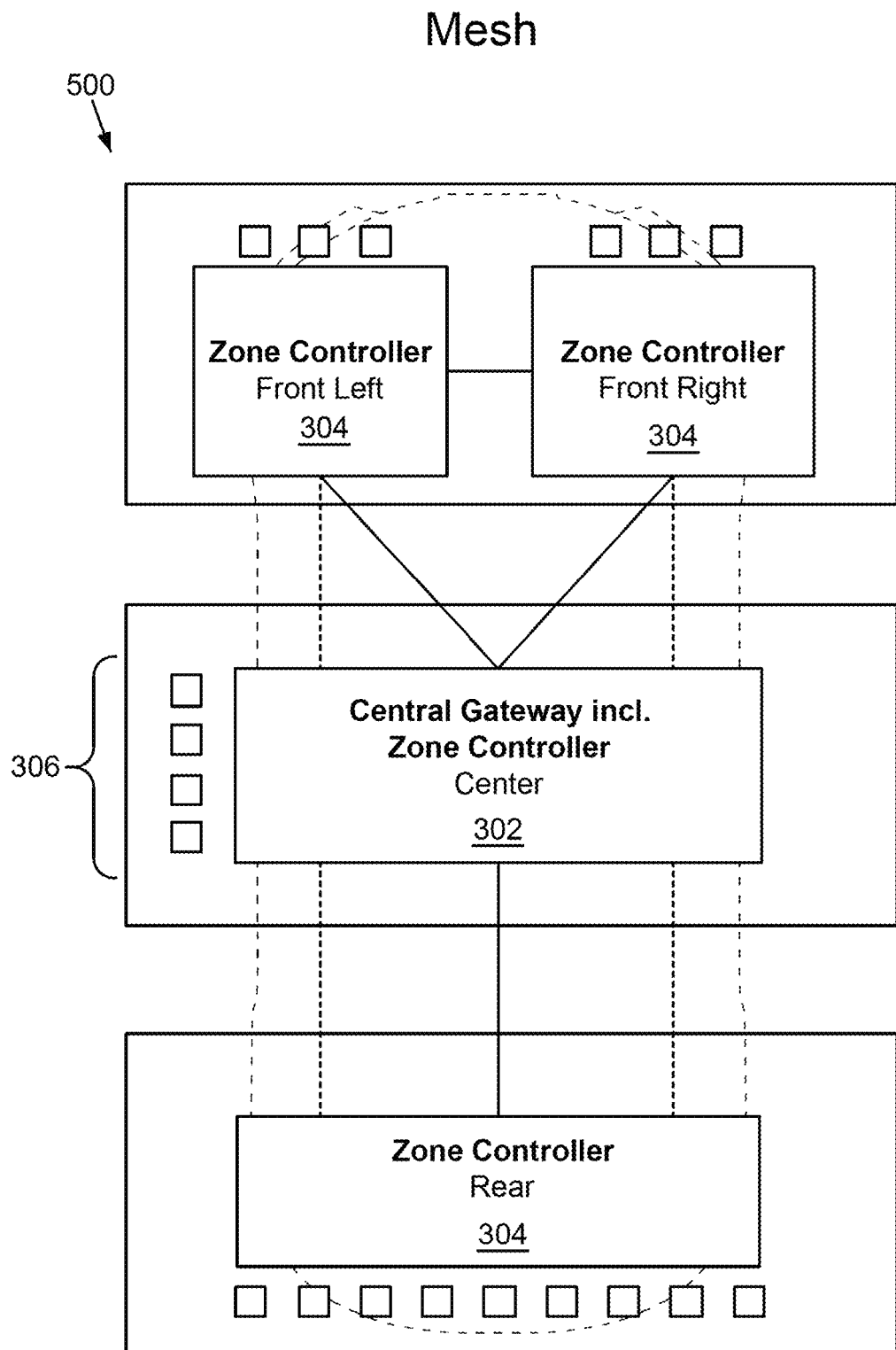
FIG. 5 is a block diagram depicting certain considerations for a mesh topology, according to certain embodiments of the present disclosure.

FIGS. 3-5 illustrate example basic topologies 300, 400, and 500 supported by embodiments herein. The example topologies are non-limiting, and include a star topology (e.g., all zones communicate through a central zone), a ring topology (e.g., communications traverse through a serial link of all zones in a selected order, with adjacent zones able to communicate directly, and remote zones communicating using hops through intermediate zones), and/or a mesh topology (e.g., each zone is communicatively coupled to every other zone). In certain embodiments, a combination of one or more of these, and/or a partial implementation of one or more of these (e.g., a mesh topology where some connections are omitted) may be utilized. Note that the topologies herein represent the network connectivity between network zones and the zone managers for each network zone, not the connectivity between end points. In a highly distributed system of over 100 devices with mixed overlapping networks, the terminology of a mesh, star, or ring topology would indicate something completely different than the network zone layout of FIGS. 3-5. Further note that the network zone selections and locations depicted are non-limiting examples. The zone layouts can be selected based on costs to design, maintain, and integrate the resulting network zones, and further can be selected to support redundancy. The reduction in the number of extended connections throughout the vehicle allows embodiments of the present disclosure to improve routing, for example pathing through lower risk areas of the vehicle, and reducing the consequences of any one of those paths suffering an adverse event. For example, if a vehicle is damaged in a location, the damage is much more likely to not affect the network at all, or just damage a single zone connection, rather than damaging several networks and causing the loss of numerous devices distributed around the vehicle. Further, by allowing the networks to be organized around proximity to devices, rather than function, the natural risk management of the vehicle is likely to support risk management for the network. For example, the battery pack of an electric vehicle is typically in protected space. In previously known systems, multiple network links related to the battery pack may be distributed around the vehicle, resulting in unexpected failure conditions, for example damage to another remote area of the vehicle may cause a loss of function for the battery pack (e.g., the ability to disconnect the batter automatically in the event of an accident), reducing the value of efforts to protect the battery pack.

FIG. 3 illustrates certain considerations for a star topology, with four network zones in the example. A star topology is a low cost implementation, with a significant reduction in the amount of wiring required, the I/O between zones, and other benefits such as reduced implementation costs, for example to implement network management features that would be required to get some of the benefits of other topologies. The star topology includes certain drawbacks, such as a single point failure in the central zone controller which would disable connectivity between the other network zones, a lack of redundancy if communication is lost between a zone and the central zone, and the requirement for a high capability central zone controller. However, an embodiment such as in FIG. 3 is viable, for example if the high capability central zone controller is positioned in a protected area.

FIG. 4 illustrates certain considerations for a ring topology 400, with four network zones in the example. A ring topology provides a significant reduction in the amount of wiring required, although less reduction than in the star topology, and in the I/O between zones. The ring topology may introduce some latency, for example between two high-needs end points that are positioned on remote zones. The ring topology does provide for some redundancy, for example where the system is capable to function if any single connection between zones fails or is lost. It will be understood that management of the network may be performed to support redundancy, for example re-routing communications if a link is lost between two zones. In certain embodiments, failure analysis may be utilized to determine the ring arrangement and sequencing, for example ensuring that two critical zones are not separated by too many "hops" in the event of a failure of a connection between any two zones in the system. In certain embodiments, the ring topology may be enhanced by separate connections between critical zones, for example with additional direct connections between those zones, and/or connection between those zones and a "central" zone. Embodiments herein often include a central zone concept. While various design considerations may drive the central zone to often be centrally located in a geometric sense, the central zone notion as utilized herein references a logical centrality, for example the central zone in many embodiments includes a single point for communication to external devices, for monitoring the network, and for receiving and distributing updates.

FIG. 5 illustrates certain considerations for a mesh topology 500. The mesh topology provides for the highest redundancy and lowest latency embodiment. In certain embodiments, the mesh topology may be enhanced with additional connections, for example a double connection between two critical zones, and/or between a critical zone and a central zone. The mesh topology does still introduce significant cost savings in terms of a reduction of wires and connections required relative to previously known systems, for example relative to previously known systems that may have 100+ end points coupled to various network devices, where the wiring is configured according to the function of the end points and without regard to the physical location of those end points. The mesh topology requires management of communications to achieve the benefits of the available redundancy, to avoid duplicated communications utilizing network bandwidth, and the like.

Figure 6A:
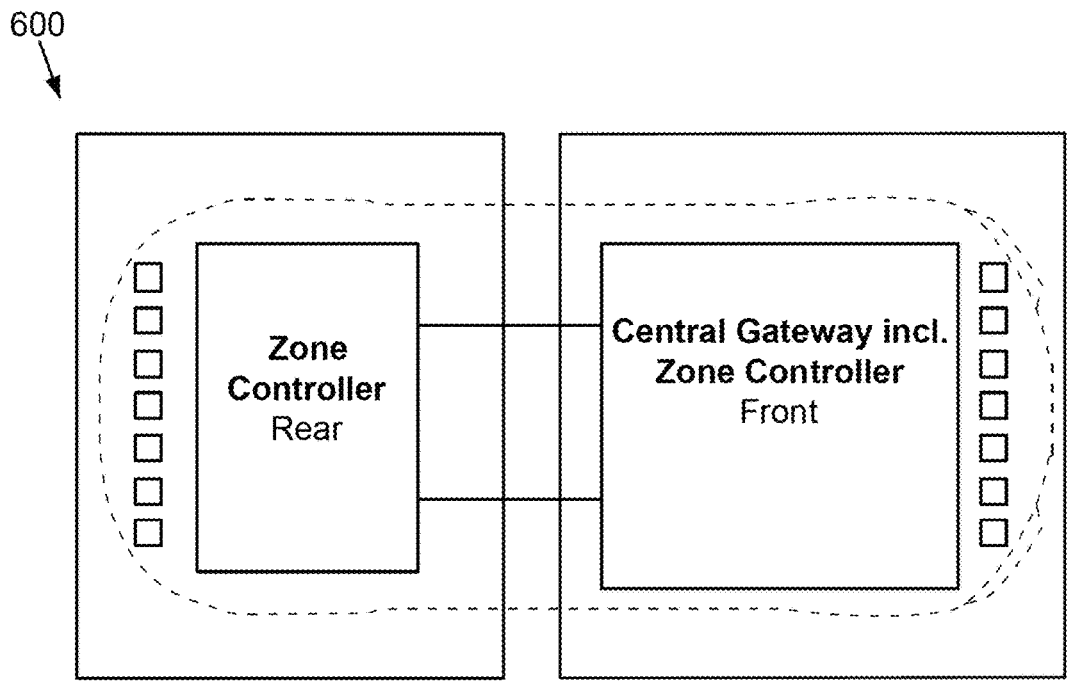
FIGS. 6A-6B are block diagrams depicting example two-zone networks, according to certain embodiments of the present disclosure.
Figure 6B:
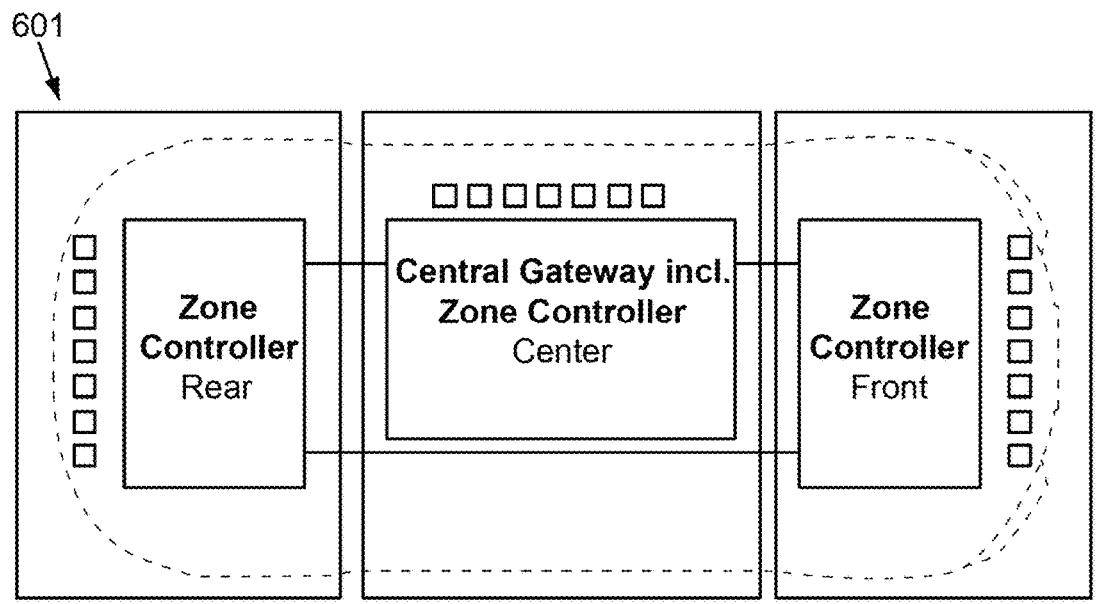

FIG. 6A depicts an example 2-zone network 600, for example with end points at the front of the vehicle connected to a first zone, and end points at the rear of the vehicle connected to a second zone. The example of FIG. 6A includes two separate connectivity paths, allowing for communications to continue if one of the paths should be compromised. FIG. 6B depicts an example 3-zone network 601, with the zones depicted as front, rear, and central. The terminology herein referencing front, rear, central, or other similar terms is not limited to physical location of the vehicle, but instead references logical connections, which may correspond to physical location but do not need to do so. For example, the end point burden in many vehicles is heavier in the front of the vehicle, so a 3-zone network may include two zones in the front (one the "front" zone, and one the "central" zone), and a single zone in the rear. The selection for zone locations may be based upon the physical location of end points, the functions (including inter-relationship of functions) of the end points, inter-zone communications (e.g., number, content, communication rate, message size, latency requirements, etc.) that will be required to support a particular arrangement, the capability of zone controllers, and the like.

Figure 7:
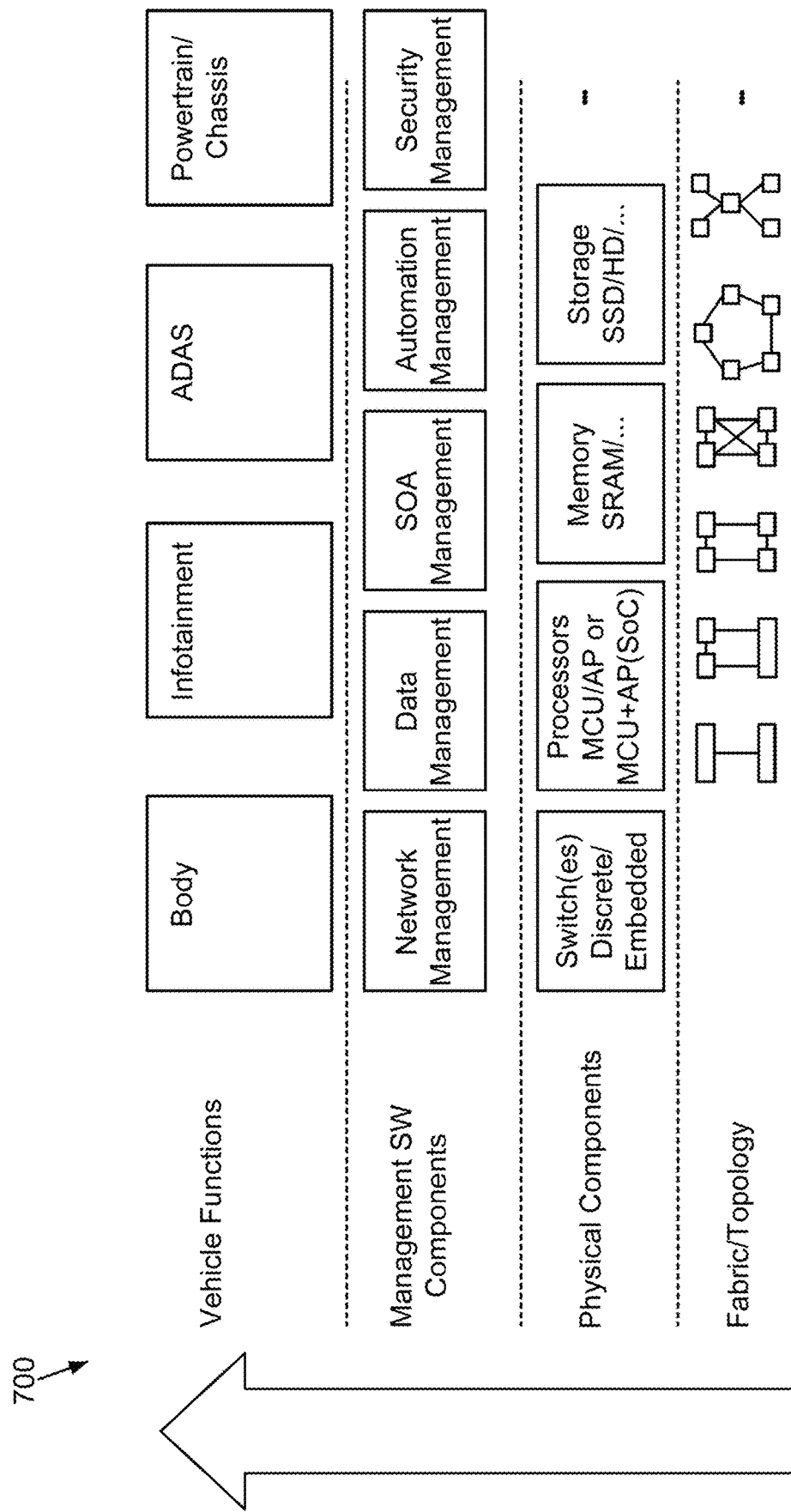
FIG. 7 is a block diagram depicting an example conceptual layering arrangement, according to certain embodiments of the present disclosure.

FIG. 7 depicts an example conceptual layering arrangement 700 for embodiments herein. The example layering of FIG. 7 includes a hardware layer (e.g., the actual physical layout of the zones, networks, connections to end points, etc.), a physical component layer to support the communications (e.g., switches, controllers, edge gateways, memory devices, etc.), an application layer (e.g., control modules and functions to support operations, such as network management, data management, service oriented architecture (service) management, automation management (e.g., support for automated vehicle functions, service operations, vehicle tests, etc.), and/or security management (e.g., managing encryption of messages, stored data, etc., as well as managing communication and/or data permissions for end points), and a vehicle function layer (e.g., specific vehicle functions that are supported by a distributed set of end points across the zones, such as control software for the vehicle, infotainment support, automated driving assistance support, or the like).

Figure 8:
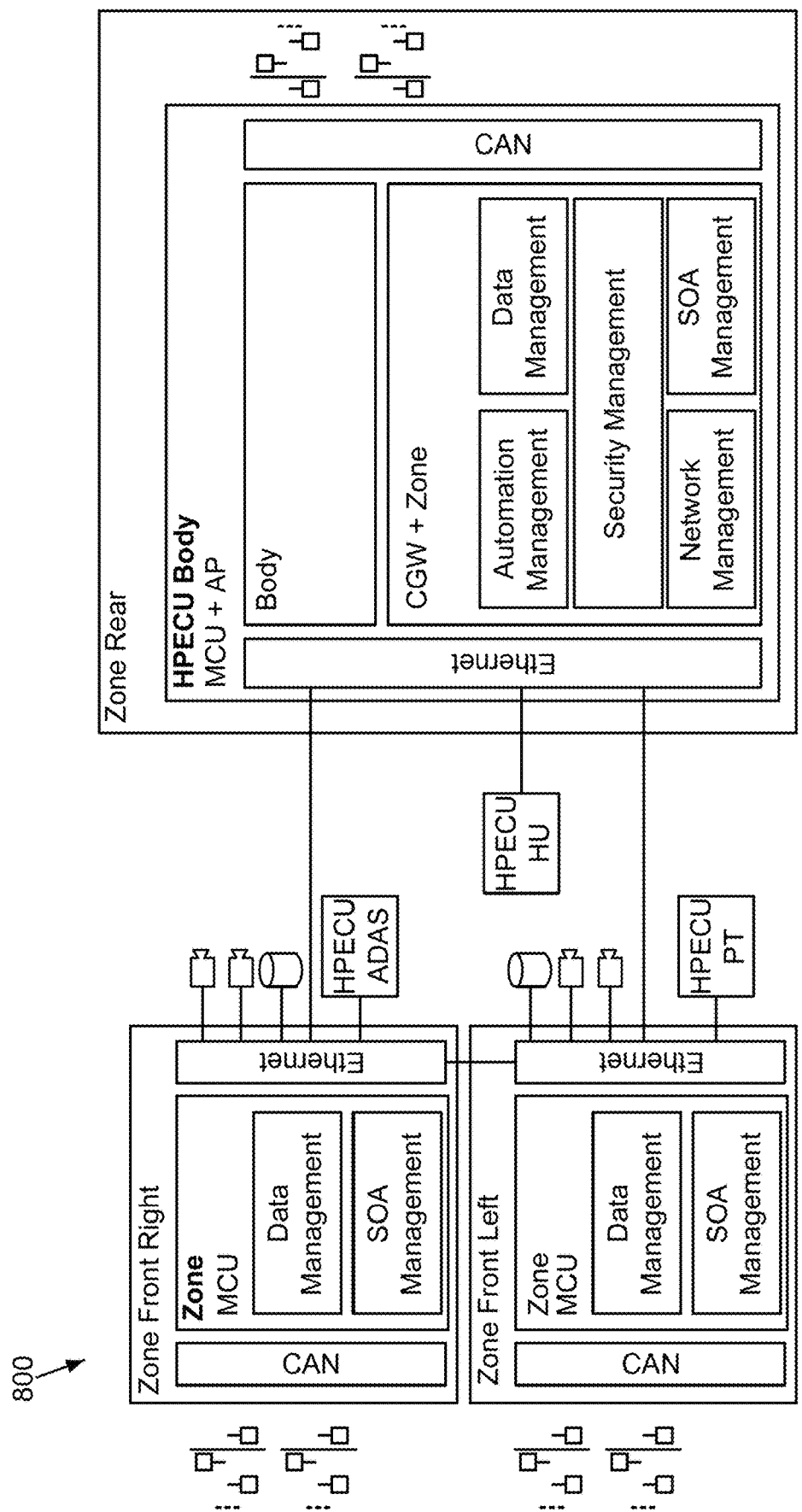
FIG. 8 is a block diagram depicting an example physical packaging arrangement, according to certain embodiments of the present disclosure.

FIG. 8 depicts an example physical packaging arrangement 800 for an example embodiment, with end point communication to specific zones, and with communications between zones implementing cross-zone communications between end points.

Figure 9:
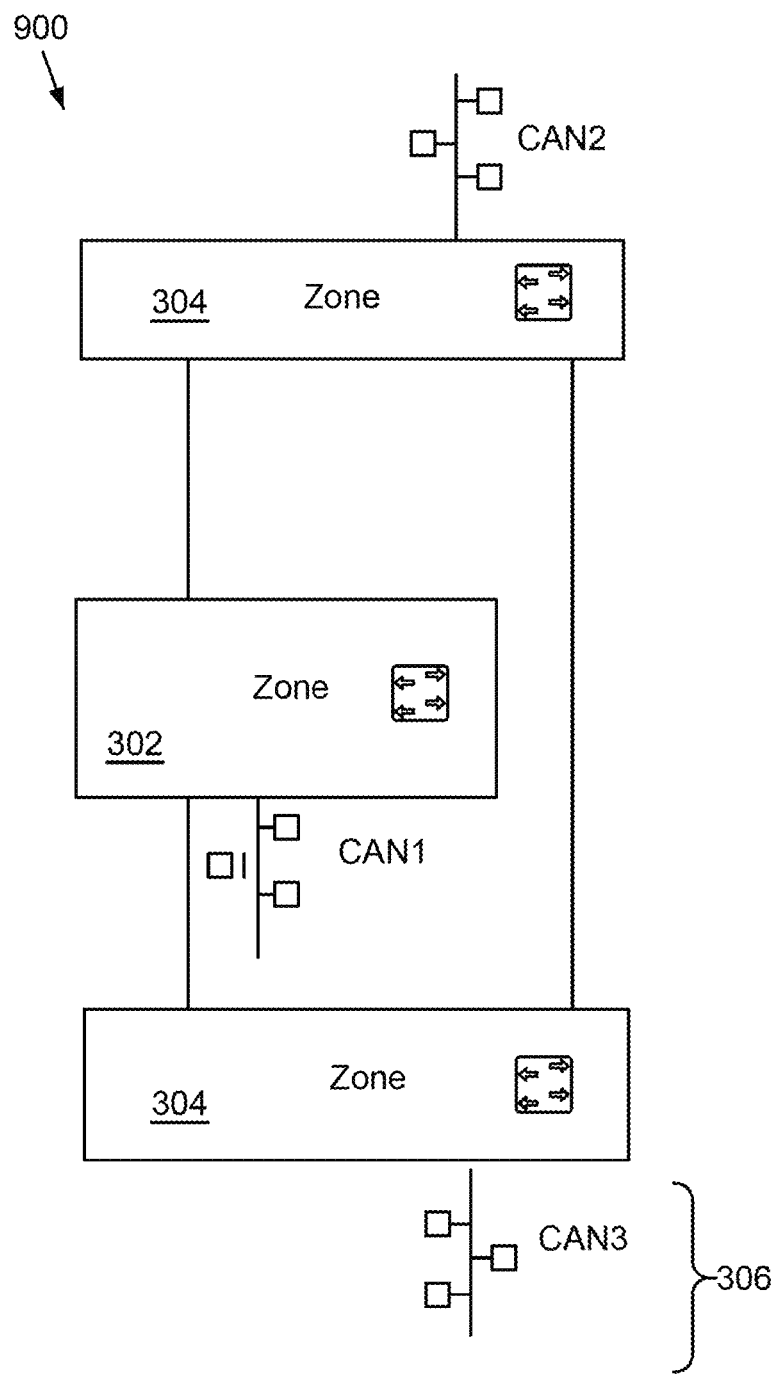
FIG. 9 is a block diagram depicting an example zoning with three zones, according to certain embodiments of the present disclosure.

FIG. 9 depicts an example zoning embodiment 900, with three zones in the example, and considerations for implementing a zoned architecture on a vehicle. The group of end points 306 in the example are CAN devices coupled to one of the network zones. The present disclosure allows for the connections of any type of end point to a given network zone, and seamless communications between end points on different zones regardless of the underlying network type specific to the end point. For example, a CAN device on a first network zone can readily communicate with a LIN device on another network zone. Further, a user accessing the vehicle (with authorization) can reference devices on the system without requiring any awareness by the user about the device location or even network type for connection of the device. Additionally, a user can request or collect available data from devices, without requiring any awareness of the device, its network location or type, or even knowledge of whether the data is provided by a specific device or by some other determination (e.g., a virtual sensor). The example of FIG. 9 includes a central zone manager 302, and two zone managers 304 for the other two zones.

Figure 10:
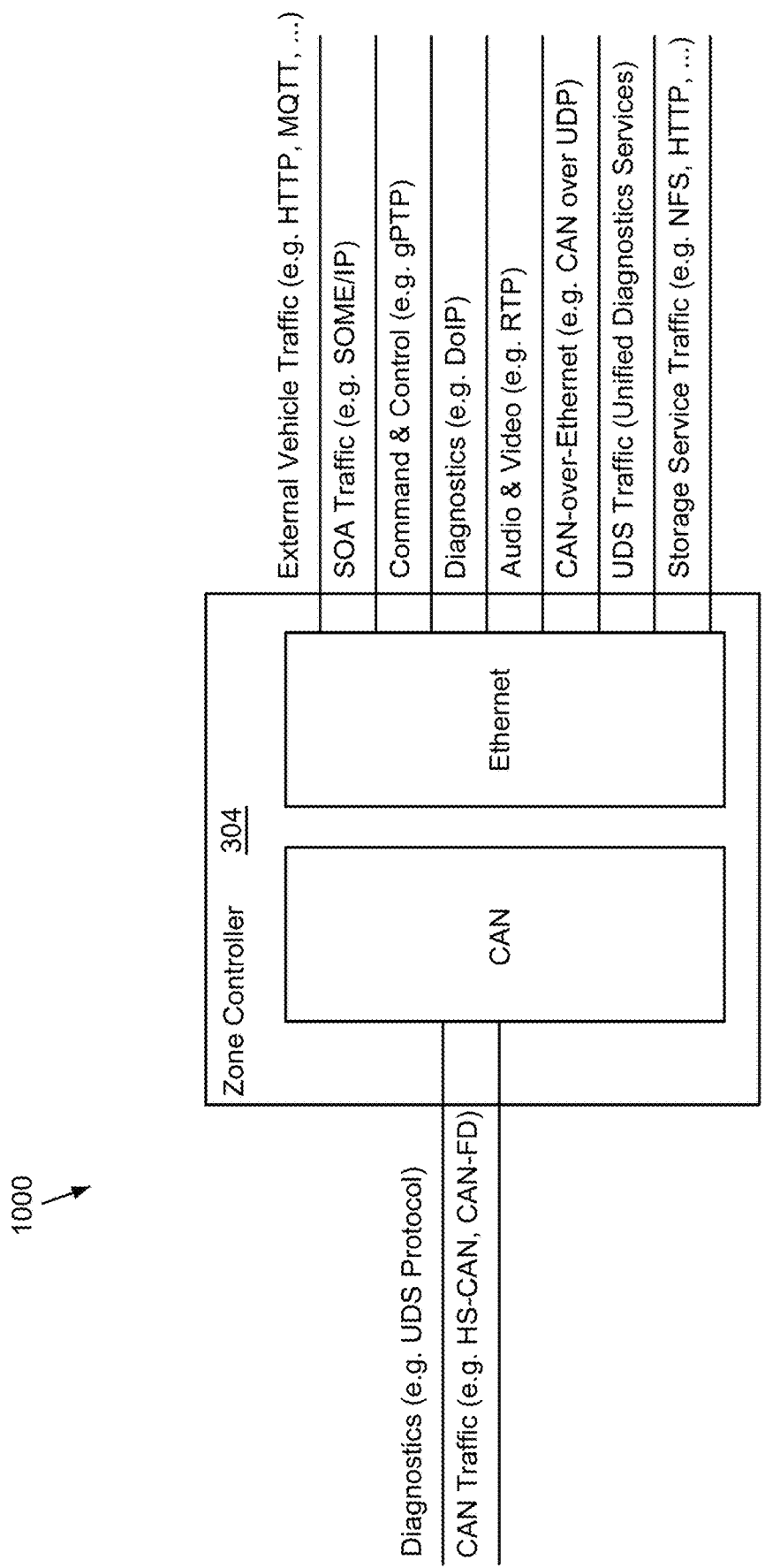
FIG. 10 is a block diagram depicting example data traffic types, according to certain embodiments of the present disclosure.

FIG. 10 depicts example 1000 data traffic types that may be present on an example vehicle having a zoned architecture, depicted in the context of a zone manager 304 (or zone controller). Network management controls, which may be implemented on a central zone controller, and/or distributed across more than one zone controller, include managing network bandwidth, permissions, prioritization of messages, or the like, to ensure that critical vehicle functions are supported, and to support other functions in a desired manner and/or at a desired service level, consistent with the required support of the critical vehicle functions.

Figure 11:
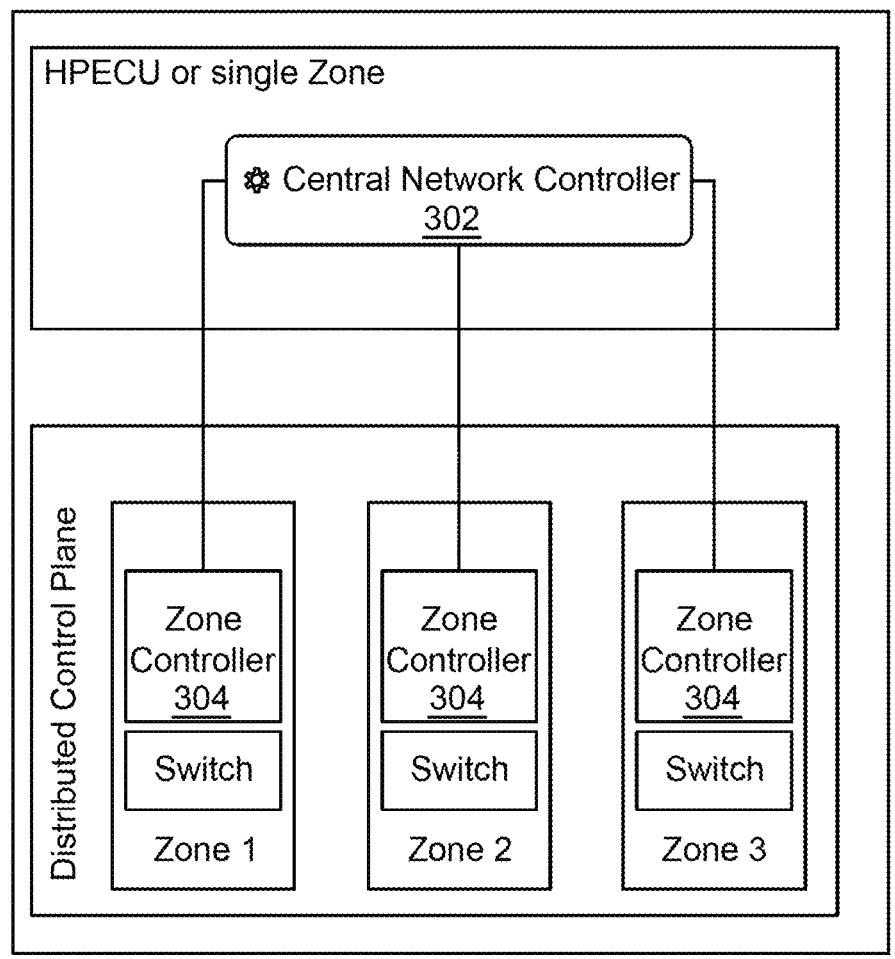
FIG. 11 is a block diagram depicting an example central network controller, according to certain embodiments of the present disclosure.

FIG. 11 depicts an example 1100 central network controller 302, with some considerations for the central network controller and configuration of network management for the vehicle.

Figure 12:
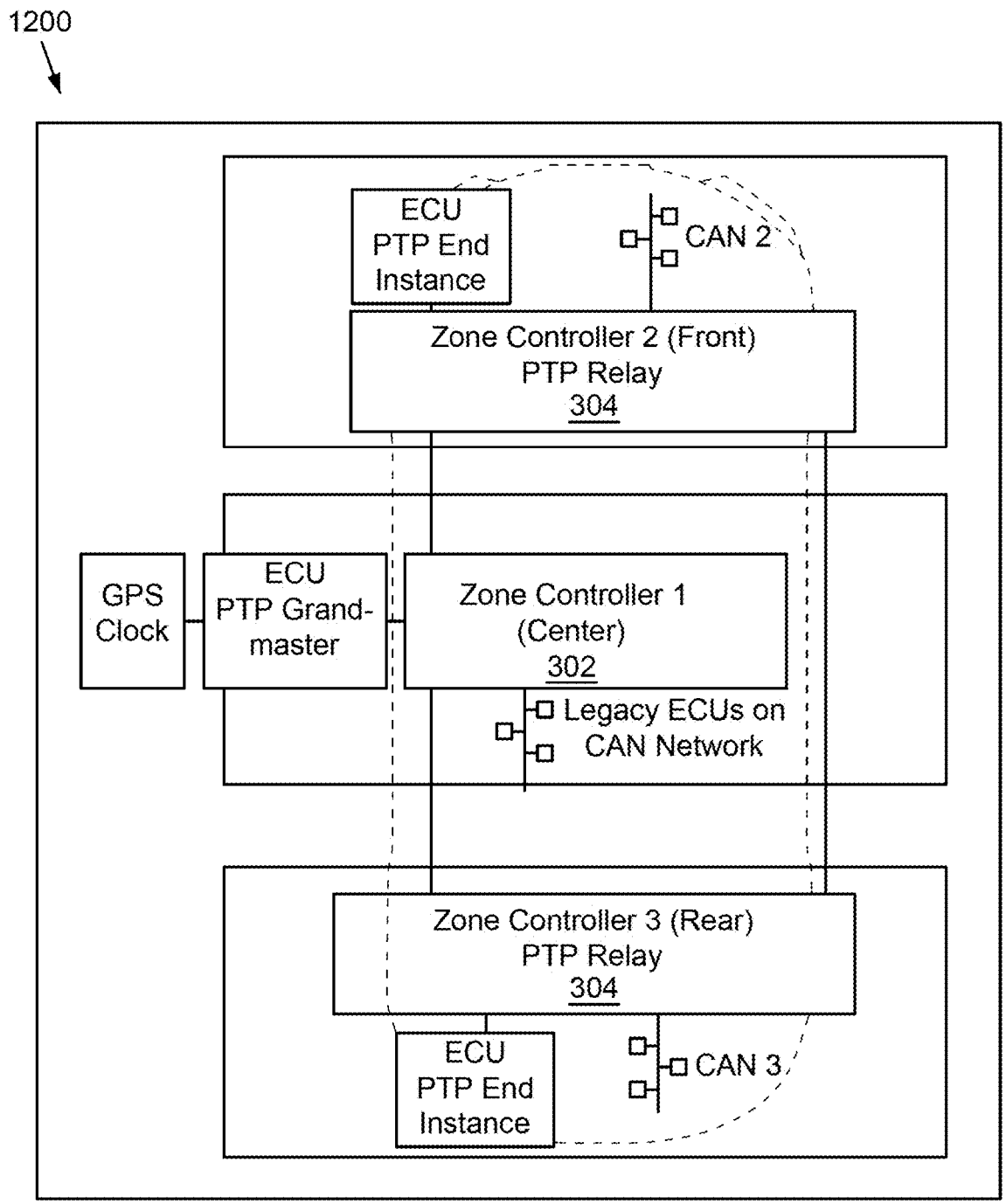
FIG. 12 is a block diagram depicting example time synchronization operations, according to certain embodiments of the present disclosure.

FIG. 12 depicts example 1200 time synchronization operations for embodiments herein. Example synchronization operations include operations to ensure that time sensitive messages are provided within expected windows (e.g., latency, arrival time, etc.), time stamped according to an accepted norm that allows for control operations at end points to utilize the data in an expected manner, or the like.

In certain embodiments, time synchronization may be relative (e.g., ensuring all related end points can utilize the data as expected, without consideration to the relationship of the synchronization to some absolute reference time), absolute (e.g., ensuring that all related end points can correlate data values to an absolute reference time), or a combination of these. FIG. 34 depicts additional or alternative time synchronization operations for embodiments herein.

Figure 13:
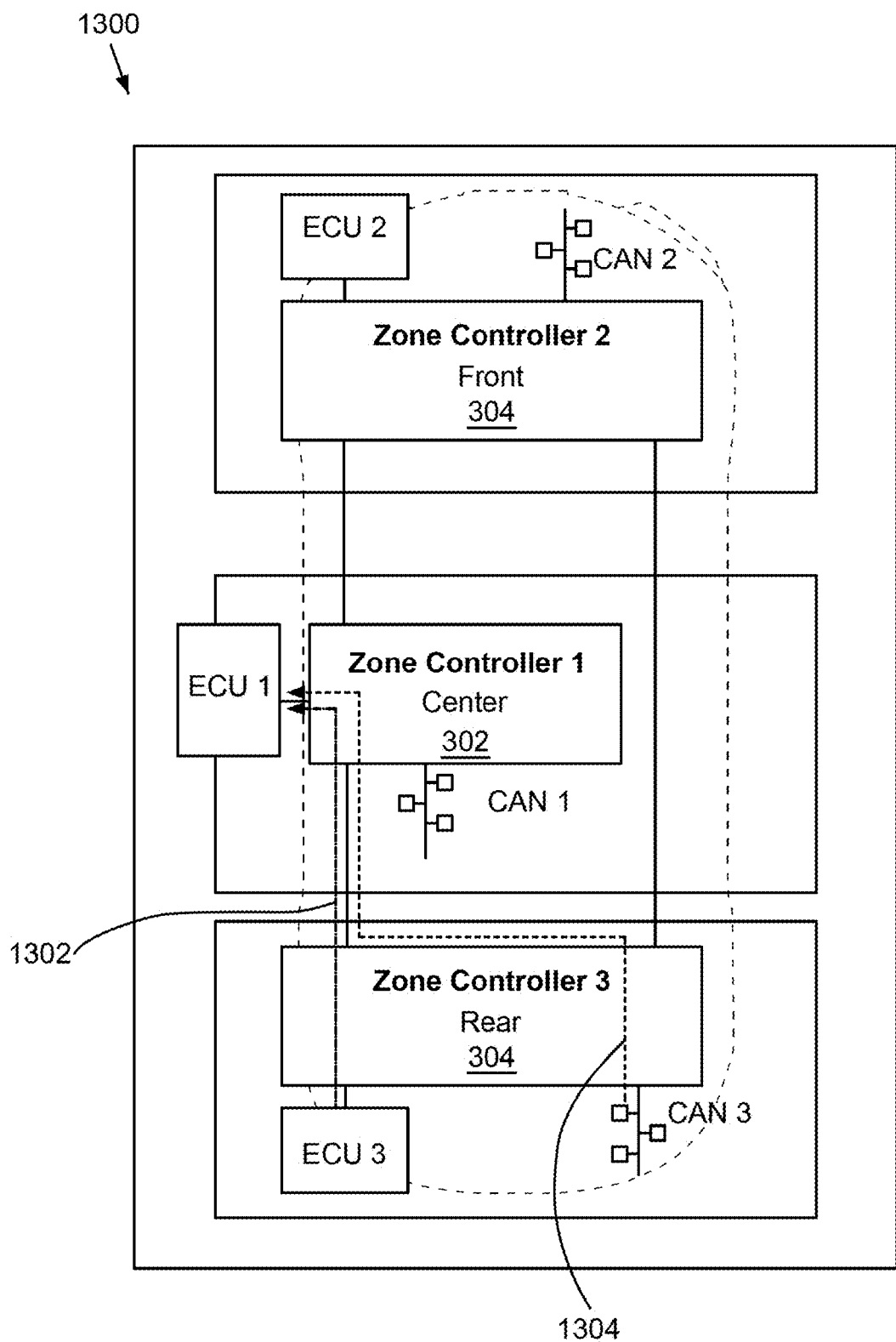
FIGS. 13-14 are block diagrams depicting example embodiments controlling a zoned architecture with mixed criticality of messages thereon, according to certain embodiments of the present disclosure.
Figure 14:
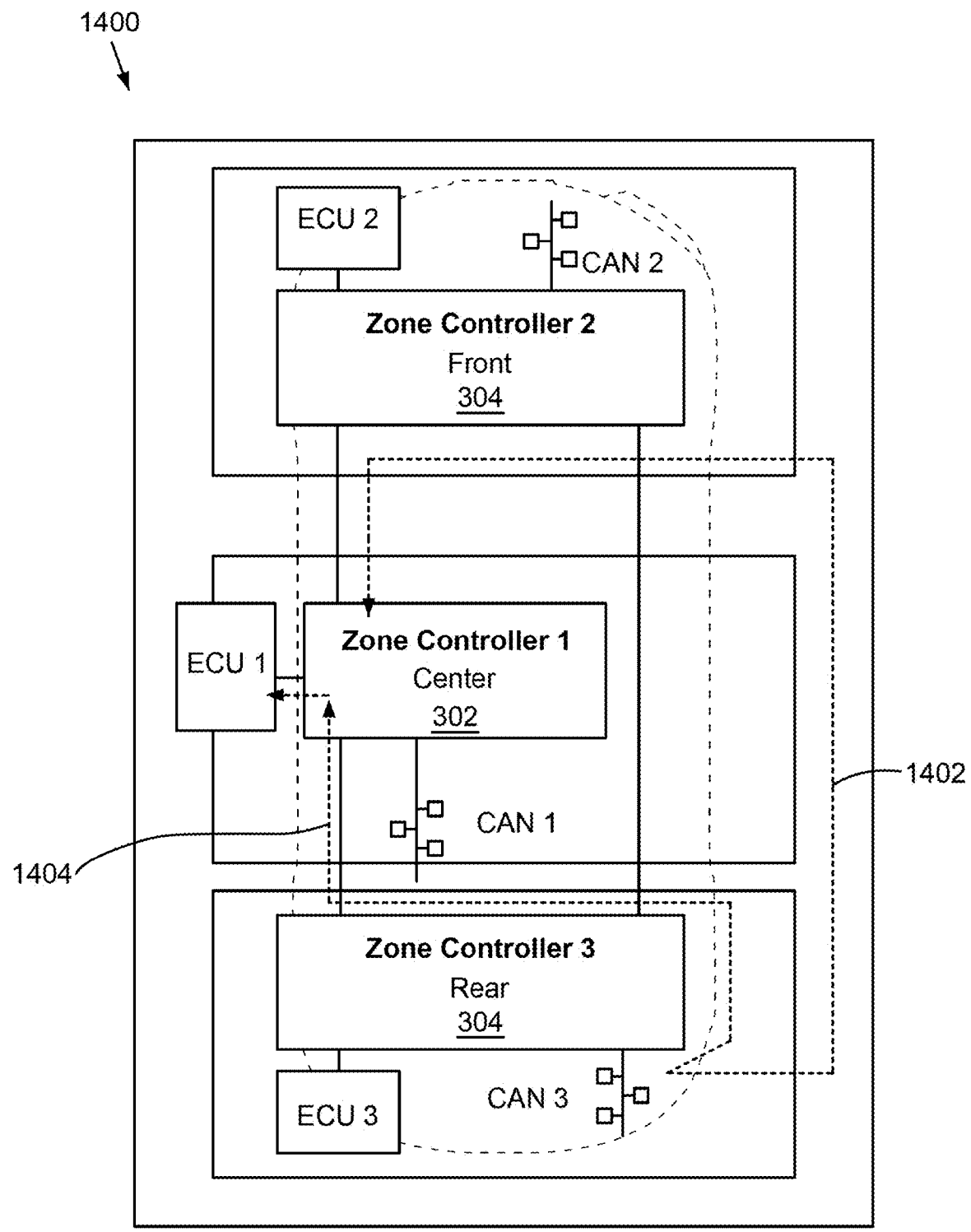

FIGS. 13-14 depict example embodiments including 3-zone networks with various communication routing options for different systems. The routing options may be determined based on, without limitation, the source or destination end point, the content of the message, related flows, applications, functions, or the like for a message, the current operating conditions of the vehicle, and/or to support a redundancy operation (e.g., replacing or mitigating the loss or degradation of a hardware component and/or a controller). System 1300 depicts various routing paths 1302, 1304 for different message. System 1400 depicts various alternate routing paths 1402, 1404 relative to FIG. 13, which may be due to a different base configuration, responsive to message criteria, and/or responsive to vehicle operating conditions.

Figure 15:
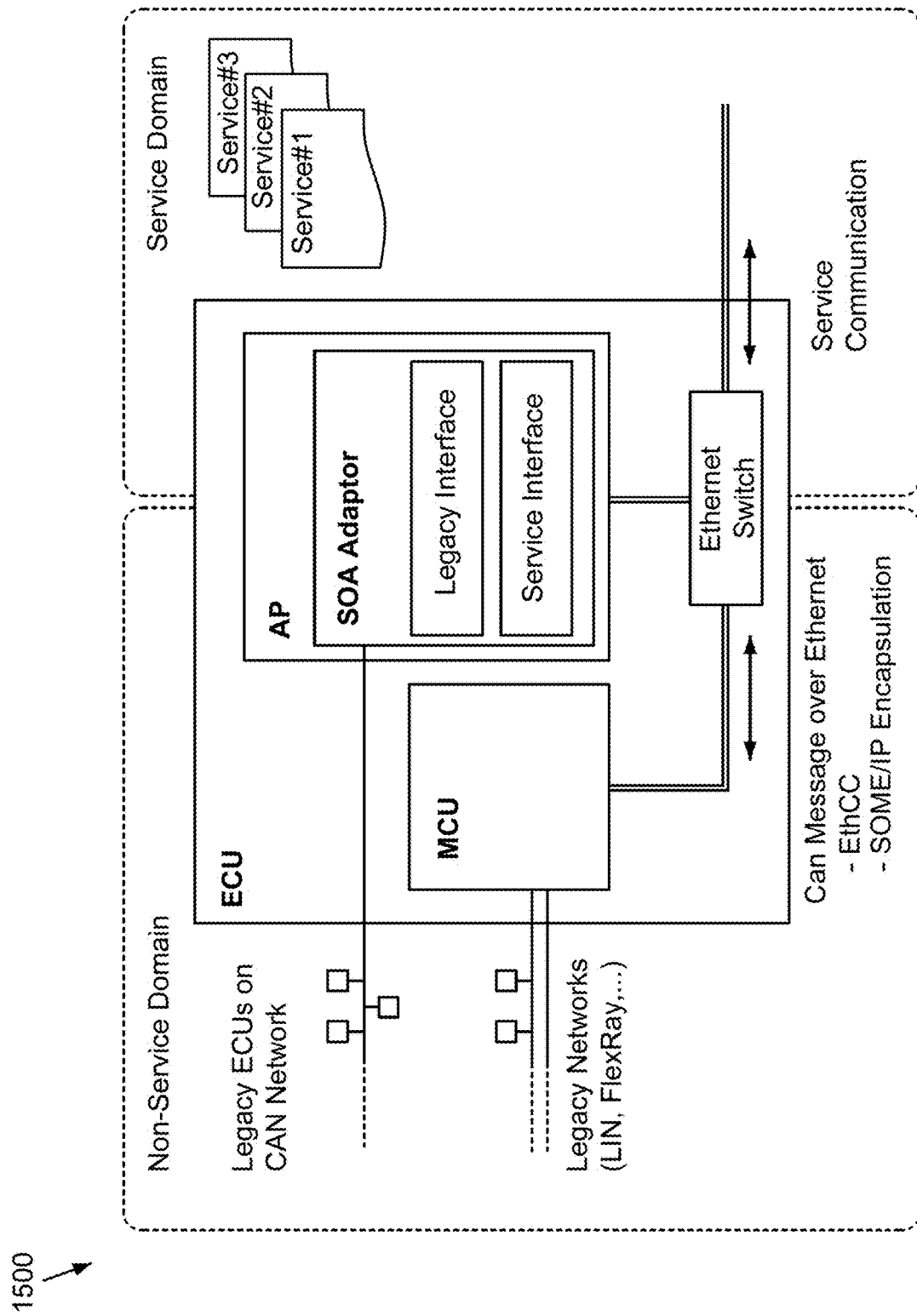
FIGS. 15-17 are schematic depictions of an example hardware layer for implementing a SOA communication embodiment on a vehicle, according to certain embodiments of the present disclosure.
Figure 16:
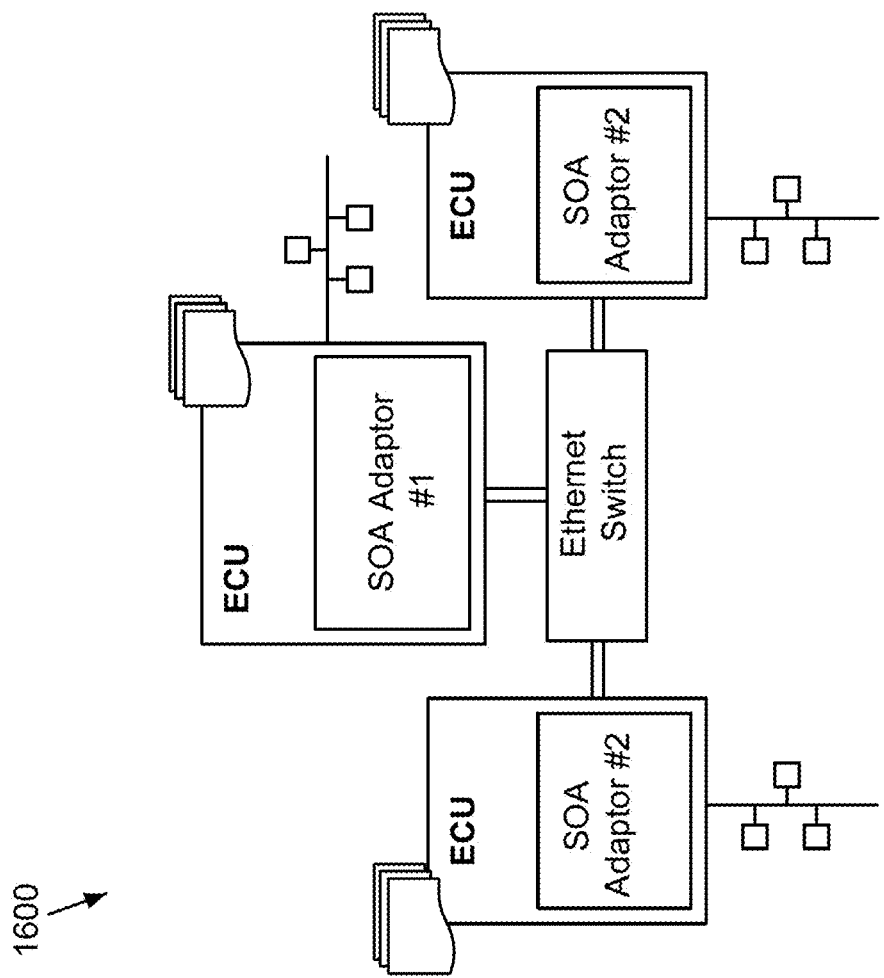
Figure 17:
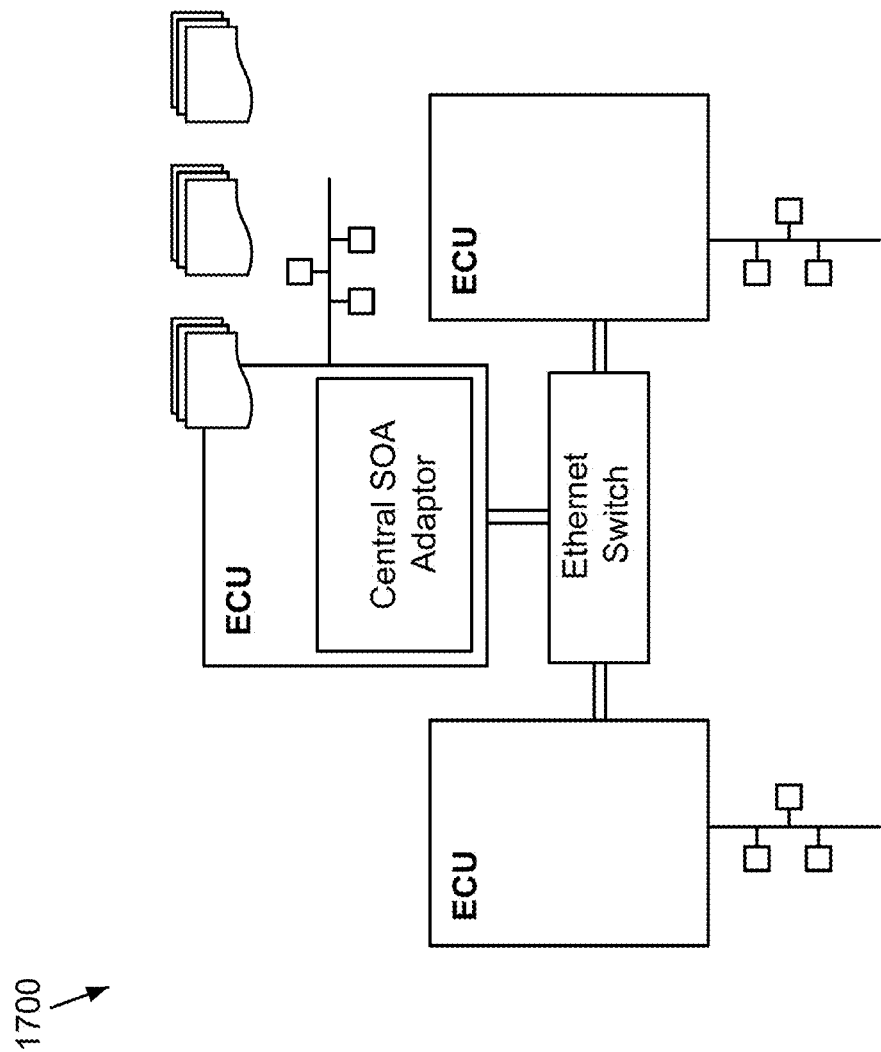
Figure 18:
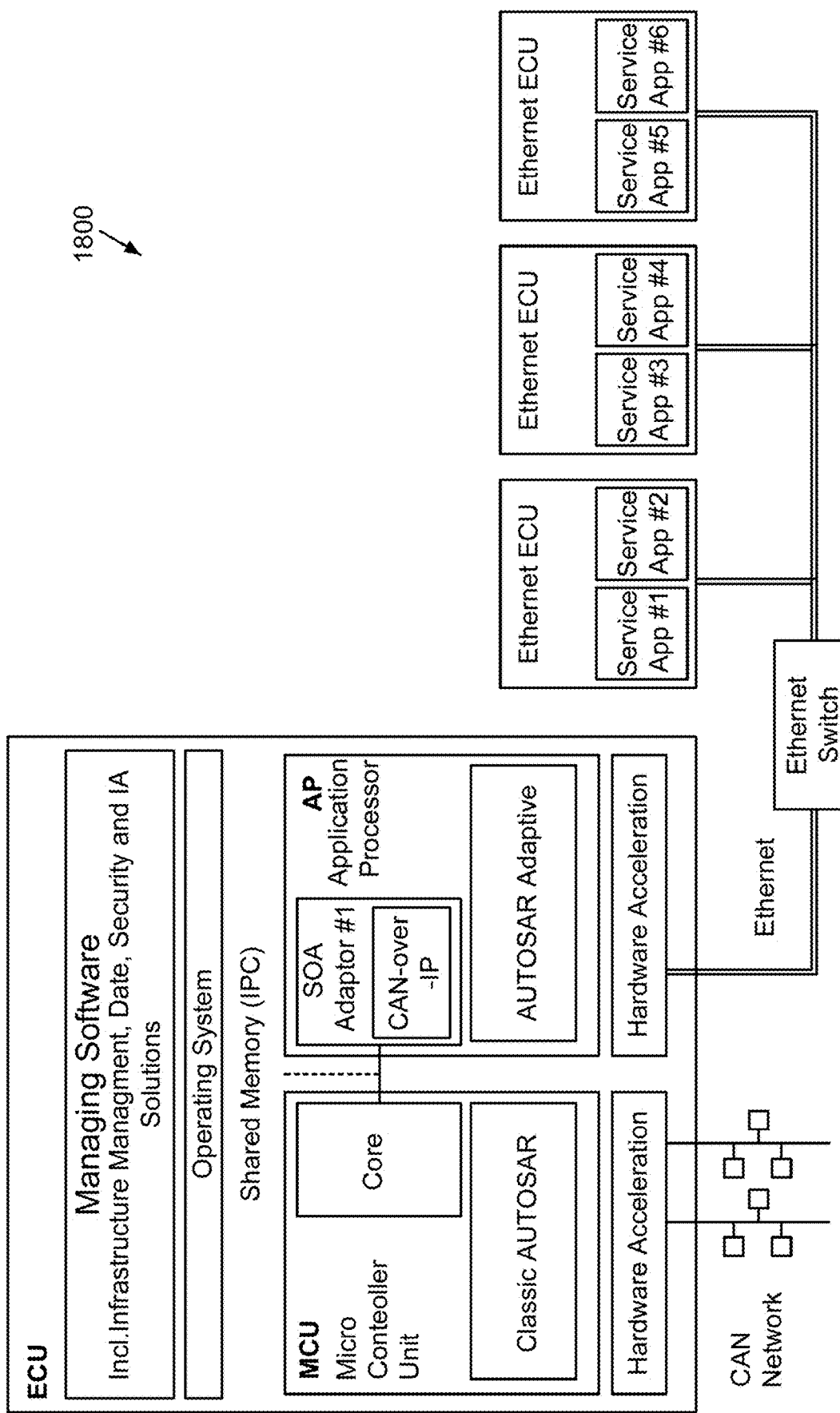
FIG. 18 schematically depicts another embodiment to implement a SOA on a vehicle, according to certain embodiments of the present disclosure.
Figure 19:
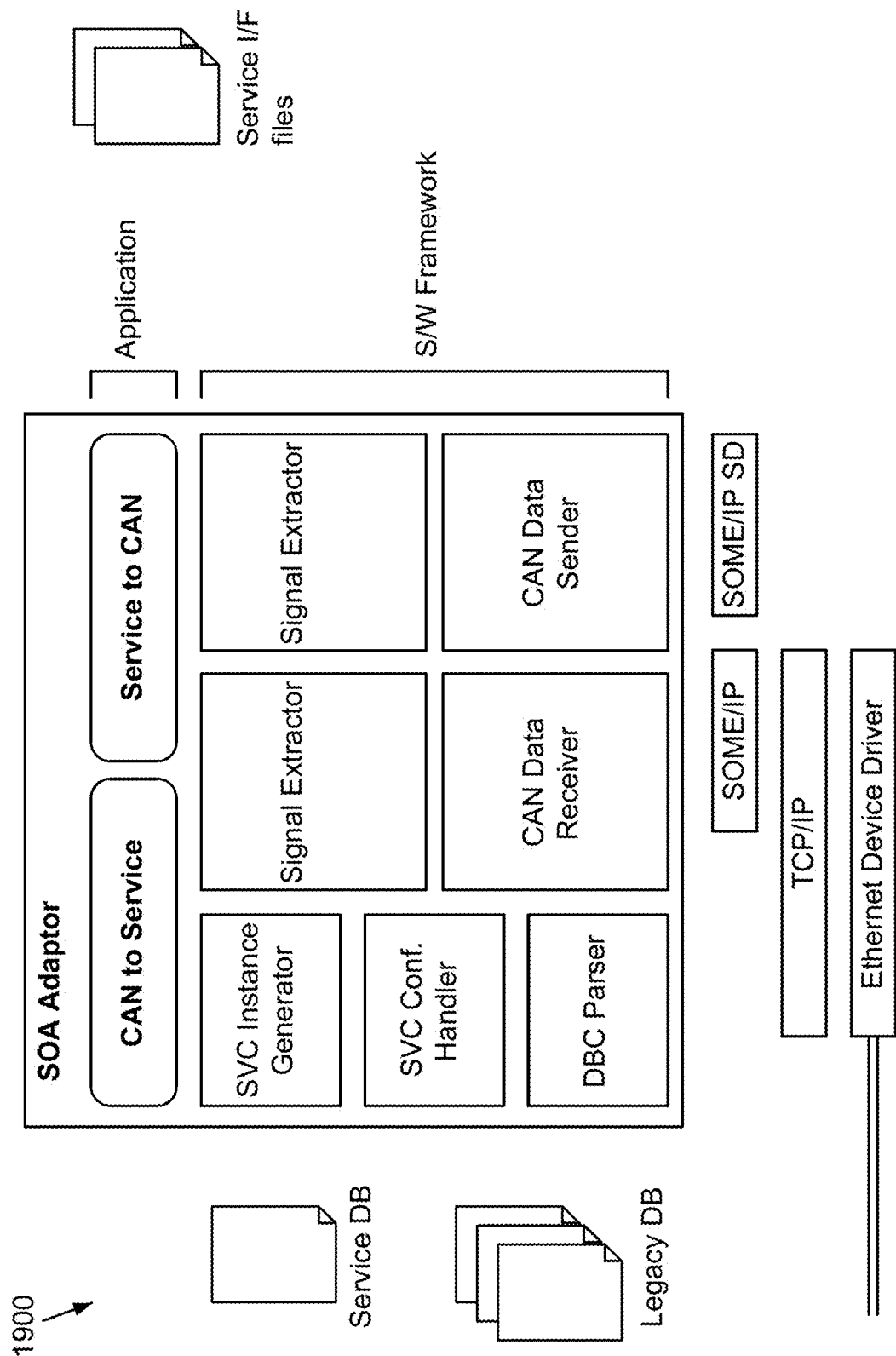
FIG. 19 schematically depicts an embodiment to implement a SOA on a vehicle, according to certain embodiments of the present disclosure.

FIG. 15 is a schematic depiction of a service oriented architecture (SOA) implementation 1500, allowing end points to subscribe to services (e.g., collection of desired data, provision of actuator commands, etc.), to publish services, and/or to limit service access according to permissions (e.g., as set forth in a policy or similar implementation). FIG. 16 is a schematic depiction of an example hardware layer 1600 for implementing a SOA communication embodiment on a vehicle. The utilization of a SOA for network communications on a vehicle provides a number of benefits, including ease of dynamic changes to the network configuration, and security control for end points to access and/or publish data. FIGS. 17 and 18 schematically depicts embodiments 1700, 1800 to implement a SOA on a vehicle. FIG. 19 schematically depicts an embodiment 1900 to implement a SOA on a vehicle, utilizing an SOA adapter, which may be included on a zone and/or with a zone controller, for example on a central zone controller.

Figure 20:
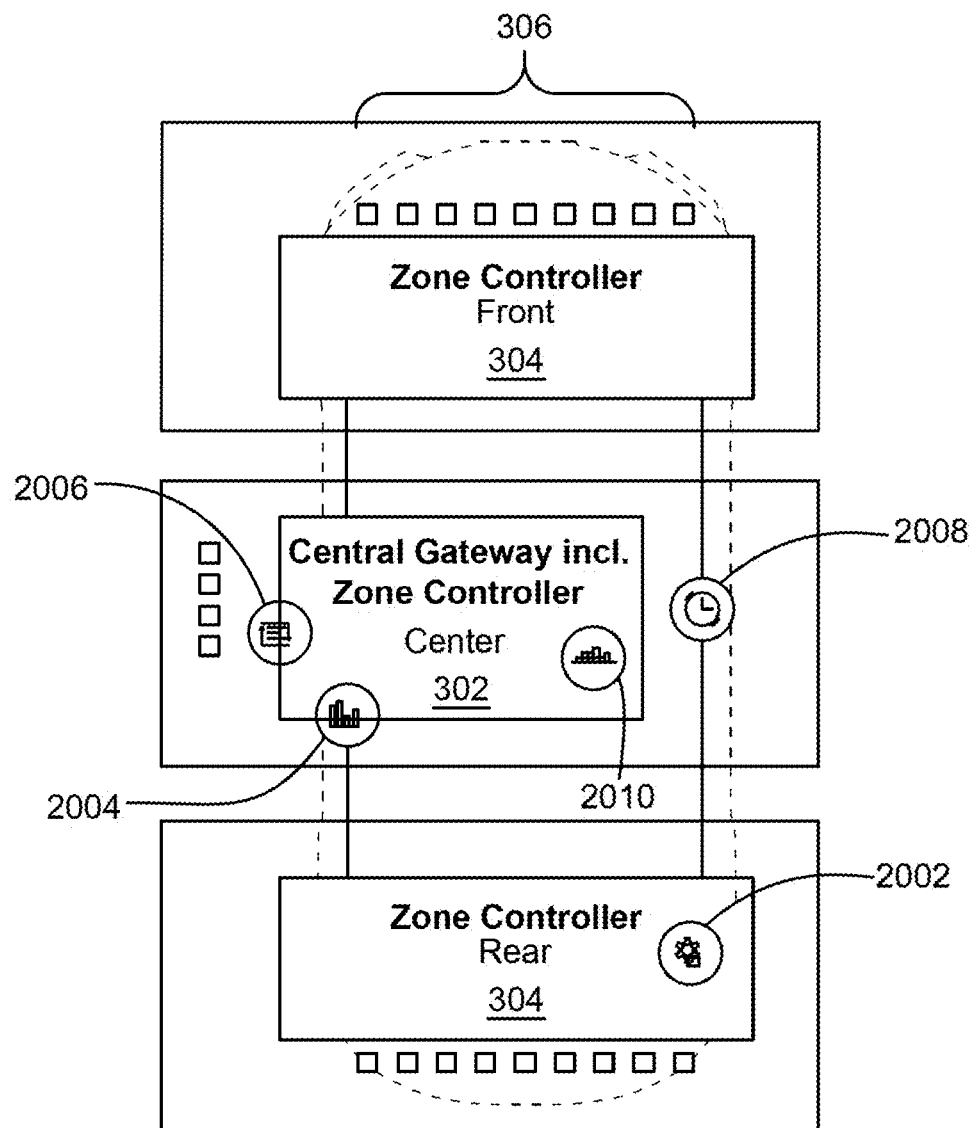
FIG. 20 schematically depicts a number of capabilities for embodiments herein, including embodiments utilizing containerized applications, according to certain embodiments of the present disclosure.
Figure 21:
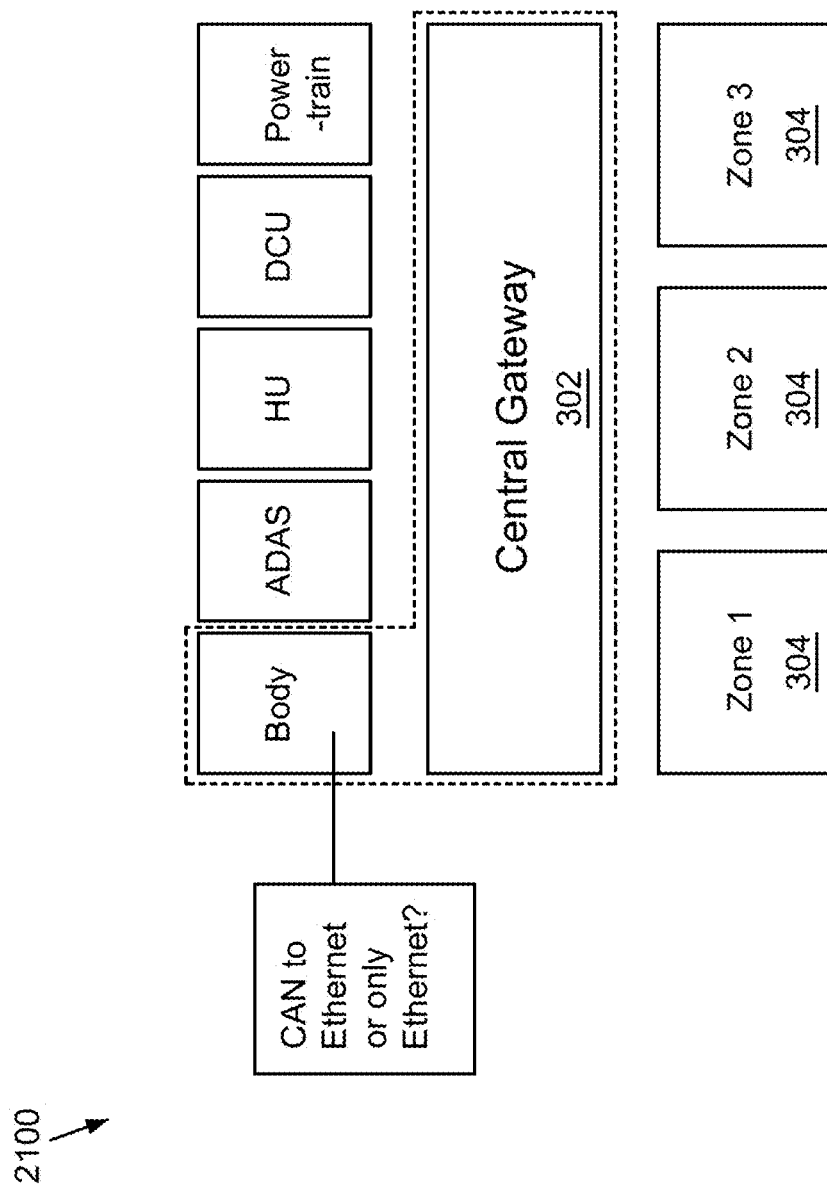
FIG. 21 is a block diagram depicting an implementation example for a zonal architecture, according to certain embodiments of the present disclosure.

FIG. 20 schematically depicts a number of capabilities for embodiments herein, including embodiments utilizing containerized applications 2006 (e.g., containerized network controls, time synchronization management 2008, automation management 2004, SOA support 2010, end point controls 2002, vehicle functions, or the like). FIG. 21 depicts example implementation considerations for a containerized network management of a zonal architecture.

Figure 22:
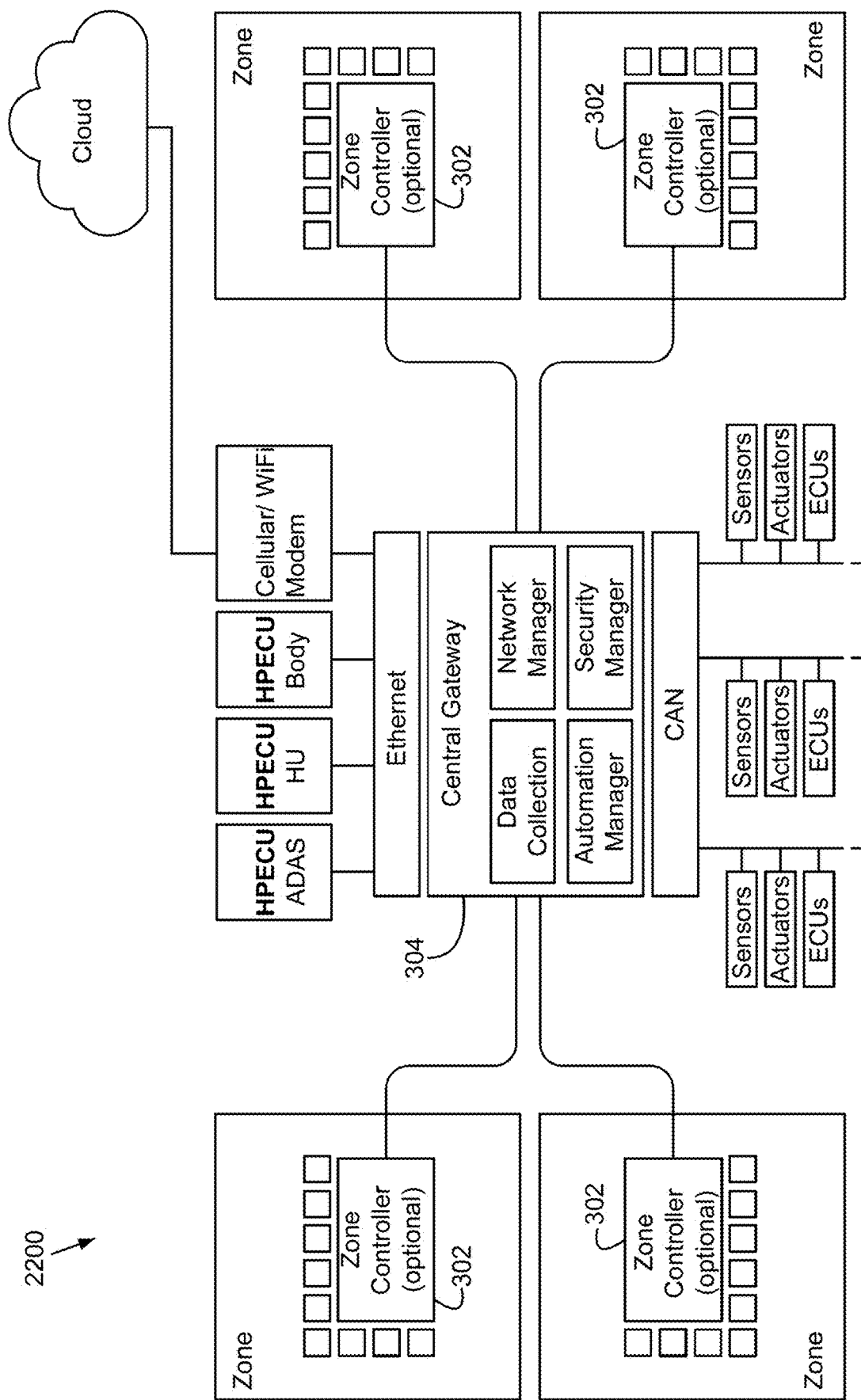
FIG. 22 is a block diagram depicting another implementation example for a zonal architecture, according to certain embodiments of the present disclosure.
Figure 23A:
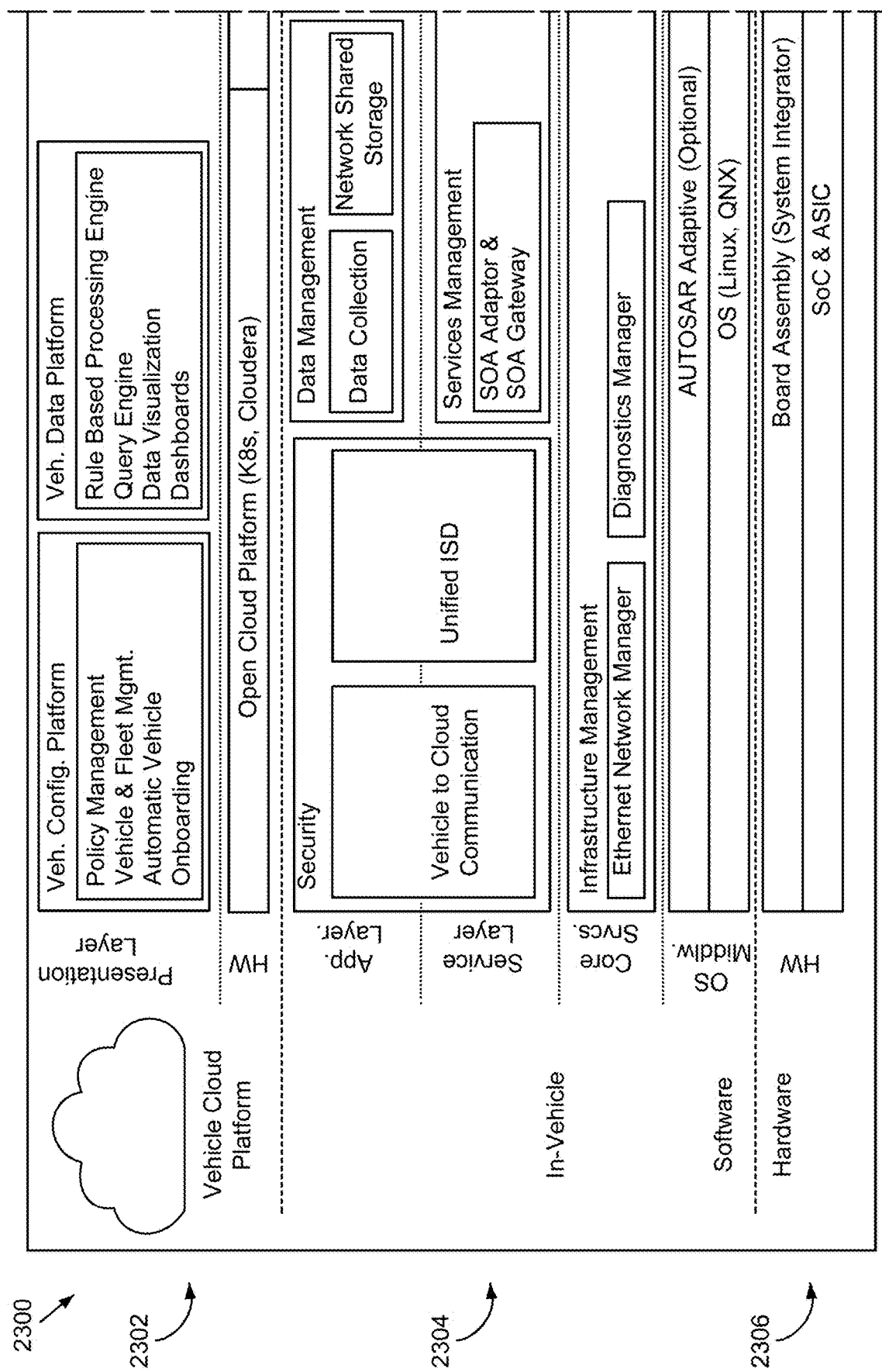
FIGS. 23-23B are block diagrams depicting example software stack for a zonal architecture on a vehicle, according to certain embodiments of the present disclosure.
Figure 23B:
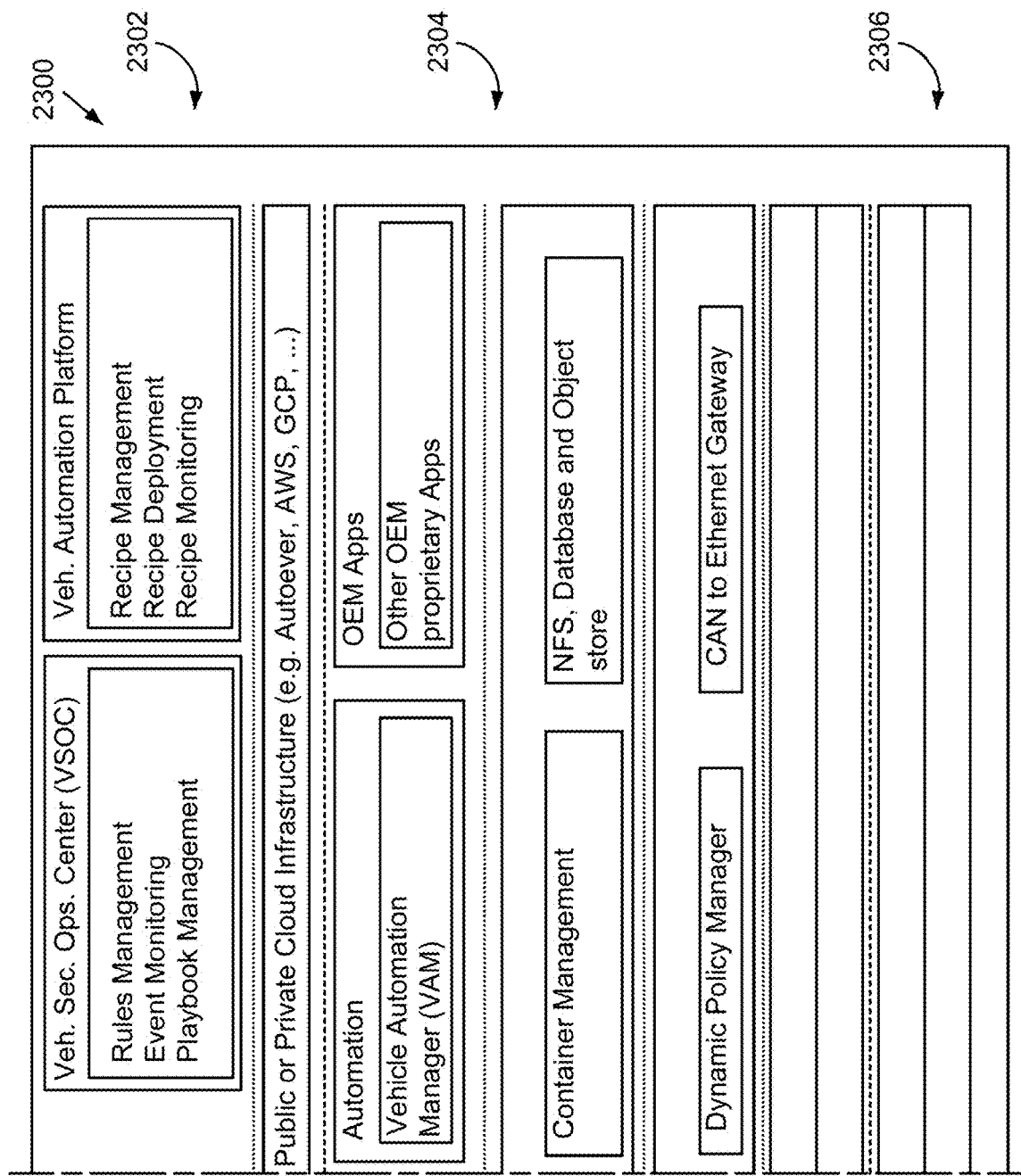

FIG. 21 depicts an implementation 2100 example for a zonal architecture, with support for end points of various network types interface with a zone. FIG. 22 depicts another implementation example 2200 for a zonal architecture. FIG. 23, sectioned into FIGS. 23A and 23B, depicts an example software stack 2300 for a zonal architecture on a vehicle, traversing from the hardware layer 2306 at the bottom, a control layer 2304 in the middle, up through cloud communications at the top 2302.

Figure 24:
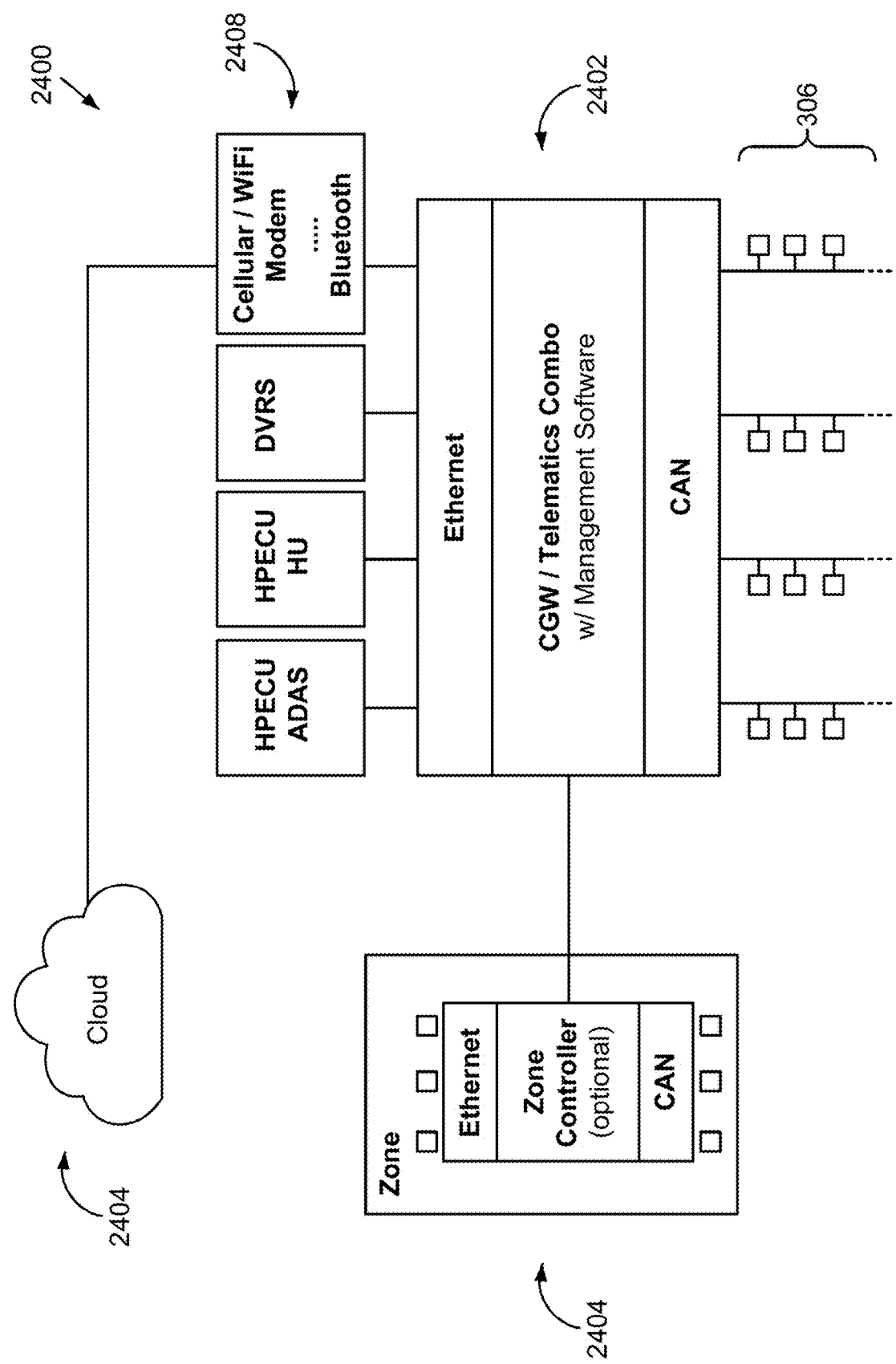
FIG. 24 is a block diagram depicting an implementation example for a zonal architecture, along with certain features and considerations related thereto, according to certain embodiments of the present disclosure.

FIG. 24 depicts an implementation example 2400 for a zonal architecture, along with certain features and considerations related thereto. The example of FIG. 24 includes central zone 2402 hosting a number of applications 2408, communication to a cloud server 2406, end points 306 of the central zone 2402, and a second zone 2404 with a zone controller.

Figure 25A:
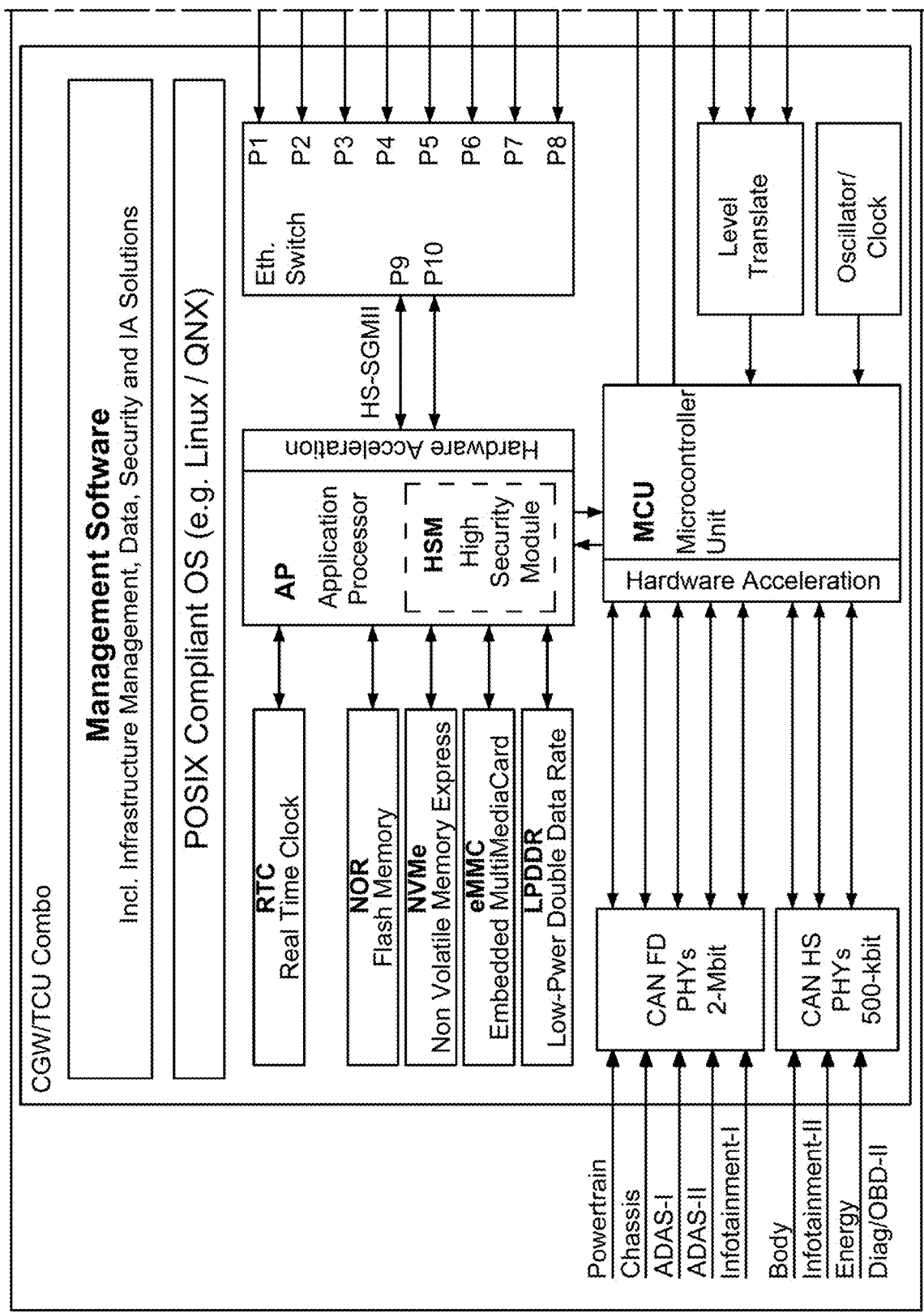
FIGS. 25-25B is a block diagram depicting an implementation example for a zonal architecture, according to certain embodiments of the present disclosure.
Figure 25B:
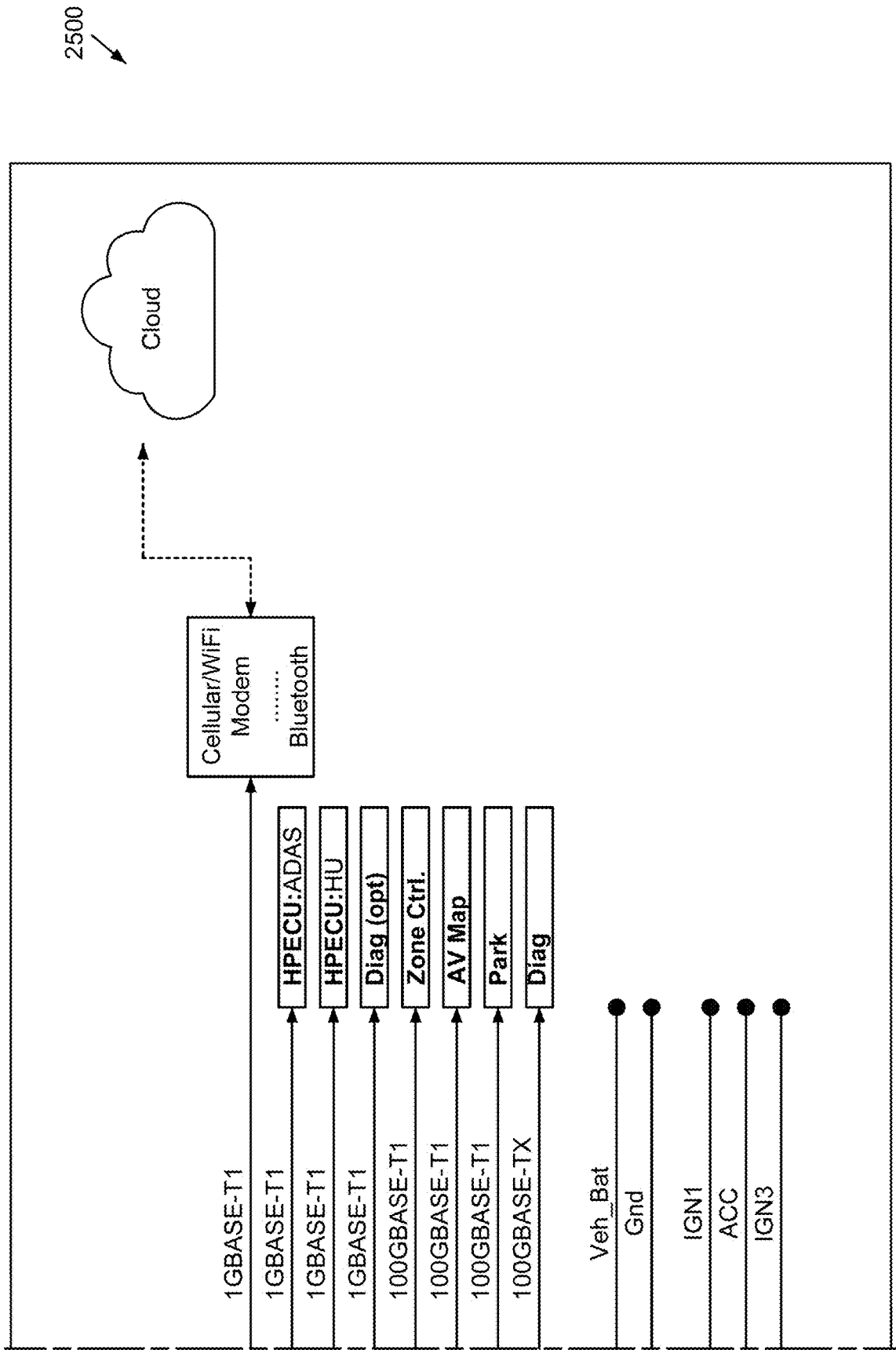

FIG. 25, sectioned into FIGS. 25A and 25B, schematically depicts a zone controller 2500 that may be utilized as a central zone manager for various embodiments of the present disclosure.

Figure 26:
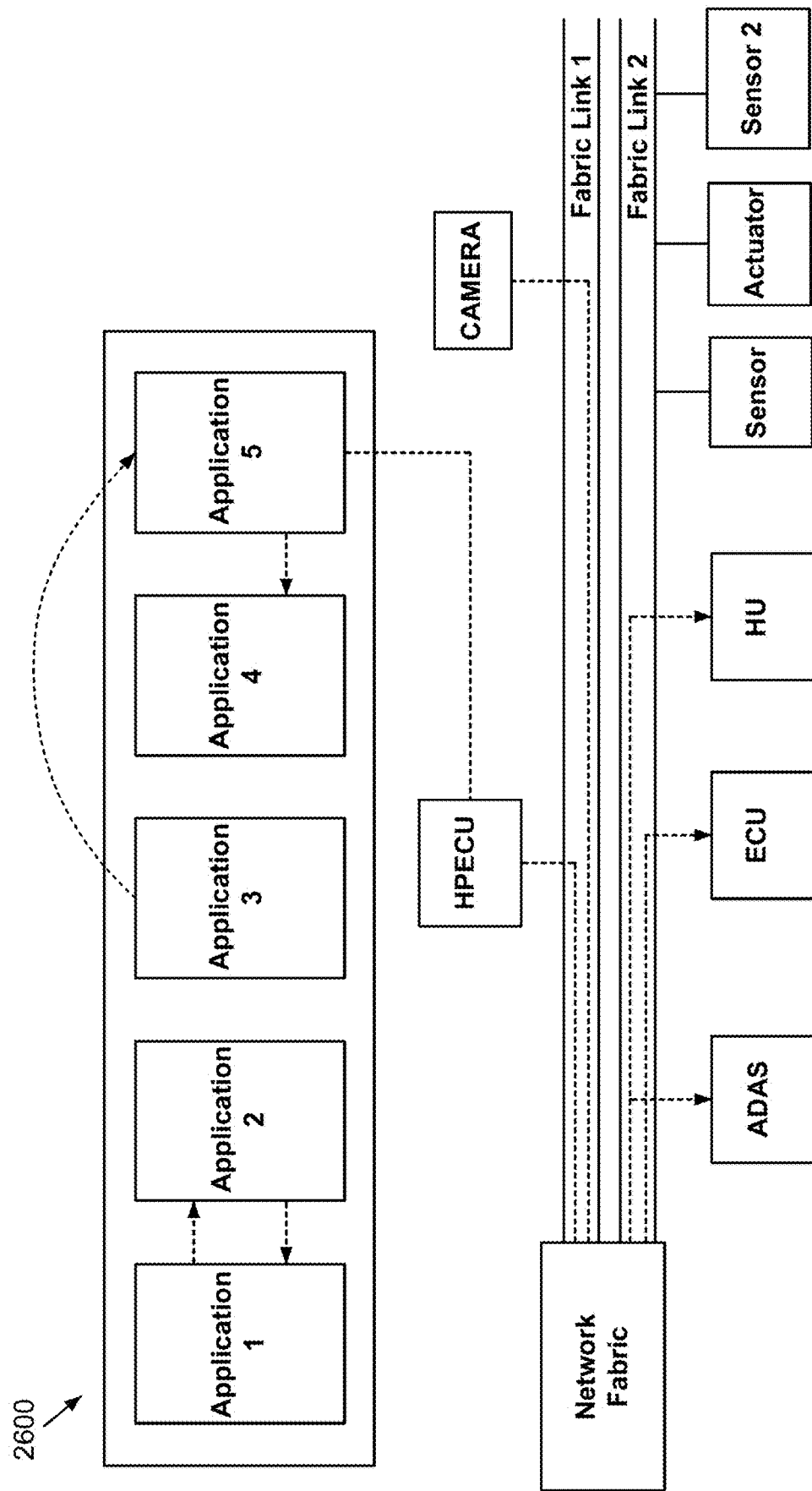
FIG. 26 is a block diagram depicting an implementation example for a zonal architecture with a SOA implementation, according to certain embodiments of the present disclosure.

FIG. 26 depicts an example zonal arrangement 2600 having two zones, with a number of applications supported on the first zone, and a number of end points supported on the second zone.

Figure 27:
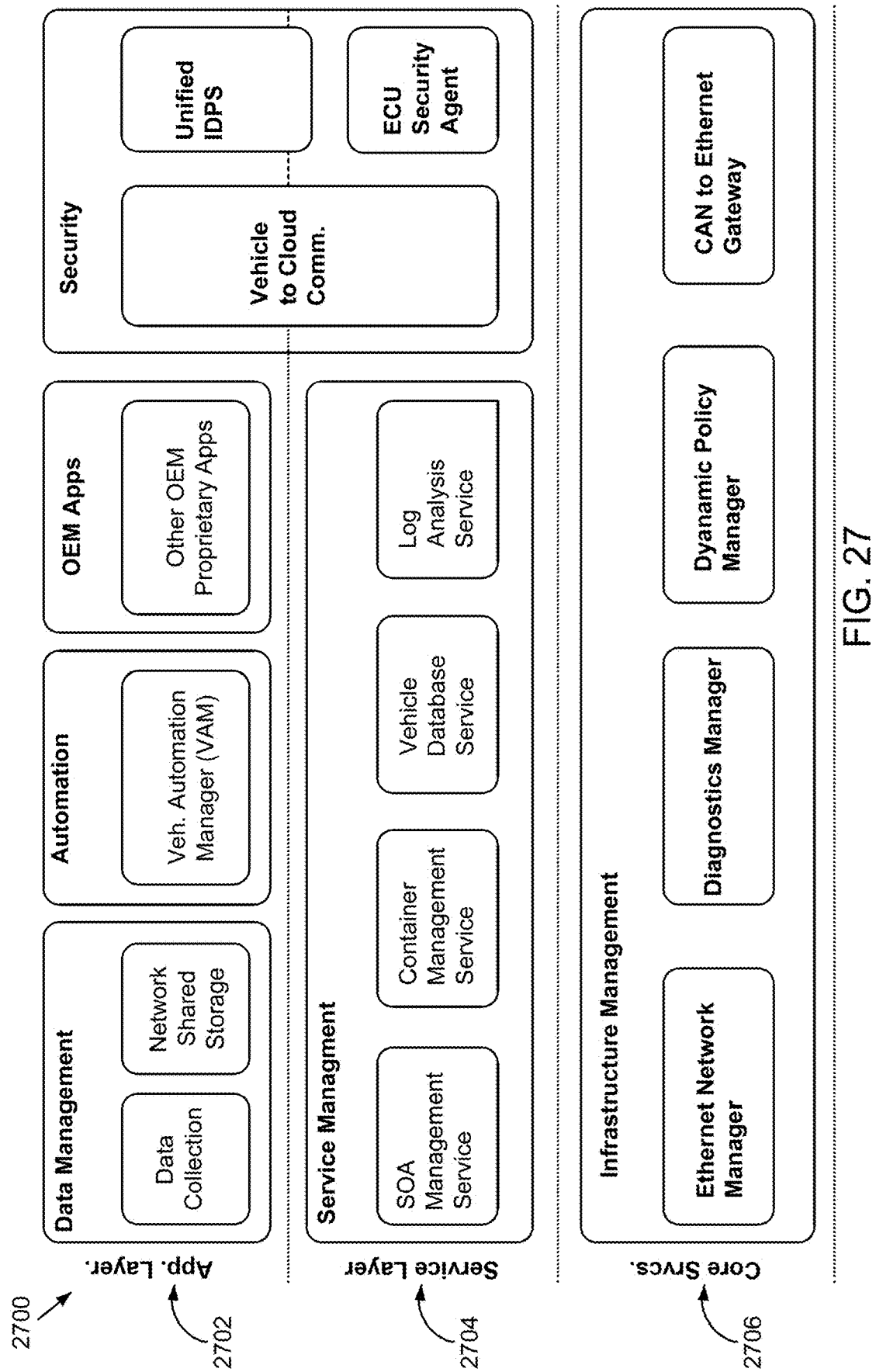
FIG. 27 is a block diagram depicting another example software stack and/or logical layer for a zonal architecture on a vehicle, according to certain embodiments of the present disclosure.

FIG. 27 depicts a control hierarchy 2700, with a core services layer 2706, a service layer 2704, and an application layer 2702. The control hierarchy 2700 may be implemented by, or coordinated by, a controller in the system, such as a central zone manager.

Figure 28:
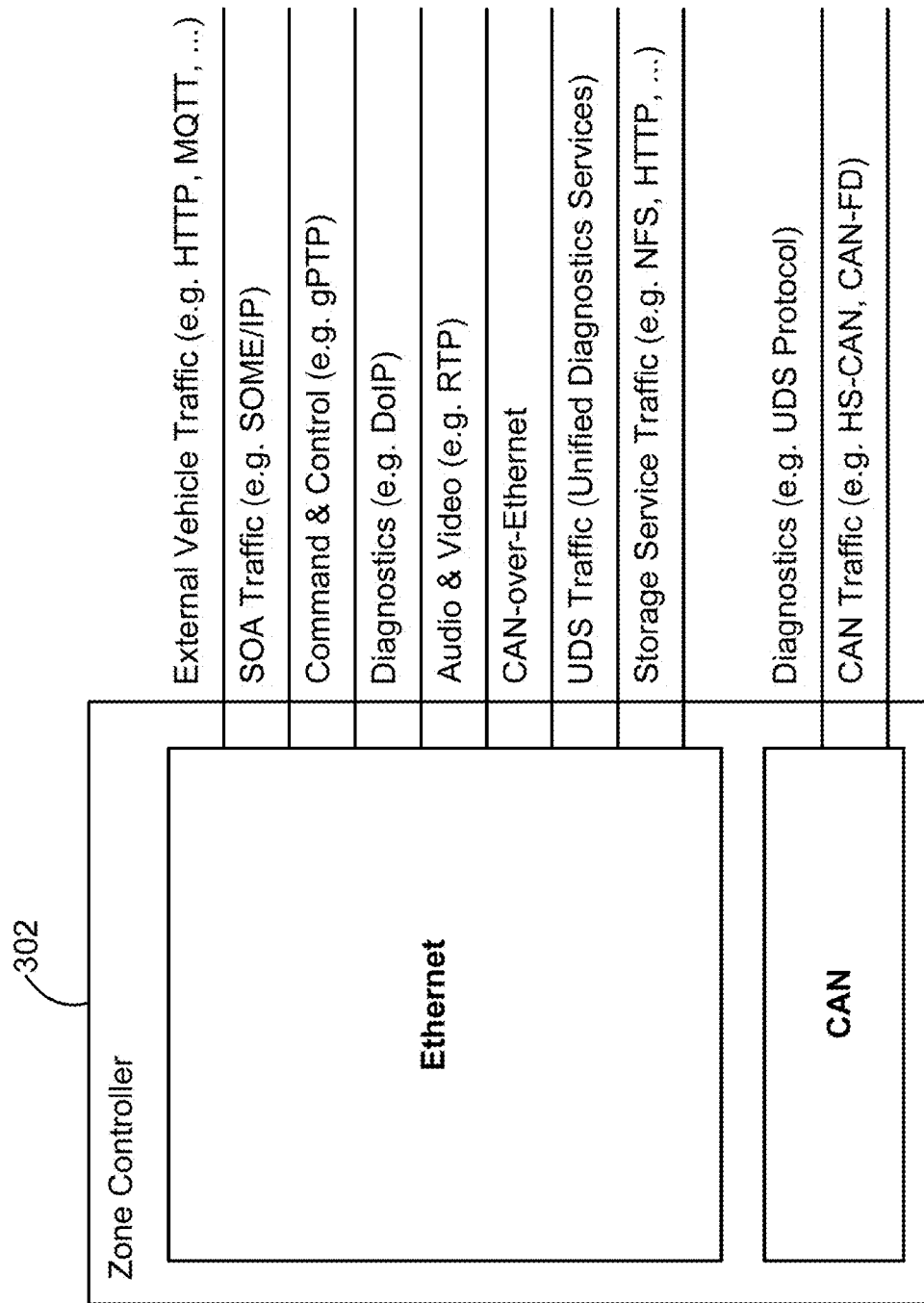
FIG. 28 is a block diagram depicting a zone controller, according to certain embodiments of the present disclosure.

FIG. 28 depicts a zone controller 302 with example network traffic types that may be present on a vehicle having a zoned architecture, which may be considered for various embodiments herein, including at least for selected zonal arrangements, mixed criticality message management, SOA implementations, or the like.

Without limitation to any other aspect of the present disclosure, embodiments herein provide for a system and procedures to implement a zonal network architecture on a vehicle to improve the reliability, installed cost, operating cost, operational performance, and/or ability to avoid or mitigate risks, failures, or degradation of the network and consequent effects on the vehicle mission.

Figure 29:
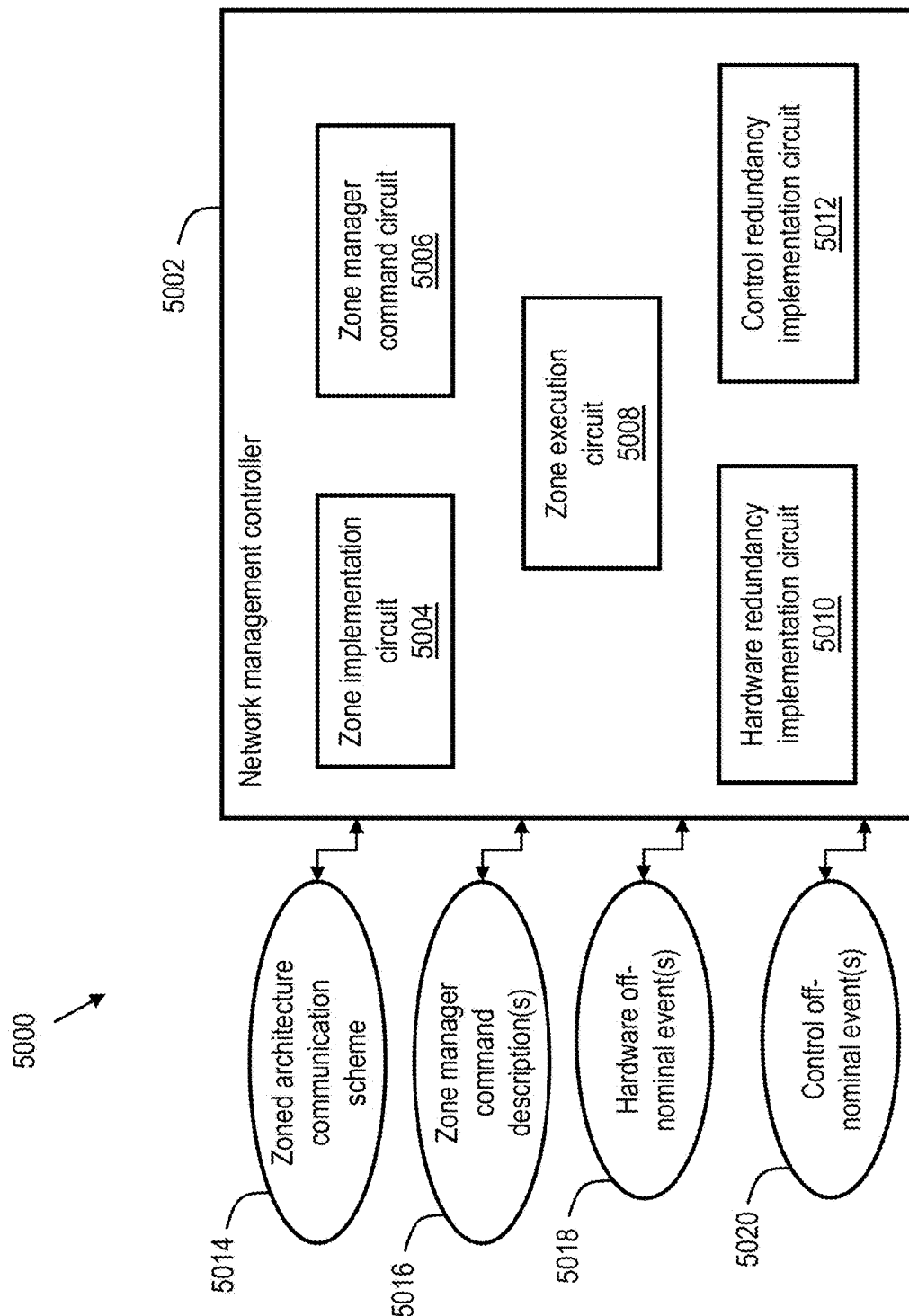
FIG. 29 is a block diagram depicting a network manager controller, according to certain embodiments of the present disclosure.
Figure 31:
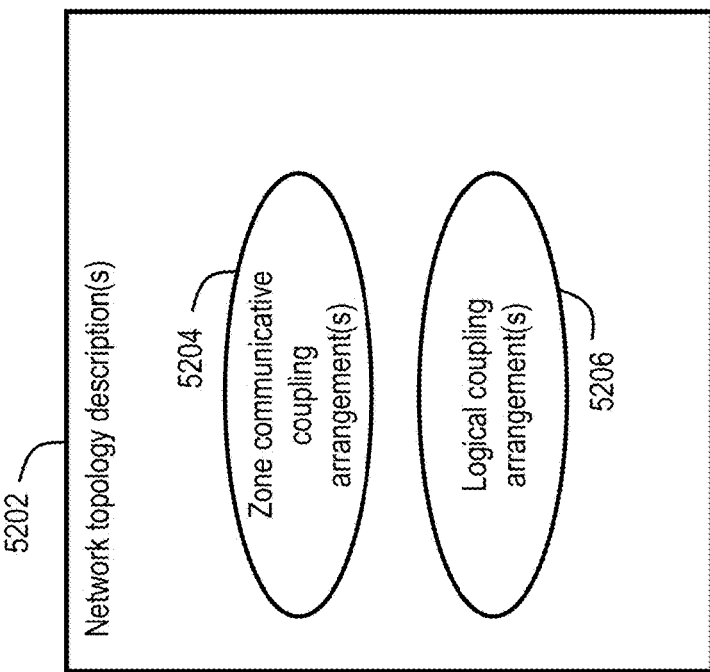
FIG. 31 is a block diagram depicting network topology description(s), according to certain embodiments of the present disclosure.

Referencing FIG. 29, an example system 5000 includes a vehicle having a multi-zone network including a plurality of network zones, each one of the network zones including at least one zone manager. Throughout the present disclosure, a zone manager may alternatively be referenced as a zone controller. The vehicle is not depicted in FIG. 29, but the system 5000 of FIG. 29 may included with, in whole or part, any embodiments set forth herein including a vehicle having a multi-zone network. For the example system 5000, the network zones are arranged according to a network topology description of a selected zone architecture, where the network topology description includes any one or more aspects as set forth throughout the present disclosure (e.g., reference FIGS. 31 and 38, and the related descriptions). In certain embodiments, each network zone includes a zone manager configured to perform control operations for the zone, for example permitting communications with other zones, limiting utilization of bandwidth or other resources, enforcing prioritization between messages, and/or performing any other operations of a zone manager (or zone controller) as set forth herein.

The example system 5000 further includes a network management controller 5002. The example network management controller 5002 includes a zone implementation circuit 5004 that interprets a zoned architecture communication scheme 5014, a zone manager command circuit 5006 that interprets a zone manager command description 5016 for each of the zone managers in response to the zoned architecture communication scheme 5014, and a zone execution circuit 5008 that provides the corresponding zone manager command description 5016 to each of the zone managers. For example, the zoned architecture communication scheme 5014 may be embodied as part of a policy passed to the network management controller 5002, such as by an external device, that defines various aspects of managing network communications on the vehicle, and between zones on the vehicle.

Some of the communication management may apply to different end points on different zones, and the specific arrangement may not be known to the user creating the policy (e.g., an employee of the vehicle manufacturer). In the example, the zone manager commend circuit 5006 determines the responsibilities of each zone manager to be responsive to the zoned architecture communication scheme 5014, and determines the zone manager command descriptions 5016 to implement the portions of the zoned architecture communication scheme 5014 that are relevant to that particular zone manager, for example based on the end points (e.g., sensors, actuators, controllers, etc.), flows, functions, applications, or the like that are serviced by or embodied on the zone. The zone execution circuit 5008 then distributes the zone manager command descriptions 5016 to the various zone managers. The utilization of a local version of the zone manager command description 5016, for example as a local configuration file, by individual zone managers allows the system to implement an update of the zone communication control immediately after a start up of the vehicle, and/or even allows an update during runtime operations, depending upon the desired behavior of the system and/or the type of change in the zone manager command description 5016 updates.

Embodiments herein thereby allow a user with specific expertise, for example in risk management or failure analysis, to configure the zoned architecture communication scheme 5014 according to their expertise, without requiring that they understand the specific arrangement of end points and control responsibilities on the vehicle. Accordingly, embodiments of the present disclosure improve outcomes, for example allowing the system to be built by appropriate experts to optimize the risk profile of the network, and also by reducing the development time and turnaround time to roll out improvements. Further, embodiments of the present disclosure reduce costs by allowing zones to cooperate and hand off data seamlessly without loss to (and typically with improvement to) security or communication capability.

One consequence of the zonal architecture arrangements herein, which allow for the zonal architecture to be arranged for various purposes (e.g., system cost, system reliability, provision for redundancy, etc.) apart from the function of the end points on the zone, is that for many vehicle functions the supporting end points will be distributed across more than one zone. The utilization of the zone manager command description 5016 allows those end points to seamlessly cooperate to perform the underlying vehicle function, while having consistent implementation for those end points with regard to communication latency, applicable security, data quality, and the like. Previously known systems group network zones, where separate zones are present at all, on the functions of the vehicle (e.g., a network providing communication between powertrain components), to enforce security of communications with the hardware layer (e.g., provision of separate Public and Private CANs), or based upon the responsible party (e.g., a electric motor supplier) for particular end points. Thus, previously known systems result in expensive and redundant hardware layers, for example where multiple parallel network cables traverse the same extensive regions of the vehicle, and expose multiple systems to all of the risks distributed around the vehicle. Embodiments of the present disclosure significantly reduce the costs of the overall network support, with planned management for risk, redundancy, application of security, and the like, and that can be built with a selected combination, based on the priorities of the designer, of enhanced capability, reduced risk, reduced cost, and enhanced security.

In the example of FIG. 29, each of the zone managers is responsive to the corresponding zone manager command description 5016 to control communications between end points of the corresponding network zone and end points of at least one other zone of the network zones.

The network topology description may include any aspects of a network topology as set forth throughout the present disclosure. Referencing FIG. 31, example aspects of the network topology description include, without limitation: a communicative coupling arrangement 5204 of the zones (e.g., which zones are directly coupled to a particular zone, which may be in a star, mesh, ring, or other arrangement); or a logical coupling arrangement 5206 of the zones (e.g., the ordering and sequencing of communication between zones, for example where communications pass through another intermediate zone, priority between zones, and/or a description of zones that may be virtual zones, for example with some communications shared on a same hardware layer, but separated in terms of which end points can see or understand the various communications).

An example zone implementation circuit 5004 interprets the zoned architecture communication scheme 5014 in response to a policy provided by an external device. An example policy is a configuration file for network communications on the vehicle, for example allowing the zone manager command descriptions 5016 to be updated, at least for certain embodiments or update operations, without making a change to base software for the vehicle, reducing risks of an incomplete update (which may disable the vehicle entirely) and reducing the operational impact of the update (e.g., without requiring a shutdown, pause in operational capability, and/or dedicated servicing operation). An example zone manager command circuit parses the policy, including a configuration file, to determine the zone manager command descriptions 5016. In certain embodiments, the zone manager command descriptions 5016 are embodied as a local configuration file communicated to, and utilized by, the corresponding zone managers. In certain embodiments, the zone manager command descriptions 5016 are embodied as an update to the local configuration file for one or more zone managers, and the zone execution circuit 5008 provides the corresponding zone manager command description 5016 to each of the zone managers by updating the local configuration file for the relevant zone managers.

Figure 30:
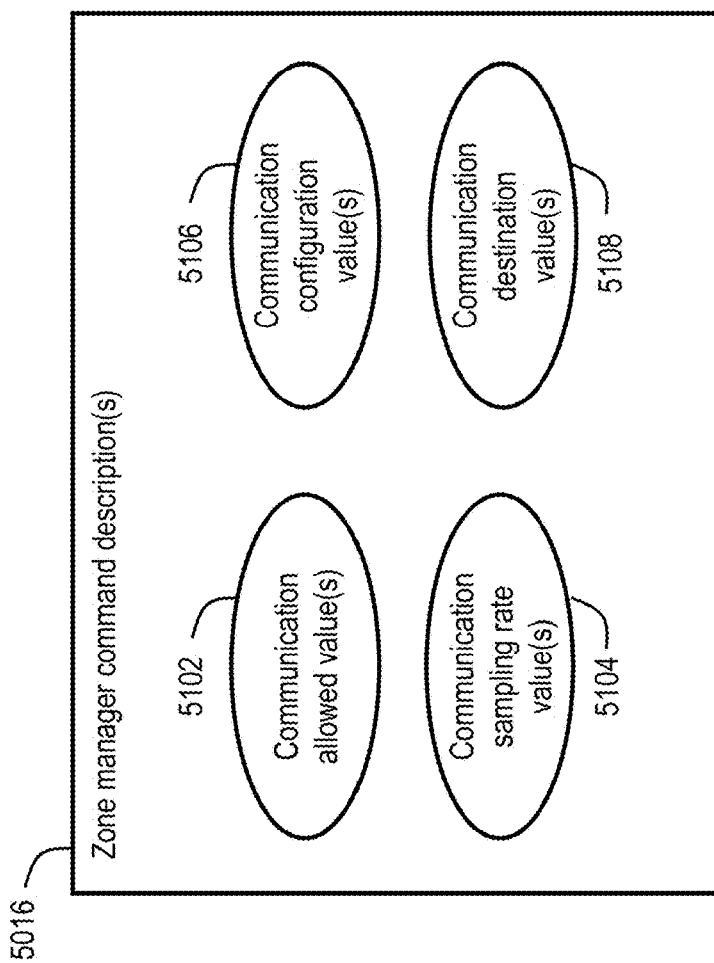
FIG. 30 is a block diagram depicting zone manager command descriptions, according to certain embodiments of the present disclosure.

Referencing FIG. 30, example and non-limiting zone manager command descriptions 5016 include one or more aspects such as: communication allowed values 5102 (e.g., which end points, flows, applications, functions, network zones, etc., are allowed to communicate with other ones of these, which may be provided as an inclusionary and/or exclusionary description); a communication sampling rate value 5104 (e.g., how fast the end points, flows, applications, functions, network zones are allowed to request or provide messages, and/or an absolute or relational description of bandwidth utilization allowed, including by zone, etc.); a communication configuration value 5106 (e.g., message information such as headers, units, byte depth, metadata, encapsulation of messages, and/or enforced latency parameters (e.g., maximum or minimum latency values)); and/or a communication destination value 5108 (e.g., end points, zones, addresses, etc. that messages from the end points, flows, applications, functions, network zones are allowed to send messages to, and/or routing descriptions such as "Zone 1 can send messages generated by Flow A to Zone 2 directly, and all other messages to Zone 2 will be passed through Zone 3"—for example to preserve bandwidth on critical network zones, to balance workload and utilization, etc.).

An example network management controller 5002 further includes a hardware redundancy implementation circuit 5010 that supports implementation of a hardware redundancy scheme. An example hardware redundancy implementation circuit 5010 determine that a hardware off-nominal event 5018 has occurred (e.g., an end point, network zone, zone manager, etc. has lost communication and/or is experiencing degraded performance), and adjusts at least one of the zone manager command descriptions 5016 in response to the hardware off-nominal event 5018. For example, a system 5000 may have a defined redundancy scheme where if a zone manager A fails, then zone manager B changes operations to fulfill, at least in part, the duties of zone manager A. The available hardware redundancy for a given system 5000 depends on the zone arrangement and connectivity, and further upon the planning for the hardware failure in question, as reflected in the zoned architecture communication scheme 5014. In a further example, an end point Z on zone A may perform a certain vehicle function which is unavailable if zone manager A fails. The response may depend upon the type of failure, for example if zone manager B can communicate with the end point Z, then the zone manager B can simply perform the network control duties previously performed by zone manager A, and full system capability is likely to remain available. However, if the failure of zone manager A removes all communication to zone A, then the response may include migrating control responsibilities from zone A to end points on other zones of the vehicle, and zone manager B can be configured to further notify end points that perform substitute operations to replace the functions of end point Z. In certain embodiments, other changes may also be implemented, for example to account for the different network traffic patterns and the like, which may affect more than just zone B, and accordingly the zone manager command description 5016 changes for a zone A manager failure may extend further than just an update to the duties of zone manager B. In certain embodiments, the lost functions may be replaced completely, for example where another end point in the system is fully capable to replace all operations of end point Z. In certain embodiments, the lost functions may be replaced in part, for example a less capable end point may perform some critical functions of end point Z, allowing continued operation which may be degraded. In certain embodiments, the functionality replacement may be very limited, but still could be important, for example allowing the vehicle to continue operation in a limp-home mode to allow the operator to move the vehicle to a safe location, and/or allowing some functionality such as a battery disconnect operation otherwise performed by end point Z, which is limited and even mission disabling, but could be important in a catastrophic failure situation (e.g., an accident with the vehicle that disables significant portions of the overall network hardware layers). The utilization of the hardware off-nominal event 5018 and updates to the zone manager command descriptions 5016 allows for a layered response to various hardware failures, while preserving as many vehicle operations as possible, with as little impact to the operator as possible.

An example network management controller 5002 includes a control redundancy implementation circuit 5012 that determines a control off-nominal event 5020 has occurred, and adjusts the zone manager command description 5016 in response to the control off-nominal event 5020. For example, if an end point controller fails in the system, hardware connectivity to the zone and to other end points may still be present, but the functions performed by that end point will otherwise be lost. In the example, the control off-nominal event 5020 adjusts the zone manage commands 5016 to move the responsibilities of the lost control function to another end point (or end points) on the vehicle. In certain embodiments, the control off-nominal event 5020 may be a degradation of performance, suspect performance (e.g., a stuck or slow responding value), and/or a control off-nominal event 5020 determined by a fault code or diagnostic operation. The considerations for the control off-nominal event 5020 are otherwise similar to the considerations for the hardware off-nominal event 5018, where various end points, zone managers, and network zones may be affected by the response operations. It will be understood that some events may not be easily classified as a hardware event or a control event. The operations described herein apply generally to off-nominal events regardless of the specific reason for the event, and the specific terminology using hardware events and control events is utilized for clarity in describing specific operations. The terminology utilized is not limiting, and off-nominal events can be addressed even where the true cause or classification of the event may not be known.

Figure 32:
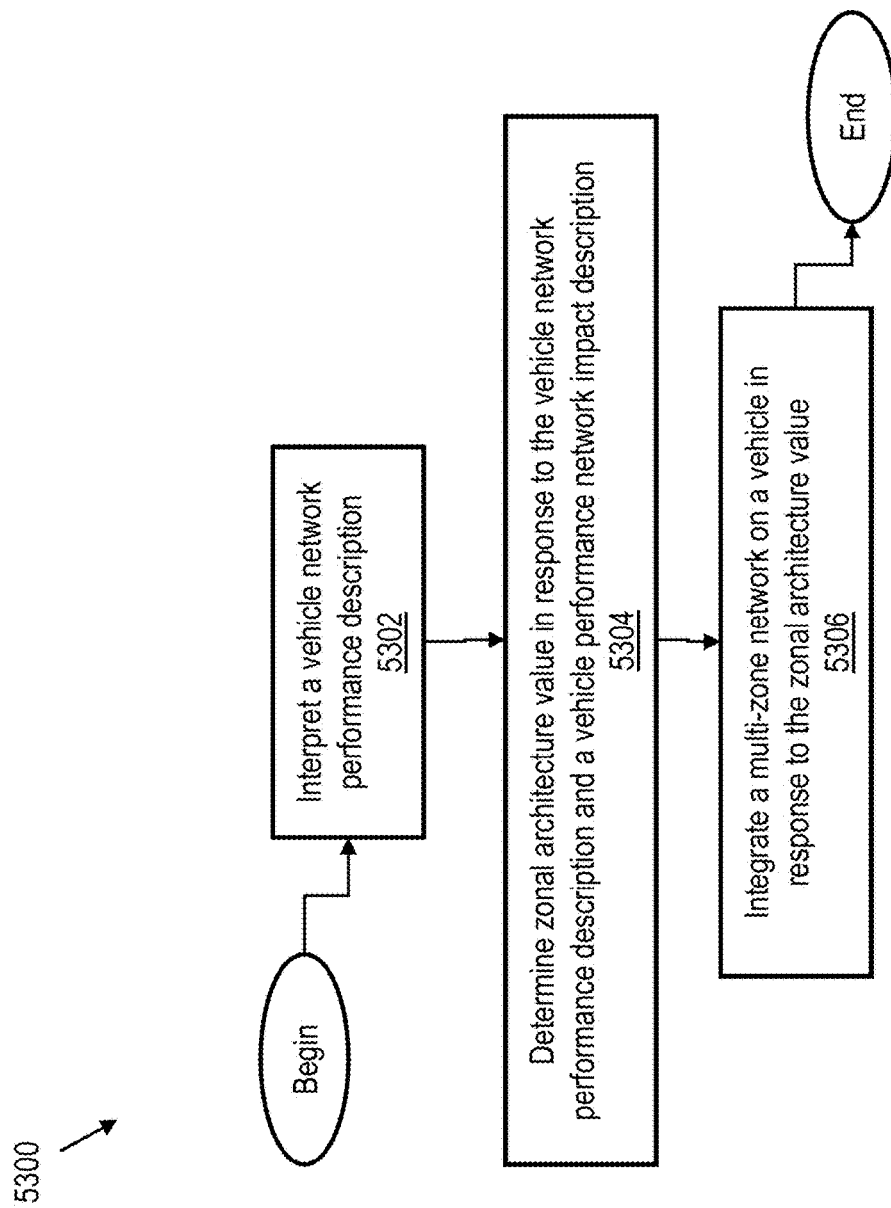
FIG. 32 is a procedure for integrating a multi-zone network on a vehicle, according to certain embodiments of the present disclosure.
Figure 36:
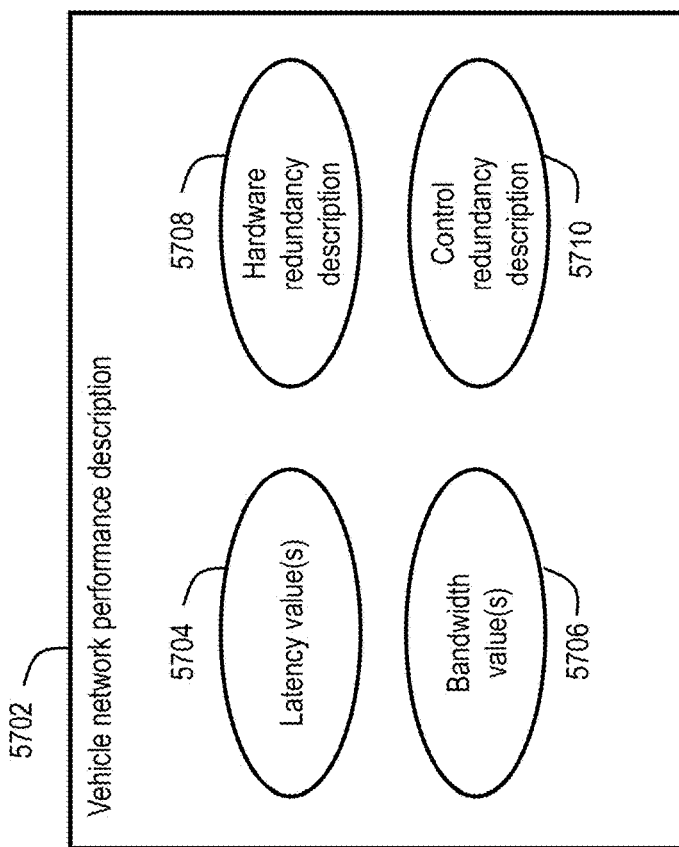
FIG. 36 is a block diagram depicting a vehicle network performance description, according to certain embodiments of the present disclosure.

Referencing FIG. 32, an example procedure 5300 for implementing a zonal architecture on a vehicle is schematically depicted. The example procedure 5300 includes an operation to interpret a vehicle network performance description 5702 (reference FIG. 36). The example vehicle network performance description 5702 includes performance criteria for the vehicle network, which may include minimally acceptable values (e.g., to perform the vehicle mission and/or to meet a specification), target or desirable values, maximal values (e.g., a performance value above which no commercial benefit is achieved, and/or above which the benefit is assumed to stop increasing), statistical descriptions (e.g., averages, time-averaged values, variability descriptions, etc.), and/or any other type of performance criteria description. In certain embodiments, aspects of the vehicle network performance description 5702 are utilized in an index, for example to compare the costs and/or benefits between two or more zonal architecture values.

An example vehicle network performance description 5702 includes a latency value 5704, for example a maximum or minimum allowed latency, an average latency description, a latency trajectory or duty cycle (e.g., to describe burst behavior, etc.). In certain embodiments, the latency value 5704 may be considered for various end points, flows, features, applications, or the like, and/or between specific end points, network zones, etc. An example vehicle network performance description 5702 includes a bandwidth value 5706, for example describing a bandwidth for one or more zones that is to be preserved, achieved, that can be utilized, etc. In certain embodiments, the bandwidth value 5706 is related to a zone or an end point. An example vehicle network performance description 5702 includes a hardware redundancy description 5708, including for example hardware aspects of the network that should have back-up operations available, and/or acceptable capability descriptions for those back-up operations. An example vehicle network performance description 5702 includes a control redundancy description 5710, including for example control aspects of the network and/or end points thereof that should have back-up operations available, and/or acceptable capability descriptions for those back-up operations.

Figure 37:
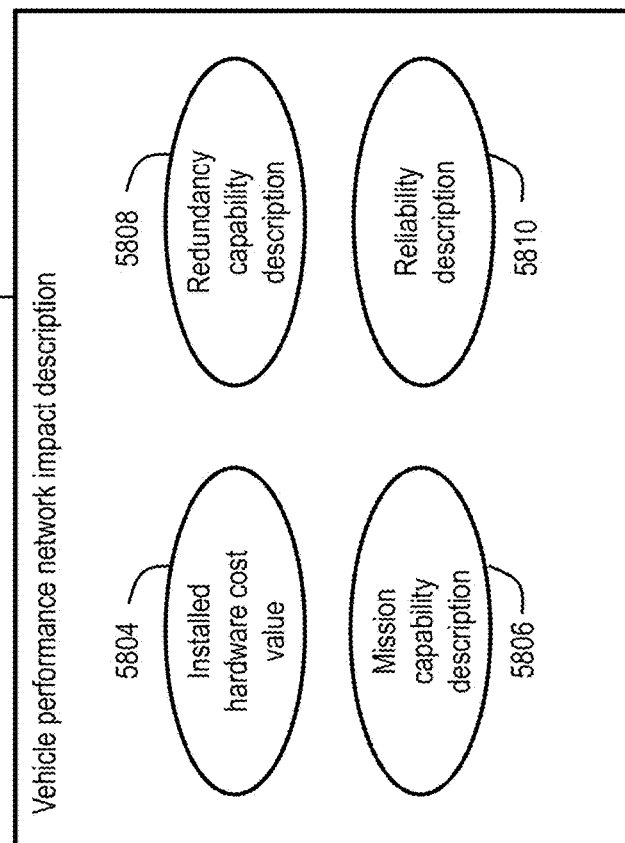
FIG. 37 is a block diagram depicting a vehicle performance network impact description, according to certain embodiments of the present disclosure.

The example procedure 5300 further includes an operation 5304 to determine a zonal architecture value in response to the vehicle network performance description 5702, and a vehicle performance network impact description 5802 (reference FIG. 37). The example vehicle performance network impact description 5802 includes the impact to network capability for the considered zonal architecture value in view of the vehicle configuration, and in view of which network impacts are important for the particular system.

An example vehicle performance network impact description 5802 includes an installed hardware cost value 5804, which can include any cost type consideration of the zonal architecture value being considered. Example hardware cost values 5804 include aspects such as: a hardware physical cost (e.g., cost of controllers, zone managers, cables, connectors, shielding, etc. to physically implement the zonal architecture value); a physical footprint of the installation (e.g., how much space, weight, number and type of integration interfaces such as brackets, routing, integration difficulty and/or sensitivity, testing requirements to confirm the installation, etc.); a control cost of the installation (e.g., engineering work required to code the solution, testing cost to confirm any code works as planned, bandwidth utilization to implement the solution, processor utilization to implement the solution, memory utilization to implement the solution, etc.; these can consider any base controls changes to the vehicle, for example by combining end points and/or changing the way vehicle controls operate, and/or zone manager operations); and/or the service cost of the installation (e.g., impacts on service procedures and/or physical access to parts of the vehicle that are affected by the installation, ability to replace components, any testing or confirmation procedures driven into service procedures by the installation, sophistication of service tools to perform service procedures that may be affected by the installation, etc.). The installed hardware cost value 5804 may be considered, generally, as a "cost" portion of a given zonal architecture value, for example utilized in an optimization routine to determine acceptable, improved, and/or optimized zonal architecture value.

An example vehicle performance network impact description 5802 includes a mission capability description 5806, for example a description of the ability for the considered zonal architecture value to meet the performance criteria for basic vehicle operation throughout the defined space, for example at all normal operating conditions, ambient conditions, and the like. An example vehicle performance network impact description 5802 includes a redundancy capability description 5808, including a description of the ability for the considered zonal architecture value to meet the hardware and/or control redundancy descriptions. An example vehicle performance network impact description 5802 includes a reliability description 5810, including a description of the likely impact of the considered zonal architecture value on reliability factors, for example estimating maintenance schedules, failure rates and costs, downtime costs, etc. These estimates may be based on the temperature, vibration, EMI, and/or water intrusion elements relevant to the vehicle, and can be dependent on the physical routing of network cables, position and environment of network components (e.g., zone mangers), and selected physical components such as cable types, shielding utilized, connector types, cooling parameters (e.g., fins, size, and power utilization of controllers, etc.).

The operation 5304 to determine a zonal architecture value in response to the vehicle network performance description 5702, and a vehicle performance network impact description 5802 can include any decision algorithm or optimization routing understood in the art, for example utilizing the vehicle network performance description 5702 parameters generally as a "benefit" function, and the vehicle performance network impact description 5802 parameters generally as a "cost" function. In certain embodiments, the vehicle network performance description 5702 is entered by a user and/or determined from a specification for the vehicle, and the vehicle performance network impact description 5802 is determined in response to the network routing layout, the network topology, the position of network components, the zoned architecture communication scheme, and information known about the vehicle and likely operating environment. In certain embodiments, an initial zonal architecture value is utilized as a starting point, which might be: a design entered by the user, a design from a previous model year for the vehicle, a design from a similar vehicle, and/or a simple baseline design used as a general starting point. In certain embodiments, operation of the procedure 5300, and/or of similar design procedures set forth in the present disclosure (e.g., and without limitation, procedures set forth in and/or supported by embodiments in FIGS. 43, 45, 77, and 93, and the related descriptions) include working through a basic set of zonal architecture values (e.g., a star, mesh, ring, 2-node, 3-node, 4-node, etc.) and using a best outcome result from those basic set of zonal architecture values as the initial zone architecture value. If the initial zone architecture value is acceptable, the operation 5304 may include using the initial zone architecture value as the determined zone architecture value, potentially with a highlight or notification of any aspects of interest, such as the highest cost contributors, lowest performance parameters, etc. In certain embodiments, the zonal architecture value may be adjusted to boost low performance parameters and/or to reduce the highest cost parameters, until either an acceptable zonal architecture value is determined, and/or according to a convergence criteria (e.g., further adjustments are achieving improvements below a threshold rate). In certain embodiments, a threshold value may be utilized, for example using a baseline installation as a marker, and ensuring the selected zone architecture value has a cost/benefit ratio that is better than or equal to the baseline (e.g., this would enforce continuous improvement over time and/or between model years, while minimizing the cycle time to find a zone architecture value solution). In certain embodiments, the various aspects of the vehicle network performance description 5702 and vehicle performance network impact description 5802 may be utilized in an index or other normalized comparison, including with weighting for various aspects. In certain embodiments, operation 5304 includes minimizing costs, minimizing certain aspects of the cost (e.g., a luxury vehicle may prioritize a low failure rate and high redundancy capability over the installed hardware cost), maximizing benefits, maximizing certain aspects of the benefits, including a similarity to an offset vehicle in the cost/benefit analysis (e.g., biasing the zonal architecture values for two different vehicle models to be similar). In certain embodiments, sensitivity to parameters may be considered in the operation 5304, for example if estimates or uncertainties on certain parameters (e.g., the vibration profile) create a high sensitivity to the overall performance or cost of the selected zonal architecture value, then another choice for the zonal architecture value having a slightly worse raw cost/benefit characteristic may be selected, if the other choice has a lower sensitivity (e.g., a lower risk that the estimated cost/benefit will not be achieved).

The example procedure 5300 further includes an operation 5306 to integrate a multi-zone network on a vehicle in response to the zonal architecture value. Referencing FIG. 33, an example operation 5306 includes installing the multi-zone network configured in accordance with the zonal architecture value (e.g., following the zonal architecture value as the design for the installation). Referencing FIG. 34, an example operation 5306 includes an installing the multi-zone network configured in accordance with a network topology description of the zonal architecture value (e.g., following the zonal architecture value for the topology decision, but potentially varying other aspects, for example to accommodate minor differences in supplied components, changes in the available space on the vehicle, changes in the real vehicle environment compared to estimates, etc.). Referencing FIG. 35, an example operation 5306 includes installing the multi-zone network configured in according with a zone manager distribution description of the zonal architecture value (e.g., following a major aspect of the zonal architecture value, such as the selection of a central zone manager, and zone managers for the zones, but potentially varying other aspects).

Figure 38:
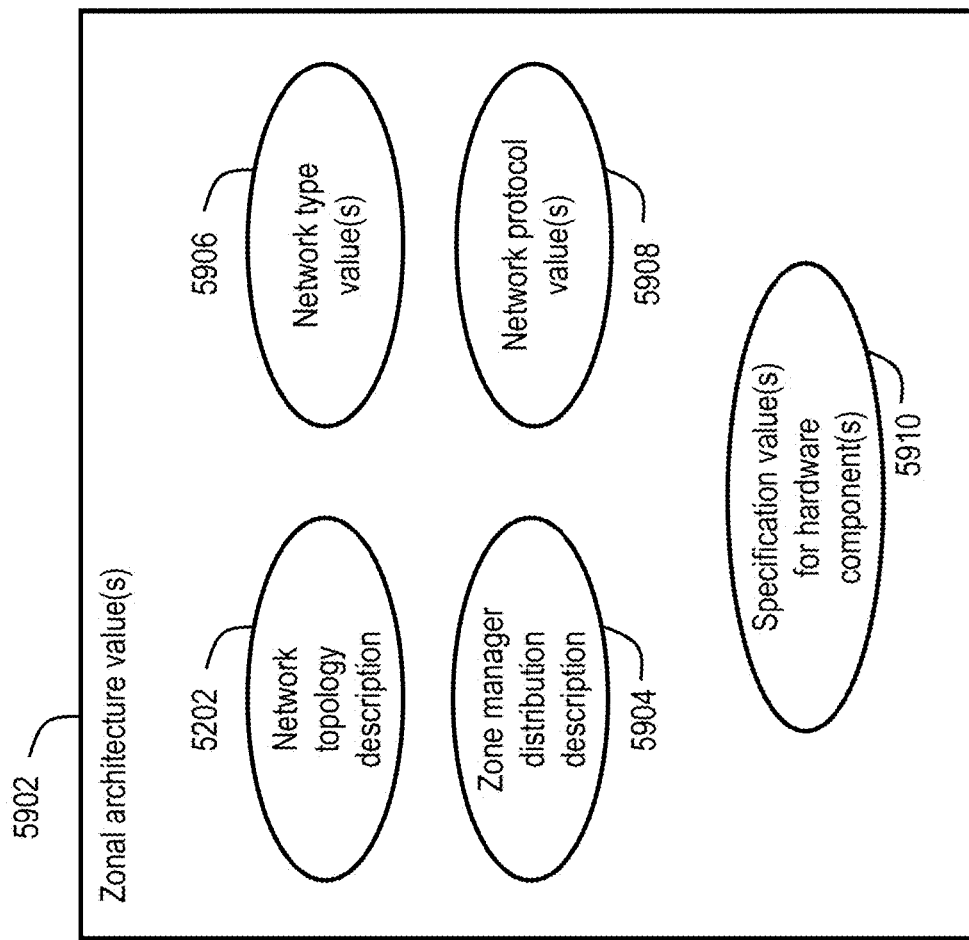
FIG. 38 is a block diagram depicting a zonal architecture value(s), according to certain embodiments of the present disclosure.

Referencing FIG. 38, example and non-limiting aspects of the zonal architecture value 5902 include: a network topology description 5202 (e.g., the number and arrangement of network zones), a zone manager distribution description 5904 (e.g., the position and duties of the zone managers, including utilization of highly capable end points as one or more zone managers, and/or utilization of dedicated zone managers), a network type value 5906 (e.g., the network types to be utilized, speed capabilities, industry standards for compliance, etc.), a network protocol value 5908 (e.g., specific protocol selection, and/or selections for headers, metadata, communication protocols, synchronization selections, etc.), and/or specification values for hardware components 5910 (e.g., capabilities of processors and network communication devices, cable specifications, connector specifications, etc.).

Referencing FIG. 39, an example procedure 6000 for implementing a zonal architecture on more than one vehicle class is schematically depicted. Operations of procedure 6000 allow for vehicle classes to benefit from commonality in the zonal architecture design, while balancing the costs and benefits of the decision across vehicles. The example procedure 6000 includes an operation 6002 to interpret a number of vehicle network performance descriptions for a number of vehicle classes (e.g., one for each vehicle class), and an operation 6004 to determine a zonal architecture value in response to the vehicle network performance descriptions and a vehicle performance network impact description for each of the vehicle classes (e.g., based on the specific environmental and operating characteristics of each class). The operation 6004 can include any of the considerations set forth for operation 5304, with separate consideration for each vehicle class where appropriate. The overall cost/benefit analysis may consider the number of vehicles in each class, the economic impact of vehicles in each class (e.g., the cost of the vehicle, the cost of downtime, the specific application of the class—for example an ambulance class of vehicle may have a distinct acceptance of risks relative to other vehicles). The example procedure 6000 includes an operation 6006 to integrate a multi-zone network on a vehicle from each of the vehicle classes. A vehicle class, as used herein, represents any group of related vehicles having a common aspect between them for purposes of network planning, for example vehicles from a same make and model year, vehicles intended for a same application, vehicles targeted to a common geographic region, vehicles belonging to a particular fleet, etc. The procedure 6000 allows leveraging the flexibility of using a zonal architecture to benefit multiple vehicle classes at the same time, while keeping commonality between the vehicles.

Referencing FIG. 40, an example operation 6006 includes installing the multi-zone network on each of the first vehicle and the second vehicle configured in accordance with the zonal architecture value. Referencing FIG. 41, an example operation 6006 includes installing the multi-zone network on each of the first vehicle and the second vehicle configured in accordance with a network topology description of the zonal architecture value (e.g., allowing variances for the specific vehicle classes, while leveraging the benefits of the selected topology). Referencing FIG. 42, an example operation 6006 includes installing the multi-zone network on each of the first vehicle and the second vehicle configured in accordance with a zone manager distribution description of the zonal architecture value (again allowing for variances between the vehicle classes).

Without limitation to any other aspect of the present disclosure, embodiments herein provide for a system and procedures to implement a zonal network architecture on a vehicle to avoid or mitigate physical system risks, for example due to environmental issues such as temperature, vibration, electro-magnetic interference (EMI), road splash (or water intrusion generally), or the like. Additionally or alternatively, the setup and configuration of a zonal network architecture on the vehicle can avoid negative consequences and/or improve outcomes of the system relative to failure modes, including any failure mode of interest, such as loss of a network component (e.g., an end point failure, loss of communication, loss of a cable, etc.), physical damage to the vehicle that may impact the network (e.g., damage due to an accident, improper hookup of a towing vehicle, damage to cables during a service event, electrical damage to the vehicle, etc.).

Figure 43:
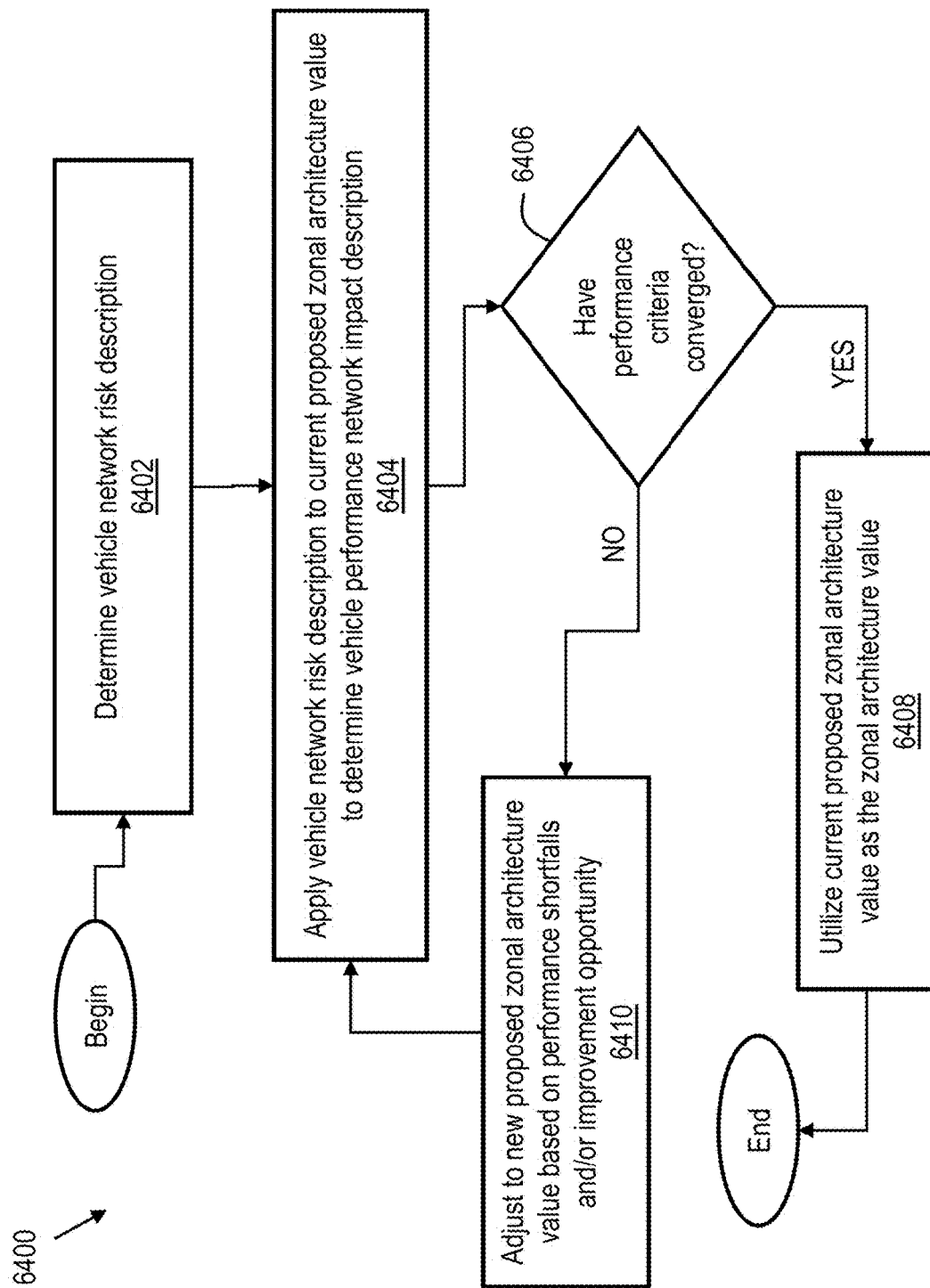
FIG. 43 is a process for utilizing a current proposed zonal architecture value, according to certain embodiments of the present disclosure.
Figure 44:
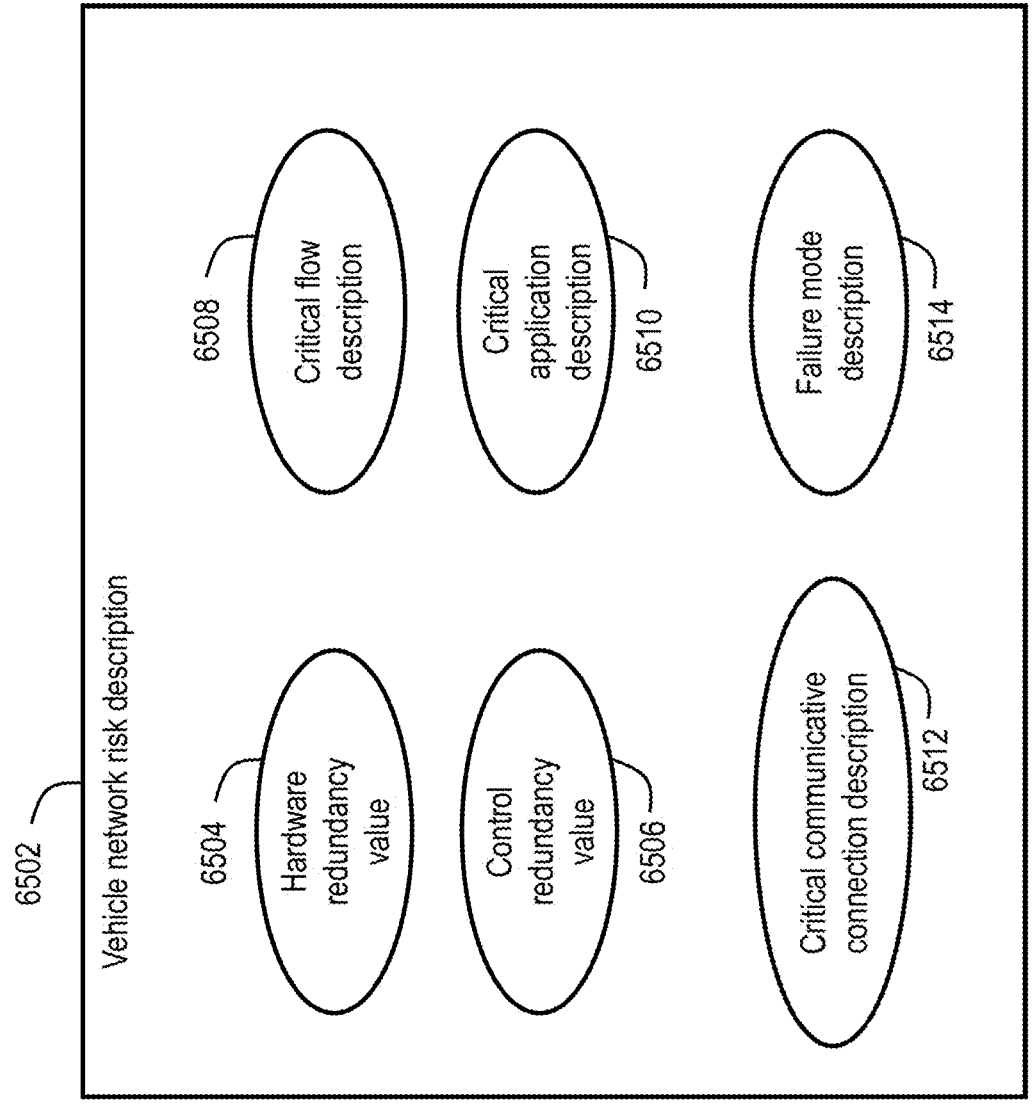
FIG. 44 is a block diagram depicting a vehicle network risk description, according to certain embodiments of the present disclosure.

Again referencing FIG. 29, an example system 5000 includes a selected zone architecture determined in response to a vehicle network risk description and a vehicle performance network impact description (e.g., the selected zone architecture determined in any manner described throughout the present disclosure, such as according to operations of FIG. 32 or FIG. 43). Referencing FIG. 43, an example procedure 6400 for determining a zonal architecture value includes an operation 6402 to determine a vehicle network risk description, for example defining the risks to the vehicle network that should be managed, and criteria for determining how well they are managed. Referencing FIG. 44, example and non-limiting aspects of a vehicle network risk description 6502 include: a hardware redundancy value 6504 (e.g., hardware elements for which redundancy should be provided, and/or acceptable performance levels under redundant hardware operations, for example whether a total loss of a network zone should be managed with zero degradation of capability); a control redundancy value 6506 (e.g., control elements and/or specific end points or zone managers for which redundancy should be provided, and/or acceptable performance levels under redundant control operations); a critical flow description 6508 (e.g., a group of related operations that represent a critical flow, and acceptable redundancy performance if lost—note that a given flow may be related to numerous end points, and redundancy for every end point may be prohibitive. Redundancy management for such situations may include consolidating controls from various end points, replacing aspects, for example a sensor value utilized, with available substitutes such as an estimation or virtual sensor for the lost sensor, repetition of control capability on more than one end point, and/or the critical flow description 6508 may be a strong lever in the location and distribution of network zones); a critical application description 6510 (e.g., an application or feature of the vehicle for which redundancy should be available, and acceptable performance if lost, note that an application may include any related group of functions, any group of functions packaged for any purpose such as providing a specific operator experience (e.g., an application for HVAC management, audiovisual system control, navigation, etc.), and in some cases an application may also be considered a flow); a critical communicative connection description 6512 (e.g., a backbone between two critical network zones, for example where powertrain control is distributed between Zones A and B, then the Zone A-B communicative connection may be considered critical; the critical communicative connection description 6512 can include a connection between zones, end points, controllers, etc.); and/or a failure mode description 6514. The failure mode description 6514 may include any scenarios, use cases, events, etc. that constitute a failure mode to protect for, and may be determined according to usage history for similar vehicles, defined by regulations, provided in specification for the vehicle, analyzed in a failure modes effects analysis (FMEA), etc. For example, the failure mode description 6514 may include "destruction of the front 18 inches of the vehicle in a collision" and a description of acceptable performance levels after the failure mode. Example and non-limiting failure mode descriptions 6514 include: specific event descriptions, elimination (loss) of specific components, loss of any component of a single type (e.g., loss of any connector in the system should not cause a loss of function greater than XYZ), occurrence of a specific electrical event (e.g., cable XYZ is shorted to ground), and/or a defined event of any type (e.g., the case of an ECU is cracked in a maintenance event; one wire from the network is cut/removed; the vehicle is exposed to an EM field of a specific strength (e.g., proximity to a high voltage power line), etc.).

The example procedure 6400 further includes an operation 6404 to apply the vehicle network risk description 6502 to a current proposed zonal architecture value, and determine the vehicle performance network impact description. For example, in operation 6404 the criteria from the failure mode description 6514 are compared to determine the degradation of the vehicle network performance in light of the failure mode, and that degraded performance is compared to the acceptable performance level.

The example procedure 6400 includes an operation 6406 to determine whether performance criteria for the zonal architecture value have converged. For example, if a selected number of adjustments to the zonal architecture value have not resulted in improved performance relative to the vehicle network risk description, and/or the rate of improvement has fallen below a threshold, then the operation 6406 may be determined as YES. In certain embodiments, for example where the performance relative to the vehicle network risk description is acceptable, the operation 6406 may still be determined as YES even if further improvements may be available, or even if further improvements are likely to be available. In certain embodiments, performance relative to the vehicle network risk description may be enforced to be an improvement, or at least not a degradation, relative to a baseline (e.g., a previous model year of the vehicle), for example to ensure that continuous improvement is being pursued. In certain embodiments, the operation 6406 may utilize a full optimization routine, and/or may include a cost analysis where the performance relative to the vehicle network risk description is used as a threshold for convergence, and the cost is minimized, improved relative to a baseline, and/or held to a not-to-exceed threshold as a part of operation 6406.

In response to operation 6406 determining YES, the procedure 6400 includes operation 6408 to utilize the current proposed zonal architecture value as the zonal architecture value. In response to operation 6406 determining NO, the procedure 6400 incudes operation 6410 to adjust the zonal architecture value based on performance shortfalls and/or improvement opportunities relative to the vehicle network risk description and/or a cost analysis. After operation 6410 to adjust the proposed zonal architecture value, the procedure 6400 returns to operation 6404. In certain embodiments, for example after a number of iterations of operation 6410, and/or after a design space has been sufficiently explored (e.g., the main reasonable network topologies have been considered, etc.) without convergence, the procedure 6400 may determine to exit, for example providing a notification of operating parameters (e.g., zonal architecture values attempted, best results, gap indications that prevented convergence, etc.), for example to allow the user to consider whether some constraint can be relaxed and/or whether a cost limit might need to be adjusted.

The procedure 6400 includes operation 6402 to determine the vehicle network risk description, and convergence operation 6406 determined according to performance against the vehicle network risk description. In certain embodiments, procedure 6400 may utilize a vehicle network performance description as the determined value in 6402, and for determining the convergence operation 6406, for example to select a zonal architecture value to enhance performance criteria rather than, or in addition to, the risk criteria of the vehicle network risk description. Similarly, the procedure 6400 may utilize a vehicle performance network impact description as the determined value in 6402, and for determining the convergence operation 6406, for example to select a zonal architecture value to enhance cost criteria rather than, or in addition to, the risk criteria of the vehicle network risk description. Additionally or alternatively, procedure 6400 can be operated on multiple vehicle classes at the same time, similar to operations described in FIG. 39 and the related description, for example where driving some commonality into the zonal architecture value for different vehicle classes would be valuable, and/or to leverage common techniques to address difficult risk management or failure management issues.

An example system 5000 includes the selected zone architecture as a star arrangement (e.g., reference FIG. 3 and the related description), where one of the network zones includes a central zone having a central zone manager 302. An example system 5000 includes the selected zone architecture as a mesh arrangement (e.g., reference FIG. 5 and the related description), and which may include a central zone manager 302. An example system 5000 includes the selected zone architecture as a ring arrangement (e.g., reference FIG. 4 and the related description), and which may include a central zone manager 302.

An example system 5000 includes the selected zone architecture as a star arrangement with four total zones, including the central zone, two forward zone each communicatively coupled to the central zone, and a rearward zone communicatively coupled to the central zone (e.g., reference FIG. 3 and the related description).

An example system 5000 includes the selected zone architecture as a mesh arrangement having four total zones, including the central zone (in the example, the central zone is the zone associated with a central zone manager 302 having responsibilities thereof, and is not related to the geometric position of the central zone), two forward zones, and one rearward zone, wherein each of the four zones is communicatively coupled to all of the other zones (e.g., reference FIG. 5 and the related description).

An example system 5000 includes the selected zone architecture as a ring arrangement having a ring arrangement with four total zones, with the zones communicatively coupled, in order, as follows: a central zone having a central zone manager (in the example, the central zone again does not need to be, but could be, a geometrically centrally located zone), coupled to a first forward zone, the first forward zone coupled to a second forward zone, the second forward zone coupled to a rearward zone, and the rearward zone communicatively coupled to the central zone (e.g., reference FIG. 4 and the related description).

An example system 5000 includes the selected zone architecture as a two node topology, where one of the two nodes is a central zone (e.g., reference FIG. 6A and the related description). An example system 5000 includes the selected zone architecture as a three node topology, wherein one of the three nodes is a central zone (e.g., reference FIG. 6B and the related description).

An example system 5000 includes the selected zone architecture including at least one of the plurality of zones provided as a virtual network zone. Without limitation to any other aspect of the present disclosure, the utilization of one or more virtual network zones provides for an additional degree of freedom in the configuration space for available zonal architecture values. It will be seen that utilizing a virtual network zone reduces the hardware cost value in most cases, assuming that an appropriately positioned hardware based network zone is present on the vehicle that is capable to manage additional communication load from the messages on the virtual network zone without hardware modifications (e.g., higher grade cables, network communication devices, shielding requirements, etc.). However, there will be some tradeoffs within the design space, for example due to increased traffic and risk on the hardware based network zone that is then servicing two logical network zones of the vehicle, which may increase risks associated with a failure related to that zone, and which may reduce the redundancy options available to respond to certain failure modes or risks. The availability of the extra degree of freedom by considering virtual network zones will improve outcomes of convergence operations and/or overall performance against risk-based, cost-based, or performance-based convergence criteria, although the utilization of a virtual network zone may not be selected for a given vehicle or vehicle class.

Figure 45:
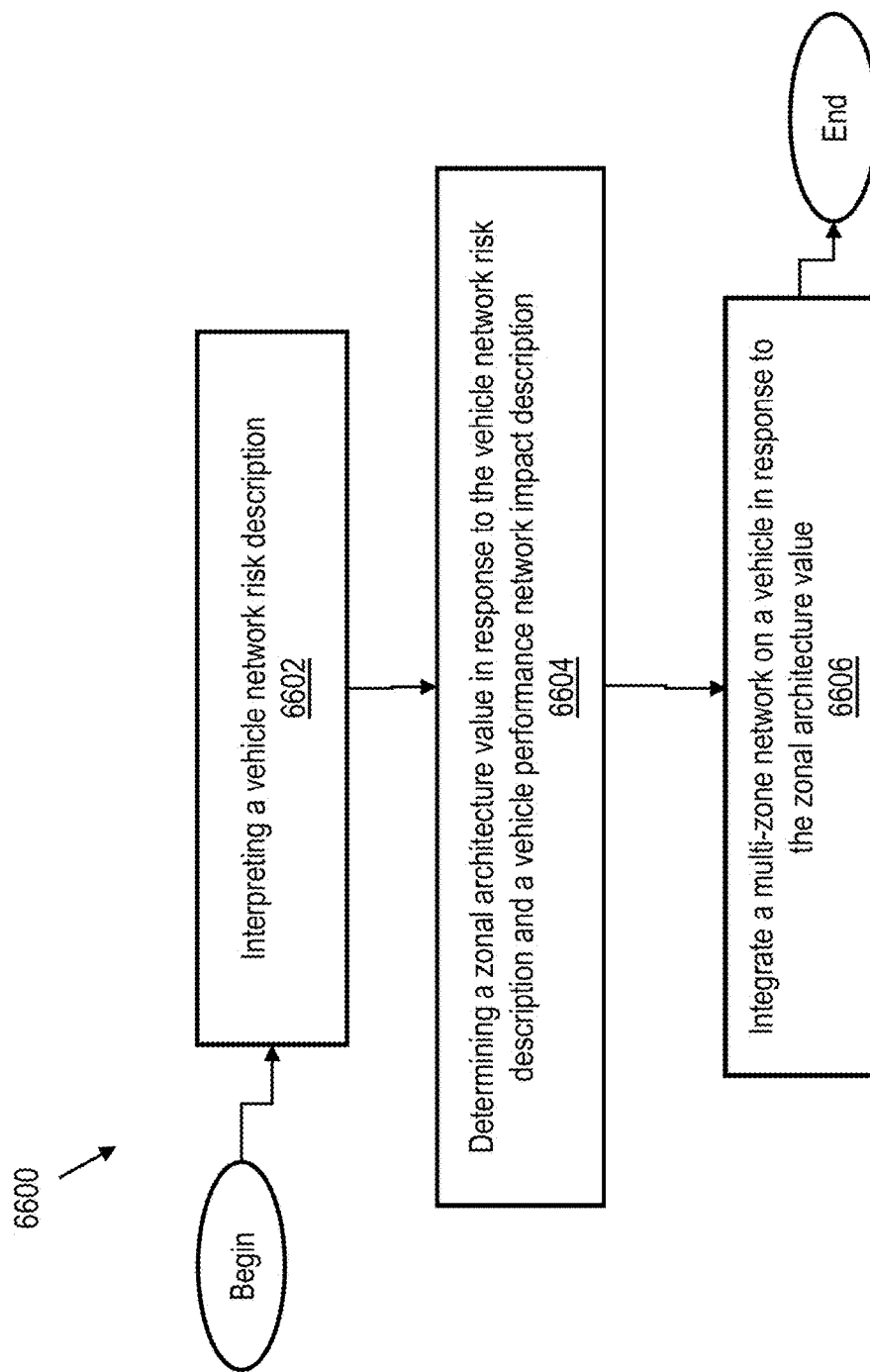
FIG. 45 is a process to integrate a multi-zone network on a vehicle, according to certain embodiments of the present disclosure.

Referencing FIG. 45, an example procedure 6600 for integrating a multi-zone network on a vehicle is schematically depicted. The example procedure 6600 includes an operation 6602 to interpret a vehicle network risk description, and an operation 6604 to determine a zonal architecture value in response to the vehicle network risk description and a vehicle performance network impact description. The example procedure 6600 further includes an operation 6606 to integrate a multi-zone network on a vehicle in response to the zonal architecture value.

Without limitation to any other aspect of the present disclosure, embodiments herein provide for a system and procedures to implement a zonal network architecture on a vehicle to avoid or mitigate system risks involving the loss or degradation of a network control component, for example allowing for the selection and/or migration of control responsibility for the zonal network.

Figure 46:
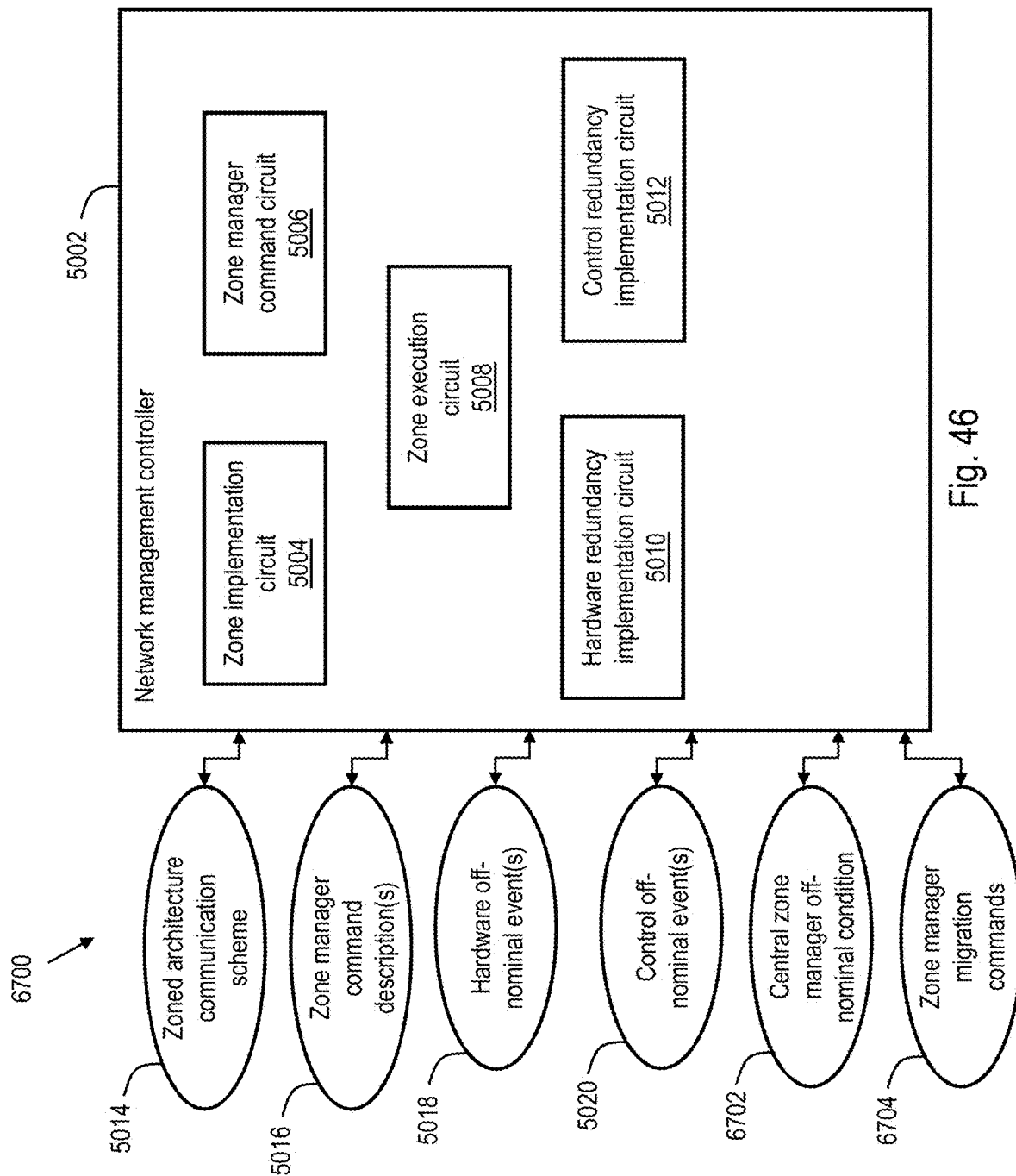
FIG. 46 is a block diagram depicting a network management controller, according to certain embodiments of the present disclosure.

Referencing FIG. 46, an example system 6700, includes a vehicle having a multi-zone network including a plurality of network zones, each one of the network zones including at least one zone manager, and wherein one of the at least one zone managers includes a central zone manager (not shown, but system 6700 can be positioned in any vehicle arrangement as set forth throughout the present disclosure). The plurality of network zones are arranged according to a network topology description of a selected zone architecture. In certain embodiments of the example of FIG. 46, the responsibilities of the central zone manager are migrated in response to a central zone manager off-nominal condition 6702 (e.g., a loss of communication with and/or degradation in the capability of the central zone manager, a loss of communication with and/or degradation in the capability of an end point of the central zone, a loss of communication with and/or degradation in the capability of the central zone, the presence of a fault condition associated with the central zone, etc.). In certain embodiments, the system 6700 includes the central zone directly communicatively coupled to at least two other zone managers, and in certain embodiments the central zone is directly communicatively coupled to each one of the other zone managers.

The example system 6700 includes a network management controller 5002 include a zone implementation circuit 5004 that interprets a zoned architecture communication scheme 5014, a zone manager command circuit 5006 that interprets a zone manager command description 5016 for each of the zone managers in response to the zoned architecture communication scheme 5014, and a zone execution circuit 5008 that provides the corresponding zone manager command description 5016 to each of the zone managers. The example system 6700 includes each zone manager responsive to the corresponding zone manager command description 5016 to control communications between end points of the corresponding network zone and end points of at least one other zone of the network zones. An example system 6700 includes the network management controller 5002 positioned, at least in part, on the central zone manager.

An example zoned architecture communication scheme 5014 includes a central zone manager succession scheme, which may include information such as which central zone manager off-nominal conditions 6702 indicate that the central zone manager duties should be moved to another zone controller, and which of the central zone manager duties should be included in the move. For example, in certain embodiments the central zone manager may have duties such as: operating as the zone manager for the central zone; distributing zone manager command descriptions 5016 to the other zone managers; maintaining a service register and/or managing publication and enrollment of a service-oriented-architecture (SOA, e.g., reference FIGS. 67-72 and the related description); operating as a PTP grandmaster for network time management operations (e.g., reference FIGS. 73-76 and the related description); and/or hosting one or more, or all, aspects of the network management controller 5002. In certain embodiments, some of these duties, where present, may be migrated to an alternate zone controller in response to the central zone manager off-nominal condition 6702, but not others. For example, one or more of these duties may not be performed by the central zone manager in a given embodiment. In another example, the designated successor zone manager may perform one set of duties (e.g., distributing zone manager command descriptions 5016), but not be best suited for another set of duties (e.g., operating as a PTP grandmaster). In certain embodiments, the central zone manager succession scheme may include migrating some duties to a first zone controller, and migrating other duties to one or more other zone controllers. In another example, some duties of the central zone manager may not be available for migration, for example operating as the zone controller for the central zone, for example where communications to the central zone are lost as a part of the central zone manager off-nominal condition 6702. It will be seen that, for certain duties of the central zone manager, the ability to migrate the duties will not be available if the successor zone manager does not already have some data available that might be stored on the central zone manager and thus potentially might become unavailable as a part of the central zone manager off-nominal condition 6702. For example, if the central zone manager maintains the service register, the service register may be lost with the central zone manager. Accordingly, in certain embodiments, the central zone manager succession scheme of the zoned architecture communication scheme 5014 includes, in certain embodiments, data that the successor zone manager maintains as a backup at all times, and/or maintains a backup that is periodically updated. Examples of such backup data include, without limitation, a policy, portions of the policy relating to the zoned architecture communication scheme, and/or the service register.

An example zone execution circuit 5008 determines the off-nominal condition for the central zone manager 6702, and migrates central zone manager duties to another zone manager (e.g., by providing zone manager migration commands 6704 to the successor zone(s)) in response to the central zone manager succession scheme. In certain embodiments, operations to provide the zone manager migration commands 6704 may instead be performed by the hardware redundancy implementation circuit 5010 or the control redundancy implementation circuit 5012.

Figure 47:
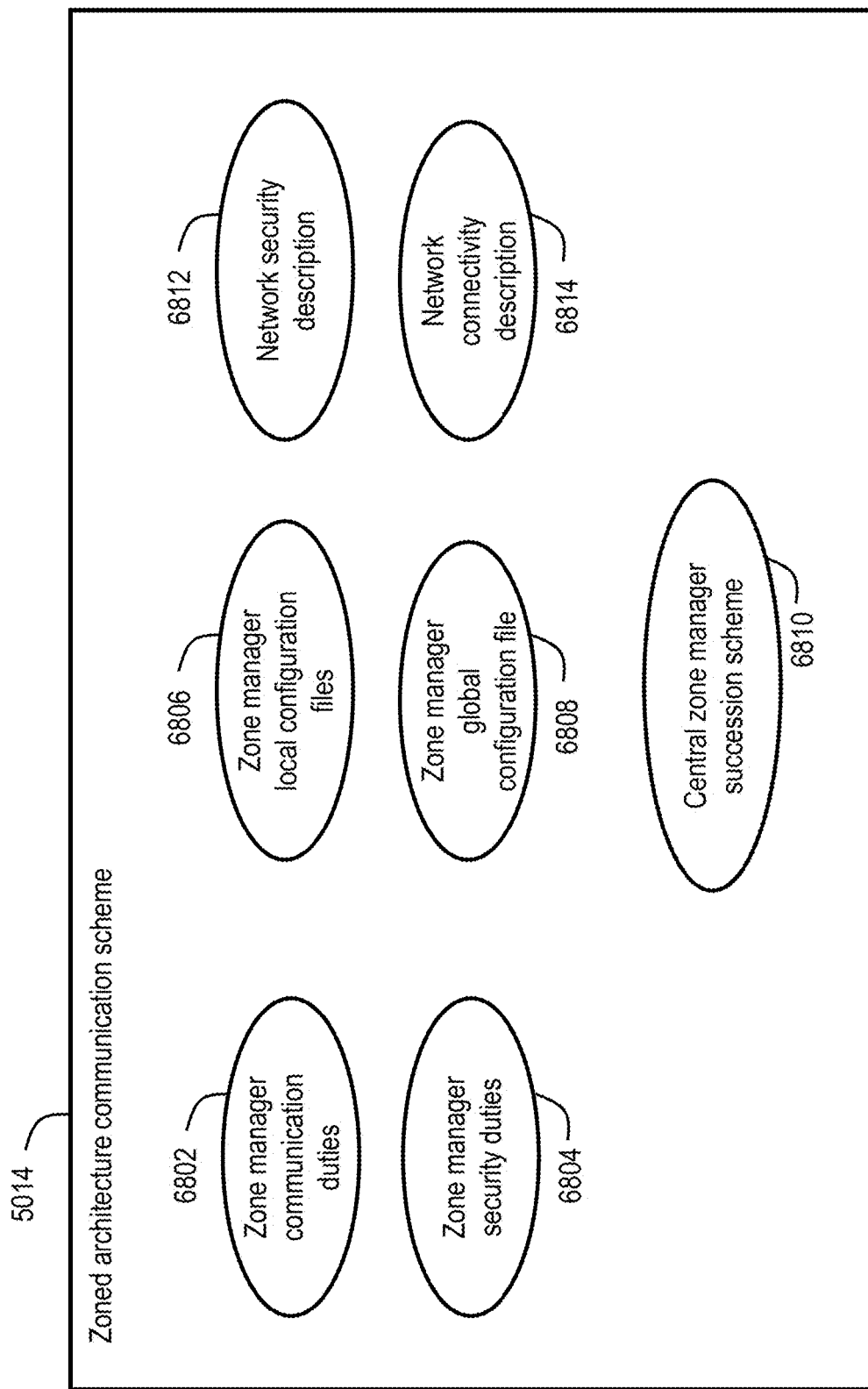
FIG. 47 is a block diagram depicting a zoned architecture communication scheme, according to certain embodiments of the present disclosure.

Referencing FIG. 47, an example zoned architecture communication scheme 5014 includes one or more aspects such as: the zone manager communication duties 6802 (and/or a subset of those duties that are intended for migration); zone manager security duties 6804 (e.g., permissions for enrolling in services, for communications to external devices, and/or external addresses that are permitted or banned, as well as security parameters for each zone and zone manager); zone manager local configuration files 6806; a zone manager global configuration file 6808 (e.g., configuration aspects that are common among the zone managers, that are applied to all network zones, that is parsed from the policy for example as a storage record and/or to facilitate future parsing operations for an updated policy, etc.); the central zone manager succession scheme 6810 (e.g., criteria to determine the central zone manager off-nominal condition 6702, duties to be migrated, and successor local managers); a network security description 6812 (e.g., security policies that are globally applied and/or specific to duties of the central zone manager); and/or a network connectivity description 6814 (e.g., communication routing for messages from end points, zones, flows, applications, etc., including redundancy descriptions to be utilized during various off-nominal events for the network).

In certain embodiments, the network topology description includes a communicative coupling arrangement of the network zones. Example and non-limiting network topology descriptions include the communicative coupling arrangement as a star arrangement, as a mesh arrangement, and/or as a ring arrangement. It will be understood that, in pure star arrangement (e.g., where there are no back-up connections between zones, for example an unused or lightly used back-up connection where, in operation, the multi-zone network operates logically as a star arrangement even if there are additional hardware connections), if the central zone manager is also the hub zone of the star arrangement, then a loss of the central zone manager would prevent migration of most duties of the central zone manager, since the network zones would become isolated. In certain embodiments, even where the network zones become isolated, some operations of the vehicle may be possible, depending upon the redundancy plans for the system, and the ability of the independent zones to operate without any cross-network communications using those redundancy plans. If another zone manager acts as the hub zone of the star arrangement, then a loss of the central zone manager in the star arrangement would allow migration of duties of the central zone manager.

Figure 48:
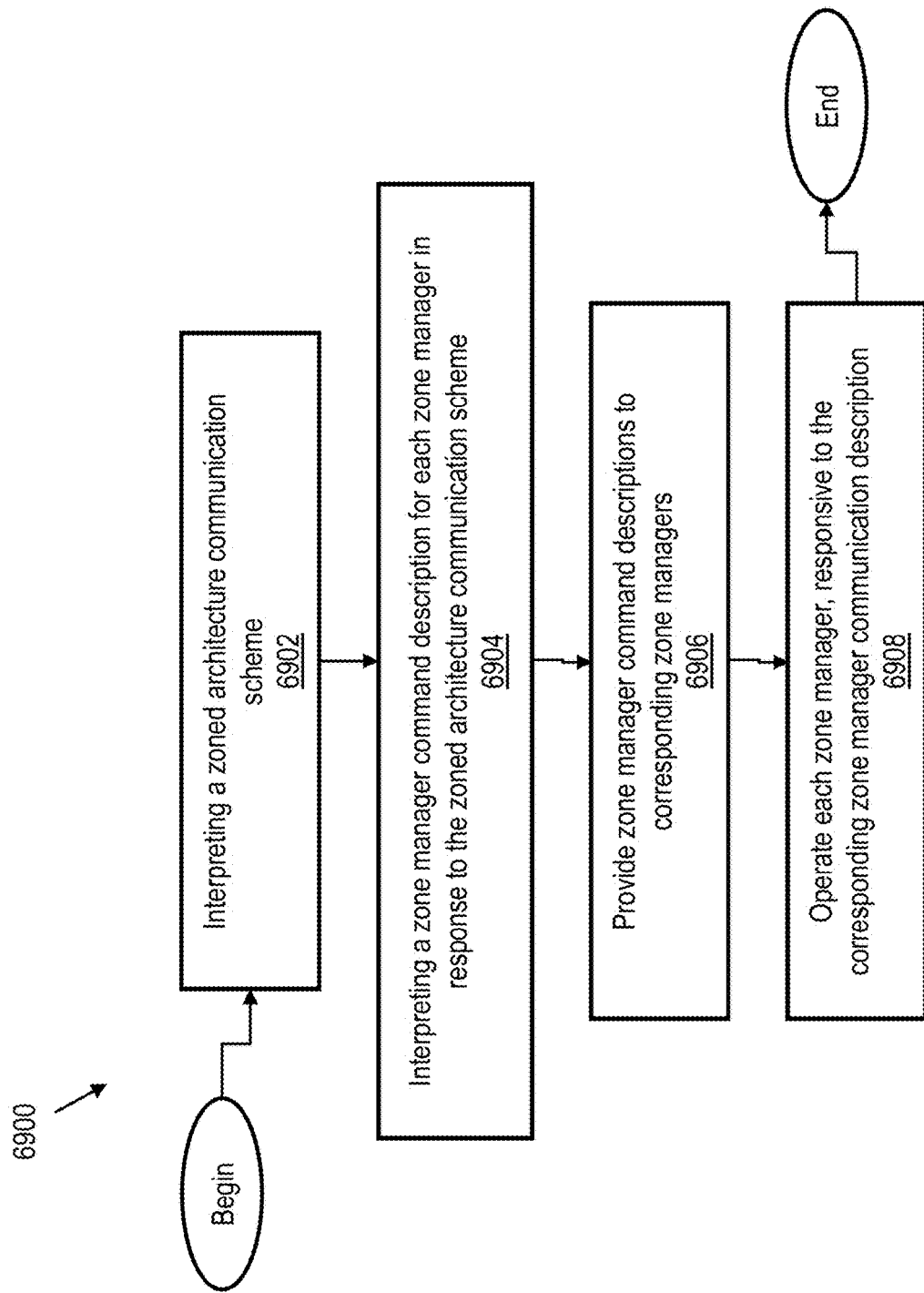
FIG. 48 is a process for operating zone managers, according to certain embodiments of the present disclosure.
Figure 49:
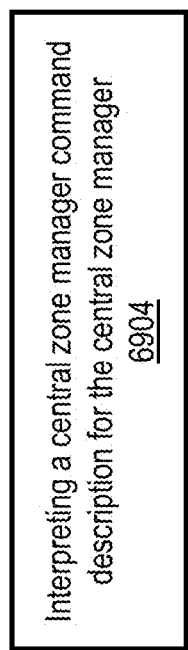
FIG. 49 is another process step in operating zone managers, according to certain embodiments of the present disclosure.

Referencing FIG. 48, an example procedure 6900 for operating a multi-zone network on a vehicle is schematically depicted. The example procedure 6900 includes an operation 6902 to interpret a zoned architecture communication scheme, an operation 6904 to interpret a zone manager command description for each zone manager in response to the zoned architecture communication scheme, an operation 6906 to provide zone manager command descriptions to the zone managers, and an operation 6908 to operate each zone manager, responsive to the corresponding zone manager communication descriptions (e.g., to control communications between end points on different network zones). Referencing FIG. 49, an example operation 6904 includes interpreting a central zone manager command description for the central zone manager in response to the zoned architecture communication scheme, for example where the central zone manager command description includes one or more of the central zone manager duties.

Figure 50:
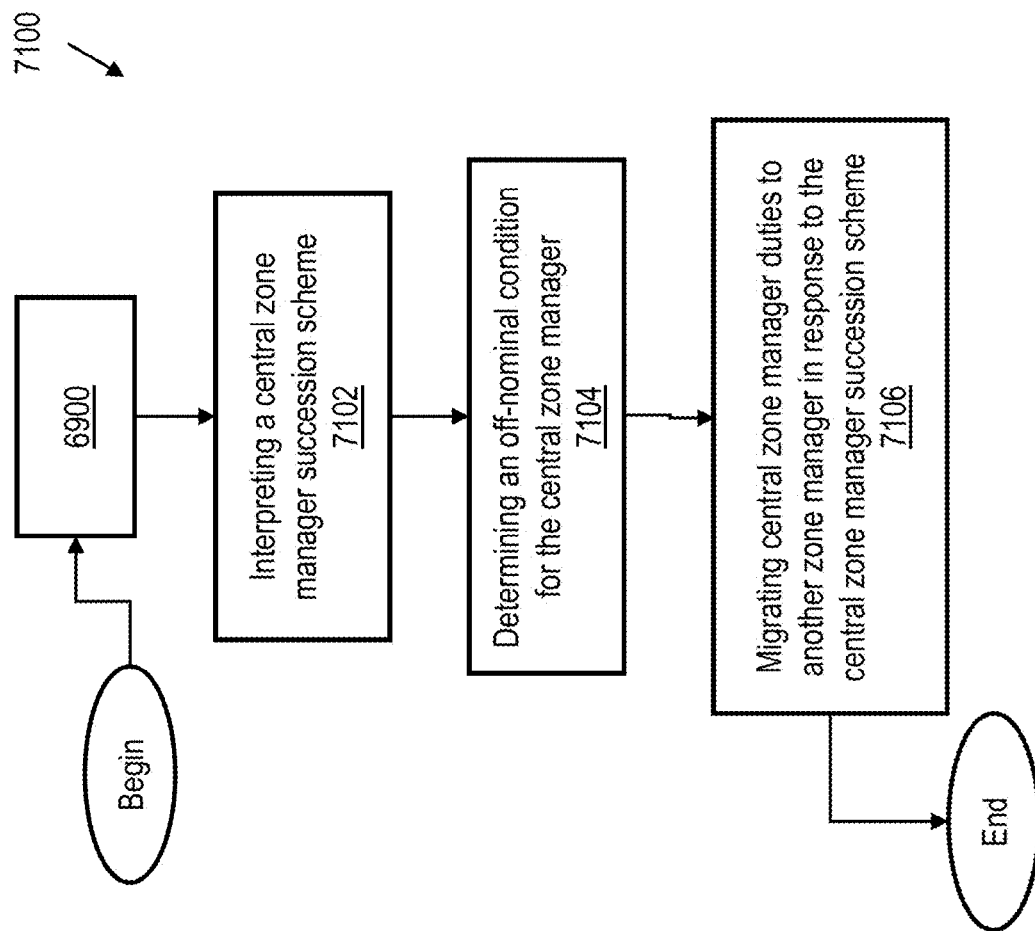
FIG. 50 is a process for migrating central zone manager duties, according to certain embodiments of the present disclosure.

Referencing FIG. 50, an example procedure 7100 includes the procedure 6900, and further includes an operation 7102 to interpret a central zone manager succession scheme (e.g., from the zoned architecture communication scheme), an operation 7104 to determine an off-nominal condition for the central zone manager, and an operation 7106 to migrate one or more central zone manager duties to another zone manager(s) in response to the central zone manager succession scheme.

Without limitation to any other aspect of the present disclosure, embodiments herein provide for a system and procedures to implement a zonal network architecture on a vehicle to enhance the security of the system, including providing for the ability to physically or logically segregate critical end points or communications from non-critical end points, to provide enhanced capabilities and greater control of features to more parties involved with the vehicle (e.g., owners, dealers, fleet managers, service personnel) while still preserving communication security and capability of the network to manage critical communications for the mission functions of the vehicle. Further, security responsibilities can be distributed, allowing for rapid updates, immediate response to changes, and the like, while preserving the simplicity and security of centralized control.

Again referencing FIG. 29, an example system 5000 includes a vehicle having a multi-zone network including a plurality of network zones, each one of the network zones including at least one zone manager, and wherein one of the at least one zone managers includes a central zone manager. The network zones are arranged according to a network topology description of a selected zone architecture; and the central zone manager includes the network management controller 5002. The network management controller 5002 includes a zone implementation circuit 5004 that interprets a zoned architecture communication scheme 5014, where the zoned architecture communication scheme 5014 includes a network security description 6812 (reference FIG. 51) and a network connectivity description. The network management controller 5002 further includes a zone manager command circuit 5006 that interprets a zone manager command description 5016 for each of the zone managers in response to the zoned architecture communication scheme 5014, and a zone execution circuit 5008 that provides the corresponding zone manager command description 5016 to each of the zone managers. The example system 5000 includes each of the zone managers responsive to the corresponding zone manager command description 5016 to control communications between end points of the corresponding network zone and end points of at least one other zone. In certain embodiments, the central zone manager is directly communicatively coupled to each of the other zones (e.g., in a star configuration, a mesh configuration, or a mixed configuration).

An example system 5000 includes the zone implementation circuit 5004 interpreting a zoned architecture communication scheme update (e.g., as a new zoned architecture communication scheme 5014), where the zone manager command circuit 5006 further interprets the zone manager command description 5016 for each of the zone managers in response to the updated zoned architecture communication scheme 5014, and where the zone execution circuit 5008 provides the corresponding updated zone manager command description 5016 to each of the zone managers. In certain embodiments, the zone execution circuit 5008 provides the corresponding updated zone manager command description 5016 during run-time operations (e.g., as soon as the zoned architecture communication scheme update is received). In certain embodiments, the updated zone manager command descriptions 5016 are implemented immediately, for example where the updated zone manager command descriptions 5016 as a configuration file without software changes, and where the operations represented within the updated zone manager command descriptions 5016 allow for runtime changes. In certain embodiments, the updated zone manager command descriptions 5016 include a flag indicated whether they should be implemented immediately or on the next vehicle start event, where that flag may be provided as a part of the zoned architecture communication scheme 5014, and/or may be determined by the zone manager command circuit 5006 (e.g., by screening for certain types of changes that indicate that an immediate runtime change should not be implemented). Where the updated zone manager command descriptions 5016 are implemented on a subsequent startup event, the operations of the system 5000 still facilitate ease and speed of updates relative to previously known systems, as each zone manager already has the appropriate commands available for immediate implementation.

Figure 51:
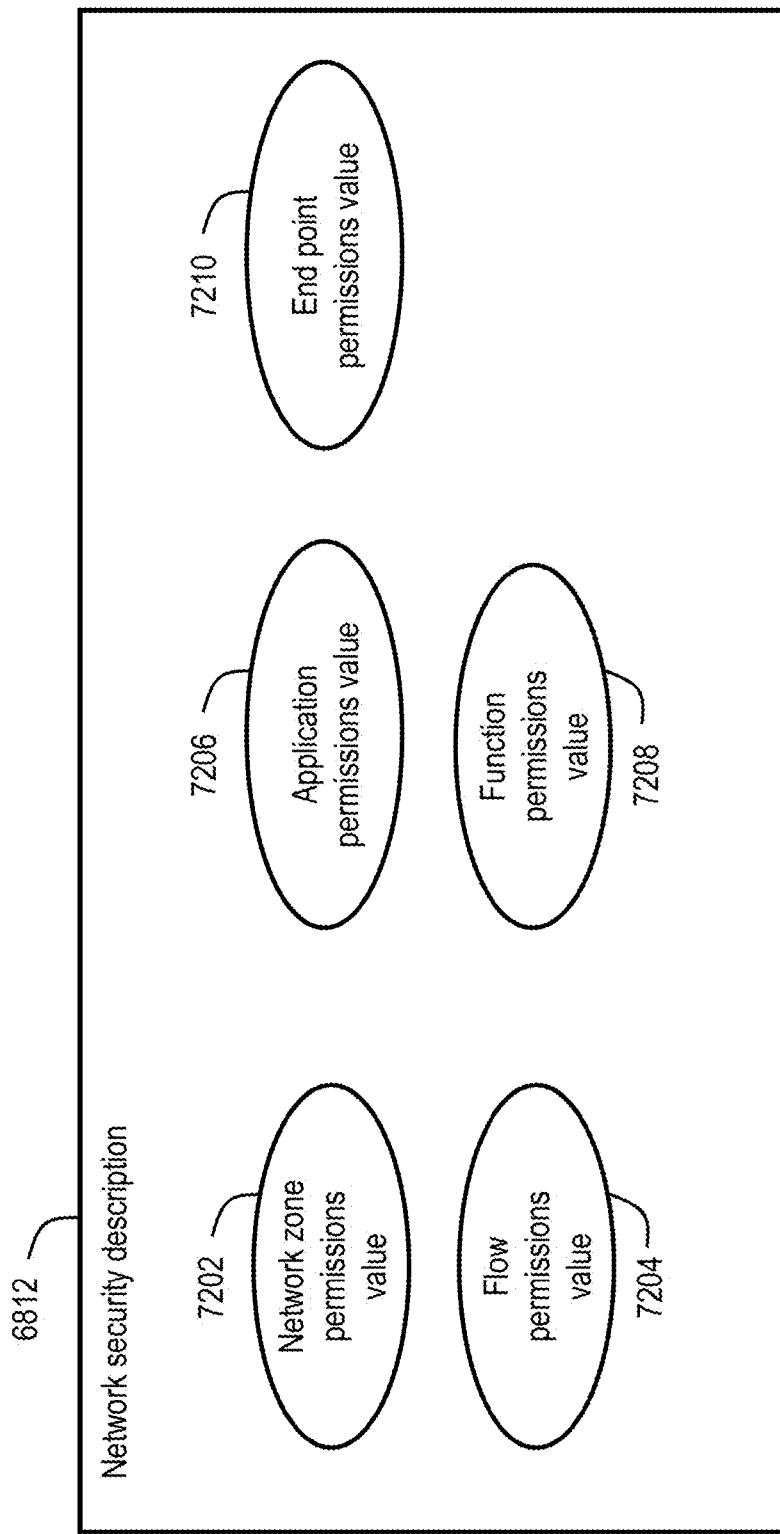
FIG. 51 is a block diagram depicting a network security description, according to certain embodiments of the present disclosure.

Referencing FIG. 51, an example network security description 6812 includes a permissions value utilized for aspects of network control operations described herein. The permissions depicted in FIG. 51 are actor based permissions, or permissions based on the associated actor (e.g., an application, a flow, an end point, a network zone, a function, etc.). Example and non-limiting permissions values for the network security description 6812 include: a network zone permissions value 7202 (e.g., permissions associated with the network zone, including for example data allowed on the zone including from various sources such as end points, flows, applications, functions; bandwidth permissions for the zone and/or for various sources, including absolute and/or relative bandwidth permissions; inter-zone communication limitations include data rates to or from the zone, and/or various sources allowed to communicate between specified zones; and/or traffic types permitted on the zone such as highly sensitive data, audio-visual data, etc.); a flow permissions value 7204 (e.g., permissions associated with the flow, including whether an actor of the flow is the source or destination for a message, where the flow permissions can relate to permissions on a specific zone, between specified zones, etc., and where the actor of the flow is an end point, application (e.g., an algorithm operating on a controller, where the algorithm is a part of the flow but the controller may not be, for example in an embodiment with containerized control elements); an application permissions value 7206 (e.g., permissions associated with an application); a function permissions value 7208 (e.g., permissions associated with certain logically grouped operations, which may be performed amongst various sources, and which are logically grouped into an application, such as "vehicle traction management"); and/or an end point permissions value 7210 (e.g., permissions associated with an end point, such as a sensor, actuator, controller, etc. that is present on the network as an end point on one of the network zones). It will be seen that a given message may have multiple tags at least conceptually available, for example a message provided from end point A may also be a part of flow B and application C. Arbitration of these instances may be performed according to criteria set forth in the policy and/or the zoned architecture communications scheme, and could follow rules such as "highest permission associated wins" or "lowest permission associated wins". The rules could be more complex, for example certain applications may have their permissions value be determinative, regardless of the other associated flags. In another example, a message associated with a certain application may have a high permissions value if provided by a first end point, but a low permissions value if provided by another end point. Additionally or alternatively, all of the flags could be available with the message (e.g., based on metadata), and/or only the winning flag may remain in the message. The utilization of permissions values and arbitration between competing permissions values can be determined based on the security scheme for the system, and the purpose of arbitrating permissions values. Generally, the rules and arbitration scheme will be selected to ensure that critical messages for important functions or applications will be sent every time from a proper source or to a proper destination, but that they will not be available to improper sources or destinations.

Figure 52:
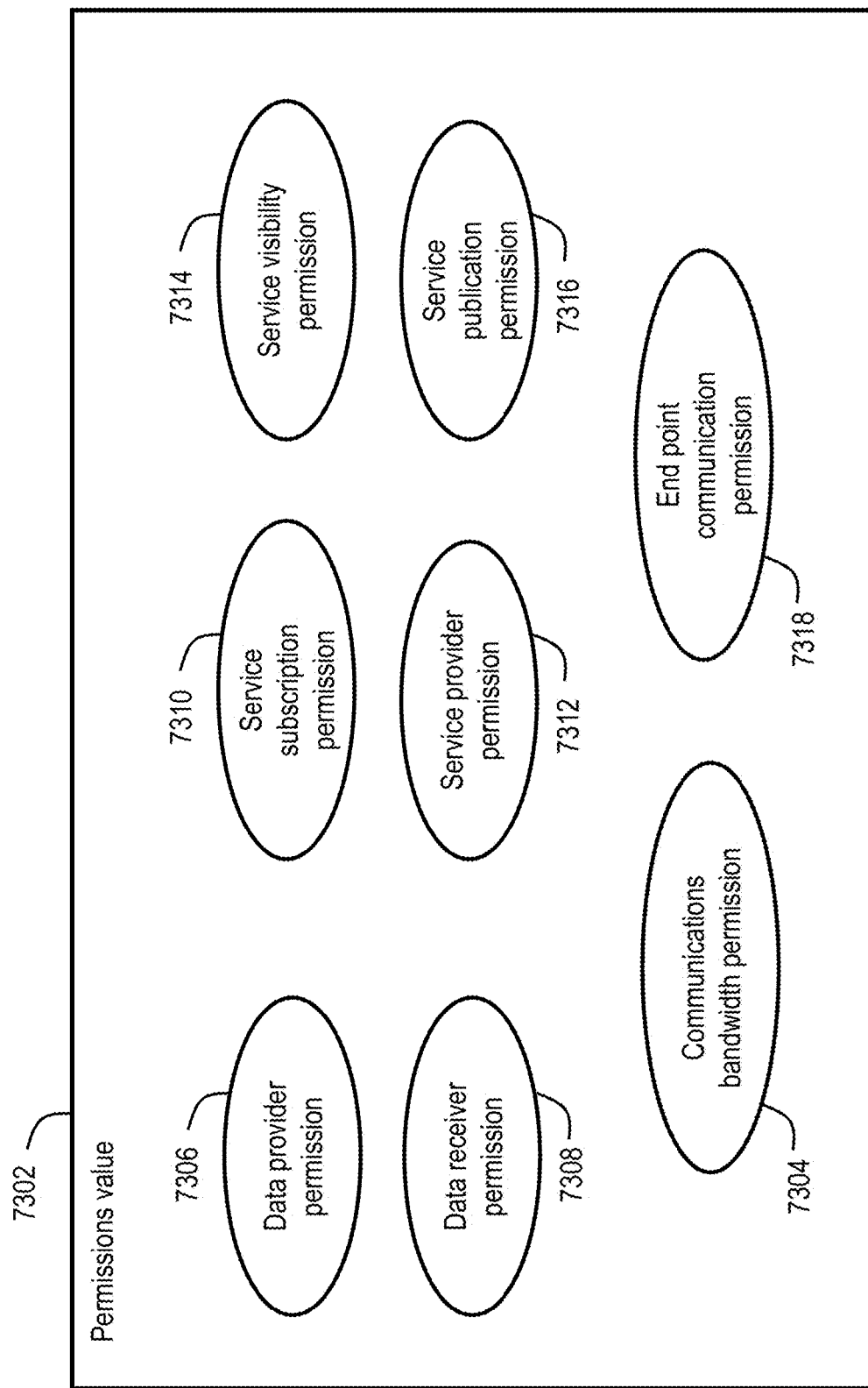
FIG. 52 is a block diagram depicting permission value(s), according to certain embodiments of the present disclosure.

Referencing FIG. 52, example and non-limiting permissions values 7302 are depicted. The example of FIG. 51 allows for permissions to be based on the source or destination of a message (actor based permissions), while the example of FIG. 52 provides for actions that are available to be performed or limited based on the permissions value, and can be applied to any of the actor based permissions. Example and non-limiting permissions values include one or more of: a data provider permission 7306 (e.g., whether the actor is allowed to make the data available as a provider of that data); data receiver permission 7308 (e.g., whether an actor is allowed to receive that data); communications bandwidth permission 7304 (e.g., whether an actor is allowed to consume a bandwidth resource, for example of a network zone, a zone manager, etc.); service subscription permission 7310 (e.g., whether an actor is allowed to subscribe to a service); a service provider emission 7312 (e.g., whether an actor is allowed to provide a service); a service visibility permission 7314 (e.g., whether an actor is allowed to make a service visible, where it is possible that an actor can make a service visible but not provide the service, or provide the service but not make it visible, for example a deprecated service—reference FIGS. 47 and 50, and the related description); a service publication permission 7316 (e.g., whether an actor is allowed to publish a service, which is a similar but distinct concept to visibility of the service); and/or an end point communication permission 7318 (e.g., whether a given end point is allowed to send messages to, or receive messages from another specified end point or class of end points). In certain embodiments, permissions may further be based on a class of actors—for example a service publication permission 7316 may specify that an actor is allowed to publish a service to other actors having permission class A, but not to actors having permission class B. All of the permissions depicted in FIGS. 51 and 52 may involve interactions of permissions between the actors involved, namely the requestor of the information and the provider of the information, and/or some permissions may be specified for the requestor or provider, independent of any other actor involved.

Figure 53:
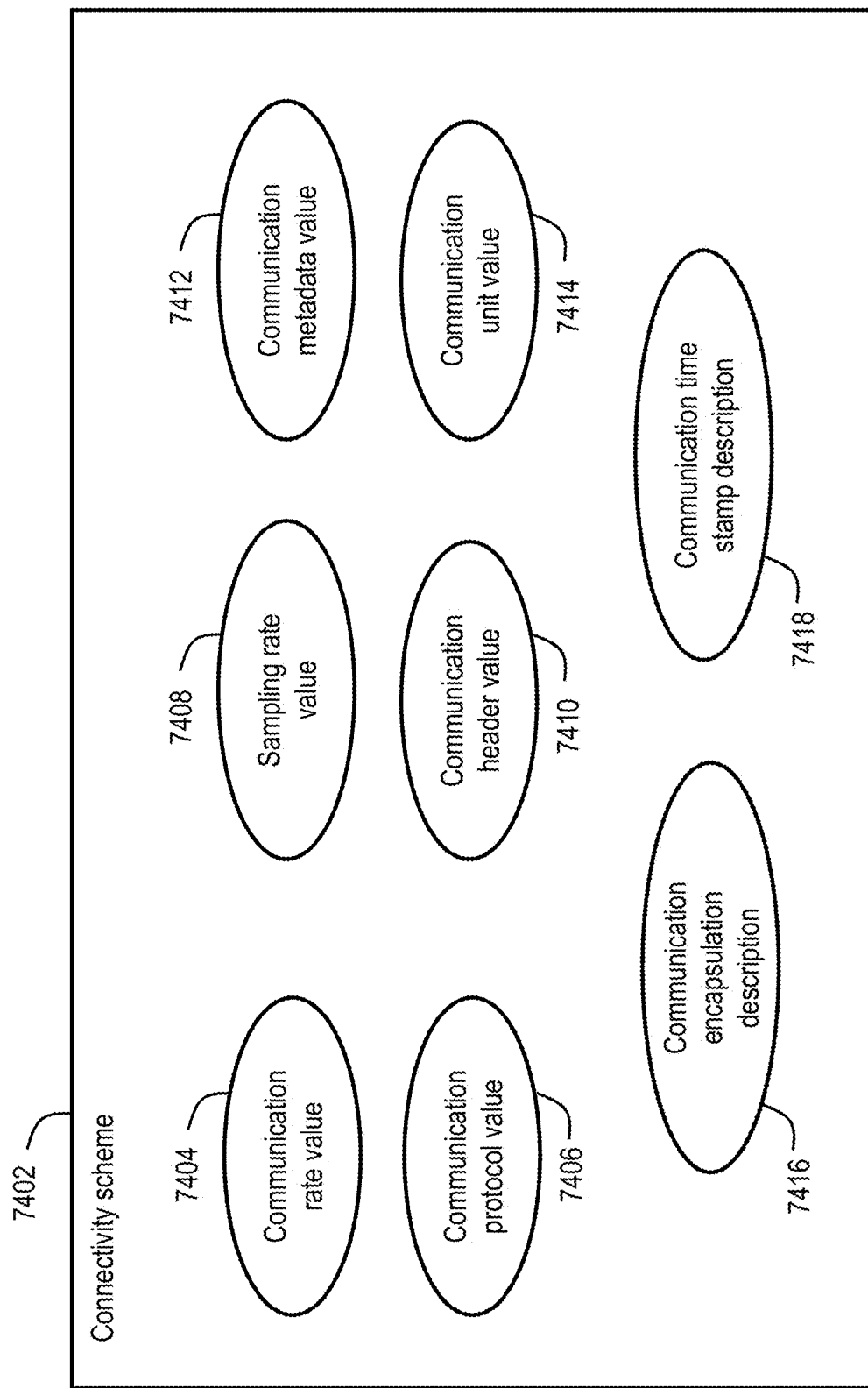
FIG. 53 is a block diagram depicting a connectivity scheme, according to certain embodiments of the present disclosure.

Referencing FIG. 53, example connectivity schemes 7402 are depicted, for example provided as a part of a network connectivity scheme. The example connectivity schemes 7402 may relate to connectivity between network zones, for example a connectivity scheme may apply to inter-zone communications between network zones A and B, where the associated zone managers apply the zone manager command descriptions 5016 to enforce the respective connectivity scheme 7402. Note that any of the connectivity schemes 7402 may be anisotropic—for example A→B communications may have a first rate limit, while B→A communications may have a different rate limit (e.g., network zone A may be a critical network zone, that is allowed to control outgoing utilization while limiting incoming utilization). Further note that any of the connectivity schemes 7402 may be based on an originating end point value and/or a destination end point value, for example a particular controller on a network may have specific criteria for messages to be sent there, where the criteria for that end point may override and/or adjust one or more aspects of the connectivity scheme 7402. For example, communications from zone A→B may have a general scheme of using SI units for messages, where end point Z has a requirement for American engineering units, which may override the general scheme for messages having a destination of end point Z (e.g., depending upon how the zoned architecture communication scheme is set up, permissions associated with end point Z or a related application or flow, etc.). Further note that any of the connectivity schemes 7402 may be based upon the network type(s) involved, for example A→B communications and A→C communications may have different values for the connectivity scheme 7402 based on the network types of B and C. In another example, D→A communications and E→A communications may have different values for the connectivity scheme 7402 based on the network types of D and E.

Example and non-limiting connectivity schemes 7402 include one or more of: a communication rate value 7404 (e.g., data rates, including burst rates and/or time averaged rates, allowed between network zones); a communication protocol value 7406 (e.g., communication protocols to be applied or followed for the message between zones); a sampling rate value 7408 (e.g., the message rate to be utilized, and/or the dynamics to be reflected in the data, which can be adjusted with up-sampling or down-sampling operations, for example providing a 20 msec vehicle speed value to a limited capability end point on a CAN that expects 20 msec data and does not have the capability to parse time data from a message); a communication header value 7410 (e.g., the form, size, and content of header information for the message); a communication metadata value 7412 (e.g., metadata form, size, and content for the message); a communication unit value 7414 (e.g., the units, such as SI units, American engineering units, etc., and/or the scaling of unitless data, for example for fixed point data; in certain embodiments the byte depth and/or type of the data may be specified in the connectivity scheme 7402); a communication encapsulation description 7416 (e.g., specifying whether communications should be encapsulated, for example preserving an original CAN message within an ethernet message, to allow CAN-CAN communications over an intervening network, to preserve original metadata in the message for monitoring or later analysis, etc.); and/or a communication time stamp description 7418 (e.g., the size, position, and format of time stamps, the utilization of PTP time stamp, the preservation or elimination of any local time stamp previously associated with the message, etc.).

Figure 54:
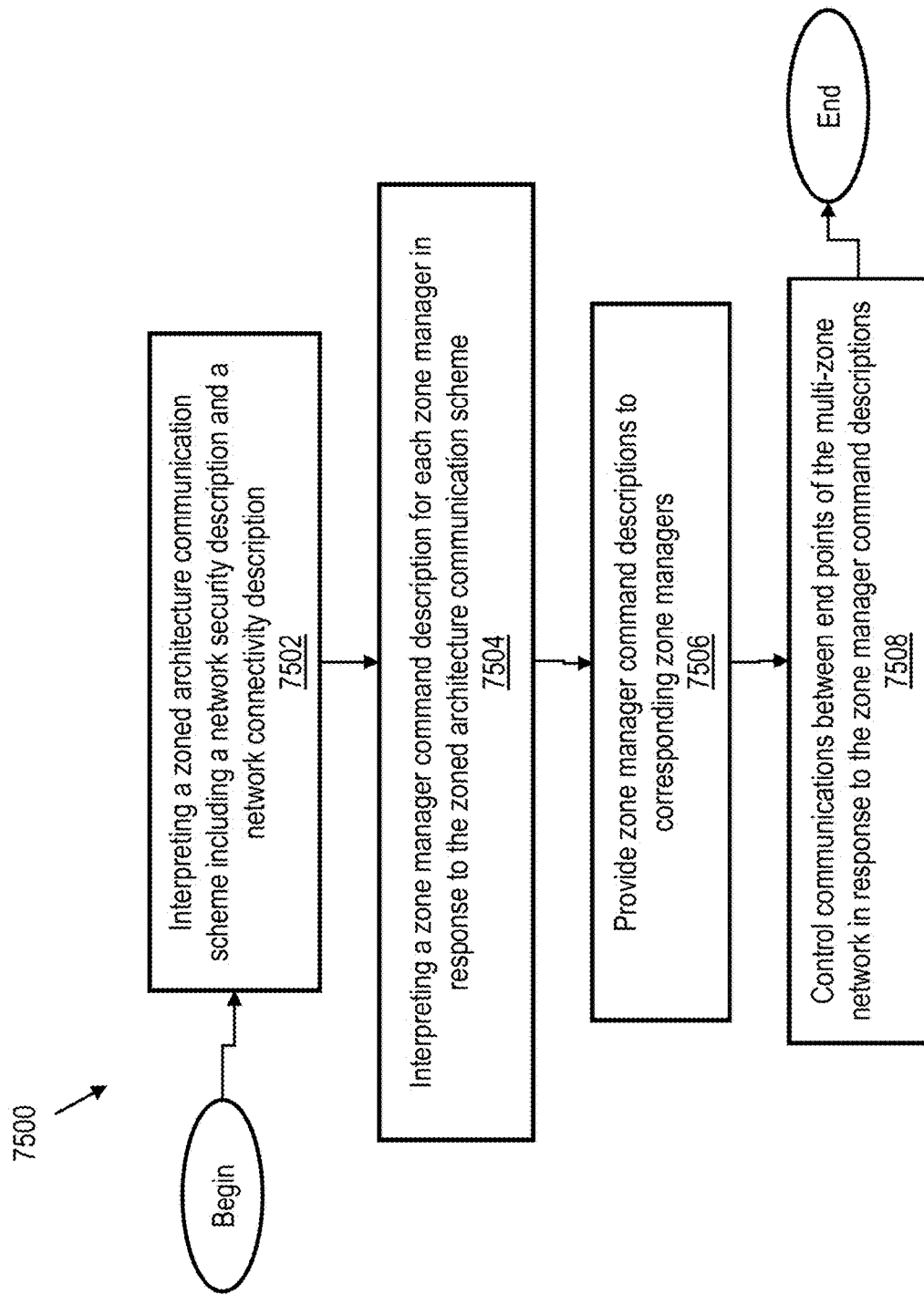
FIG. 54 is a process for control communications between end points of a multi-zone network, according to certain embodiments of the present disclosure.

Referencing FIG. 54, an example procedure 7500 for controlling communications between end points of a multi-zone network of a vehicle is schematically depicted. The example procedure 7500 includes an operation 7502 to interpret a zoned architecture communication scheme for a multi-zone network of a vehicle including a plurality of network zones, an operation 7504 to interpret a zone manager command description for each zone manager in response to the zoned architecture communication scheme, an operation 7506 to provide the corresponding zone manager command descriptions to each of the zone managers, and an operation 7508 to control communications between end points of each of the plurality of network zones in response to the zone manager command descriptions.

Figure 55:
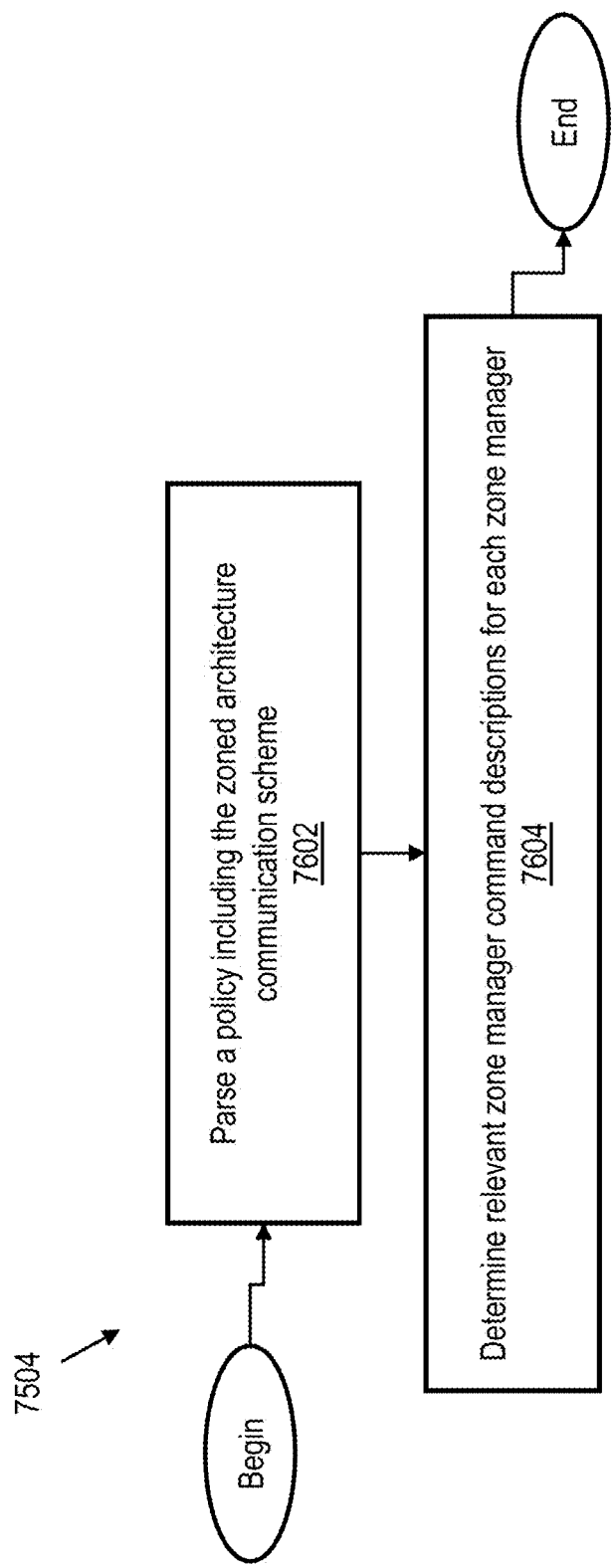
FIG. 55 is another process portion as in FIG. 54 for control communications between end points of a multi-zone network, according to certain embodiments of the present disclosure.
Figure 56:
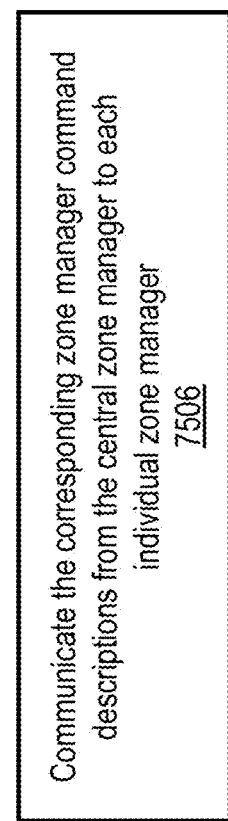
FIG. 56 is another process portion as in FIG. 54 for control communications between end points of a multi-zone network, according to certain embodiments of the present disclosure.

Referencing FIG. 55, an example operation 7504 includes an operation 7602 to parse a policy including the zoned architecture communication scheme, and an operation 7604 to determine relevant zone manager command descriptions for each zone manager in response to the policy. Referencing FIG. 56, an example operation 7506 includes communicating the corresponding command descriptions from a central zone manager to each individual zone manager.

Figure 57:
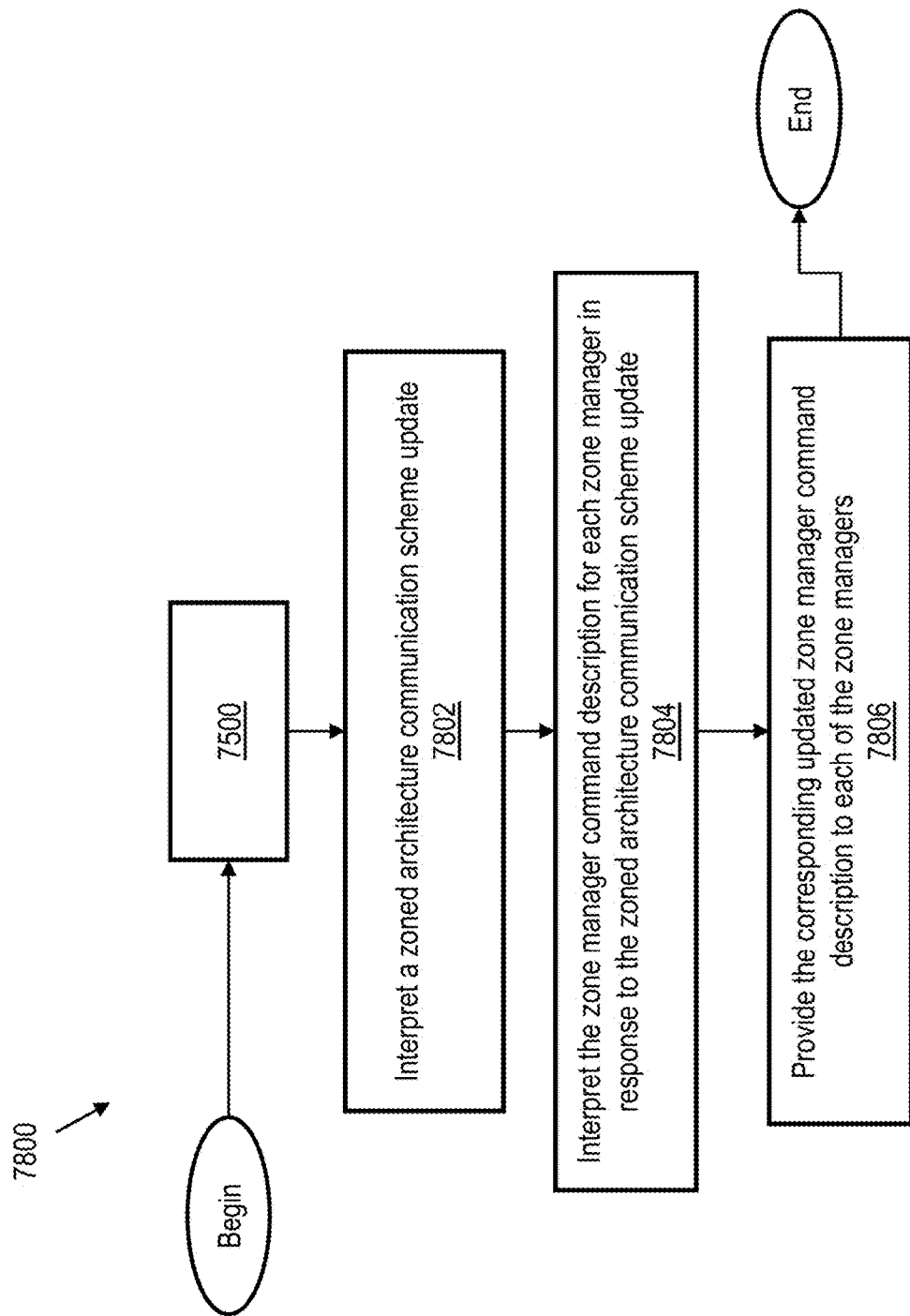
FIG. 57 is a process for providing an updated zone manager command description, according to certain embodiments of the present disclosure.
Figure 58:
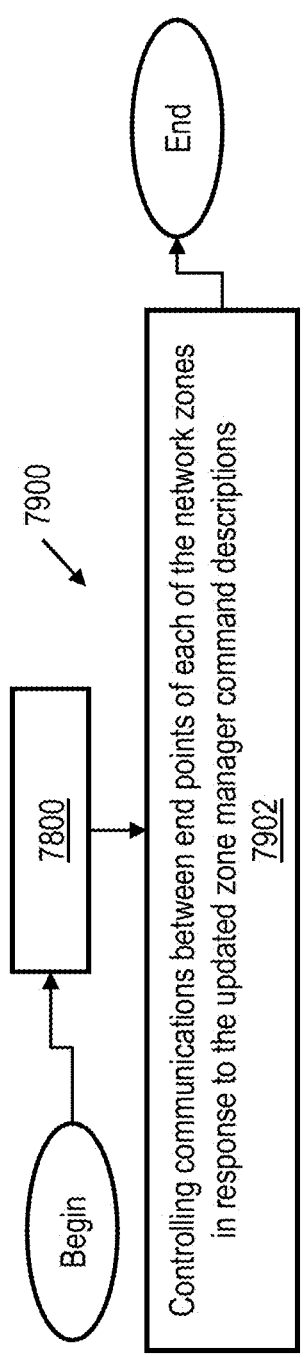
FIG. 58 is a process for controlling communications between end points in a multi-zone network, according to certain embodiments of the present disclosure.
Figure 59:
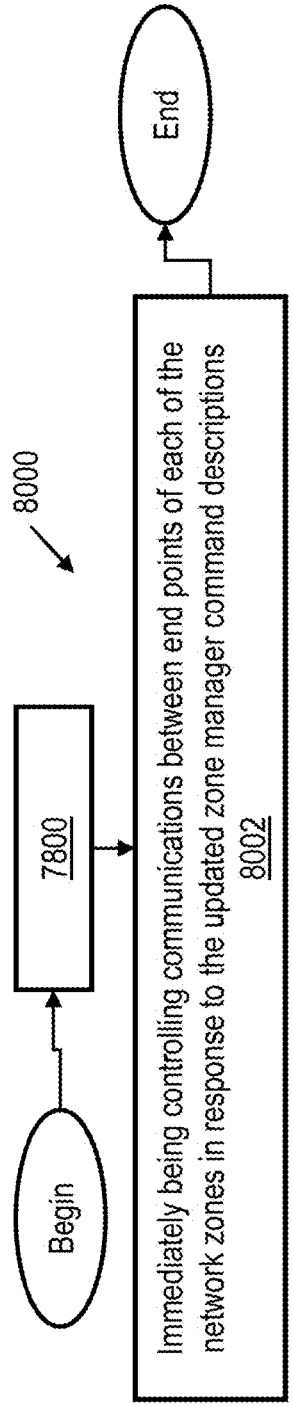
FIG. 59 is another process for controlling communications between end points in a multi-zone network, according to certain embodiments of the present disclosure.
Figure 60:
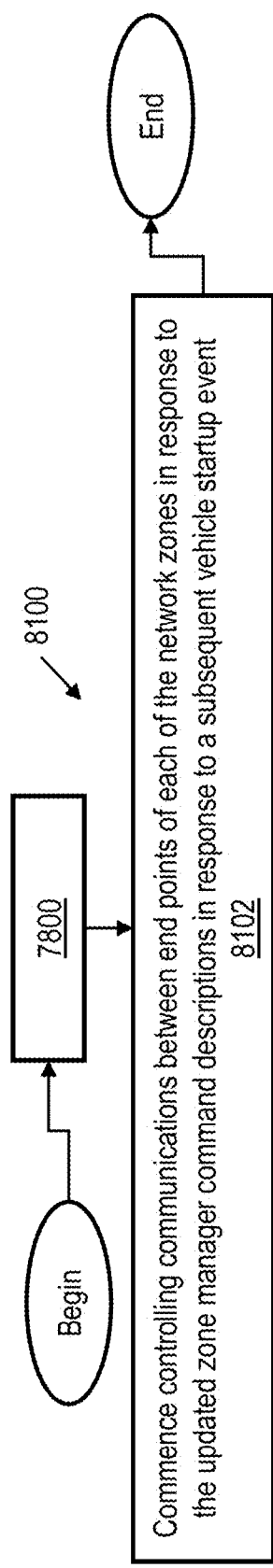
FIG. 60 is another process for controlling communications between end points in a multi-zone network, according to certain embodiments of the present disclosure.
Figure 61:
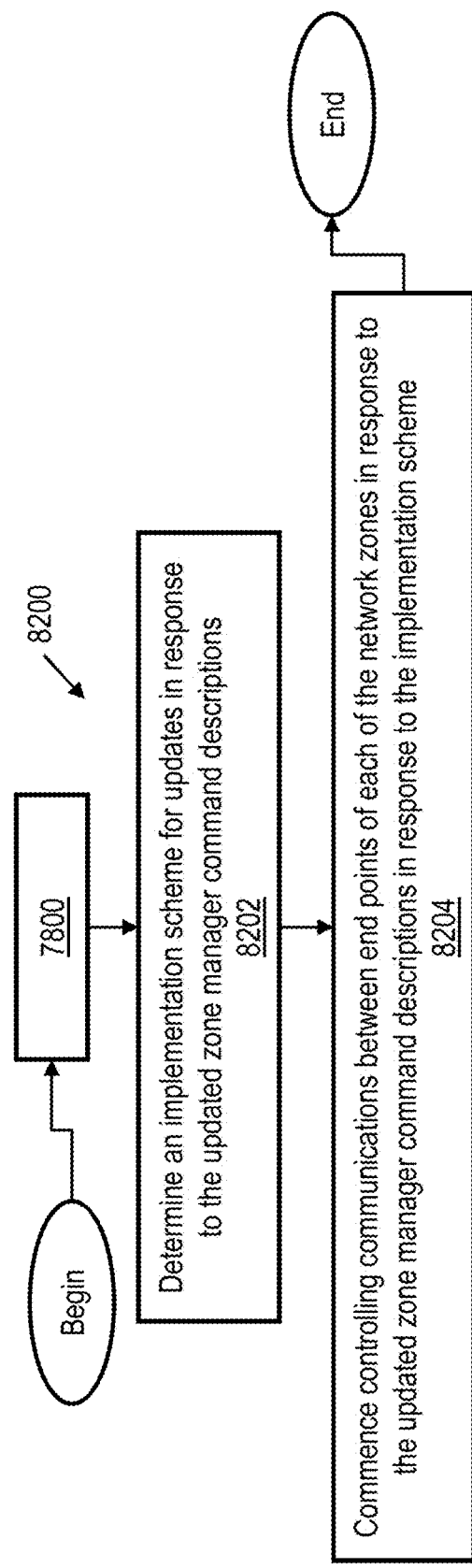
FIG. 61 is another process for controlling communications between end points in a multi-zone network, according to certain embodiments of the present disclosure.

Referencing FIG. 57, an example procedure 7800 includes the procedure 7500, and further includes an operation 7802 to interpret a zoned architecture communication scheme update, an operation 7804 to interpret an updated zone manager command description for each zone manager in response to the zoned architecture communication scheme update, and an operation 7806 to provide the corresponding updated zone manager command descriptions to each of the zone managers. Referencing FIG. 58, an example procedure 7900 further includes an operation 7902 to control communications between end points of each of the network zones in response to the updated zone manager command descriptions. Referencing FIG. 59, an example procedure 8000 further includes an operation 8002 to immediately begin controlling the communications between end points of the network zones in response to the updated manager command descriptions. Referencing FIG. 60, an example procedure 8100 further includes an operation 8102 to commence controlling the communications between end points of the network zones in response to the updated manager command descriptions and a subsequent vehicle startup event. Referencing FIG. 61, an example procedure 8200 further includes an operation 8202 to determine an implementation scheme for updates in response to the updated zone manager command descriptions, and an operation 8204 to commence controlling communications between end points of each of the network zones in response to the updated zone manager command descriptions and further in response to the implementation scheme.

Without limitation to any other aspect of the present disclosure, embodiments herein provide for a system and procedures to implement a zonal network architecture to simplify and enhance network communications control in the zonal network architecture. For example, systems and procedures herein provide embodiments that allow end points on distinct zones, with different communication payloads, metadata, device capability, and the like to communicate in a secure manner that is operable and easily configured in view of the additional complexity of a zoned network environment. Systems and procedures herein protect the capability of the zonal network architecture to perform critical functions and to support flexible additional functions, for example by balancing the loads and utilization of network components such as backbones and zone controllers.

Figure 62:
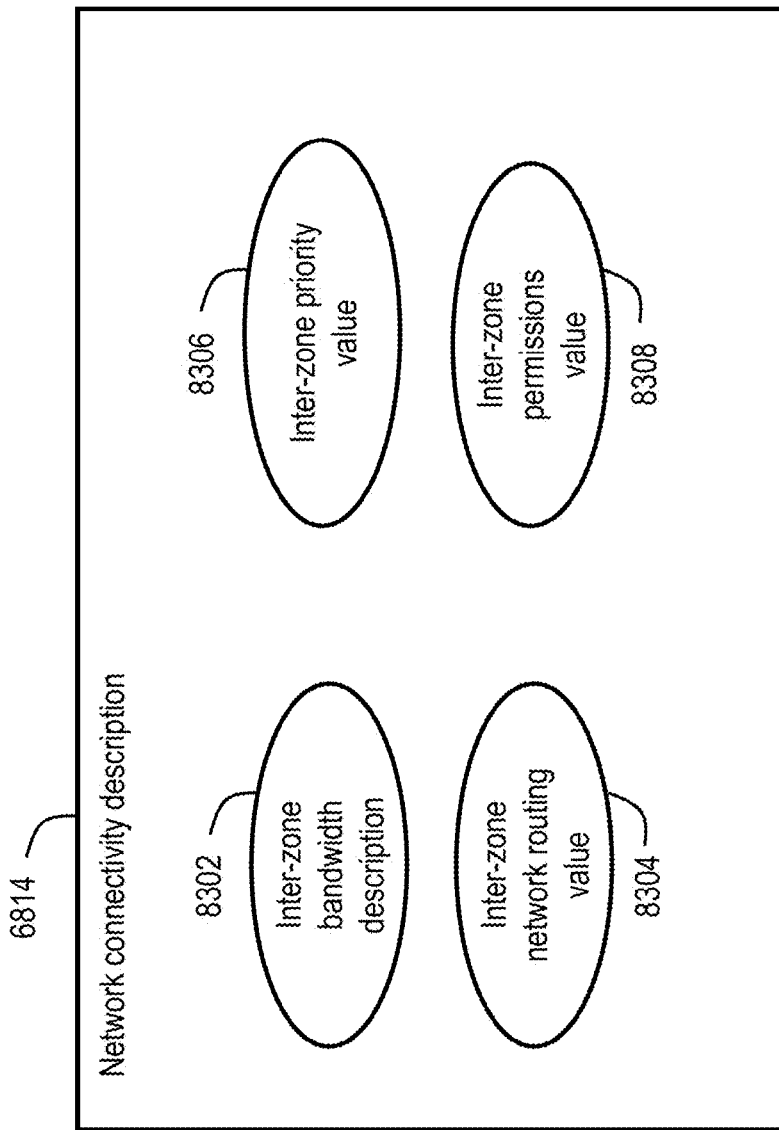
FIG. 62 is a block diagram depicting a network connectivity description, according to certain embodiments of the present disclosure.

Referencing FIG. 29, an example system 5000 includes the the zoned architecture communication scheme 5014 including a network security description and a network connectivity description. Referencing FIG. 62, an example network connectivity description 6814 includes one or more of: an inter-zone bandwidth description 8302 (e.g., bandwidth allowed between selected zones, which may be anisotropic); an inter-zone network routing value 8304 (e.g., some communications passing between zones may be routed through other zones first, and/or some communications passing between zones may have multiple routes available, with the inter-zone network routing value 8304 providing the route to be utilized, the routing may be anisotropic, and may differ depending upon the messages and actors involved with the messages); an inter-zone priority value 8306 (e.g., priority of messages between zones based on the zones as such, and/or the routing or other connectivity aspects depending upon the priority of the messages and/or the priority associated with the actors involved with the messages); and/or an inter-zone permissions value 8308 (e.g., permissions associated with messages based on the zones as such, and/or the permissions associated with the messages depending upon the permissions associated with the messages and/or actors involved with the messages). In certain embodiments, any one or more of the network connectivity descriptions 6814 may be further determined in response to an operating condition of the vehicle, for example a message may be a low priority and/or routed in a first manner at a first operating condition (e.g., a parked vehicle condition), and a high priority and/or routed in a second manner at a second operating condition (e.g., a driving vehicle condition). The inter-zone permissions value 8308 may include any aspects of a permissions value as set forth throughout the present disclosure, including without limitation a sampling rate description, a data resolution description, or a data latency description.

Figure 63:
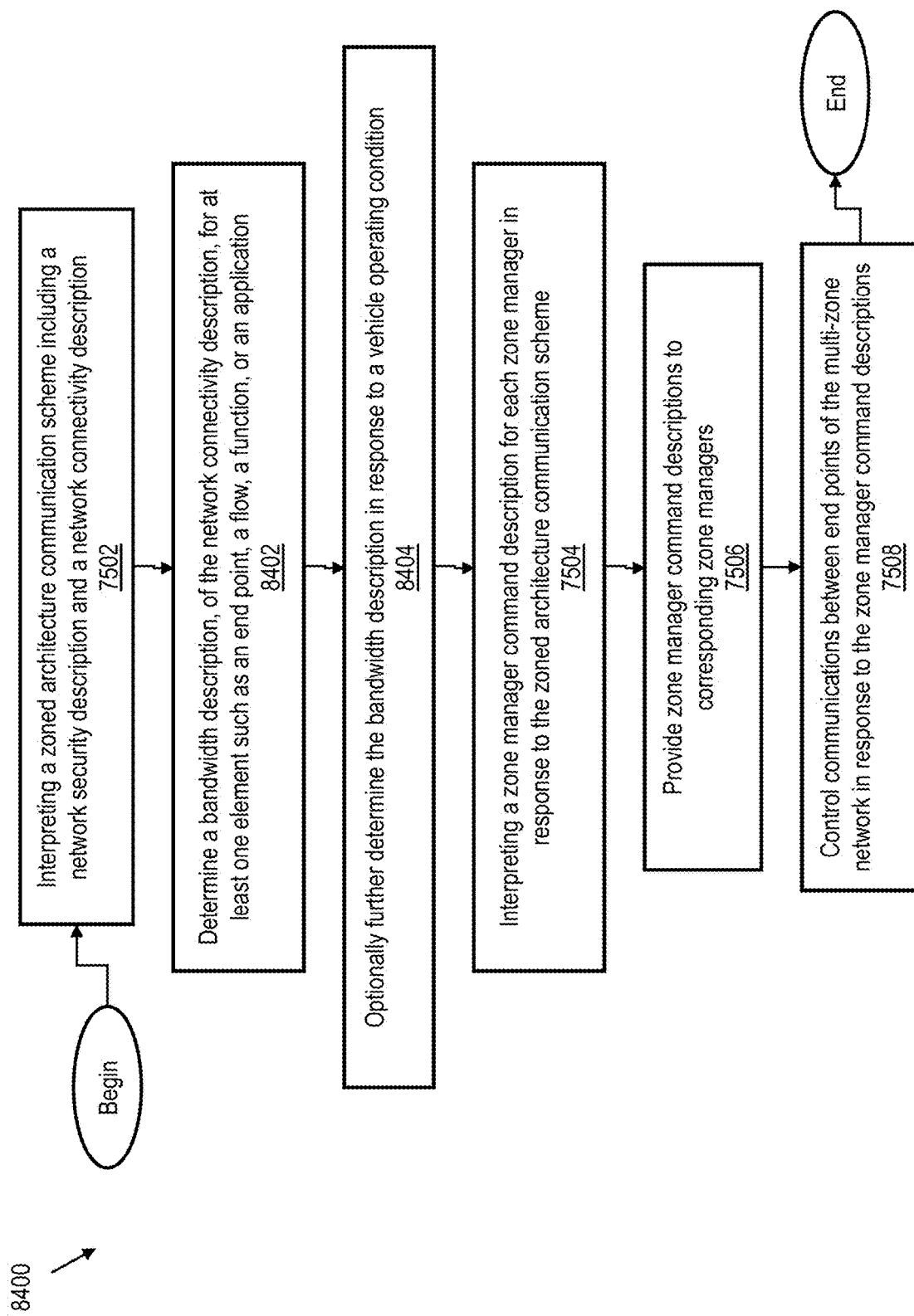
FIG. 63 is a process for control of communications between end points in a multi-zone network, according to certain embodiments of the present disclosure.

Referencing FIG. 63, an example procedure 8400 includes an operation 7502 to interpret a zoned architecture communication scheme for a multi-zone network of a vehicle including a plurality of network zones including a network security description and a network connectivity description, an operation 8402 to determine a bandwidth description, of the network connectivity description, for at least one element (e.g., an end point, a flow, a function, or an application), and an optional operation 8404 to further determine the bandwidth description in response to a vehicle operating condition.

Figure 64:
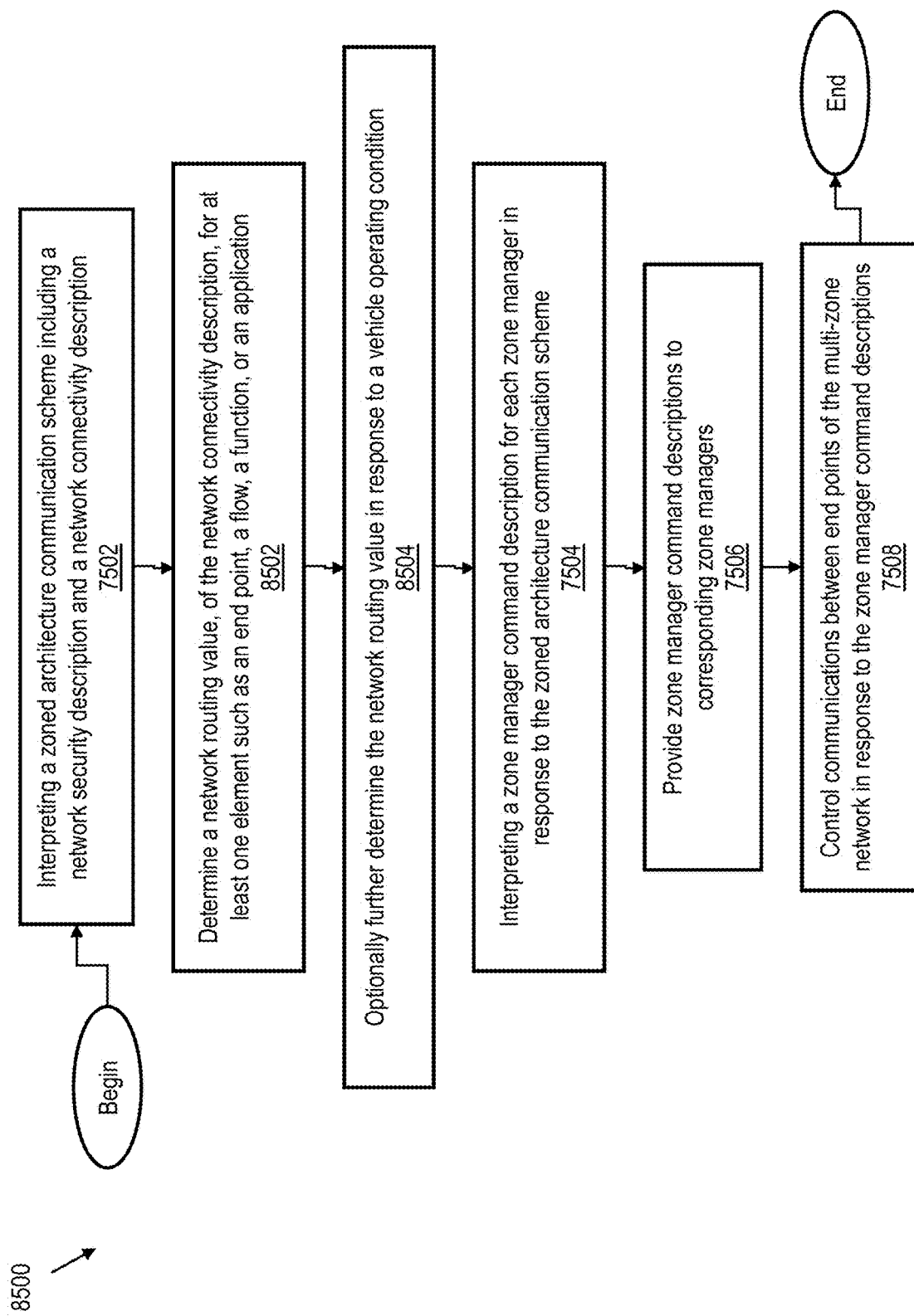
FIG. 64 is another process for control of communications between end points in a multi-zone network, according to certain embodiments of the present disclosure.

Referencing FIG. 64, an example procedure 8500 includes an operation 7502 to interpret a zoned architecture communication scheme for a multi-zone network of a vehicle including a plurality of network zones including a network security description and a network connectivity description, an operation 8502 to determine a network routing value, of the network connectivity description, for at least one element (e.g., an end point, a flow, a function, or an application), and an optional operation 8504 to further determine the network routing value in response to a vehicle operating condition.

Figure 65:
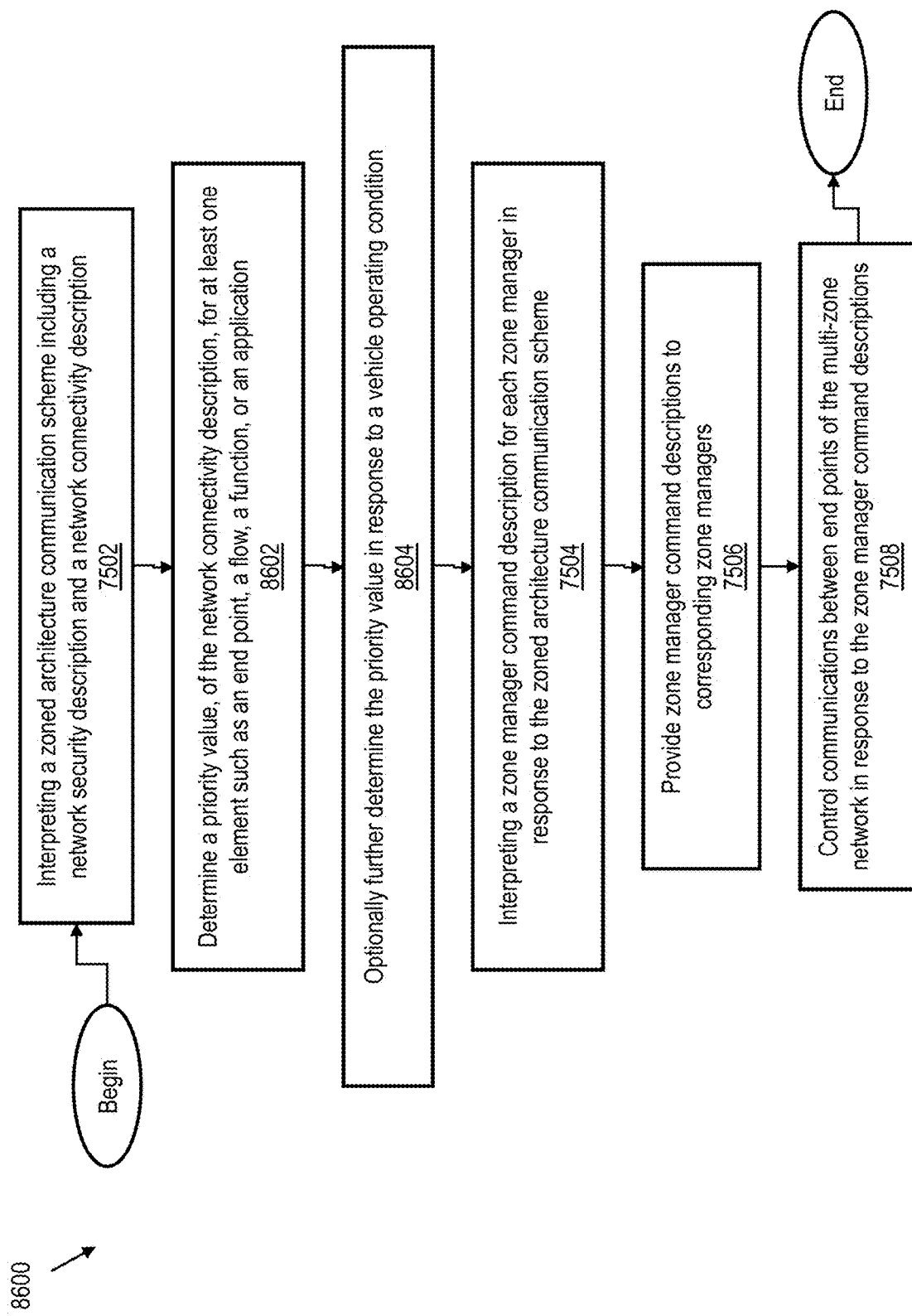
FIG. 65 is another process for control of communications between end points in a multi-zone network, according to certain embodiments of the present disclosure.

Referencing FIG. 65, an example procedure 8600 includes an operation 7502 to interpret a zoned architecture communication scheme for a multi-zone network of a vehicle including a plurality of network zones including a network security description and a network connectivity description, an operation 8602 to determine a priority value, of the network connectivity description, for at least one element (e.g., an end point, a flow, a function, or an application), and an optional operation 8604 to further determine the priority value in response to a vehicle operating condition.

Figure 66:
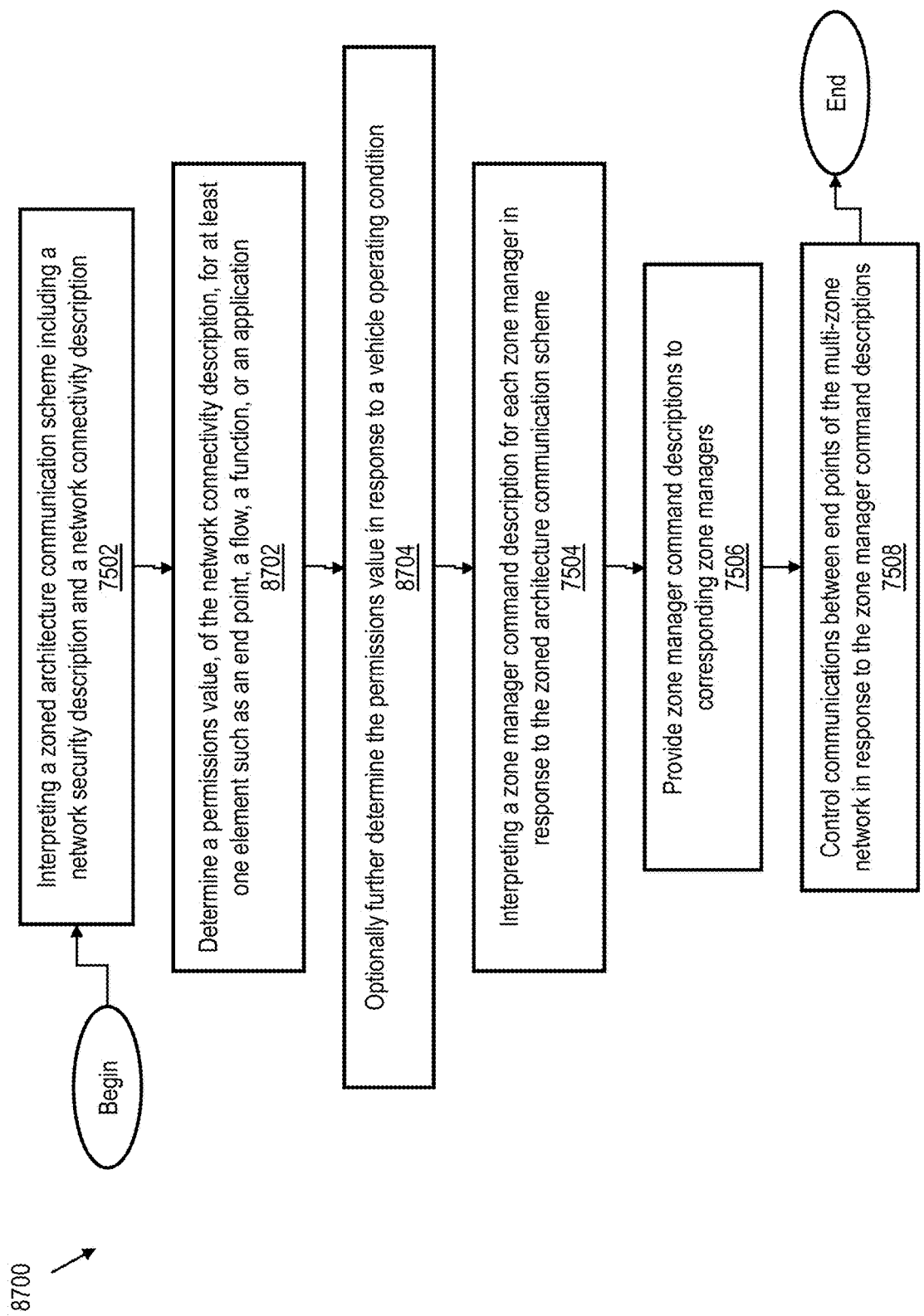
FIG. 66 is another process for control of communications between end points in a multi-zone network, according to certain embodiments of the present disclosure.

Referencing FIG. 66, an example procedure 8700 includes an operation 7502 to interpret a zoned architecture communication scheme for a multi-zone network of a vehicle including a plurality of network zones including a network security description and a network connectivity description, an operation 8702 to determine a permissions value, of the network connectivity description, for at least one element (e.g., an end point, a flow, a function, or an application), and an optional operation 8704 to further determine the permission value in response to a vehicle operating condition.

Without limitation to any other aspect of the present disclosure, embodiments herein provide for a system and procedures to implement a zonal network architecture to simplify and enhance network communications control in the zonal network architecture. For example, systems and procedures herein provide embodiments that enforce the selected security and permissions scheme for the network, without requiring the user to have full knowledge of all end points on the network, and/or the locations of all data within the network. Further, embodiments herein allow a user to create or adjust the security and permissions scheme for the entire zonal network through simple operations with a single access point, and to adjust mitigation plans such as redundancy implementation and/or succession of responsibility through simple operations with that single access point.

Figure 67:
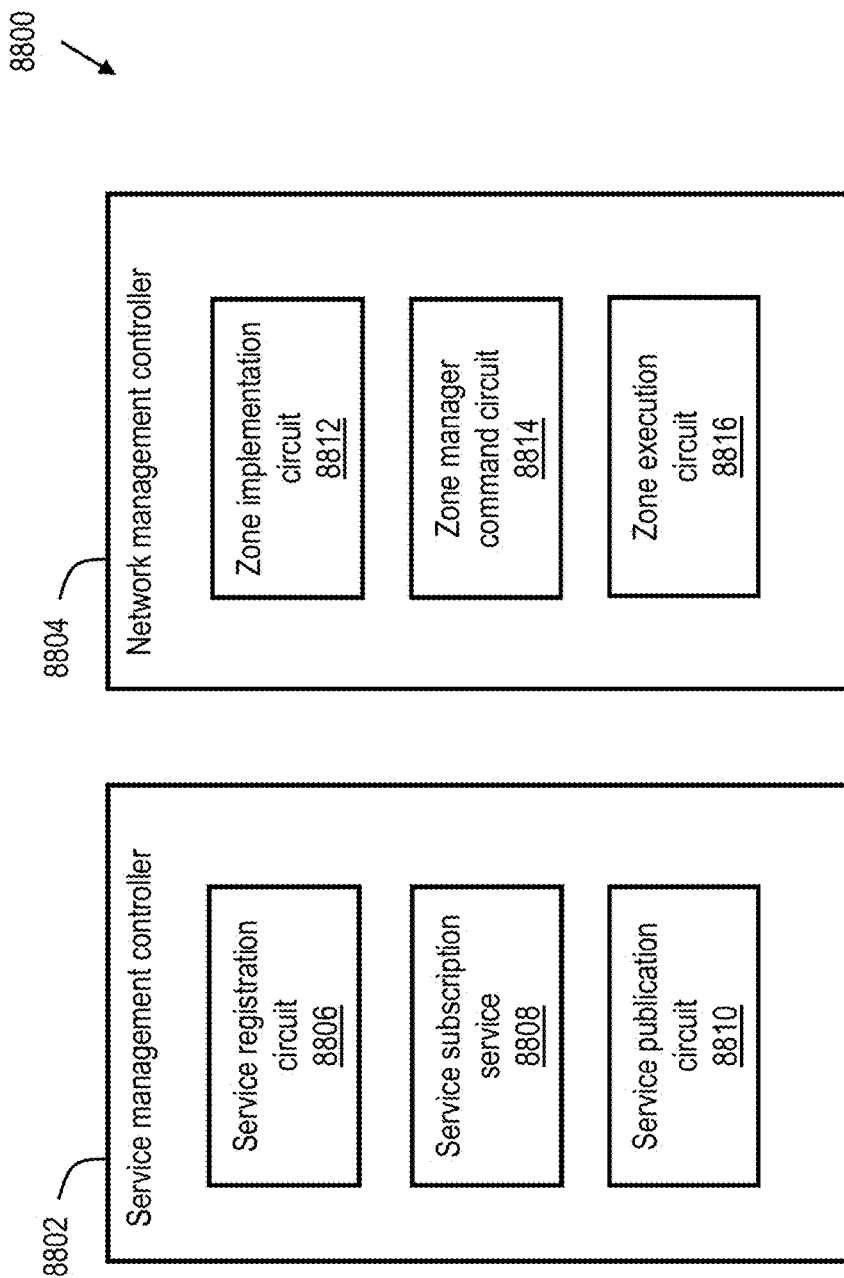
FIG. 67 is a block diagram depicting service manager controllers, according to certain embodiments of the present disclosure.
Figure 68:
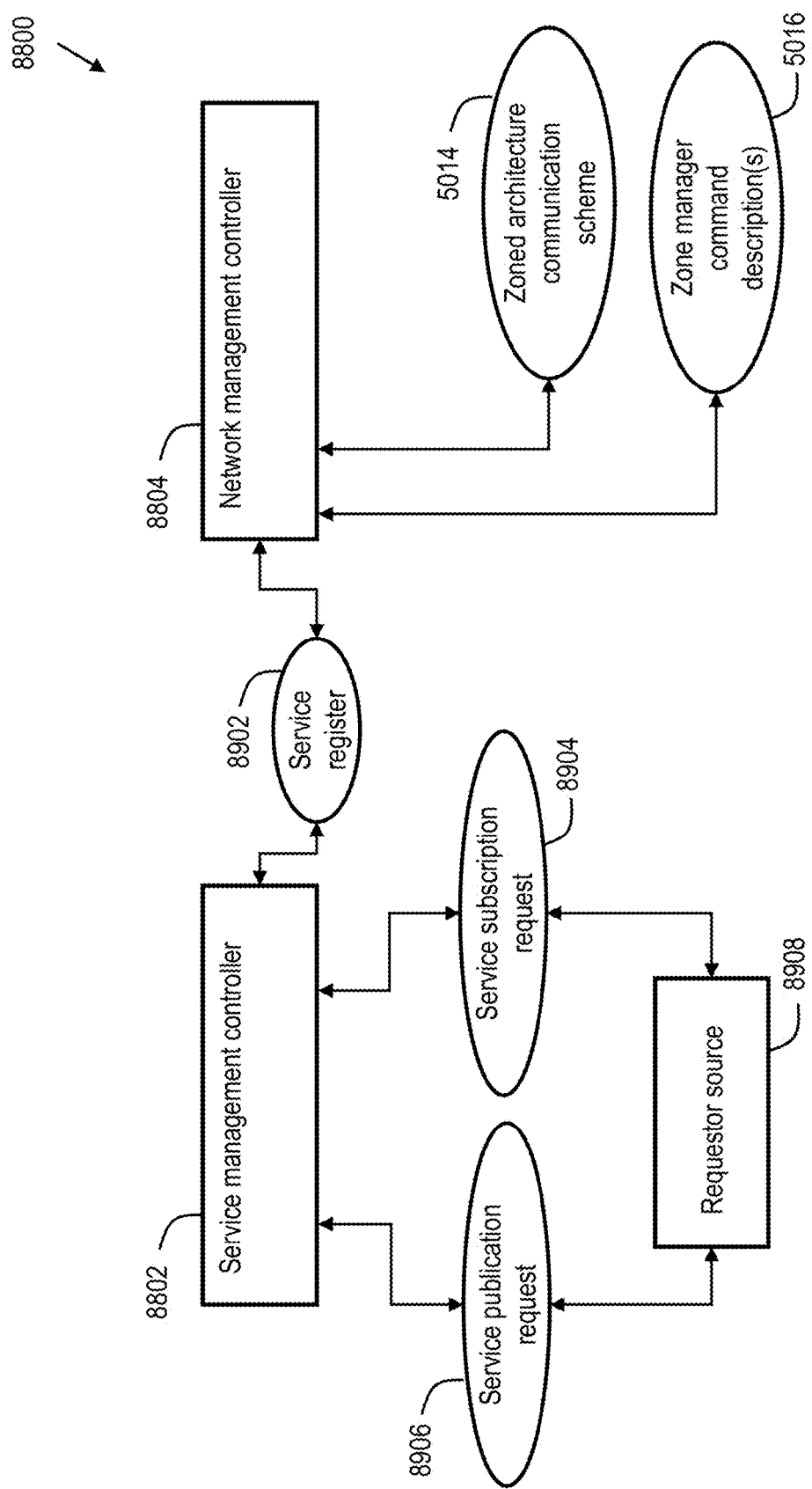
FIG. 68 is a system depicting processes for service management controllers, according to certain embodiments of the present disclosure.

Referencing FIG. 67, an example system 8800 for operating a service oriented architecture for a vehicle (not depicted) having a multi-zone network including a number of network zones, each one of the network zones including at least one zone manager, and where the number of network zones are arranged according to a network topology description of a selected zone architecture. The system 8800 includes a service management controller 8802, including: a service registration circuit 8806 that maintains a service register 8902 (reference FIG. 68) including a number of services and a service description for each of the services, a service publication circuit 8810 that exposes at least one service from the number of services to a requestor source 8908, in response to a service publication request 8906, and a service subscription circuit 8808 that enrolls a requestor source 8908 (e.g., which may be the same or a different source. The requestor source 8908 is the source of a given request, which may be a publication request and/or a subscription request) with the at least one service in response to a service subscription request 8904, and updates the service register 8902 in response to the enrollment. The system 8800 further includes a network management controller 8804, including: a zone implementation circuit 8812 that interprets a zoned architecture communication scheme 5014, a zone manager command circuit 8814 that interprets a zone manager command description 5016 for each of the zone managers in response to the zoned architecture communication scheme, and a zone execution circuit 8816 that provides the corresponding zone manager command description 5016 to each of the zone managers. The zone managers are responsive to the corresponding zone manager command description 5016 and the service register 8902 to control communications between end points of the corresponding network zone and end points of at least one other zone of the plurality of network zones.

An example system 8800 includes the service management controller 8802 positioned, at least in part, on a central zone manager of the zone managers. An example central zone manager is directly communicatively coupled to each one of the other zone managers. An example system 8800 includes the network management controller 8804 positioned, at least in part, on the central manager.

Figure 69:
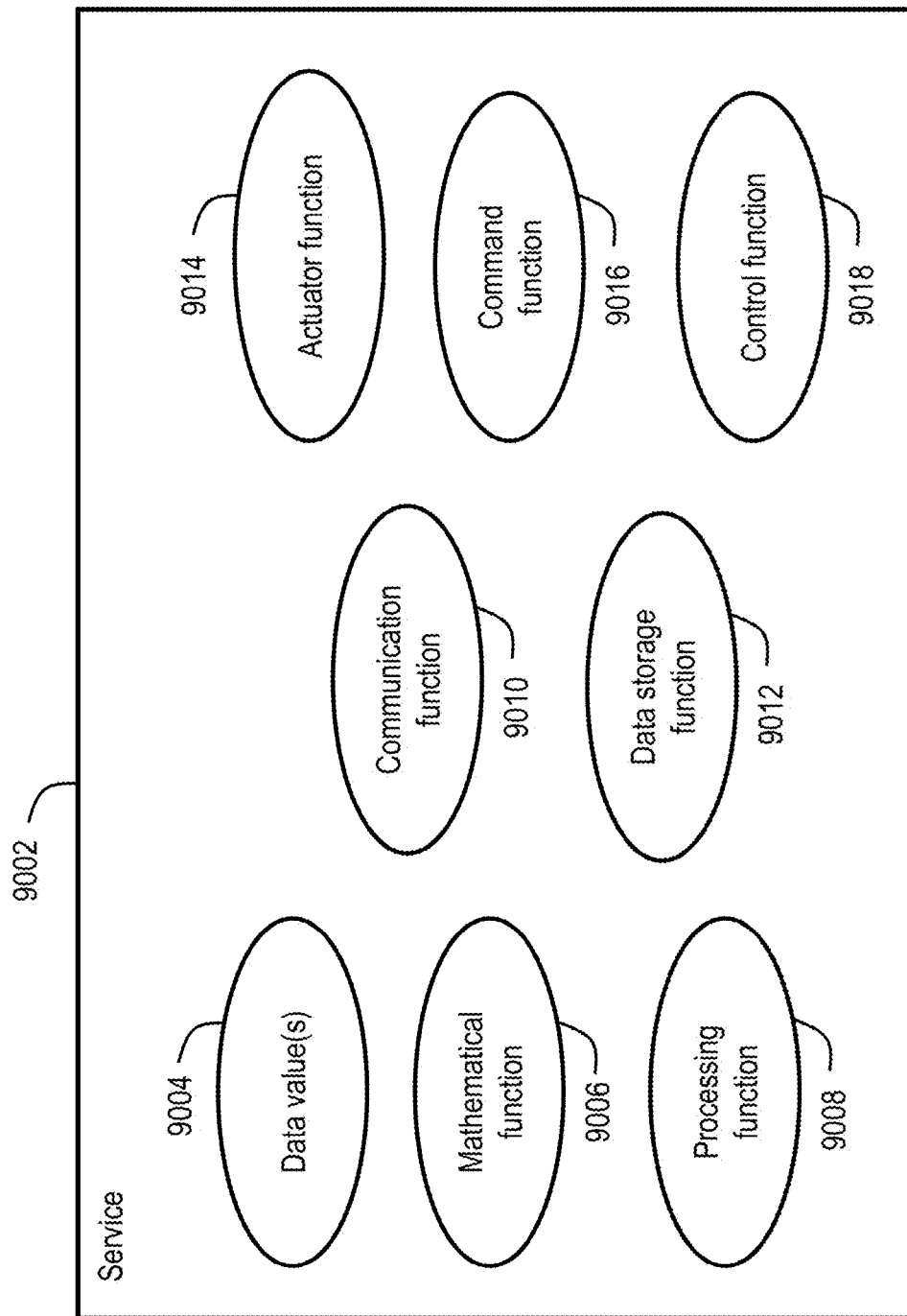
FIG. 69 is a block diagram depicting an aspect of a zonal architecture, according to certain embodiments of the present disclosure.

Referencing FIG. 69, non-limiting examples of a service 9002 are schematically depicted. An example service 9002 includes provision of any data value available on the system, and/or that can be determined from data available on the system, and additionally or alternatively may include any function, available action, and the like. A service can be provided by any actor on the vehicle, typically from an end point that makes the service available for enrollment, where another actor on the vehicle can use the service (e.g., begin receiving messages, exercising the function, etc.) once enrolled. Permissions may be associated with any aspect of a service, for example permissions may be applied to provide a service, to make a service visible, to publish the service, including the scope of visibility or publication, to see the service as available, to enroll with the service, or the like. The examples of a service 9002 include: a data value 9004, a mathematical function 9006 (e.g., providing a mathematical function that may be helpful or commonly utilized on the vehicle, where utilization of the function as a service may allow for shift processing resources between devices in the system, and/or allow an actor on the system to provide the function as a black box where other actors can call the function and get return values but the actual operations being performed do not have to be visible. Example functions include any moderately complex function such as an average value determination, a trigonometric expression, and/or functions that may require access to certain system aspects that are not generally available, such as a random number generator based on system time or another seed parameter), a processing function 9008 (e.g., providing a sophisticated processing function available for utilization that again can shift processing resources within the system, hide proprietary functionality in a black box, and/or allow for rarely used sophisticated operations to be centralized and managed from a single location. Example functions include dynamic processing of data streams such as up-sampling or down-sampling operations and/or dynamic filtering operations for smoothing, feature detection, and/or frequency banding, interpolation, spline fits, Fourier or other frequency analysis operations, operation of a goal seeking or optimization algorithm on input sets, operation of lookup tables and/or conversion of lookup tables to analytical models, data compression operations, sparse data reconstructions, operating a compensation algorithm for an aging or degraded sensor, etc.); a communication function (e.g., packaging communications for use elsewhere in the system, especially for example where packaging operations for the communication—such as encapsulation, addition or removal of headers, metadata, time stamps, or the like will be operationally "expensive" for either low capability devices and/or for a zone manager or switch to perform); a data storage function (e.g., allowing subscribers to check in, check out, change stored values, retrieve stored values, etc. with data; for example allowing a low capability device to borrow data storage from a higher capability device with low implementation overhead, and/or to utilize such storage for infrequent but potentially large data operations, such as intermediate data stored temporarily during a calculation, short term storage buffers, etc., such a data storage service would be "expensive" in terms of capability versus implementing cost for many applications, but is useful in a mixed environment of high and low capability legacy devices may linger in the system for a few years with the possibility of replacement at any point, and where replacement will likely be rolled out piecemeal across a group of vehicle classes); an actuator function 9014 (e.g., allowing devices to control an actuator, the service providing the actuator control may limit the range and/or dynamics of control of the actuator through the service, for example relative to the base control of the actuator that is available; further the service may prioritize between multiple enrollees for the service, for example by enforcing a "check-out" of the actuator, applying a hysteresis between multiple requests to prevent dithering or other potentially undesirable operation, and/or favoring utilization by a higher priority user over a lower priority user); a command function 9016 (e.g., allowing various system command services, such as requesting a system state (e.g., which vehicle speed governor is currently active), setting a state for some parameters—e.g., headlights on, retrieving diagnostic values or states, etc.); and/or a control function 9018 (e.g., allowing access to some control parameters, for example for observation potential adjustment, which may be within an allowed range that may depend upon the actor requesting the service—for example a vehicle owner convenience application allowing the user to adjust the cruise control minimum speed may have a different capability range than an engineering tool application that uses the same service, in another example a parent may allow a teen driver to adjust the vehicle maximum power or top speed, but within a limited range, etc.). It will be seen that certain parameters accessed or adjusted by a service 9002 may be understood as a data value, a command function, or a control function (e.g., setting a headlight value that requests the headlights to be on could be understood as a control function, a command function, or an actuator function). The specific category of the service 9002 is not important; the categories together illustrate various aspects of the vehicle, the network, end points, applications, and the like that can be exercised through the use of a service 9002. In certain embodiments, a service 9002 can be a complex function, for example engaging an ADAS system, requesting an automated parallel parking operation, or the like, and other services 9002 can be very simple services that extend the capability of low capability devices, shift processing resources within the system, simplify repetitive or complex tasks, and/or reduce development and maintenance of common processes to a single location.

Referencing FIG. 70, an example illustrative data structure for a service register 8902 is schematically depicted. In certain embodiments, the service register 8902 tracks the services available on the system, whether the services are published, who is enrolled with the service, and the like. Some fields in the service register 8902 may be informative rather than active, for example the service capability description may be a text field for display on a user device (e.g., services made available for a user, for example to display on a service tool, engineering tool, mobile device, or the like), where other fields may be active, such as the Service ID which may be an actual identifier, for example utilized by the service management controller 8802 to specifically identify and track services 9002. An example service register 8902 includes, for each service of the plurality of services, at least one of: a service identifier; a service provider description; a service permissions description; or a service capability description. An example service register 8902 further includes, for each service of the plurality of services, at least one of: a service input description; a service active or inactive flag; a service deprecation flag; a service enrollee description; or a service participant description (e.g., other end points, controllers, applications, etc. that are accessed by the service provider as a part of the operations of the service).

An example service publication circuit 8810 exposes the service(s) 9002 by listing the service register 8902 in a data structure provided to the requestor source, for example a requestor source may request a listing of services 9002, and/or may be periodically provided a list of services 9002. The data structure provided to the requestor source is based on the service register 8902, but will be limited to services that the requestor source has permissions to view and/or to subscribe to, and/or services 9002 that are likely to be of interest to the requestor source.

An example service publication circuit 8810 exposes the service(s) 9002 by listing the service 9002 in a known location (e.g., a memory location accessible to actors on the network). In certain embodiments, a number of data structures with service listings may be provided, for example based on common permissions classes of actors on the network. For example a first permissions class may allow access to a first table, for example listing only services that access low security data or functions, and a second permissions class may allow access to a second table, for example listing services that access more sensitive data or functions. There may be any number of permissions classes. In certain embodiments, a service listing may be created in response to a request, with services filtered according to the overall permission scheme applicable to the requestor source. A requestor source may be any actor on the system (e.g., an end point, an application, a flow, a controller, etc.), and/or may include actors off the system (e.g., a user interacting with an external device, such as tool in the cloud, or a service tool in communication with the vehicle, that requests a service providing data or allowing functions to be accessed by the user), and will similarly be limited by the appropriate permission scheme applicable to the user, the external device, and/or the tool being utilized to request the service. In certain embodiments, a service provider could be an external device, for example allowing on-vehicle actors to access data, processing functionality, or any other service aspect that is provided by the external device (again subject to publication and other permissions applicable to the external device).

An example service publication circuit 8810 interprets a service publication request 8906 for a new service from a new service provider (e.g., a provider of the new service, which may be a new requestor source or a requestor source publishing a new service), determines a new service description in response to the service publication request 8906 and the new service provider (e.g., determined from data fields in the service publication request 8906, and/or interpreted from the operations performed by the service), and maintains the service register 8902 by adding the new service 9002 as one of the services in the register.

An example service publication circuit 8810 further adds the new service to the service register 8902 in response to a permissions value associated with the new service provider, for example denying the request, adding the service to the service register 8902 but not publishing the service, and/or by making appropriate entries in a permissions field of the service register 8902 (e.g., specifying permissions for visibility and/or enrollment of the service).

An example service publication circuit 8810 maintains the service register 8902 by removing a service from the plurality of services in response to a service publication request 8906, which may include deleting the associated entry from the service register 8902, adjusting the service register entry so the service is no longer visible or published, and/or setting an inactive flag in an associated entry from the service register 8902 (e.g., thereby allowing for tracking of services that have been available, and/or simplifying the process to turn the service back on at a later time).

An example service publication circuit 8810 maintains the service register by deprecating a service from the services in the service register in response to a service publication request 8906 (e.g., where the service publication request 8906 is a request to stop publishing the service). As used herein, deprecating a service allows the service to continue to be utilized by enrollee actors that were enrolled at the time of deprecation, but does not allow new requestors to see or utilize the service 9002, and blocks further enrollments for the service. The deprecation operation allows services to be grandfathered out of the system as enrollees stop using the service 9002. As used herein, making a service 9002 inactive does not necessarily remove the enrollment status of requestors, but the service 9002 will not be utilized unless and until the service is reactivated.

An example service publication circuit 8810 further maintains the service register 8902 by removing a service from the available services in response to determining that at least one aspect of the service is no longer available (e.g., an end point used by the service is no longer present, service enrollees are no longer receiving the benefit of the service, and/or the service provider appears unresponsive to the service 9002). In certain embodiments, removing the service from the available services includes setting an inactive flag, and/or deleting the entry for the service 9002 from the service register 8902.

Once a service is active, an enrollee may engage the service actively or passively, depending upon the nature and configuration of the service. For example, utilizing the service 9002 may involve passively receiving data, which may be sent from the service provider directly to enrollees as data communications, and/or the data may be sent to the service management controller 8802 for storage in a location accessible to enrollees at a time of need or convenience. In another example, the service may involve a call from the enrollee, for example passing data parameters that inform the service—for example a number that is passed to the service provider and a value of the function is returned after the call, parameters for an actuator setting requested by the enrollee, and/or a data block for processing (e.g., a stream of data values on which the processing of the service is performed). In certain embodiments, the service register 8902 stores the service call formatting and information, which is then available to the enrollee for utilizing the service 9002.

In certain embodiments, a service permissions description includes a service publication permission, a service subscription permission, and/or a service visibility permission. In certain embodiments, the service register 8902 may be stored on an external device, which may be in addition to a local version of the service register 8902. In certain embodiments, the service register 8902 stored on an external device may be different from the local version, for example with only active services listed externally, and/or with services listed on the external device that are deleted from the local version.

Figure 71:
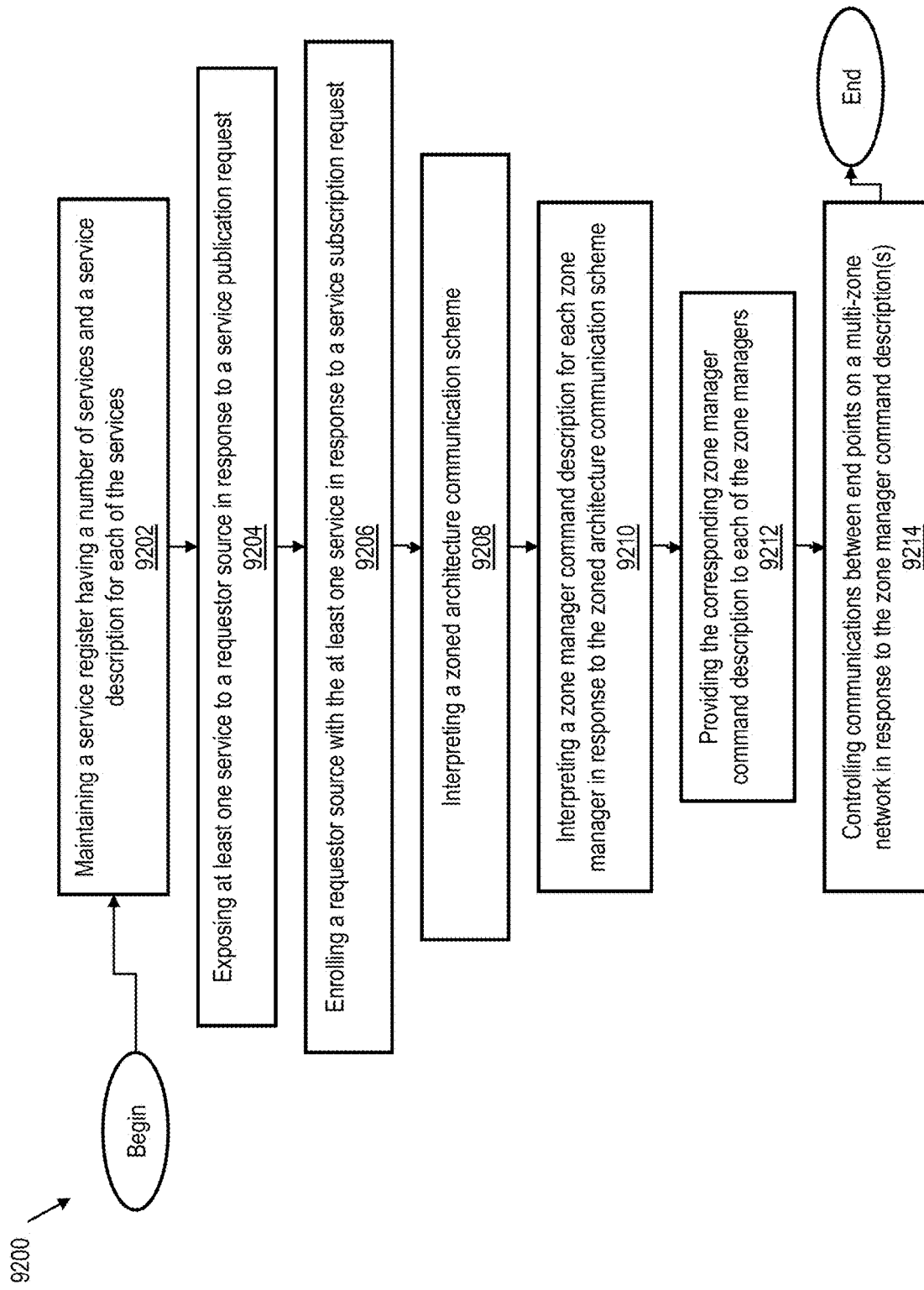
FIG. 71 is a process for controlling communications between end points in a multi-zone network, according to certain embodiments of the present disclosure.

Referencing FIG. 71, an example procedure 9200 includes an operation 9202 to maintain a service register including a plurality of service and a service description for each of the plurality of services on a vehicle having a multi-zone network including a plurality of network zones; an operation 9204 to expose at least one service from the plurality of services to a requestor source, in response to a service publication request; an operation 9206 to enroll a requestor source with the at least one service in response to a service subscription request, and updating the service register in response to the enrollment; an operation 9208 to interpret a zoned architecture communication scheme; an operation 9210 to interpret a zone manager command description for each of the at least one zone managers in response to the zoned architecture communication scheme (e.g., adjusting the zone manager command descriptions based on activities performed for the service); an operation 9212 to provide the corresponding zone manager command description to each of the at least one zone managers; and an operation 9214 to control communications between end points of the corresponding network zone and end points of at least one other zone of the plurality of network zones, in response to the corresponding zone manager command description and the service register.

Example operations 9204 to expose the at least one service include: listing the service in a data structure provided to the requestor source; and/or listing the service in a data structure available to the requestor source.

Figure 72:
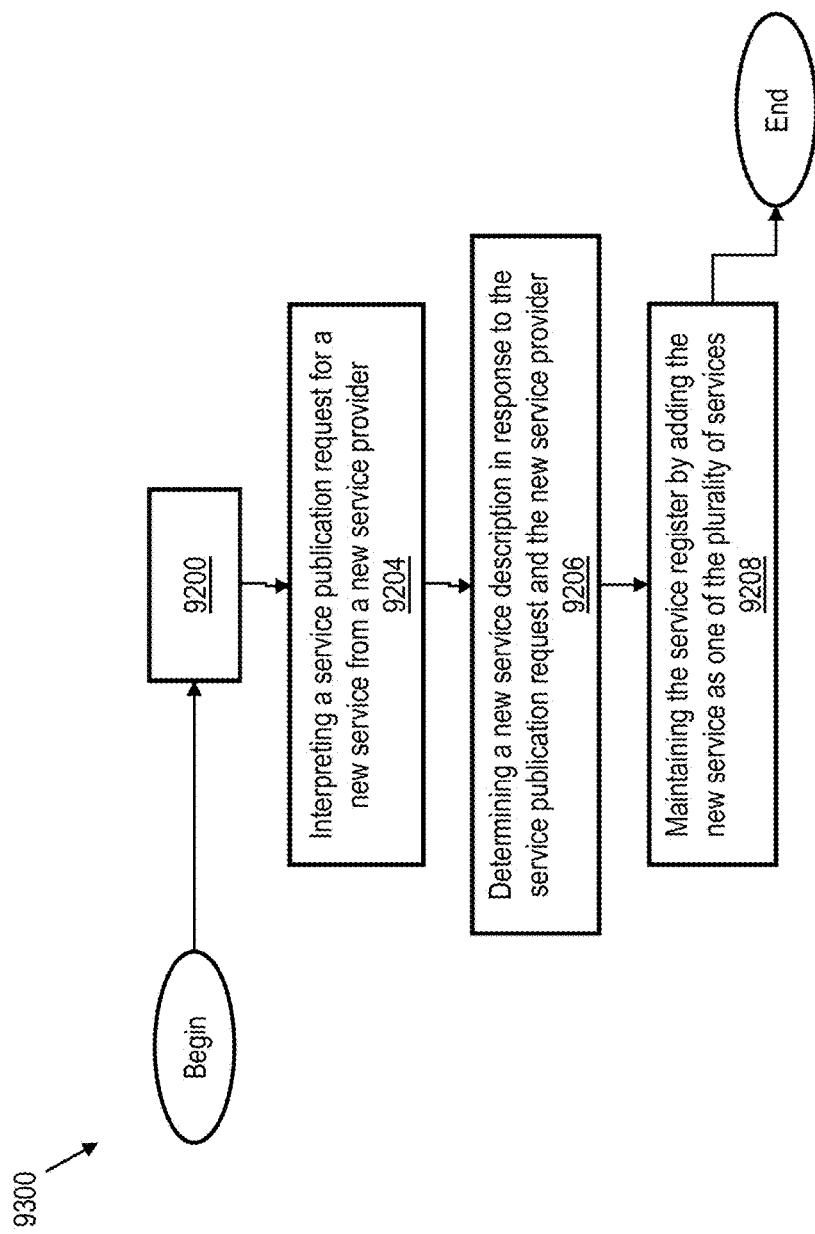
FIG. 72 is a process for maintaining a service register, according to certain embodiments of the present disclosure.

Referencing FIG. 72, an example procedure 9300 includes the procedure 9200, and further includes an operation 9202 to interpret a service publication request for a new service from a new service provider; an operation 9204 to determine a new service description in response to the service publication request and the new service provider; and an operation 9206 to maintain the service register by adding the new service as one of the plurality of services.

Without limitation to any other aspect of the present disclosure, embodiments herein provide for a system and procedures to implement a zonal network architecture to control time management of communications on the network, including time management for control purposes (e.g., synchronization of operations between distributed controllers), and/or for data analysis (e.g., comparing streams of data to detect events, plan or implement diagnostics or troubleshooting operations, etc.).

Figure 73:
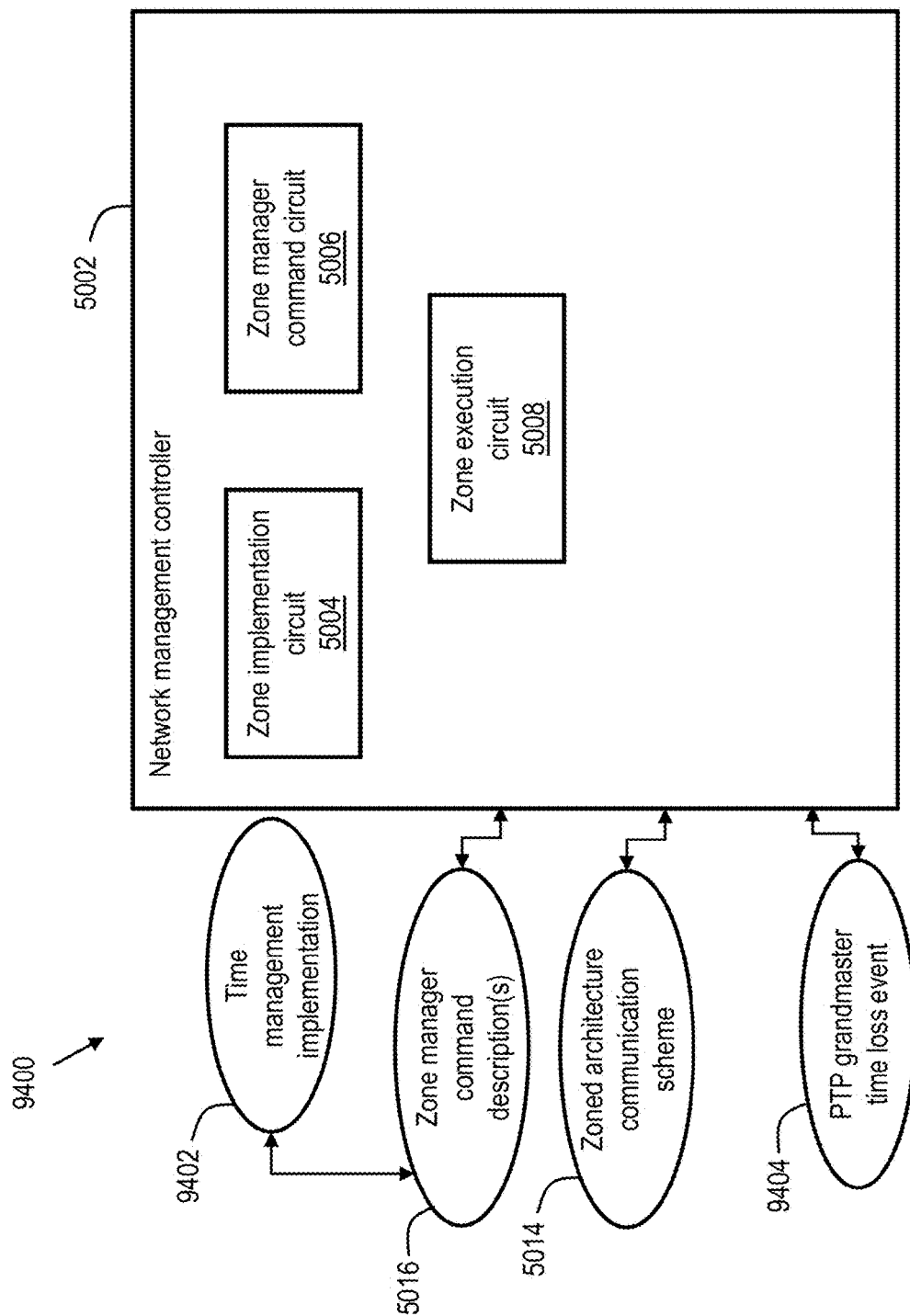
FIG. 73 is a block diagram depicting a network management controller, according to certain embodiments of the present disclosure.

Referencing FIG. 73, an example system 9400 includes a vehicle (not shown) having a multi-zone network including a plurality of network zones, each one of the network zones including at least one zone manager; and a network management controller 5002, including: a zone implementation circuit 5004 that interprets a zoned architecture communication scheme 5014, the zoned architecture communication scheme 5014 including a time management scheme 9502 (reference FIG. 74); a zone manager command circuit 5006 that interprets a zone manager command description 5016 for each of the at least one zone managers in response to the zoned architecture communication scheme 5014, the zone manager command description 5016 further including a time management implementation 9402; and a zone execution circuit 5008 that provides the corresponding zone manager command description 5016 to each of the at least one zone managers; and wherein each of the at least one zone managers is responsive to the corresponding zone manager command description 5016 to control communications between end points of the corresponding network zone and end points of at least one other zone of the plurality of network zones.

An example system 9400 includes the time management scheme including a designated one of zone managers to operate as a precision time protocol (PTP) grandmaster for the multi-zone network. The example system 9400 may further include the other zone managers designated as boundary clocks for the corresponding network zones. In certain embodiments, the central zone manager may operate as the PTP grandmaster for the multi-zone network, but any other zone manager may operate as the PTP grandmaster, where the central zone manager operates as a boundary clock for the central zone.

In certain embodiments, one or more end points may instead operate as a clock for a given zone, including as the PTP grandmaster for the multi-zone network, and one or more end points may operate as boundary clocks for their respective zones. In certain embodiments, a mix of selected end points and/or zone managers may operate as the clocks, including the PTP grandmaster and/or boundary clocks for respective zones.

Figure 78:
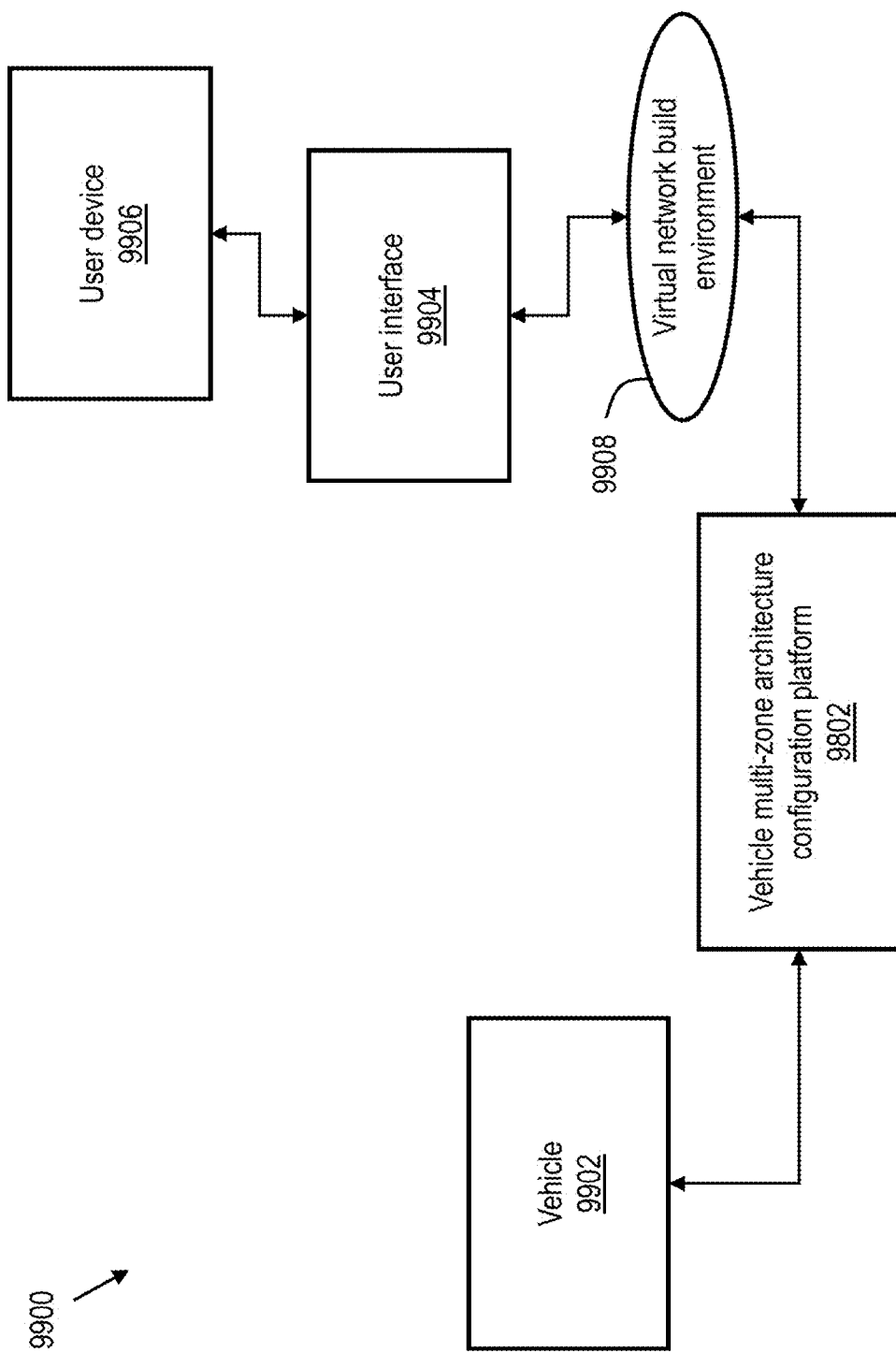
FIG. 78 is a block diagram process depiction for a vehicle multi-zone architecture configuration platform, according to certain embodiments of the present disclosure.
Figure 93:
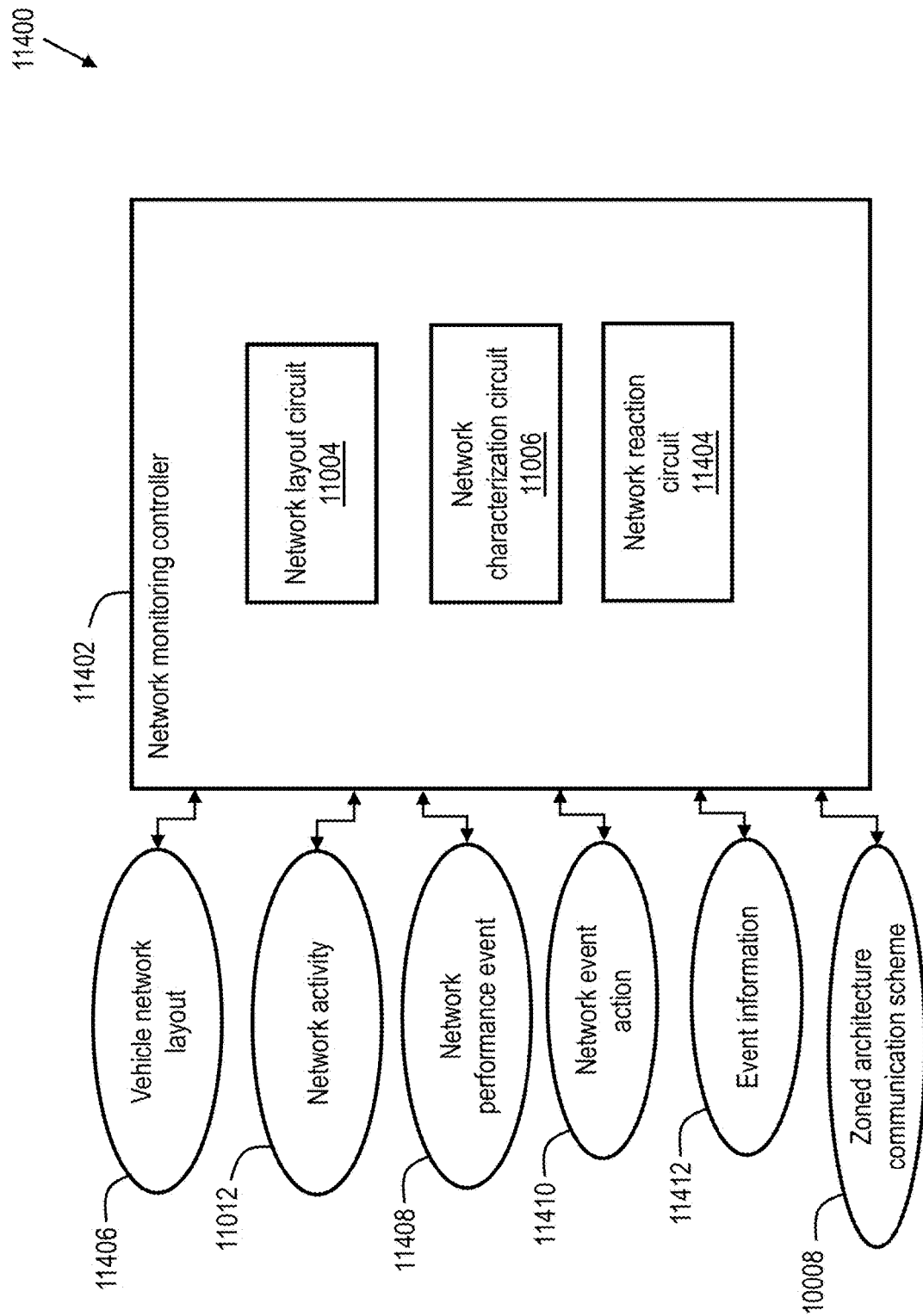
FIG. 93 is a block diagram depicting a network monitoring controller, according to certain embodiments of the present disclosure.

An example system includes the zone implementation circuit 5004 operating a best master clock algorithm to determine the designated one zone manager(s) and/or end points to operate as the PTP grandmaster. In certain embodiments, the zone implementation circuit 5004 may further operate a best master clock algorithm for end points and the zone manager of a given zone to determine and designate a boundary clock for the given zone. In certain embodiments, the best master clock algorithm may be operated away from the vehicle, for example on a build environment and/or monitoring environment such as depicted in FIGS. 78 and 93 and the related descriptions, to determine the best PTP grandmaster and/or boundary clocks. In certain embodiments, the best PTP grandmaster and/or boundary clocks may be determined based on certain criteria, for example based on a criticality of functions performed on a given zone (e.g., important and/or high rate functions such as powertrain control may drive the selection of the PTP grandmaster to that zone), and/or based on a sensitivity of functions performed on a given zone (e.g., functions with extreme time sensitivity may drive the selection of the PTP grandmaster to that zone).

An example zone execution circuit 5008 further determines a PTP grandmaster time loss event 9404, the zone implementation circuit 5004 further operates the best master clock algorithm to determine an alternative one of the at least one zone managers to operate as the PTP grandmaster, and the zone execution circuit 5008 further designates the alternative one of the zone managers to operate as the PTP grandmaster. In certain embodiments, the alternative best PTP grandmaster is stipulated in the time management scheme, where the zone execution circuit 5008 further determines a PTP grandmaster time loss event 9404, and designates the stipulated alternative one of the zone managers to operate as the PTP grandmaster. In certain embodiments, the PTP grandmaster may be any one of a zone manager or an end point, where the zone execution circuit 5008 further determines a PTP grandmaster time loss event 9404, where the zone implementation circuit 5004 further operates the best master clock algorithm to determine an alternative end point and/or zone manager to operate at the PTP grandmaster, and the zone execution circuit 5008 further designates the determined alternative end point and/or zone manager to operate as the PTP grandmaster. In certain embodiments, the PTP grandmaster may be any one of a zone manager or an end point, where the alternative best PTP grandmaster is stipulated in the time management scheme as any one of a zone manager or an end point, where the zone execution circuit 5008 further determines a PTP grandmaster time loss event 9404, and designates the stipulated alternative one of the zone manager or end point as the PTP grandmaster.

An example system 9400 includes the zone controllers applying a common PTP time stamp to at least a portion of communications provided on the corresponding network zones. An example system 9400 includes the zone controllers instructing the application of a common PTP time stamp to at least a portion of communications provided on the corresponding network zones.

An example system 9400 includes the zone controllers removing a local time stamp from at least a portion of communications provided on the corresponding one of the plurality of network zones. An example system 9400 includes the zone controllers instructing the removal of a local time stamp from at least a portion of communications provided on the corresponding network zones. In certain embodiments, the local time stamp is kept, and/or moved into a different part of the message. Keeping the original local time stamp allows for certain post-processing operations, confirmation of the performance and selection of the PTP grandmaster, detection of systematic issues in the overall timekeeping and synchronization scheme, and the like.

Figure 74:
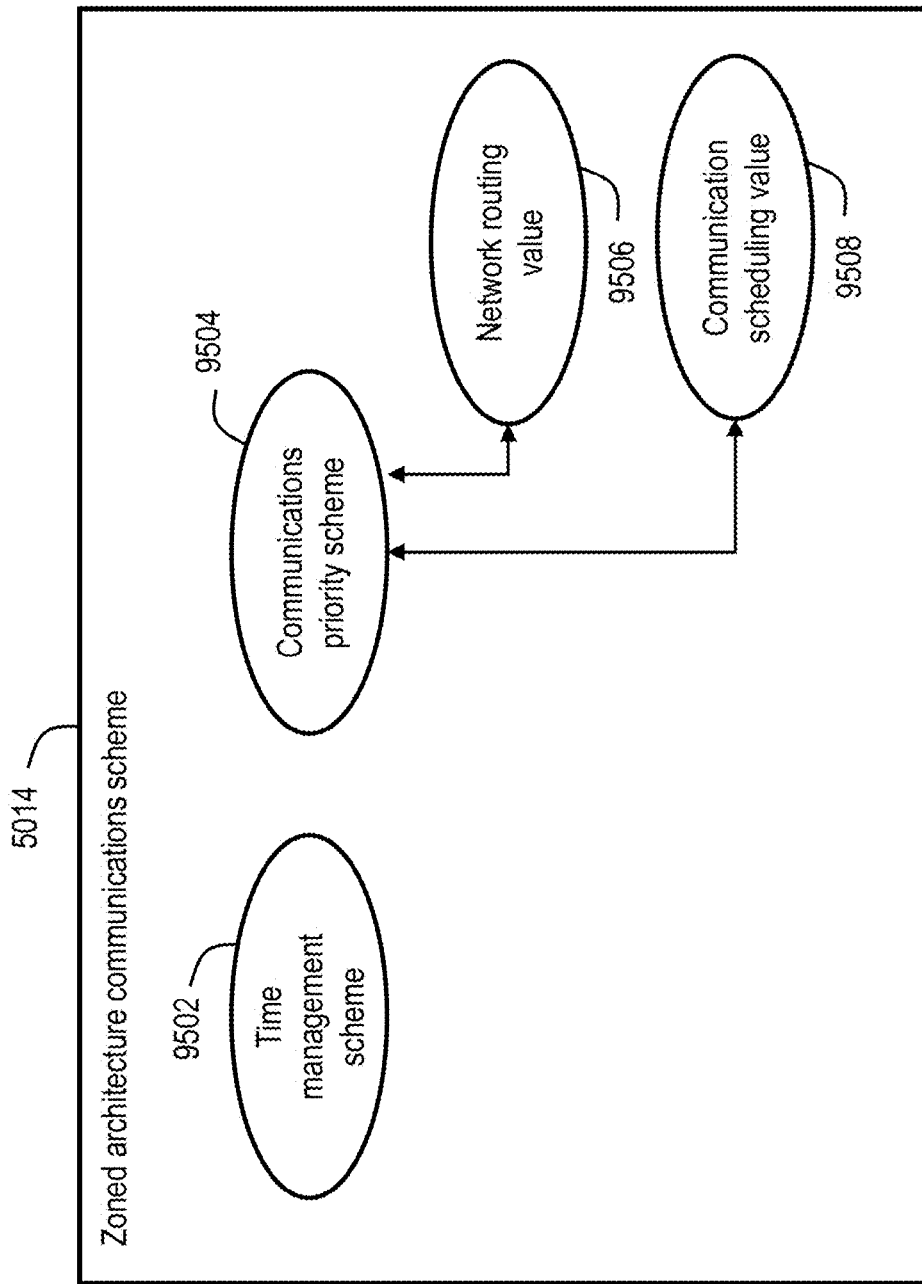
FIG. 74 is a block diagram depicting zoned architecture communications scheme, according to certain embodiments of the present disclosure.

Referencing FIG. 74, an example zoned architecture communication scheme 5014 includes a communications priority scheme 9504. An example system 9400 includes the zone managers responsive to a communications priority value (e.g., associated with a communication and/or an actor associated with the communication) and the communications priority scheme 9504 to control communications between end points of the corresponding network zone and end points of at least one other zone of the plurality of network zones.

An example communications priority scheme 9504 includes a network routing value 9506, for example providing a short path, lower activity path, and/or more rapid travel time path for high priority communications, and providing a longer path, a higher activity path, and/or a longer travel time path for low priority communications. An example communications priority scheme 9504 includes a communication scheduling value 9508, for example providing a higher priority scheduling for a high priority communication, and providing a lower priority scheduling, including potentially as "as available" or "best effort" scheduling, for a lower priority communication. In certain embodiments, a credit based scheduling may be utilized to prioritize high priority communications while allowing some lower priority communications to proceed.

In certain embodiments, the vehicle operating conditions are utilized to determine scheduling and/or routing for high and low priority messages, and/or the vehicle operating conditions are utilized to determine or adjust the priority of messages. For example, during normal operations, an AV message may be a high priority message due to the time sensitivity of such messages, but during certain operating conditions, for example when critical network traffic for control messages are high, and/or the network is degraded, an AV message may be treated as a low priority message, until vehicle operations return to normal and/or the degradation is resolved.

Figure 75:
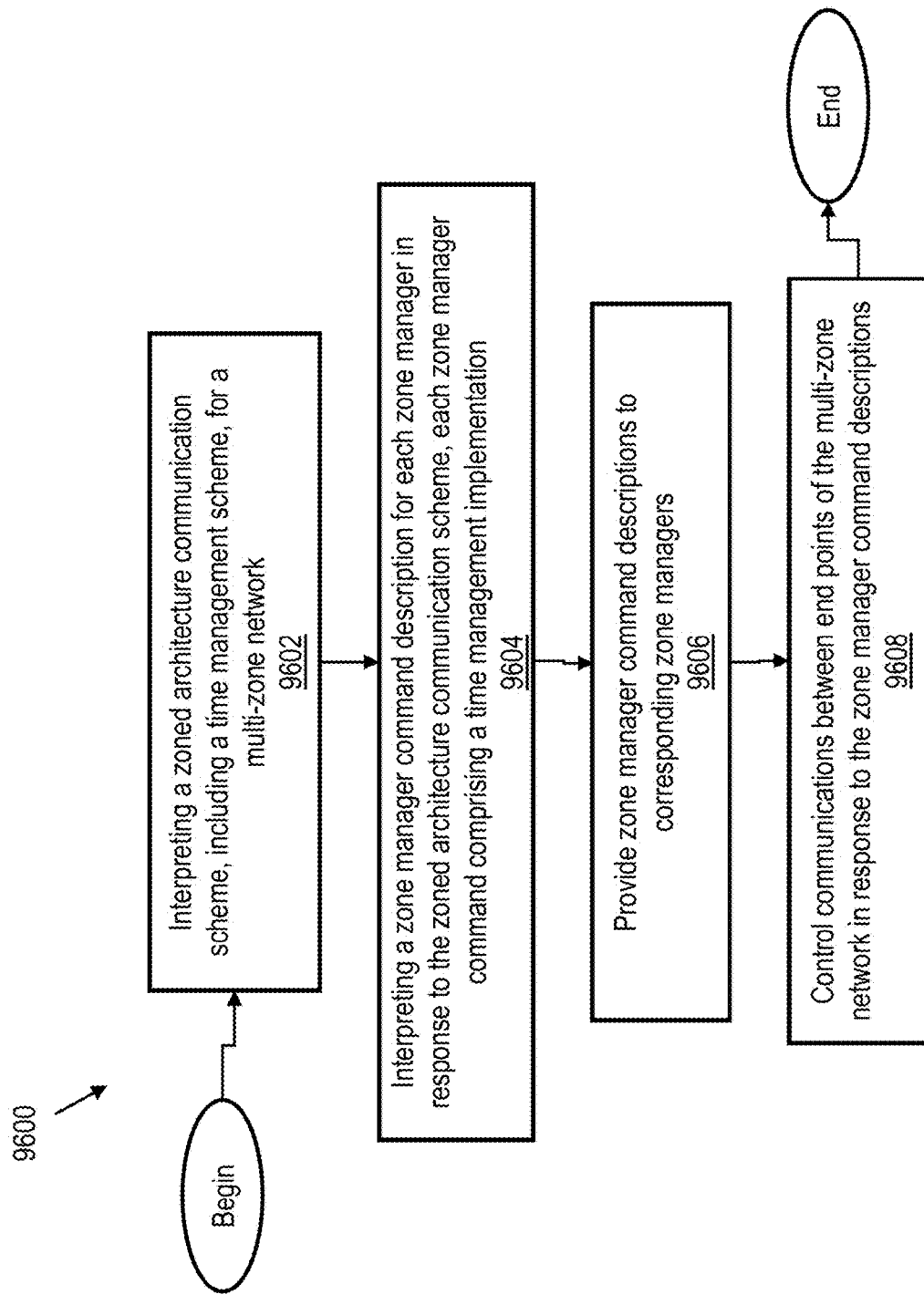
FIG. 75 is a process for controlling communications between end points in a multi-zone network, according to certain embodiments of the present disclosure.

Referencing FIG. 75, an example procedure 9600 includes an operation 9602 interpreting a zoned architecture communication scheme for a multi-zone network of a vehicle, where the zoned architecture communication scheme includes a time management scheme; an operation 9604 to interpret a zone manager command description for each of the at least one zone managers in response to the zoned architecture communication scheme, the zone manager command description further including a time management implementation; an operation 9606 to provide providing the corresponding zone manager command description to each of the at least one zone managers, and an operation 9608 to control communications between end points of the corresponding network zone and end points of at least one other zone of the plurality of network zones in response to the zone manager command descriptions.

Figure 76:
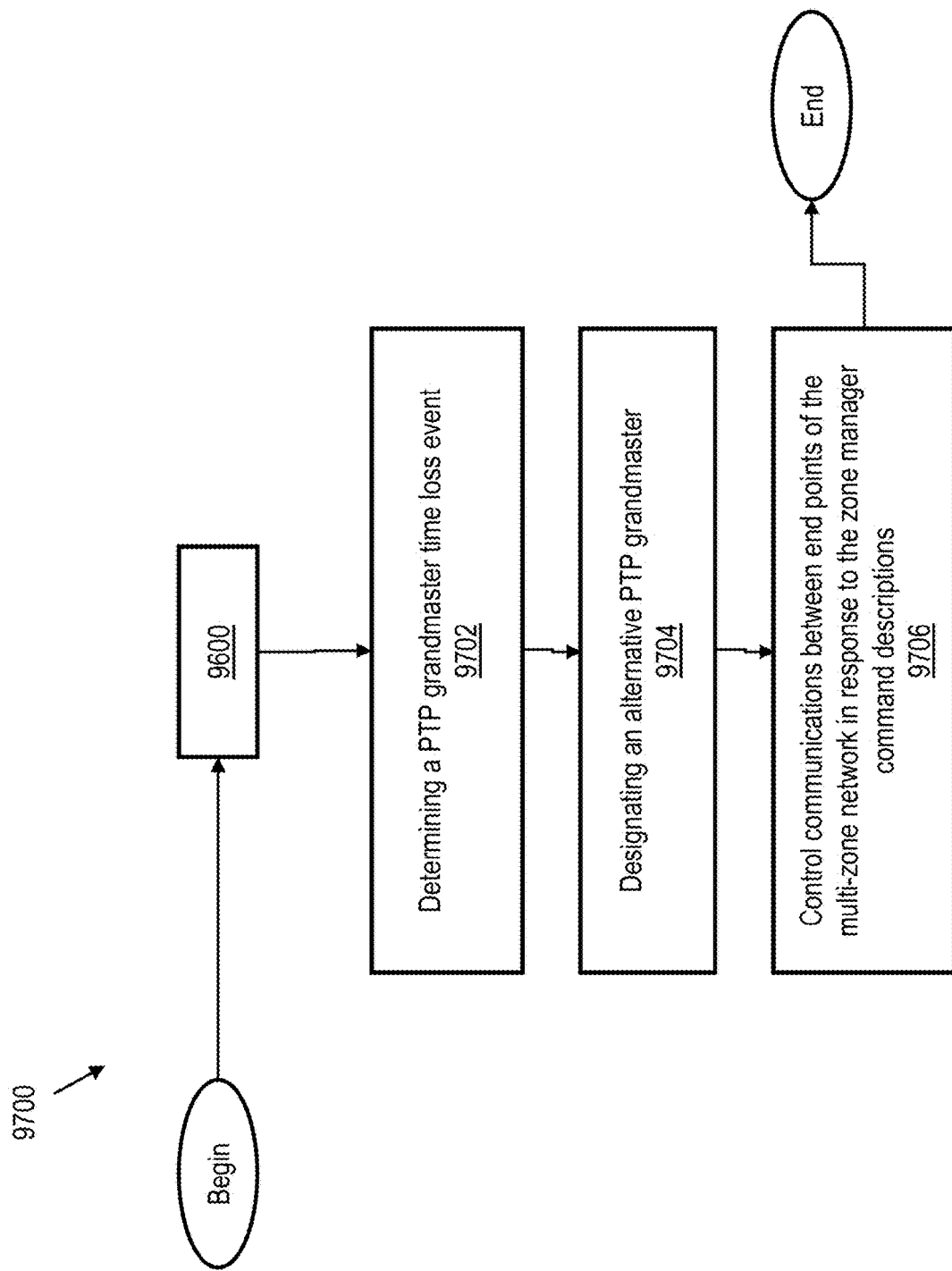
FIG. 76 is a process for controlling communications between end points in a multi-zone network, according to certain embodiments of the present disclosure.

Referencing FIG. 76, an example procedure 9700 includes the procedure 9600, and an operation 9702 to determine a PTP grandmaster time loss event, an operation 9704 to designate an alternative PTP grandmaster, and an operation 9706 to continue controlling communications between end points of the corresponding network zones.

In certain embodiments, procedure 9600 includes designating an end point and/or a zone manager as a boundary clock for each zone, with one end point and/or zone manager designated as a PTP grandmaster. In certain embodiments, the procedure 9600 includes operating a best master clock algorithm to designate the end point and/or zone manager as the PTP grandmaster. In certain embodiments, the procedure 9700 includes operating a best master clock algorithm to designate the alternative PTP grandmaster. In certain embodiments, designating the PTP grandmaster, the alternative PTP grandmaster, and/or the boundary clocks includes determining the PTP grandmaster, alternative PTP grandmaster, and/or the alternative clocks based on a master zone having the most critical and/or most time sensitive operations occurring thereon.

Without limitation to any other aspect of the present disclosure, embodiments herein provide for a system and procedures to configure and/or adjust a zonal network architecture, whether in the design phase (e.g., planning the zonal network architecture for a new vehicle) or the runtime phase (e.g., monitoring, confirming, or troubleshooting an existing vehicle that is in operation). Embodiments herein include tools to quickly design a new system, to confirm expected operation, to diagnose anomalous operation, to compare different configurations, to leverage lessons learned and configuration options between vehicles, and to roll out updated configurations with a high confidence that the updated configuration will operate as expected and not cause downtime.

Figure 77:
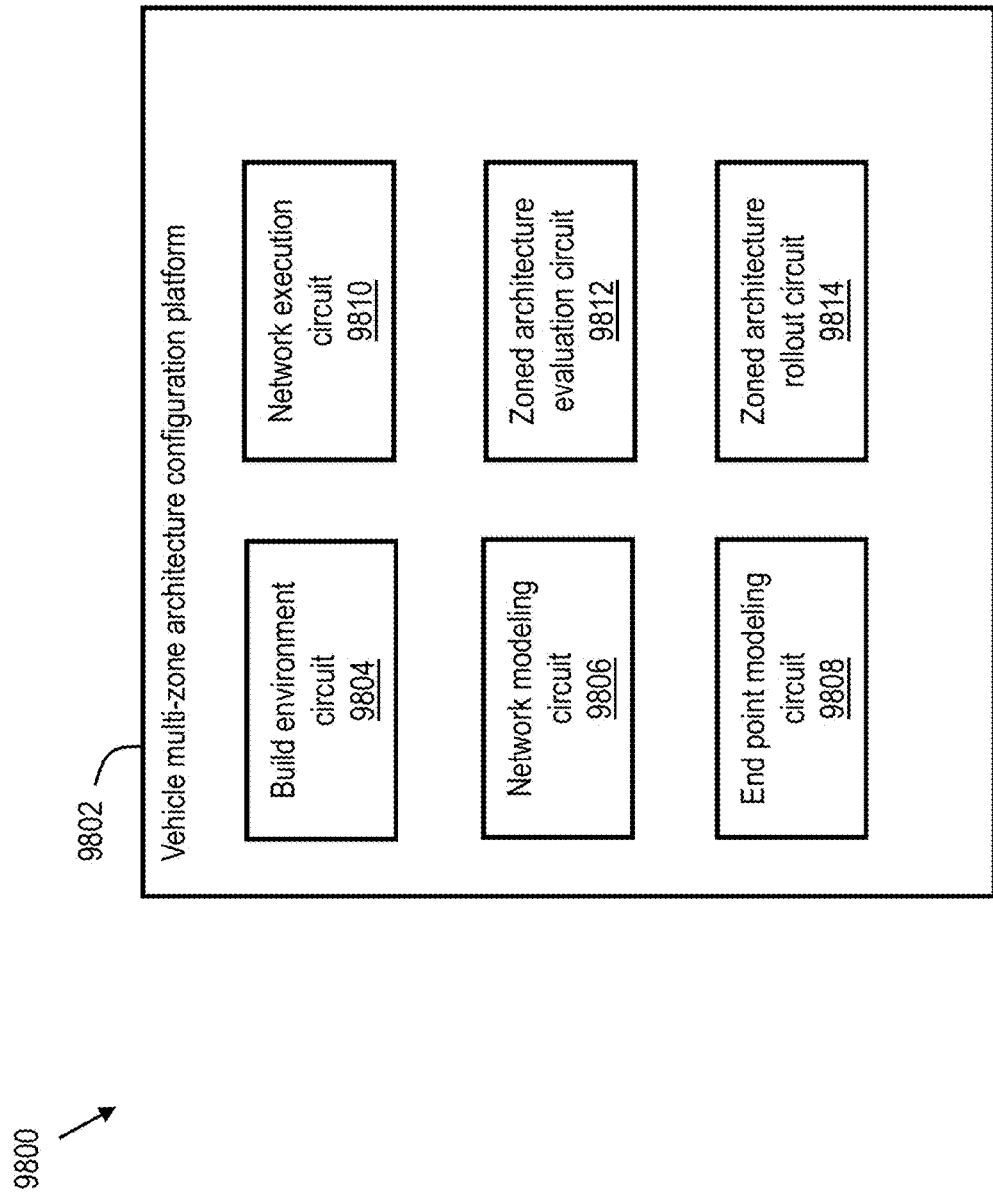
FIG. 77 is a block diagram depicting a vehicle multi-zone architecture configuration platform, according to certain embodiments of the present disclosure.
Figure 79:
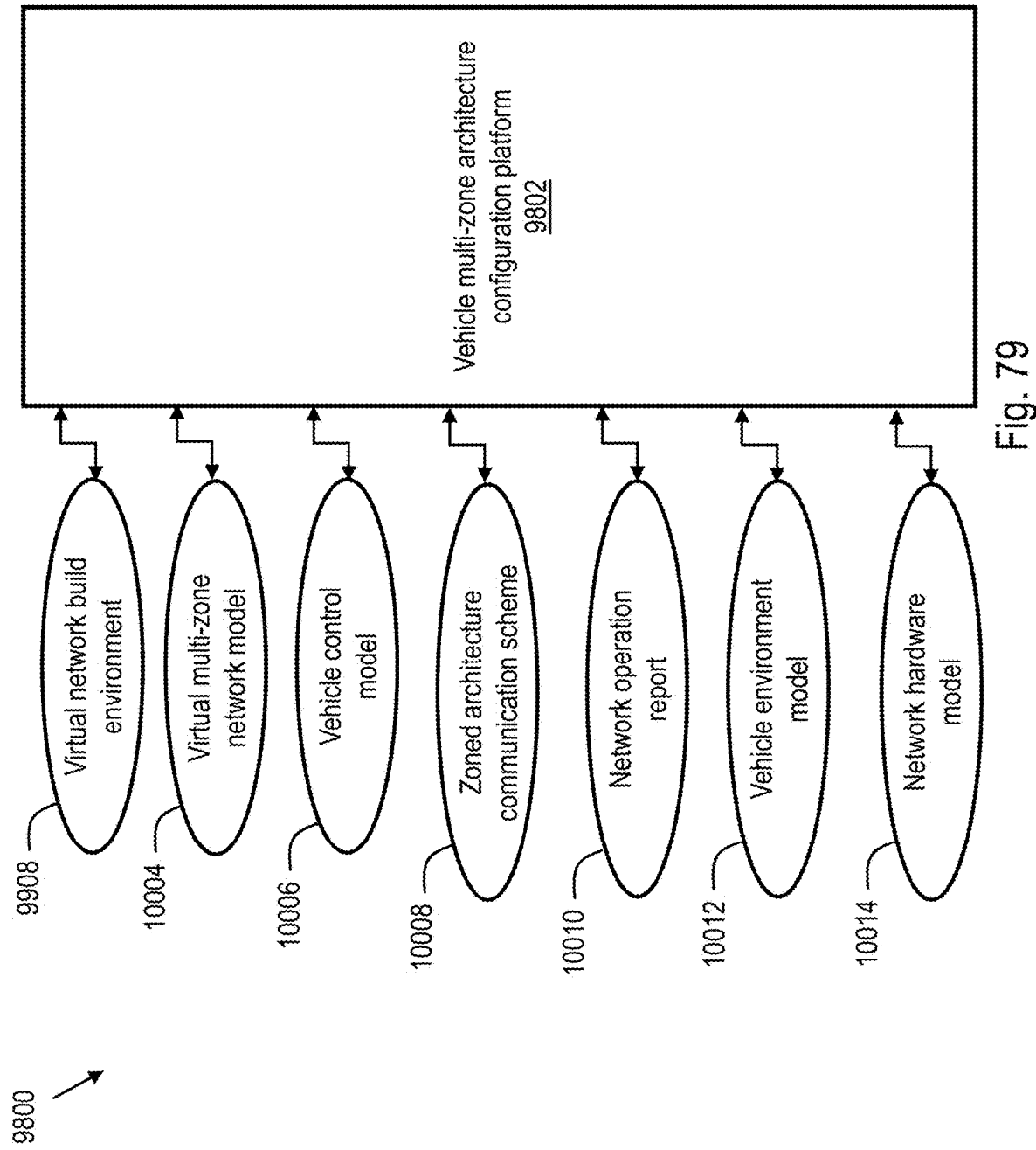
FIG. 79 is a block diagram depicting a vehicle multi-zone architecture configuration platform, according to certain embodiments of the present disclosure.

Referencing FIG. 77, an example system 9800 is schematically depicted, the system 9800 including a vehicle multi-zone architecture configuration platform 9802, including: a build environment circuit 9804 that provides a virtual network build environment 9908 (reference FIG. 78) to a user interface 9904 (reference FIG. 78); a network modeling circuit 9806 that builds a virtual multi-zone network model 10004 (reference to FIG. 79) of a vehicle in response to user inputs on the user interface 9904, the virtual multi-zone network model 10004 including a zone controller positioned on each zone of the virtual multi-zone network model 10004. The vehicle for which the virtual multi-zone network model 10004 is built may be an existing vehicle, or a prospective vehicle (e.g., planning a zonal network architecture for a new vehicle, a new model for a vehicle, an upgrade and/or recall plan for an existing vehicle, etc.).

The example system 9800 includes an end point modeling circuit 9808 that populates the virtual multi-zone network model 10004 with end points based on a vehicle control model 10006. In certain embodiments, the end point modeling circuit 9808 is empirical and/or low resolution, and populates the end points with data providers that simulate traffic on the network of the vehicle at a realistic rate, for example based on monitoring data from a vehicle in service. In certain embodiments, the end point modeling circuit 9808 is based on high resolution and/or first principals, for example utilizing the actual applications, flows, end points, or the like that are installed (and/or a representative installation) on the vehicle, allowing for true generation of traffic, response to inputs including environmental parameters, sensors, and/or operator inputs. In certain embodiments, both a low resolution and high resolution model may be utilized, for example using a low resolution realistic network traffic emulator to detect gross network problems, and then using a high resolution full end point model to make a granular diagnosis of the network performance, test whether new control algorithms or updates will create any unexpected issues, or the like. In certain embodiments, operator inputs, sensor inputs, and the like may be fully simulated, for example utilizing a software interface to simulate the vehicle interior and controls available to the operator, and/or utilizing actual hardware elements that interface with the vehicle multi-zone architecture configuration platform 9802 to simulate operator inputs. In certain embodiments, a simple interface screen depicting the available switches and operator inputs may be utilized, with numerical or graphical selection of the positions of operator inputs.

The example vehicle multi-zone architecture configuration platform 9802 includes the network modeling circuit 9806 further building the virtual multi-zone network model 10004 by applying a zoned architecture communication scheme 10008, for example an actual full zone manager control scheme according to embodiments herein, and which again may have low resolution simplified versions, and high resolution realistic or actual versions to fully test the planned control environment for the vehicle. The example vehicle multi-zone architecture configuration platform 9802 includes a network execution circuit 9810 that simulates runtime operation of a multi-zone network of a vehicle in response to the virtual multi-zone network model 10004, the vehicle control model 10006, and/or the zoned architecture communication scheme 10008. Depending upon which aspects of the zonal architecture design, the multi-zone network, and/or the vehicle controls, one or more aspects of the virtual multi-zone network model 10004, the vehicle control model 10006, and/or the zoned architecture communication scheme 10008 may be provided in a low resolution or high resolution mode. Additionally or alternatively, vehicle operations may be performed according to a digitally fed operation, for example with driving operations, torque feedback, ambient conditions, and the operating through a digitally specified sequence (e.g., simulating a driving route, certain tests, diagnostics, network monitoring operations, or the like intended to test control features and/or exercising the network under selected conditions), through manual inputs of an operator (e.g., using a virtual vehicle interior, and/or some elements that include actual hardware in the loop). The example vehicle multi-zone architecture configuration platform 9802 includes a zoned architecture evaluation circuit 9812 that provides a network operation report 10010 in response to the simulating.

Referencing FIG. 78, a system 9900 is schematically depicted, including a vehicle 9902, which may be simulated in whole or part, and which may represent an actual vehicle or a prospective vehicle. The system 9900 includes the vehicle multi-zone architecture configuration platform 9802 that provides the virtual network build environment 9908 to the user interface 9904. A user interacts with the user interface 9904 using a user device 9906, which may be a laptop, desktop, mobile computing device, a terminal communicatively coupled to the vehicle multi-zone architecture configuration platform 9802, and/or a dedicated engineering tool or station for virtual modeling of the multi-zone network, and/or network configuration operations as set forth in FIGS. 78-88 and the related figures. In certain embodiments, for example with hardware elements in the loop, aspects of the vehicle 9902 (e.g., switches, pedals, and/or other vehicle controls) may themselves be a part of the user device 9906, including for example where a dedicated engineering tool or station is utilized in the system 9900. In certain embodiments, the user interface 9904 is provided on the user device 9906, for example as a proprietary application on the user device 9906 that performs display and interaction operations for the vehicle multi-zone architecture configuration platform 9802, and/or as a mobile application on a mobile device (e.g., a phone, a tablet, or a lean laptop). In certain embodiments, the user device 9906 is provided through a web portal, operating in a web browser (e.g., as a javascript implantation) or otherwise using an internet connection, and/or through direct networking connections such as on a LAN, WLAN, using a tunneling application, through a VPN, or the like.

Figure 84:
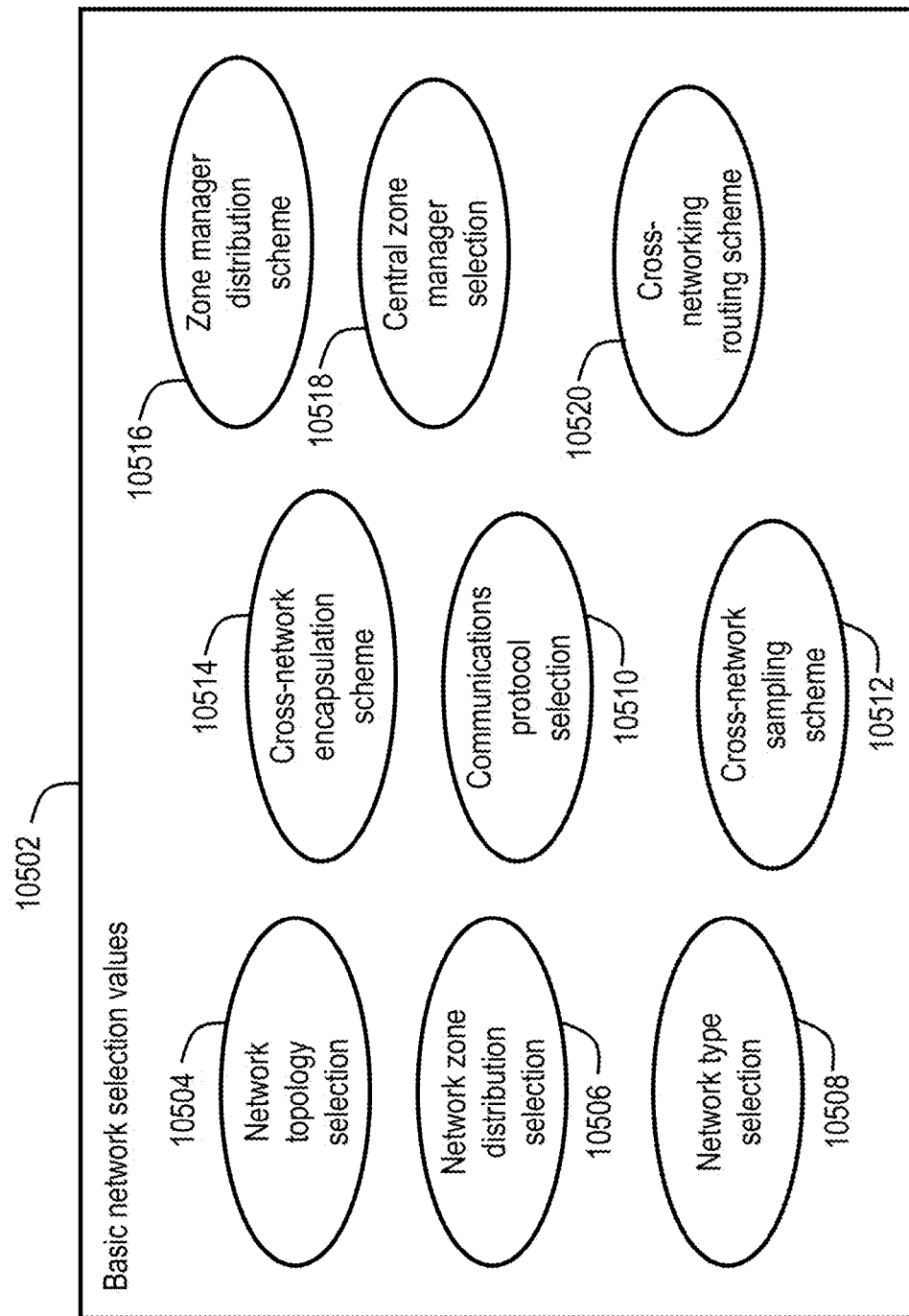
FIG. 84 is a block diagram depicting a basic network selection value, according to certain embodiments of the present disclosure.
Figure 85:
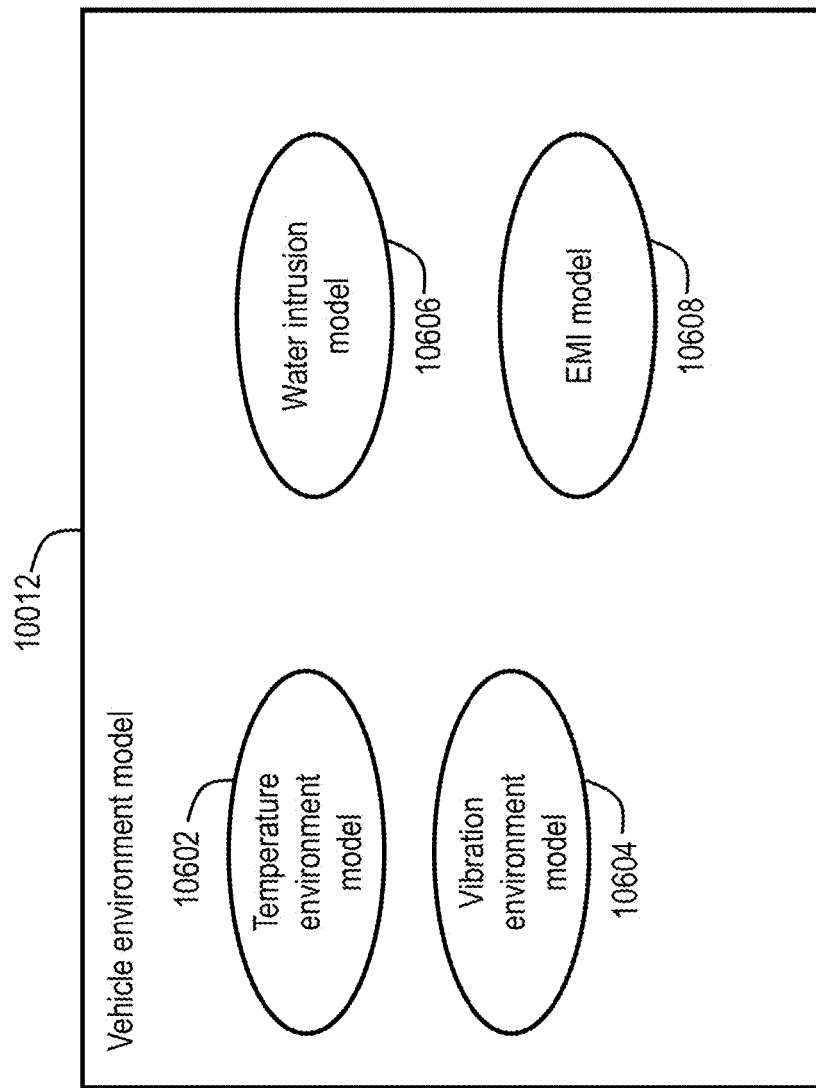
FIG. 85 is a block diagram depicting a vehicle environment model, according to certain embodiments of the present disclosure.
Figure 86:
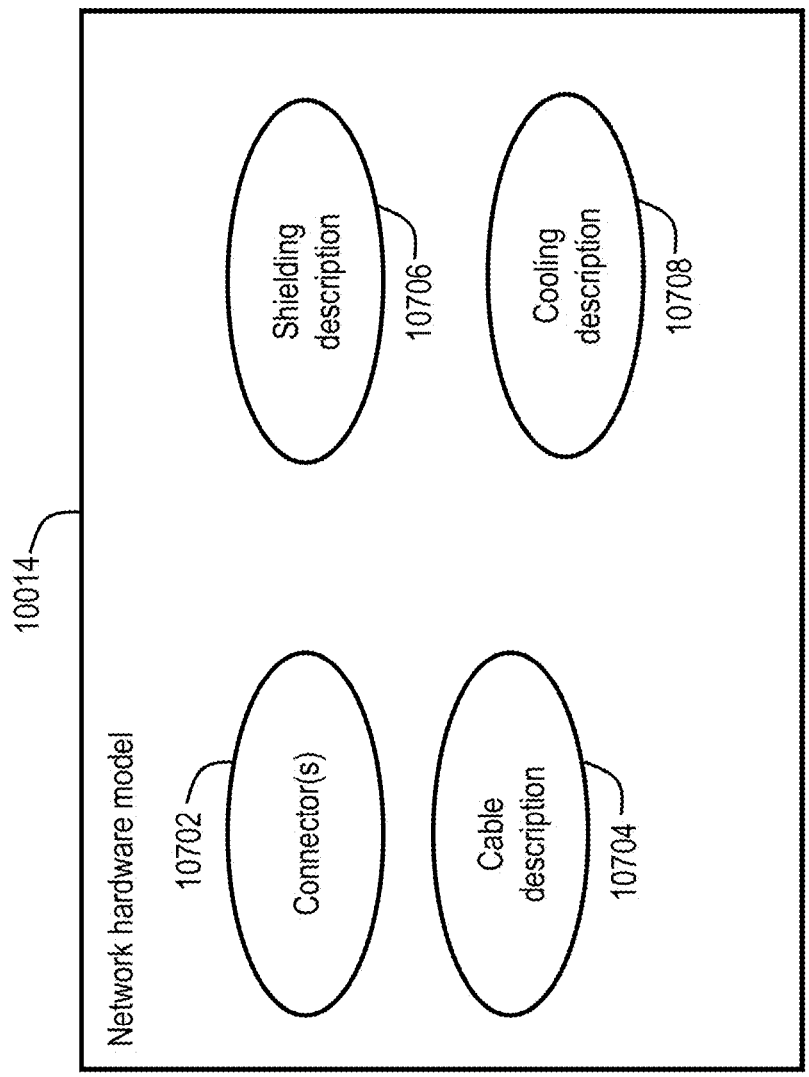
FIG. 86 is a block diagram depicting a network hardware model, according to certain embodiments of the present disclosure.

In certain embodiments, operations to build the virtual multi-zone network model 10004 include allowing the user to begin with a pre-built model, which may be selected from a list or menu of basic network selection values 10502 (e.g., reference FIG. 84). Some example basic network selection values 10502 that may be available include a network topology selection 10504 (e.g., selecting a schematic picture of a topology selection and/or selecting a topology from a drop-down menu, for example a 2-node, 3-node, or 4-node, including variations on the arrangements, and/or selecting an "n" node arrangement, and specifying a star, mesh, and/or ring arrangement); a network zone distribution selection 10506 (e.g., weighting zones to the front or back of the vehicle, assigning a central zone and central zone manager, and/or assigning redundancy parameters such as the zone manager that serves as the central zone manager in response to a hardware or control off-nominal event, adjusting connections between zones from the default layout applied by the topology selection, if used, and otherwise making or removing connections as desired); a network type selection 10508 (e.g., ethernet, speed ratings, cable and/or connector types if applicable, and/or how many ports are available for zone managers and/or switches in the system, any networks that are based on other systems like CAN, LIN, etc.); a communications protocol selection 10510 (e.g., protocols to be utilized for communications, industry standards for compliance, etc.); a cross-network sampling scheme 10512 (e.g., up-sampling or down-sampling operations for certain cross-zone communications, sampling rates to be enforced for certain network zones and/or end points, etc.); a cross-network encapsulation scheme 10514 (e.g., encapsulation operations to be performed for communications between certain zones and/or end points); a zone manager distribution scheme 10516 (e.g., defining elements such as the hardware and positioning of zone managers); a central zone manager selection (e.g., designating a central zone manager, for example if a default central zone manager is to be changed, and/or if this was not completed using the network zone distribution selection 10506); and/or a cross-network routing scheme 10520 (e.g., setting the connections between zones, and/or defining routing for end points, data types, etc. that may vary from simply following the shortest route). The listed basic network selection values 10502 are non-limiting examples, some of these may overlap, and not all of these may be present in a given embodiment. In certain embodiments, the available basic network selection values 10502 may be defined by the user, and/or may be varied according to the characteristics of the user device 9906, user interface 9904, and/or version of the vehicle multi-zone architecture configuration platform 9802.

In certain embodiments, the user may add elements by dragging and dropping them onto the virtual network build environment 9908, for example pulling zone managers, switches, end points, network connections, and the like onto the virtual network build environment 9908, and/or inserting elements onto the virtual network build environment 9908 using menu selections and/or keyboard shortcuts. In certain embodiments, typical interface elements are provided on the virtual network build environment 9908, for example allowing a user to select devices and drag them to different locations, alternate select devices (e.g., with a right click, shift click, hold click, etc.) to get a properties menu for the device, and the like. In certain embodiments, devices will be populated with actual example hardware, for example including actual device capabilities and characteristics (e.g., ports, processing power, memory, communication rates, etc.) and/or costs of the devices. In certain embodiments, end points may be configured, for example as sensors, actuators, and computing devices (e.g., ECUs), which may additionally be selected from a menu of actual devices, have user-defined properties, and/or default properties. In certain embodiments, the model is populated with actual network hardware, and runs a high resolution network hardware model 10014, for example including (reference FIG. 86) connectors 10702, cable descriptions 10704, shielding descriptions 10706, and/or a cooling description 10708 (e.g., based on fins, nearby environment, ambient conditions, etc.) for potentially temperature sensitive components.

In certain embodiments, end points, zone managers, or other elements can be populated with actual controls—for example designating a software build from a configuration library, which may be synced with actual production and/or engineering databases for a high resolution simulation. In certain embodiments, for example even when a full software build is integrated into the virtual network build environment 9908, a selection for simulation resolution can allow for switching the simulation between simple network traffic modeling, or actual vehicle runtime modeling. In certain embodiments, a selection can include environmental modeling (e.g., a vehicle environment model 10012), for example determining temperatures, vibration profiles, water intrusion or road splash, or the like for the network components, including models for temperature generation, heat rejection, warm-up, and/or cool down operations by controllers and nearby vehicle devices (e.g., an engine, electric motor, turbocharger, radiator, wheels and brakes, etc.) as well as ambient heat transfer. Referencing FIG. 85, an example vehicle environment model 10012 includes one or more of: a temperature environment model 10602, a vibration environment model 10604, a water intrusion model 10606, and/or an EMI model 10608.

In certain embodiments, the user can select a previous build, a build from an actual vehicle, or the like. In certain embodiments, the vehicle may be depicted schematically (e.g., as an outline, which may have a proper relative size or not), omitted completely, and/or depicted realistically (e.g., from CAD file, a drawing prepared for the purpose of the platform, etc.). In certain embodiments, the vehicle may be depicted as an empty shell, with major parts in place (e.g., powertrain components, engine, tires, vehicle interior, etc.), and/or as a high resolution model of the vehicle (e.g., enabling footprint analysis, high resolution determination of installation feasibility, modeling of environmental parameters, and/or integration challenges). An example network modeling circuit 9806 builds the virtual multi-zone network model of the vehicle by pre-populating the virtual multi-zone network model 10004.

Figure 80:
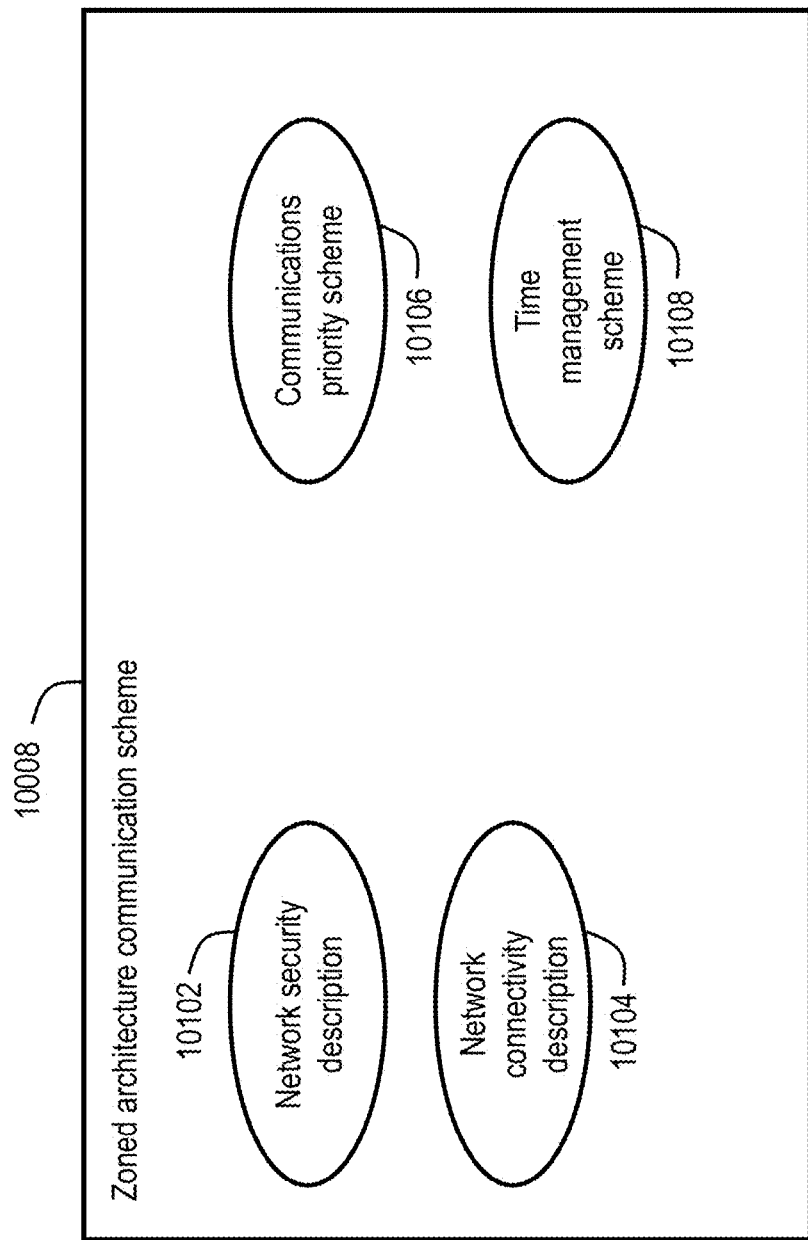
FIG. 80 is a block diagram depicting a zoned architecture communication scheme, according to certain embodiments of the present disclosure.
Figure 81:
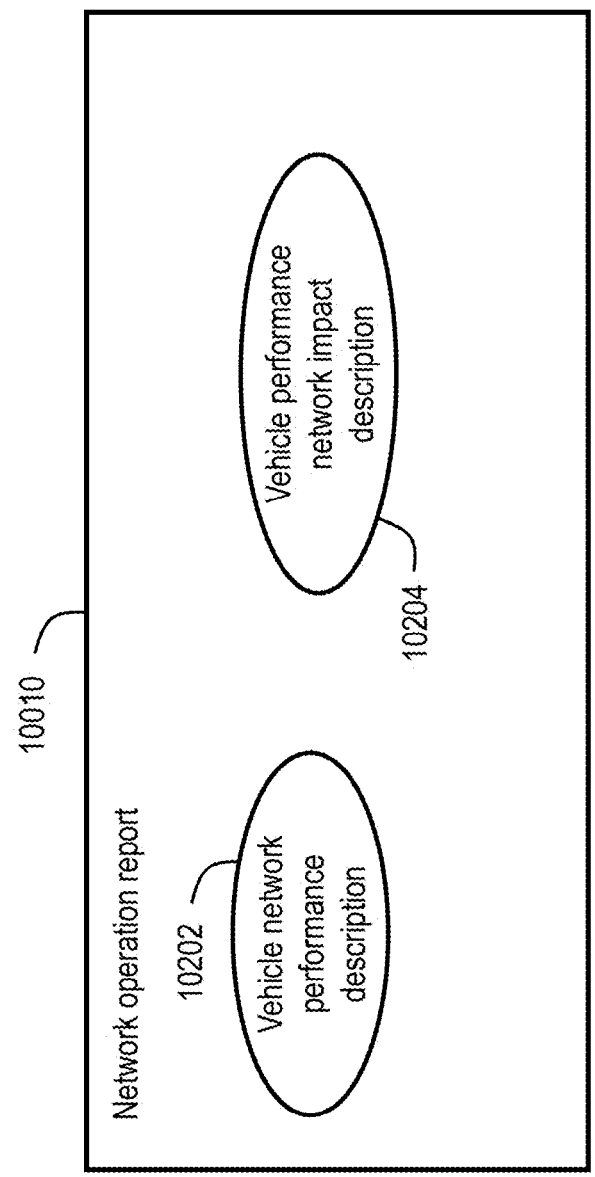
FIG. 81 is a block diagram depicting a network operation report, according to certain embodiments of the present disclosure.
Figure 82:
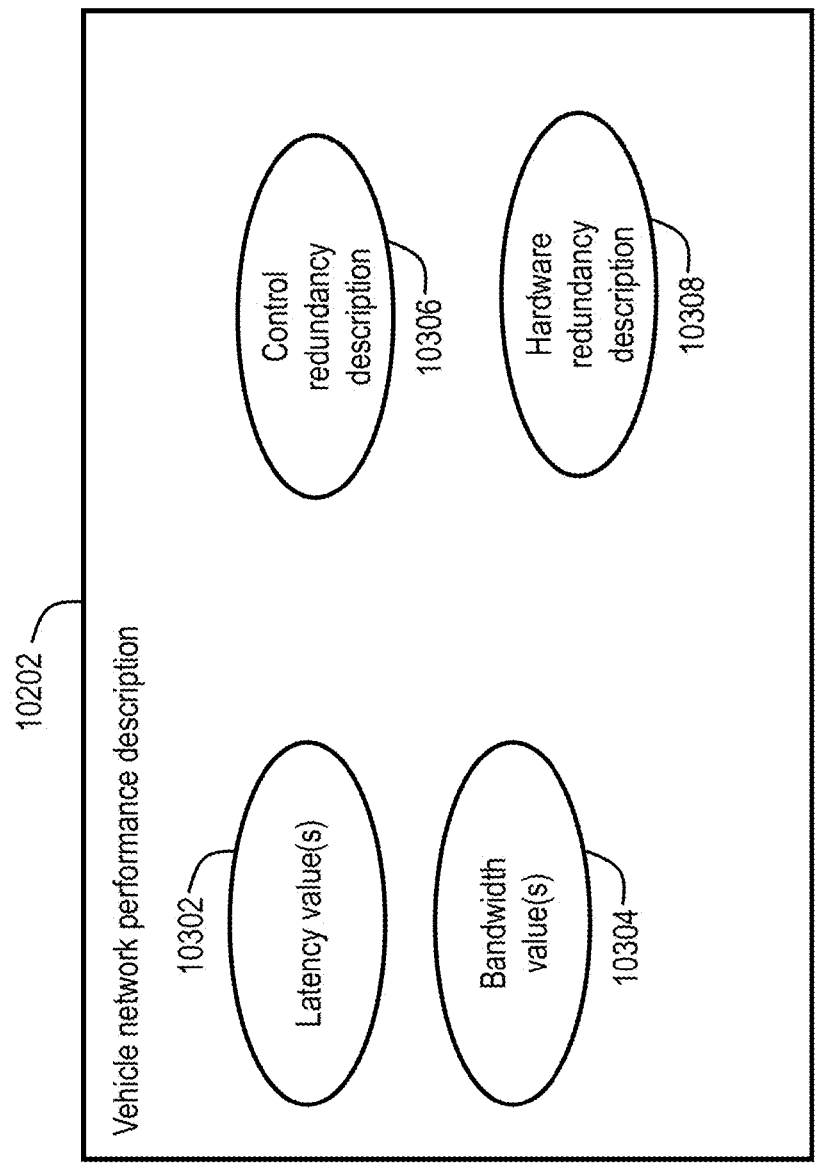
FIG. 82 is a block diagram depicting a vehicle network performance description, according to certain embodiments of the present disclosure.

Referencing FIG. 80, an example zoned architecture communication scheme 10008, at least in the full resolution mode, includes at least one of: a network security description 10102, a network connectivity description 10104, a time management scheme 10108, and/or a communications priority scheme 10106.

An example vehicle control model 10006 includes a model of end points of the multi-zone network simulating vehicle control operation, including actual network traffic, vehicle responses, and/or actual vehicle control instructions and data.

An example network execution circuit 9810 simulates runtime operation of the multi-zone network by simulating an off-nominal condition, for example certain hardware, control, and/or operating failures. An example network execution circuit 9810 simulates the off-nominal condition by simulating at least one condition selected from: the loss of an end point, the loss of a network component, a selected vehicle operating condition, or a selected operator behavior.

An example network modeling circuit 9806 builds the virtual multi-zone network model 10004 of the vehicle by applying a network topology description. An example network topology description includes applying a selected network topology for the zones of the multi-zone network, and assigning the zone controllers to the zones of the multi-zone network. An example network modeling circuit 9806 applies the network topology description in response to user inputs on the user interface.

An example network operation report 10010 includes an operational capability value (e.g., describing simulation outcomes, comparisons to expectations and/or specifications, etc.), a vehicle network performance description 10202 (e.g., reference FIG. 81), and/or a vehicle performance network impact description 10204. Referencing FIG. 82, an example vehicle network performance description 10202 includes at least one of the following: a latency value 10302 between at least two end points of the multi-zone network; a bandwidth value 10304 between at least two end points of the multi-zone network; a hardware redundancy description 10308 for the multi-zone network (e.g., capability and/or performance to meet hardware redundancy targets); or a control redundancy description 10306 for the multi-zone network (e.g., capability and/or performance to meet control redundancy targets).

Figure 83:
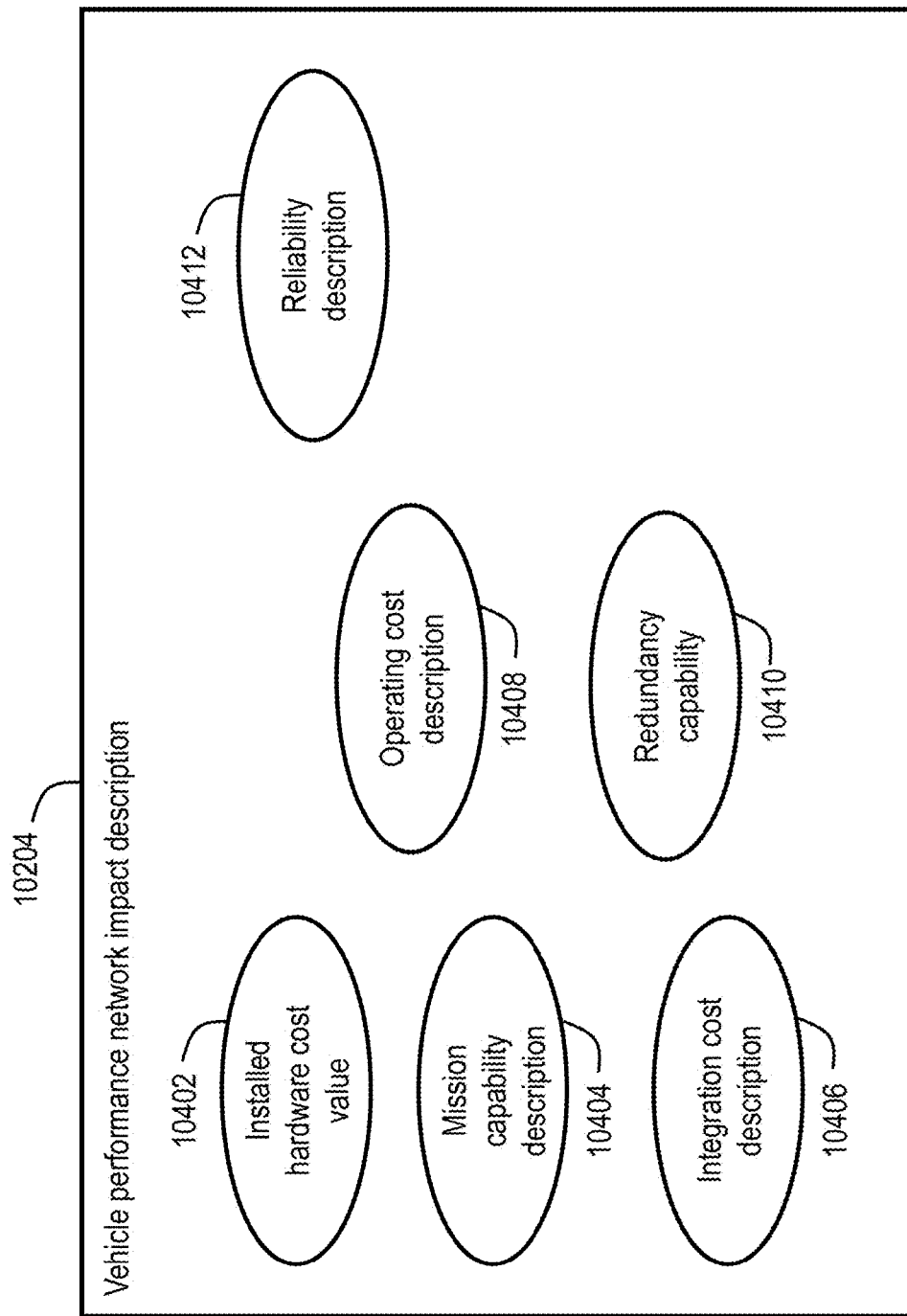
FIG. 83 is a block diagram depicting a vehicle performance network impact description, according to certain embodiments of the present disclosure.

Referencing FIG. 83, an example vehicle performance network impact description 10204 includes at least one of the following: an installed hardware cost value 10402 of the multi-zone network (e.g., determined from the parts list of actual network components); a mission capability description 10404 of the multi-zone network (e.g., determined from performance relative to targets or specifications, and/or a summary of actual performance values); an integration cost description 10406 of the multi-zone network (e.g., based on interfaces, installation difficulty estimates, etc.); an operating cost description 10408 of the multi-zone network (e.g., based on processing resources, power consumption, and/or maintenance operations estimated from the simulation); a redundancy capability description 10410 of the multi-zone network (e.g., comparison of redundancy capability and/or performance against redundancy targets and/or specification); and/or a reliability description 10412 of the multi-zone network (e.g., based on wear models, temperature environment, vibration environment, and/or water impingement on network components).

In certain embodiments, a high resolution simulation of network operations includes the network modeling circuit 9806 building the virtual multi-zone network model 10004 by performing one or more of (reference FIG. 80): interpreting a zoned architecture communication scheme 10008 for the multi-zone network, interpreting a time management scheme 10108 for the multi-zone network, interpreting a communications priority scheme 10106 for the multi-zone network, interpreting a network security description 10102 for the multi-zone network, and/or interpreting a network connectivity description 10104 for the multi-zone network.

An example vehicle multi-zone architecture configuration platform 9802 further includes a zoned architecture rollout circuit 9814 that builds a zoned architecture communication scheme 10008 in response to user operations on the interface and/or simulation results. The example zoned architecture rollout circuit 9814 communicates the zoned architecture communication scheme 10008 to a network management controller of a target vehicle, allowing the vehicle multi-zone architecture configuration platform 9802 to directly implement the zoned architecture rollout circuit 9814. In certain embodiments, the zoned architecture rollout circuit 9814 can provide a communication or final output including any aspects of the virtual multi-zone network model 10004, vehicle control model 10006, vehicle environment model 10012, network hardware model 10014, a schematic of the build environment, the network operation report 10010, a bill of materials for network components, and any simulation parameters, configurations, or results.

Figure 87:
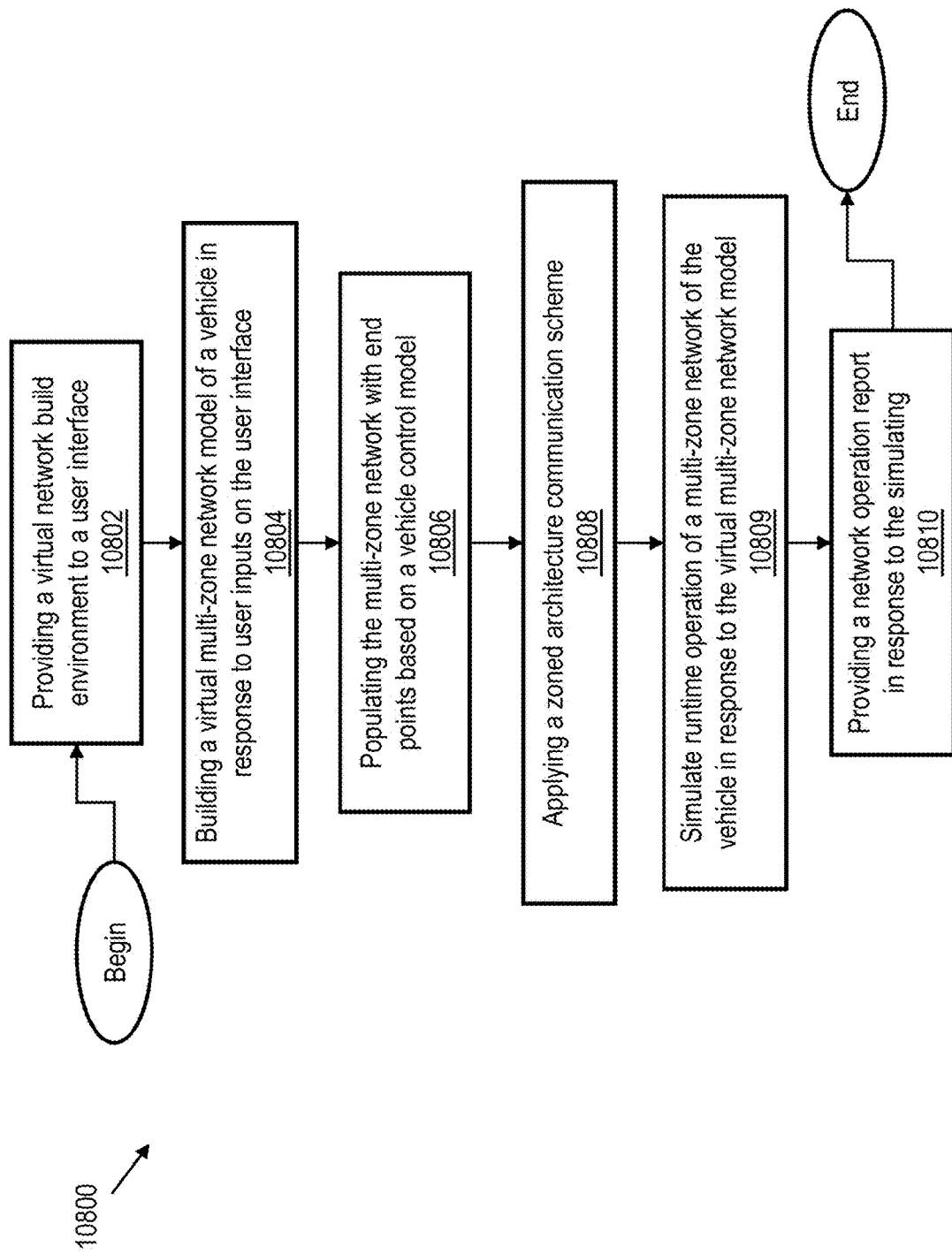
FIG. 87 is a process for providing a network operation report, according to certain embodiments of the present disclosure.

Referencing FIG. 87, an example procedure 10800 includes an operation 10802 to provide a virtual network build environment to a user interface, an operation 10804 to build a virtual multi-zone network model of a vehicle in response to user inputs on the user interface, the virtual multi-zone network model including a zone controller positioned on each zone of the virtual multi-zone network model; an operation 10806 to populate the virtual multi-zone network model with end points based on a vehicle control model; where operation 10804 to build the virtual multi-zone network model further includes operation 10808 applying a zoned architecture communication scheme; operation 10809 to simulate runtime operation of a multi-zone network of the vehicle in response to the virtual multi-zone network model, the vehicle control model, and the zoned architecture communication scheme; and operation 10810 to provide a network operation report in response to the simulating.

Figure 88:
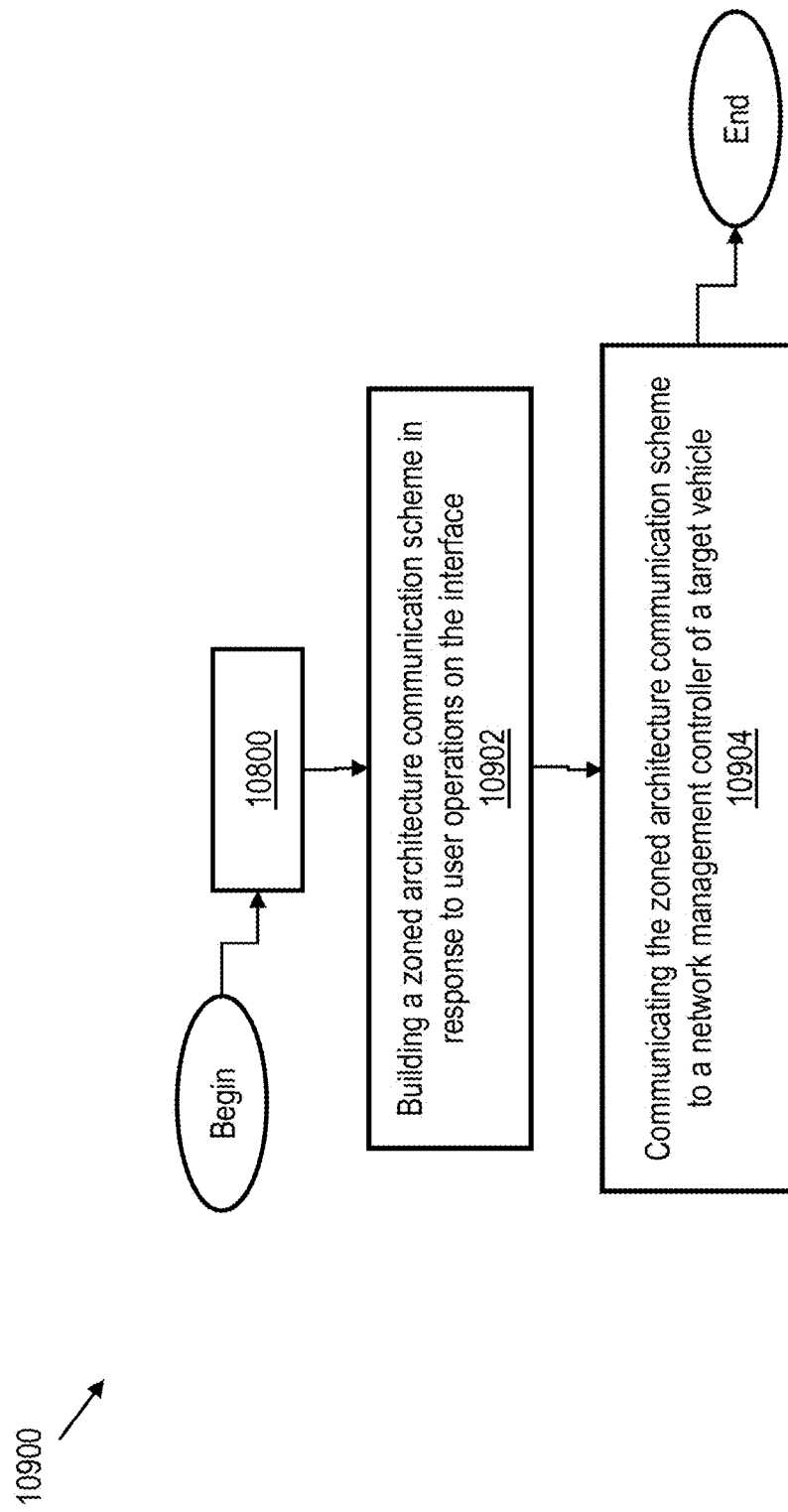
FIG. 88 is process for communicating a zoned architecture communication scheme, according to certain embodiments of the present disclosure.

Referencing FIG. 88, an example procedure 10900 includes procedure 10800, and further includes operation 10902 to build a zoned architecture communication scheme in response to user operations on the user interface, and operation 10904 to communicate the zoned architecture communication scheme to a network management controller of a target vehicle.

Without limitation to any other aspect of the present disclosure, embodiments herein provide for a system and procedures to monitor and/or analyze a zonal network architecture and/or a prospective zonal network architecture, to utilize the network monitoring and/or analysis in performing diagnostics, identifying issues, responding to issues, planning mitigation actions to issues, performing fault tree analysis, planning updates or recalls, developing a deeper understanding of activity on the vehicle and/or vehicle effects of a possible or actual failure or off-nominal operation, or the like.

Figure 89:
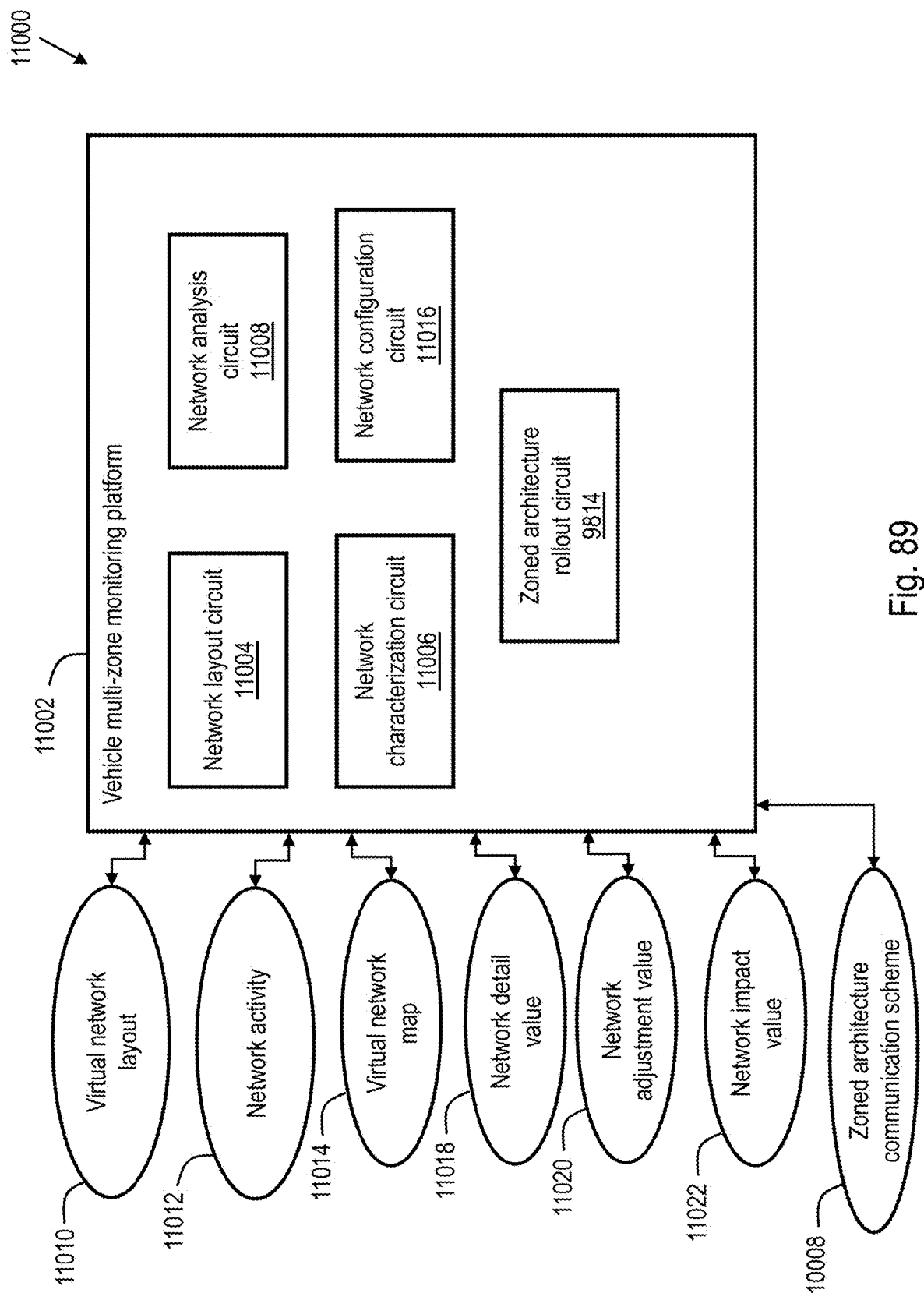
FIG. 89 is a block diagram depicting a vehicle multi-zone monitoring platform, according to certain embodiments of the present disclosure.

Referencing FIG. 89, an example system includes a vehicle multi-zone monitoring platform 11002, including: a network layout circuit 11004 that interprets a virtual network layout 11010 for a vehicle having a multi-zone network; a network characterization circuit 11006 that interprets network activity 11012 for the vehicle; and a network analysis circuit 11008 that determines a virtual network map 11014 in response to the virtual network layout 11010 and the network activity 11012, and provides the virtual network map 11014 to a user interface. In certain embodiments, the network characterization circuit 11006 that interprets network activity 11012 for the vehicle via direct communication with the vehicle, for example with a high rate data connection performing sniffing operations on network zones of the vehicle. Additionally or alternatively, the network characterization circuit 11006 that interprets network activity 11012 for the vehicle via a data collection operation, for example collecting data from a mirrored port of a network of the vehicle to determine network activity on the network and/or selected zones thereof.

An example virtual network map 11014 includes an interactive network activity depiction, for example with a graphical depiction of traffic flows between end points and/or network zones, bandwidth utilization descriptions, statistical data such as lost packets, comparisons to expected values, and the like. In certain embodiments, the virtual network map 11014 may include any data or depictions such as those depicted in FIGS. 22-27 of U.S. patent application Ser. No. 17/570,738 (SONA-0007-U01-C01). An example virtual network map 11014 includes a color coded schematic layout of the network, for example identifying components (e.g., end points, zone managers, network zones, etc.) that are suspect, not meeting specification, overworked (e.g., having an issue, but appears to be operating within design parameters), and/or having an active failure or fault condition.

Figure 90:
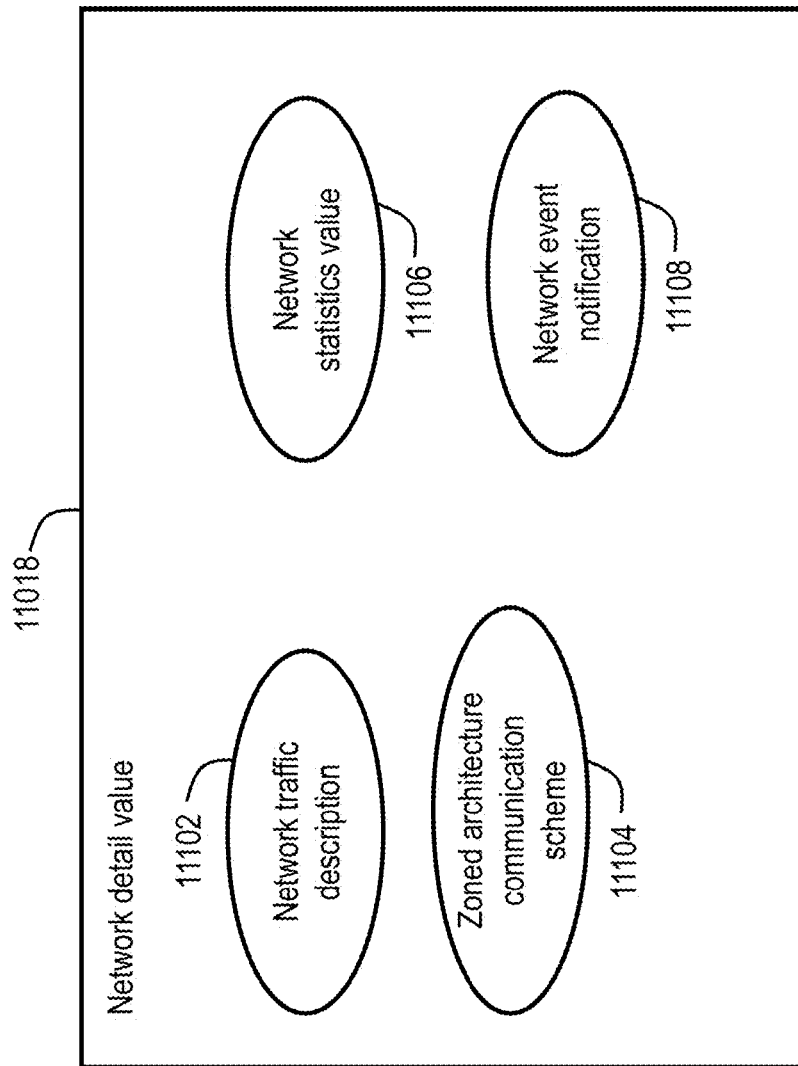
FIG. 90 is a block diagram depicting a network detail value, according to certain embodiments of the present disclosure.

An example network analysis circuit 11008 further provides a network detail value 11018 (reference FIG. 90) in response to a user selection on the user interface. Example and non-limiting network detail values include: a network traffic description 11102; a zoned architecture communication scheme 11104; a network statistics value 11106; and/or a network event notification 11108. An example vehicle multi-zone monitoring platform 11002 further includes a network configuration circuit 11016 that interprets a network adjustment value 11020, and updates the virtual network map 11014 in response to the network adjustment value 11020. In certain embodiments, the network adjustment value 11020 includes a user entered adjustment, and/or an automatically calculated adjustment, where the adjustment is responsive to observed issues, and/or is responsive to meet a capability adjustment or upgrade of the multi-zone network. Example and non-limiting network adjustment values 11020 include any one or more of: a different hardware component, a zoned architecture communication scheme 10008 adjustment, a zone manager command description adjustment, a timing scheme adjustment, a connectivity scheme adjustment, and/or a permissions value adjustment. In certain embodiments, the network adjustment values 11020 can include an adjustment to any configuration, command value, or scheme value as set forth throughout the present disclosure. An example network analysis circuit 11008 determines a network impact value 11022 in response to the network adjustment value 11020, and provides the network impact value 11022 to the user interface (e.g., as a confirmation that the adjustment is expected to be successful, and/or noting any gaps, uncertainties, or values that could not be estimated). In certain embodiments, the network analysis circuit 11008 utilizes a vehicle multi-zone architecture configuration platform 9802 to operate a high resolution model of the virtual network layout 11010, for example utilizing an API interface, and/or exercising the user interface 9904 and virtual network build environment 9908, to perform at least a part of the determination of the network impact value 11022.

vehicle multi-zone monitoring platform 11002 further includes a zoned architecture rollout circuit 9814 that builds a zoned architecture communication scheme 10008 in response to the network adjustment value 11020. The example zoned architecture rollout circuit 9814 further communicates the zoned architecture communication scheme 10008 to a network management controller of the vehicle or an offset vehicle (e.g., as a part of upgrading offset vehicles, which may be within the same vehicle class and/or share a relevant similarity in the network configuration).

Figure 91:
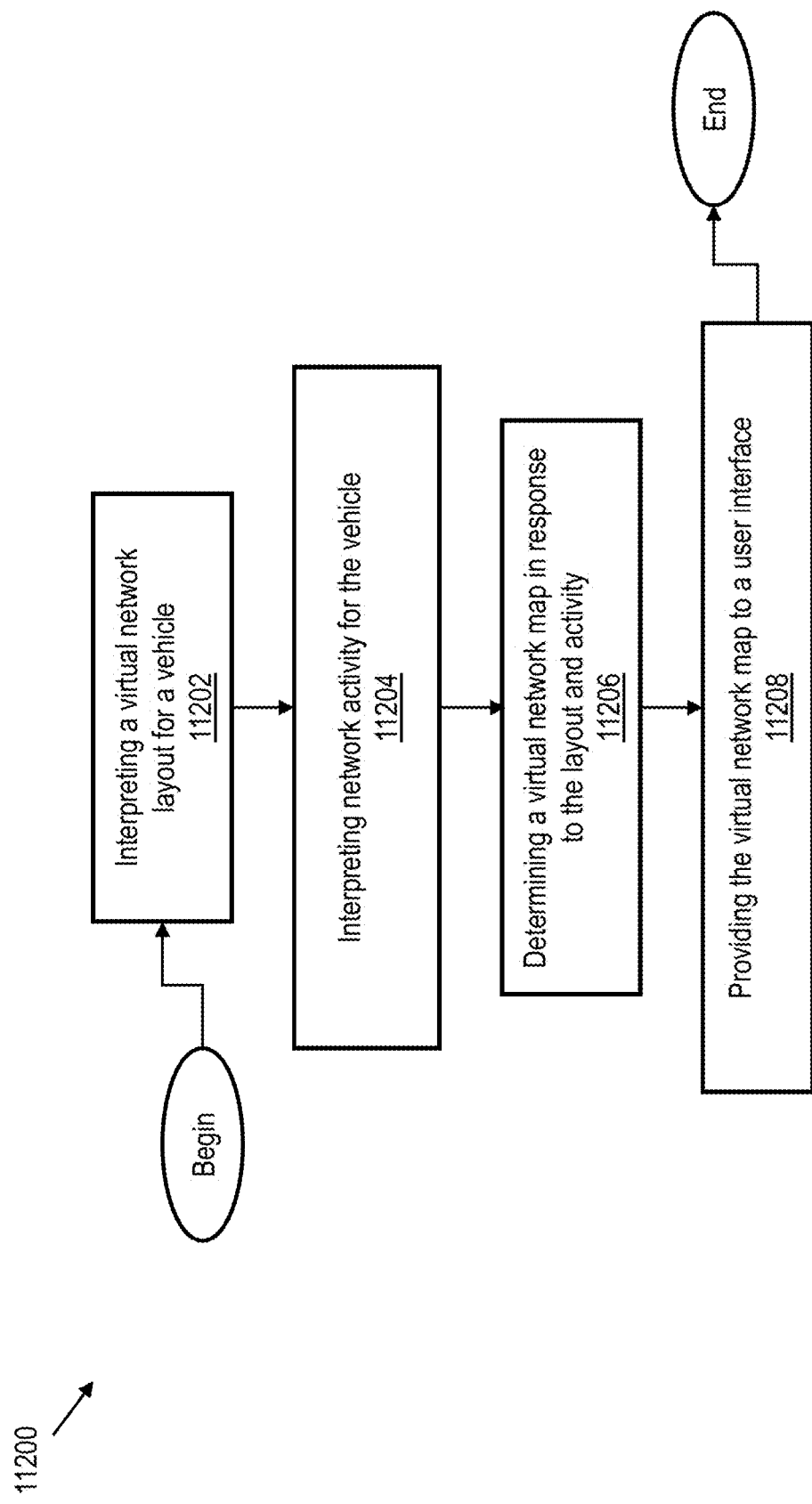
FIG. 91 is a process for providing a virtual network map to a user interface, according to certain embodiments of the present disclosure.

Referencing FIG. 91, an example procedure 11200 includes an operation 11202 to interpret a virtual network layout for a vehicle having a multi-zone network, an operation 11204 to interpret network activity for the vehicle, an operation 11206 to determine a virtual network map in response to the virtual network layout and the network activity, and an operation 11208 to provide the virtual network map to a user interface, which may be provided as an interactive network activity depiction, allowing the user to make adjustments, adjust displayed results and/or layouts, and/or perform simulations. In certain embodiments, the interactive network activity depiction is operated as an interface to a virtual network build environment 9908, providing the user on the vehicle multi-zone monitoring platform 11002 with any capabilities as set forth in FIGS. 77-88 and the related description. In certain embodiments, procedure 11200 includes an operation (not shown) to provide a network detail value in response to a user selection on the user interface. Example network detail values include one or more of a network traffic description, a zoned architecture communication scheme, a network statistics value, and/or a network event notification.

Figure 92:
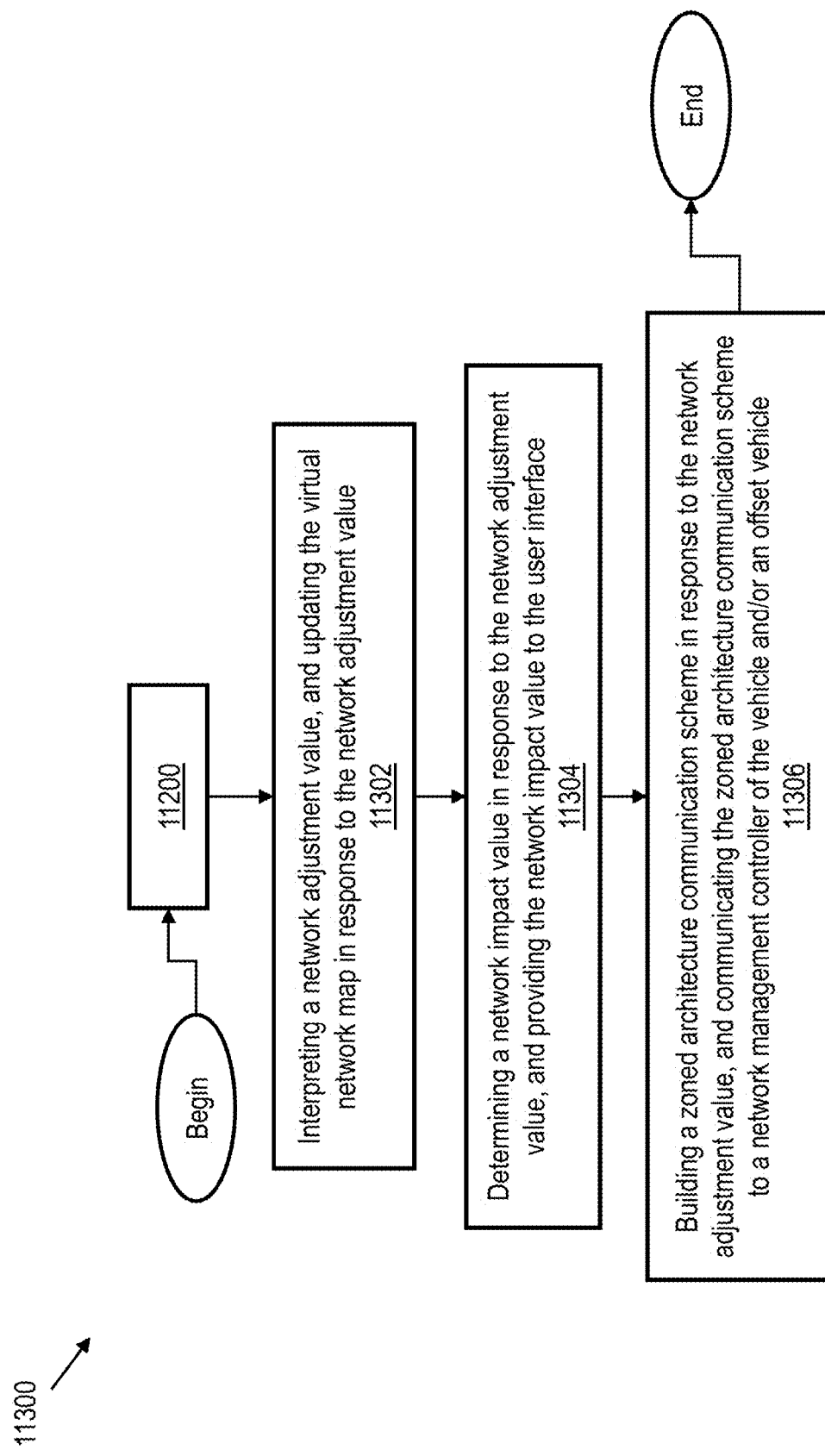
FIG. 92 is a process for building a zoned architecture communication scheme, according to certain embodiments of the present disclosure.

Referencing FIG. 92, an example procedure 11300 includes the procedure 11200, and further includes an operation 11302 to interpret a network adjustment value, and to update the virtual network map in response to the network adjustment value, an operation 11304 to determine a network impact value in response to the network adjustment value, and provide the network impact value to the user interface, and an operation 11306 to build a zoned architecture communication scheme in response to the network adjustment value, and communicate the zoned architecture communication scheme to a network management controller of at least one of the vehicle or an offset vehicle.

Without limitation to any other aspect of the present disclosure, embodiments herein provide for a system and procedures to monitor and/or analyze a zonal network architecture, where such monitoring can operate on the vehicle, and quickly identify and respond to issues as experienced on the vehicle with rapid response, or even immediate and/or automated response. Actions to respond include, without limitation, implementing a redundancy plan, changing a configuration of the zonal network operations (e.g., prioritizing critical communications and operations, and/or changing the routing or configuration of communications), migrating responsibility for security and/or control operations, and/or providing notifications and/or relevant data to a selected off-vehicle location.

Referencing FIG. 93, an example system 11400 includes a vehicle (not shown) having a multi-zone network including a plurality of network zones, each one of the network zones including at least one zone manager; a network monitoring controller 11402, including: a network layout circuit 11004 that interprets a zoned architecture communication scheme 10008 and a network layout 11406 for the vehicle; a network characterization circuit 11006 that interprets interpret network activity 11012 for the vehicle, and determines a network performance event 11408 in response to the network activity 11012; and a network reaction circuit 11404 that performs a network event action 11410 in response to the network performance event 11408. An example network event action includes collecting event information 11412 (e.g., information collected to determine that the event has occurred, traffic information for end points, flows, applications, network zones, or the like related to the event, a basic set of characterization information collected generally for network events, such as system information, operating states for the vehicle, fault code information, vehicle speed, load, ambient conditions, time since startup or the last shutdown, and/or a planned set of information based on an identifier for the event) in response to the network performance event 11408, and communicating the event information to an external device.

Figure 94:
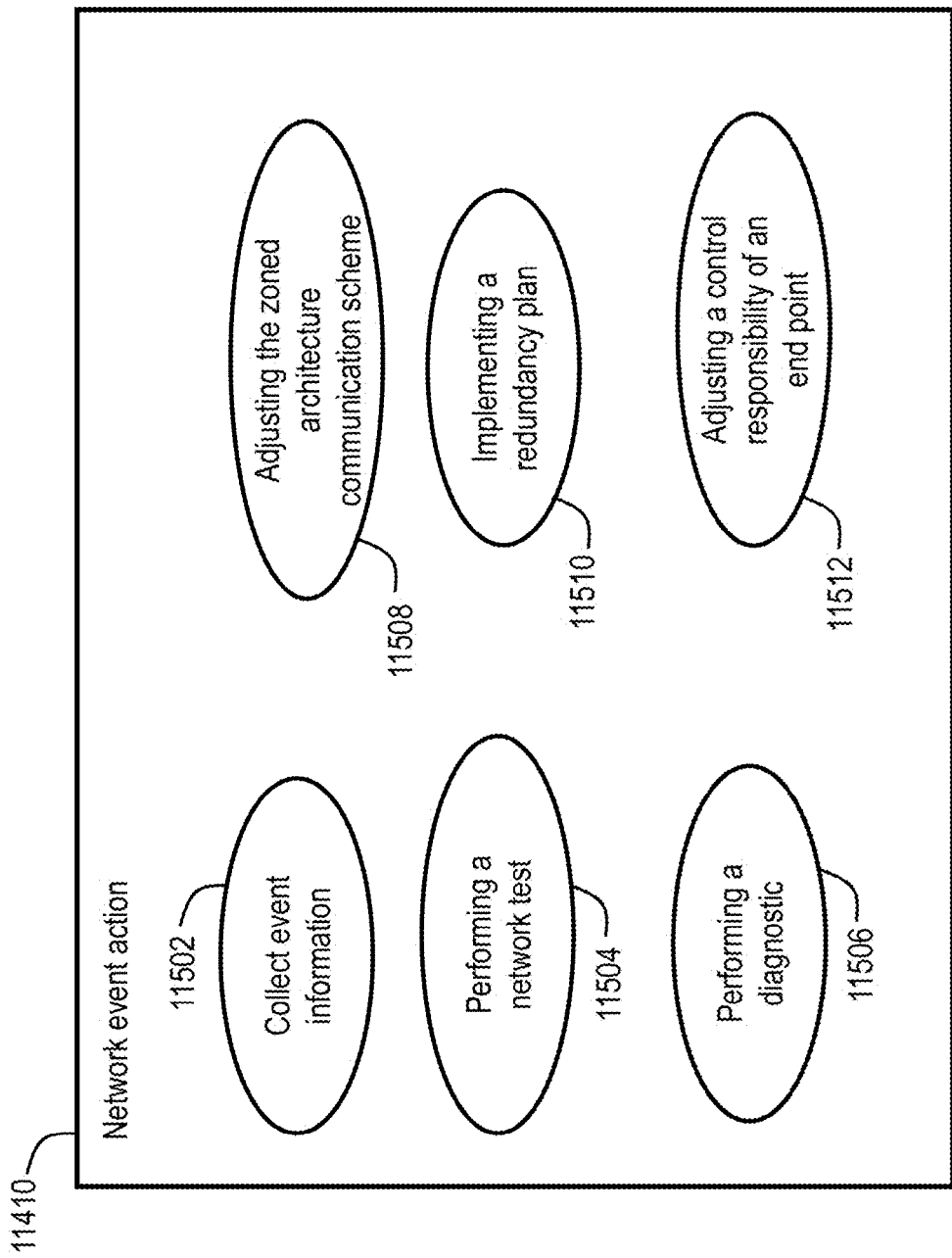
FIG. 94 is a block diagram depicting a network event action, according to certain embodiments of the present disclosure.

An example network reaction circuit 11404 collects one or more aspects of the event information as a post-event activity. An example network reaction circuit 11404 collects one or more aspects of the event information as pre-event information, for example captured from a rolling buffer, and/or captured from non-transient information (e.g., states or fault codes) that survived the event period. An example network reaction circuit 11404 collects the event information by capturing network activity 11012 utilized to determine the network performance event 11408. Referencing FIG. 94, example an non-limiting network event actions 11410 include one or more actions such as: collecting event information 11502, performing a network test 11504, performing a diagnostic 11506, adjusting the zoned architecture communication scheme 11508, implementing a redundancy plan 11510 (e.g., switching the responsibility of an end point, controller, zone manager, etc. in the system, which may further include disabling one or more components, operating a test with the one or more components, and/or placing the one or more components in limited operating condition), and/or adjusting a control responsibility of an end point 11512.

Figure 95:
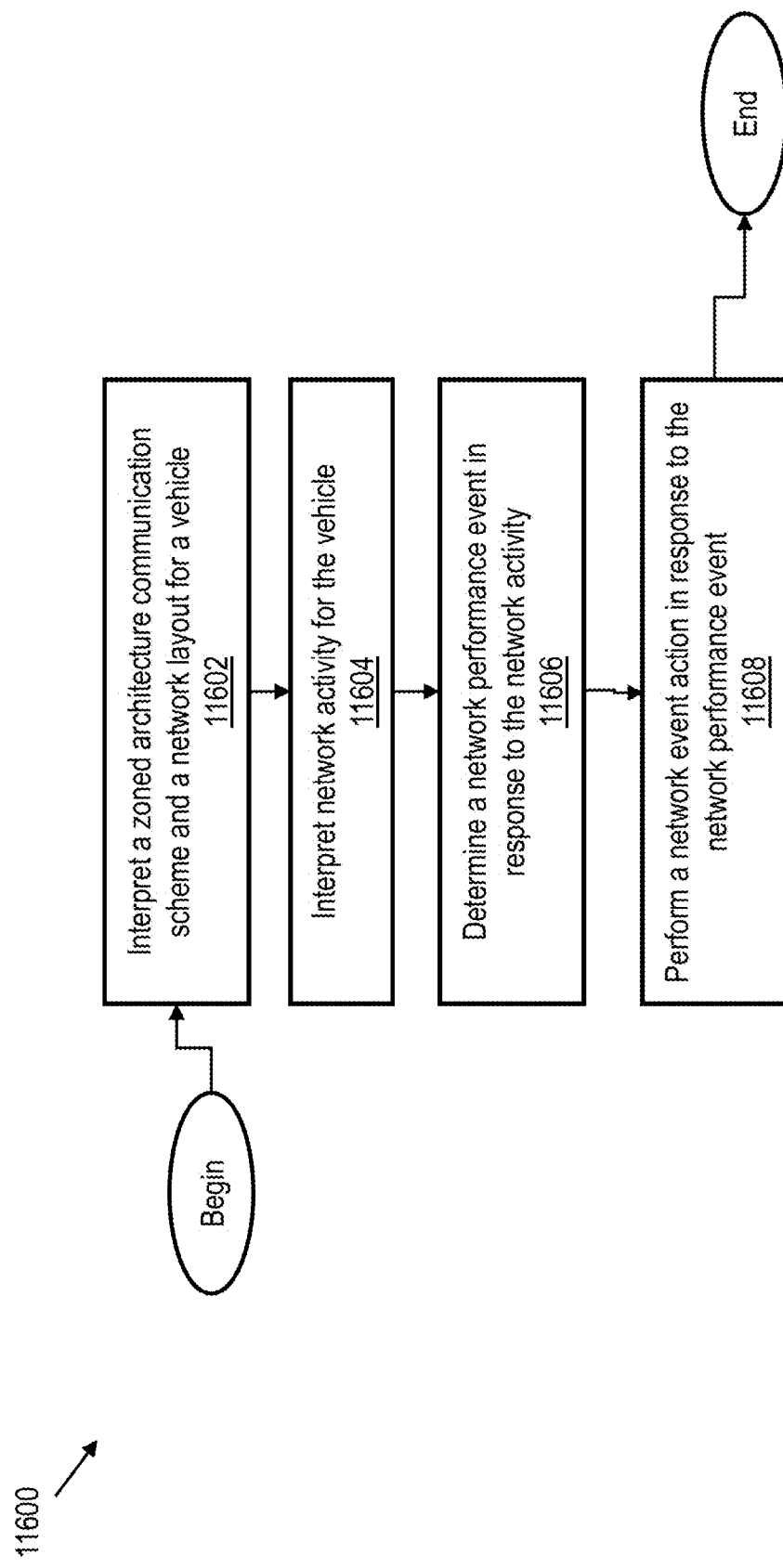
FIG. 95 is a process for performing a network event action, according to certain embodiments of the present disclosure.

Referencing FIG. 95, an example procedure 11600 includes an operation 11602 to interpret a zoned architecture communication scheme and a network layout for a vehicle having a multi-zone network including a plurality of network zones, each one of the network zones including at least one zone manager, an operation 11604 to interpret network activity for the vehicle, an operation 11606 to determine a network performance event in response to the network activity, and an operation 11608 to perform a network event action in response to the network performance event.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems herein. The terms computer, computing device, processor, circuit, and/or server, ("computing device") as utilized herein, should be understood broadly.

An example computing device includes a computer of any type, capable to access instructions stored in communication thereto such as upon a non-transient computer readable medium, whereupon the computer performs operations of the computing device upon executing the instructions. In certain embodiments, such instructions themselves comprise a computing device. Additionally or alternatively, a computing device may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware and/or computing devices include, without limitation, a general-purpose computer, a server, an embedded computer, a mobile device, a virtual machine, and/or an emulated computing device. A computing device may be a distributed resource included as an aspect of several devices, included as an interoperable set of resources to perform described functions of the computing device, such that the distributed resources function together to perform the operations of the computing device. In certain embodiments, each computing device may be on separate hardware, and/or one or more hardware devices may include aspects of more than one computing device, for example as separately executable instructions stored on the device, and/or as logically partitioned aspects of a set of executable instructions, with some aspects comprising a part of one of a first computing device, and some aspects comprising a part of another of the computing devices.

A computing device may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer-to-peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g., where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another.

The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above, and combinations thereof, may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the disclosure has been disclosed in connection with certain embodiments shown and described in detail, various modifications and improvements thereon will become readily apparent to those skilled in the art. Accordingly, the scope of the present disclosure is not to be limited by the foregoing examples but is to be understood in the broadest sense allowable by law.

What is claimed is:

1. A system, comprising:
   a vehicle multi-zone monitoring platform, comprising:
   a network layout circuit structured to interpret a virtual network layout for a vehicle having a multi-zone network;
   a network characterization circuit structured to interpret network activity for the vehicle;
   a network analysis circuit structured to determine a virtual network map in response to the virtual network layout and the network activity, and to provide the virtual network map to a user interface;
   a network configuration circuit structured to interpret a network adjustment value, and to update the virtual network map in response to the network adjustment value; and
   a zoned architecture rollout circuit structured to build a zoned architecture communication scheme in response to the network adjustment value.

2. The system of claim 1, wherein the virtual network map comprises an interactive network activity depiction.

3. The system of claim 2, wherein the network analysis circuit is further structured to provide a network detail value in response to a user selection on the user interface.

4. The system of claim 3, wherein the network detail value comprises at least one of:
   a network traffic description;
   a zoned architecture communication scheme;
   a network statistics value; or
   a network event notification.

5. The system of claim 1, wherein the network analysis circuit is further structured to determine a network impact value in response to the network adjustment value, and to provide the network impact value to the user interface.

6. The system of claim 1, wherein the zoned architecture rollout circuit is further structured to communicate the zoned architecture communication scheme to a network management controller of at least one of the vehicle or an offset vehicle.

7. A method, comprising:
   interpreting a virtual network layout for a vehicle having a multi-zone network;
   interpreting network activity for the vehicle;
   determining a virtual network map in response to the virtual network layout and the network activity;
   providing the virtual network map to a user interface;
   interpreting a network adjustment value;
   updating the virtual network map in response to the network adjustment value; and
   building a zoned architecture communication scheme in response to the network adjustment value.

8. The method of claim 7, further comprising providing the virtual network map as an interactive network activity depiction.

9. The method of claim 8, further comprising providing a network detail value in response to a user selection on the user interface.

10. The method of claim 9, wherein the network detail value comprises at least one of:
    a network traffic description;
    a zoned architecture communication scheme;
    a network statistics value; or
    a network event notification.

11. The method of claim 7, further comprising determining a network impact value in response to the network adjustment value, and providing the network impact value to the user interface.

12. The method of claim 7, further comprising communicating the zoned architecture communication scheme to a network management controller of at least one of the vehicle or an offset vehicle.

* * * * *